(12) United States Patent
Bently et al.

(10) Patent No.: US 9,043,774 B2
(45) Date of Patent: May 26, 2015

(54) SYSTEMS AND METHODS FOR INFORMATION FLOW ANALYSIS

(76) Inventors: William G. Bently, Bloomington, IN (US); David D. Duchesneau, Puyallup, WA (US)

(*) Notice: Subject to any disclaimer, the term of this patent is extended or adjusted under 35 U.S.C. 154(b) by 1269 days.

(21) Appl. No.: 12/370,554

(22) Filed: Feb. 12, 2009

(65) Prior Publication Data

US 2009/0217248 A1 Aug. 27, 2009

Related U.S. Application Data

(60) Provisional application No. 61/027,967, filed on Feb. 12, 2008, provisional application No. 61/027,975, filed on Feb. 12, 2008.

(51) Int. Cl.
*G06F 9/45* (2006.01)
*G06F 9/44* (2006.01)

(52) U.S. Cl.
CPC . *G06F 8/30* (2013.01); *G06F 8/433* (2013.01)

(58) Field of Classification Search
None
See application file for complete search history.

(56) References Cited

U.S. PATENT DOCUMENTS

| | | | | |
|---|---|---|---|---|
| 5,237,691 A | * | 8/1993 | Robinson et al. | 717/107 |
| 5,249,295 A | * | 9/1993 | Briggs et al. | 717/157 |
| 5,347,639 A | * | 9/1994 | Rechtschaffen et al. | 712/203 |
| 5,408,658 A | * | 4/1995 | Rechtschaffen et al. | 712/216 |
| 5,448,737 A | | 9/1995 | Burke et al. | |
| 5,742,814 A | | 4/1998 | Balasa et al. | |
| 5,790,866 A | * | 8/1998 | Robison | 717/156 |
| 6,077,313 A | * | 6/2000 | Ruf | 717/155 |
| 6,079,032 A | * | 6/2000 | Peri | 714/38.13 |
| 6,182,284 B1 | * | 1/2001 | Sreedhar et al. | 717/155 |
| 6,226,789 B1 | * | 5/2001 | Tye et al. | 717/155 |
| 6,243,863 B1 | * | 6/2001 | Kothari et al. | 717/149 |
| 6,378,066 B1 | * | 4/2002 | Lewis | 717/155 |
| 6,694,310 B1 | * | 2/2004 | Yu et al. | 717/156 |
| 6,745,384 B1 | * | 6/2004 | Biggerstaff | 717/156 |
| 6,983,456 B2 | * | 1/2006 | Poznanovic et al. | 717/133 |
| 7,039,909 B2 | * | 5/2006 | Wu et al. | 717/157 |

(Continued)

OTHER PUBLICATIONS

Parrow, "The Expressive Power of Parallelism", 1990, Proceedings of PARLE '89 vol. II; [retrieved on Oct. 17, 2013]; Retrieved from Internet <URL: http://citeseerx.ist.psu.edu/viewdoc/download-?doi=10.1.1.39.359&rep=rep1&type=pdf>;pp. 1-43.*

(Continued)

*Primary Examiner* — Xi D Chen
(74) *Attorney, Agent, or Firm* — Foster Pepper PLLC; Richard T. Black; P. G. Scott Born

(57) ABSTRACT

Computer-implemented methods for analyzing computer programs written in semi-structured languages are disclosed. The method is based on unification of the two classic forms of program flow analysis, control flow and data flow analysis. As such, it is capable of substantially increased precision, which increases the effectiveness of applications such as automated parallelization and software testing. Certain implementations of the method are based on a process of converting source code to a decision graph and transforming that into one or more alpha graphs which support various applications in software development. The method is designed for a wide variety of digital processing platforms, including highly parallel machines. The method may also be adapted to the analysis of (semi-structured) flows in other contexts including water systems and electrical grids.

3 Claims, 186 Drawing Sheets

(56) References Cited

U.S. PATENT DOCUMENTS

| | | | | |
|---|---|---|---|---|
| 7,263,692 | B2* | 8/2007 | Muthukumar et al. | 717/150 |
| 7,555,745 | B2* | 6/2009 | Iwashita | 717/137 |
| 7,703,085 | B2* | 4/2010 | Poznanovic et al. | 717/140 |
| 7,721,275 | B2* | 5/2010 | Kestner et al. | 717/156 |
| 7,793,276 | B2* | 9/2010 | Dai et al. | 717/149 |
| 7,797,691 | B2* | 9/2010 | Cockx et al. | 717/155 |
| 7,882,498 | B2* | 2/2011 | Ottoni et al. | 717/149 |
| 7,886,280 | B2* | 2/2011 | Zawawy | 717/128 |
| 7,926,037 | B2* | 4/2011 | Leino et al. | 717/157 |
| 8,134,566 | B1* | 3/2012 | Brown et al. | 345/522 |
| 8,225,299 | B2* | 7/2012 | Takeuchi | 717/144 |
| 8,549,507 | B2* | 10/2013 | Kim et al. | 717/159 |
| 8,578,389 | B1* | 11/2013 | Boucher | 717/156 |
| 8,615,748 | B2* | 12/2013 | Doyle et al. | 717/156 |
| 8,694,971 | B2* | 4/2014 | Chandra et al. | 717/159 |
| 8,813,054 | B2* | 8/2014 | Joisha et al. | 717/157 |
| 2004/0015929 | A1* | 1/2004 | Lewis et al. | 717/156 |
| 2004/0154009 | A1* | 8/2004 | Reynaud | 717/155 |
| 2004/0243982 | A1* | 12/2004 | Robison | 717/157 |
| 2005/0108696 | A1* | 5/2005 | Dai et al. | 717/155 |
| 2005/0188364 | A1* | 8/2005 | Cockx et al. | 717/159 |
| 2008/0172662 | A1* | 7/2008 | Harris et al. | 717/159 |
| 2009/0217248 | A1* | 8/2009 | Bently et al. | 717/156 |
| 2011/0191761 | A1* | 8/2011 | Doyle et al. | 717/156 |
| 2012/0096444 | A1* | 4/2012 | Wright et al. | 717/159 |
| 2014/0075423 | A1* | 3/2014 | Kielstra | 717/155 |
| 2014/0075424 | A1* | 3/2014 | Kielstra | 717/155 |

OTHER PUBLICATIONS

Carribault, et al., "Deep Jam: Conversion of Coarse-Grain Parallelism to Instructin-Level and Vector Parallelism for Irregular Applications"; 2005 IEEE; [retrieved on Jun. 28, 2014]; Retrieved from Internet <URL:http://ieeexplore.ieee.org/stamp/stamp.jsp?tp=&arnumber=1515601>;pp. 1-10.*

Purser, et al., "A Study of Slipstream Processors"; 2000 IEEE; [retrieved on Jun. 28, 2014]; Retrieved from Internet <URL:http://ieeexplore.ieee.org/stamp/stamp.jsp?tp=&arnumber=898077>;pp. 269-280.*

August, et al., "The Program Decision Logic Approach to Predicated Execution"; 1999 IEEE; [retrieved on Jun. 28, 2014]; Retrieved from Internet <URL:http://dl.acm.org/citation.cfm?id=300979>;pp. 208-219.*

Lee, et al., "A Dynamic Tool for Finding Redundant Computations in Native Code", 2008 ACM; [retrieved on Jun. 28, 2014]; Retrieved from Internet <URL:http://dl.acm.org/citation.cfm?id=1401827>;pp. 15-21.*

Kulkarni, et al., "Fast and efficient searches for effective optimization-phase sequences", 2005 ACM; [retrieved on Dec. 1, 2014]; Retrieved from Internet <URL:http://dl.acm.org/citation.cfm?id=1071604.1071607>; pp. 165-198.*

Lacroix, et al., "An Introduction to Metabolic Networks and Their Structural Analysis", 2008 IEEE;[retrieved on Dec. 1, 2014]; Retrieved from Internet <URL:http://dl.acm.org/citation.cfm?id=1486911.1486918>; pp. 594-617.*

Ravasi, Mattavelli, "High-Abstraction Level Complexity Analysis and Memory Architecture Simulations of Multimedia Algorithms", 2005 IEEE;[retrieved on Dec. 01, 2014]; Retrieved from Internet <Url:http://ieeexplore.ieee.org/stamp/stamp.jsp?tp=&arnumber=1425531>; pp673-684.*

Allen et al.; Optimizing Compilers for Modern Architectures: A Dependence-Based Approach; 2002; pp. 35-38, 65-67, 350-352, 360-364; Morgan Kaufmann Publishers and Academic Press.

Paige; On Partitioning Program Graphs; IEEE Transactions on Software Engineering, vol. SE-3 No. 6; Nov. 1977; pp. 386-388; IEEE Press.

Bently; How to Test an Object: The Information Flow Approach; Conference Tutorials, 12th International Software Quality Week; May 1999; pp. 27-38, 51-52; Software Research Institute; San Jose, CA.

Bently et al.; The Dynamic Information Flow Testing of an Object; Conference Tutorials, 12th International Software Quality Week; May 1999; pp. 5-10, 18; Software Research Institute; San Jose, CA.

Bently; Software Test Efficiency and Information Flow Analysis; Conference Proceedings, Sixth International Software Quality Week; May 1993; pp. 2-5; Software Research Institute; San Francisco, California.

Bently; An Introduction to Cd Testing: A Comparison of Two Path Testing Strategies: Ct and Cd; Conference Proceedings, Quality Week 1991; May 1991; pp. 12-15, 20-24, 32, 34-35; Software Research Inc.; San Francisco, California.

Bently; Moving Toward Data Use Testing; Conference Proceedings, Quality Week 1990; May 1990; pp. 18-31; Software Research Inc.; San Francisco, California.

Bently et al.; Ct Coverage—An Initial Evaluation; Technical Proceedings, SR Quality Week 1989; May 1989, pp. 7-17; Software Research Inc.; San Francisco, California.

Jackson et al.; A New Model of Program Dependences for Reverse Engineering; Conference Proceedings, Second ACM SIGSOFT Symposium on Foundations of Software Engineering; Dec. 1994; pp. 2,4,8; ACM.

Bergeretti; Information-Flow and Data-Flow Analysis of While-Programs; ACM Transactions on Programming Languages and Systems, vol. 7 No. 1; Jan. 1985; pp. 59-60; ACM.

Farrow; Graph Grammars and Global Program Data Flow Analysis; Conference Proceedings, 17th Annual Symposium on Foundations of Computer Science; Oct. 1976; pp. 42-45; IEEE Computer Society Press.

Ferrante; The Program Dependence Graph and Its Use in Optimization; ACM Transactions on Programming Languages and Systems, vol. 9 No. 3; Jul. 1987; pp. 319-320, 322; ACM.

Bently et al.; Ct Coverage —An Initial Evaluation; Technical Proceedings, SR Quality Week 1989; May 1989, pp. 7-17; Software Research Inc.; San Francisco, California.

Korel, The Program Dependence Graph in Static Program Testing, Information Processing Letters, vol. 24, No. 2, Jan. 1987, pp. 103-108.

Bates, et al., Incremental Program Testing Using Program Dependence Graphs, Proceedings of the 20th ACM Sigplan-Sigact Symposium on Principals of Programming Laguages, POPL '93, Jan. 1993, pp. 384-396, New York, NY.

* cited by examiner

| MEMORY ACCESS ELEMENT | DESCRIPTION | DDF EXAMPLE | JAVA EQUIVALENT |
|---|---|---|---|
| definition | definition of variable x | d(x) | x=5 |
| use | use of variable x | u(x) | println (x) |
| predicate | collectively represents one or more uses contained in a decision predicate | if ( u(a), u(b) ) | if ( a>0 && b>0 ) |

FIG.2

| INTRA-SEGMENT ACCESS ELEMENT | DESCRIPTION | DDF EXAMPLE | JAVA EQUIVALENT |
|---|---|---|---|
| intra-segment du-pair | intra-segment du-pair containing the variable x | du(x) | x = 1<br>y = x |
| ud-pair | ud-pair containing the variables x and y | ud(x,y) | y = x |

FIG.3

JAVA SOURCE CODE

```
public int signxy ( int x, int y ) {
    int sx = -1;
    int sxy;

if ( x >= 0 )
        sx = 1;
    if (y >= 0 )
        sxy = sx;
    else
        sxy = -sx;
    return sxy;
}
```

DDF

```
signxy {
    d(x), d(y), d(sx);

if( u(x) )
        d(sx);
    if( u(y) )
        ud(sx, sxy);
    else
        ud(sx, sxy);
    u(sxy);
}
```

FIG.4

SEQUENCE OF EXECUTION IS  A B OR A C

SEQUENCE OF EXECUTION IS:

A B C E F  OR
A B C D B C E F  OR
A B C D B C D B C E F  OR ...

DDF:

while ( U(a) )
{. . .}

| α-NODE TYPE | DESCRIPTION | SYMBOL |
|---|---|---|
| definition | point at which a value is bound to a variable | Ⓓ |
| use | point at which the value of a variable is accessed | Ⓤ |
| predicate | decision or loop predicate-divergence of control | ⓘ |
| plus | decision exit-convergence of data and control | ⊕ |
| star | partial def-clear outcome or def-clear complementary outcome | ✳ |

FIG.14

| α−NODE TYPE | DESCRIPTION | SYMBOL |
|---|---|---|
| loop entry plus | entry of loop− convergence of data from outside and inside of loop | ⊕ |
| loop exit plus | exit of loop− convergence of data from inside of loop | ⊕ |
| control plus | convergence of control | ⊕ |

FIG.15

| FIELD α-NODE | DESCRIPTION | USE | PREDICATE | PLUS | CONTROL PLUS | LOOP ENTRY PLUS | LOOP EXIT PLUS | STAR |
|---|---|---|---|---|---|---|---|---|
| ALPHAGRAPH | 1 | 1 | 1 | 1 | 1 | 1 | 1 | 1 |
| ID | 1 | 1 | 1 | 1 | 1 | 1 | 1 | 1 |
| VARIABLE | 1 | 1 | 1+ | 1 | 0–1 | 1 | 1 | 1 |
| DATA ELEMENT ID | 0–1 | 1 | | | | | | 1 |
| CONTROL INPUT | | | FALSE 0+ TRUE 0+ | | 2+ | | | |
| CONTROL OUTPUT | | | | | 1 NON-POLAR | | | |
| DATA INPUT | 0+ | 1 | 1+ | 2+ | | 2+ | 1+ | 1 |
| DATA OUTPUT | 0+ | 0–1 | | 1+ | | 1+ | 1+ | 1+ |

FIG.16

| STATE OF CONTROL INPUT | CONTROL STATE OF DATA INPUT | CONTROL STATE OF DATA OUTPUT |
|---|---|---|
| CLEAR | | CLEAR |
| BLOCK | | BLOCK |
| EMPTY OR PASS | AT LEAST ONE CLEAR | CLEAR |
| | ALL BLOCK | BLOCK |
| | EMPTY OR ALL PASS | PASS |

FIG.17

| CONTROL STATE OF DATA INPUT | CONTROL STATE OF DATA OUTPUT |
|---|---|
| CLEAR | CLEAR |
| BLOCK | BLOCK |
| PASS | PASS |

FIG.18

| CONTROL STATE OF DATA INPUT | PREDICATE VALUE | STATE OF FALSE CONTROL OUTPUT | STATE OF TRUE CONTROL OUTPUT |
|---|---|---|---|
| AT LEAST ONE CLEAR | | CLEAR | CLEAR |
| ALL BLOCK | | BLOCK | BLOCK |
| ALL PASS | 0 | PASS | BLOCK |
| | 1 | BLOCK | PASS |

FIG.19

| CONTROL STATE OF DATA INPUT | CONTROL STATE OF DATA OUTPUT |
|---|---|
| AL LEAST ONE CLEAR | CLEAR |
| ALL BLOCK | BLOCK |
| ONE PASS AND ALL OTHERS BLOCK | PASS |

FIG.20

| STATE OF CONTROL INPUT | STATE OF CONTROL OUTPUT |
|---|---|
| AL LEAST ONE CLEAR | CLEAR |
| ALL BLOCK | BLOCK |
| ONE PASS AND ALL OTHERS BLOCK | PASS |

FIG.21

| STATE OF CONTROL INPUT | CONTROL STATE OF DATA OUTPUT |
|---|---|
| CLEAR | CLEAR |
| BLOCK | BLOCK |
| PASS | PASS |

FIG.22

| LOOP INSTANCE NUMBER | DATA INPUT | CONTROL STATE OF DATA INPUT | CONTROL STATE OF DATA OUTPUT |
|---|---|---|---|
| n = 1 | INITIALIZER | CLEAR | CLEAR |
| | | BLOCK | BLOCK |
| | | PASS | PASS |
| n > 1 | FEEDFORWARD | AT LEAST ONE CLEAR | CLEAR |
| | | ALL BLOCK | BLOCK |
| | | ONE PASS AND ALL OTHERS BLOCK | PASS |

FIG.27

BEFORE TERMINATION
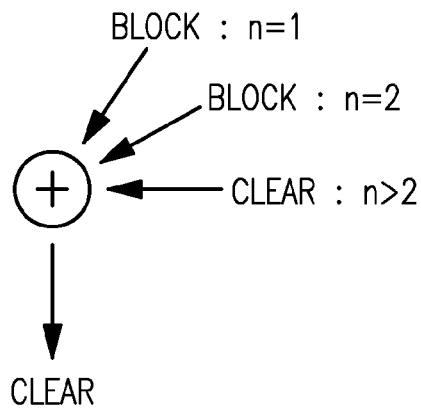
AFTER TERMINATION
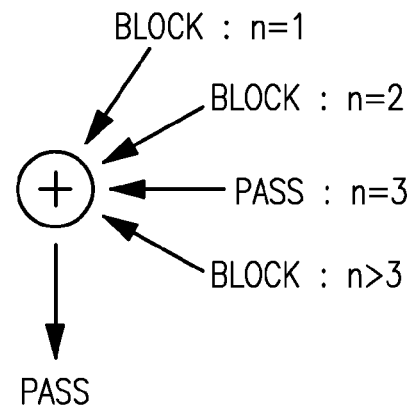
BLOCKED
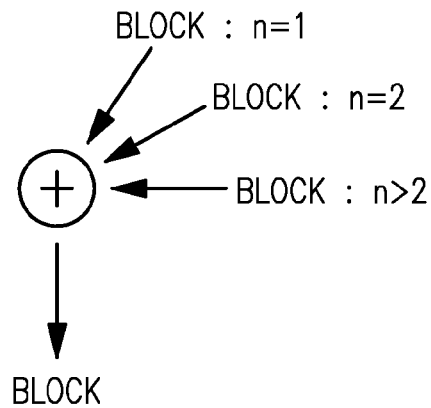
FIG.28

INFORMATION FLOWGRAPH

SIGNAL FLOW EQUATIONS target use = $u_3(a)$ $\alpha_3(a) = d_2(a)$ target use = $u_7(x)$ $\alpha_7(x) = d_2(x) \circ (\bar{a} \cdot 1' + a \cdot d_4(x))$ $\alpha_7(x) = d_2(x) \circ (\bar{a} \cdot 1') + d_2(x) \circ (a \cdot d_4(x))$ $= \bar{a} * d_2(x) + a \cdot d_4(x)$

DDF

```
example {
    d(x);
    d(a), d(b), d(c);

A:  if(u(a))
    {
        if(u(b))
        {
            if(u(c))
            {
                d(x);
                break A;
            }
        }
        else
            d(x);
        u(x);
    }
else
    d(x);
u(x);
}
```

FIG.33

DDF

```
example {
   d(x);
   d(a), d(b), d(c);

A: if(u(a))
      {
      if(u(b))
         {
         if(u(c))
            {
            d(x);
            break A;
            }
         }
      u(x);
      }
   else
      d(x);
   u(x);
   }
```

FIG.36

ANNOTATED CONTROL FLOWGRAPH $$\alpha_n = \alpha_{entry} \circ \mathcal{T}_\Theta$$

WHERE $\alpha_{entry}$ = signal at entry node
$\alpha_n$ = signal at node 'n'
$\Theta$ = set of control flow paths from the entry node to 'n'
$\mathcal{T}_\Theta$ = transmission of $\Theta$
$\circ$ = sequence operator

FIG.38

$T_j = d_j(x)$    for segment 'j' that contains the definition $d_j(x)$ $T_j = 1_j$    for segment 'j' that is a def clear outcome (partial or complete)

$T_j = 1_j$    for segment 'j' that is def clear for 'x' and is not an outcome $T_a = a$    for predicate segment of decision a that precedes a true outcome $T_a = \text{not}(a)$    for predicate segment of decision a that precedes a false outcome

FIG.39

$$T_{AB} = T_A \circ T_B$$

WHERE $T_A$ = transmission of A $T_B$ = transmission of B

FIG.40

$$\begin{array}{ll} \text{false} & \text{not}(a) \cdot 1' \\ \text{true} & a \cdot d_4(x) \end{array}$$

FIG.41

$$T_a = \text{not}(a) \cdot 1' + a \cdot d_4(x)$$ FIG.42

$$T \circ (\kappa \cdot 1') = \kappa * T$$ FIG.43

$$T_a = \text{not}(a) \cdot 1' + a \cdot 1'$$ FIG.44

$$\begin{aligned}
\mathcal{T}_a &= \text{not}(a) \cdot 1' + a \cdot 1' \\
&= (\text{not}(a) + a) \cdot 1' \\
&= 1 \cdot 1' \\
&= 1' \\
&= 1
\end{aligned}$$

$$(\mathcal{T}_1 + \mathcal{T}_2) \cdot \mathcal{T}_3 = \mathcal{T}_1 \cdot \mathcal{T}_3 + \mathcal{T}_2 \cdot \mathcal{T}_3$$
$$\pi + \text{not}(\pi) = 1$$
$$1 \cdot \mathcal{T} = \mathcal{T} \cdot 1 = \mathcal{T}$$
def-clear outcome conversion

FIG.45

$$\mathcal{T}_b = \text{not}(b) \cdot d_4 + b \cdot 1'$$

FIG.46

$$\mathcal{T}^n = p_1 \cdot \mathcal{T}_1 \circ p_2 \cdot \mathcal{T}_2 \circ \ldots \circ p_n \cdot \mathcal{T}_n$$

FIG.47

$$p_1 = p_2 = \ldots = p_n = 1$$
and
$$\mathcal{T}^n = \mathcal{T}_1 \circ \mathcal{T}_2 \circ \ldots \circ \mathcal{T}_n$$

FIG.48

$$\lambda = 0 \text{ if } n==1 \qquad \lambda = 1 \text{ if } n > 1$$

FIG.49

$$\mathcal{T}_{ENTRY.n} = \text{not}(\lambda) \bullet 1' + \mathcal{T}^{n-1} \circ \lambda \bullet 1'$$

FIG.50

$$\mathcal{T}_{Loop} = \mathcal{T}_{ENTRY.n} \circ \text{not}(p_n) \bullet 1'$$

FIG.51

DERIVATION $\tau_{ENTRY.n} = not(\lambda) \cdot 1' + \tau^{n-1} \circ \lambda \cdot 1'$ $\tau^{n-1} = 1$ $\tau_{ENTRY.n} = not(\lambda) \cdot 1' + 1 \circ \lambda \cdot 1'$ $\tau_{ENTRY.n} = not(\lambda) \cdot 1' + \lambda \cdot 1'$ $\tau_{ENTRY.n} = (not(\lambda) + \lambda) \cdot 1'$ $\tau_{ENTRY.n} = 1 \cdot 1'$ $\tau_{ENTRY.n} = 1'$ $\tau_{ENTRY.n} = 1$

RULES since there is no definition of the reference variable in the loop iteration path set substitution for $\tau^{n-1}$ $1 \circ \tau = \tau \circ 1 = \tau$ $(\tau_1 + \tau_2) \cdot \tau_3 = \tau_1 \cdot \tau_3 + \tau_2 \cdot \tau_3$ $\pi + not(\pi) = 1$ $1 \cdot \tau = \tau \cdot 1 = \tau$ def-clear outcome conversion

FIG.52

DDF

```
example {
    d(x), d(a); d(b); d(c);

ANNOTATED CONTROL FLOWGRAPH

DERIVATION $\alpha_{13} = d_2 \circ a \cdot (1 \circ \tau_b \circ 1 \circ \tau_c \circ 1)$ $\tau_b = \text{not}(b) \cdot 1' + b \cdot d_6$ $\tau_c = \text{not}(c) \cdot 1' + c \cdot d_{10}$ $\alpha_{13} = d_2 \circ a \cdot (\tau_b \circ \tau_c)$ $\alpha_{13} = d_2 \circ ((a \cdot \tau_b) \circ (a \cdot \tau_c))$ $a \cdot \tau_b = a \cdot (\text{not}(b) \cdot 1' + b \cdot d_6)$ $a \cdot \tau_b = a \cdot (\text{not}(b) \cdot 1') + a \cdot (b \cdot d_6)$ $a \cdot \tau_b = (a \cdot \text{not}(b)) \cdot 1' + (a \cdot b) \cdot d_6$ $a \cdot \tau_b = \text{not}(b) \cdot 1' + b \cdot d_6$ $a \cdot \tau_c = a \cdot (\text{not}(c) \cdot 1' + c \cdot d_{10})$ $a \cdot \tau_c = a \cdot (\text{not}(c) \cdot 1') + a \cdot (c \cdot d_{10})$ $a \cdot \tau_c = (a \cdot \text{not}(c)) \cdot 1' + (a \cdot c) \cdot d_{10}$ $a \cdot \tau_c = \text{not}(c) \cdot 1' + c \cdot d_{10}$ $\alpha_{13} = d_2 \circ ((a \cdot \tau_b) \circ (\text{not}(c) \cdot 1' + c \cdot d_{10}))$

RULES $(\tau_1 \circ \tau_2) \circ \tau_3 = \tau_1 \circ (\tau_2 \circ \tau_3)$ $1 \circ \tau = \tau \circ 1 = \tau$ $\kappa \cdot (\tau_1 \circ \tau_2) = (\kappa_1 \cdot \tau_1) \circ (\kappa \cdot \tau_2)$ substitution for $\tau_b$ $\kappa \cdot (\tau_1 + \tau_2) = \kappa \cdot \tau_1 + \kappa \cdot \tau_2$ $(\kappa_1 \cdot \kappa_2) \cdot \tau = \kappa_1 \cdot (\kappa_2 \cdot \tau)$ $\pi_1 \cdot \pi_2 = \pi_2$ substitution for $\tau_c$ $\kappa \cdot (\tau_1 + \tau_2) = \kappa \cdot \tau_1 + \kappa \cdot \tau_2$ $(\kappa_1 \cdot \kappa_2) \cdot \tau = \kappa_1 \cdot (\kappa_2 \cdot \tau)$ $\pi_1 \cdot \pi_2 = \pi_2$ substitution for $a \cdot \tau_c$

FIG.55A

RULES $T_1 \circ (T_2+T_3) = T_1 \circ T_2 + T_1 \circ T_3$
$T \circ (\kappa \bullet 1') = \kappa * T$
$T \circ (\kappa \bullet d) = \kappa \bullet d$ $T_1 \circ (T_2+T_3) = T_1 \circ T_2 + T_1 \circ T_3$
$T_1 \circ (\kappa * T_2) = \kappa * (T_1 \circ T_2)$
$T \circ (\kappa \bullet d) = \kappa \bullet d$
substitution for $a \bullet T_b$ $T_1 \circ (T_2+T_3) = T_1 \circ T_2 + T_1 \circ T_3$
$T \circ (\kappa \bullet 1') = \kappa * T$
$T \circ (\kappa \bullet d) = \kappa \bullet d$

DERIVATION $\alpha_{13} = d_2 \circ ((a \bullet T_b) \circ (not(c) \bullet 1')) + (a \bullet T_b) \circ (c \bullet d_{10})$ $\alpha_{13} = d_2 \circ (not(c) * (a \bullet T_b) + c \bullet d_{10})$ $\alpha_{13} = d_2 \circ (not(c) * (a \bullet T_b)) + d_2 \circ (c \bullet d_{10})$ $\alpha_{13} = not(c) * (d_2 \circ (a \bullet T_b)) + c \bullet d_{10}$ $\alpha_{13} = not(c) * (d_2 \circ (not(b) \bullet 1' + b \bullet d_6)) + c \bullet d_{10}$ $\alpha_{13} = not(c) * (d_2 \circ (not(b) \bullet 1') + d_2 \circ (b \bullet d_6)) + c \bullet d_{10}$ $\alpha_{13} = not(c) * (not(b) * d_2 + b \bullet d_6) + c \bullet d_{10}$

FIG.55B

DERIVATION $\alpha_{15} = \alpha_{5.n} + \alpha_{11.n}$ $\alpha_{5.n} = \alpha_{3.n} \circ \text{not}(p_{4.n}) \cdot 1'$ $\alpha_{3.n} = d_2 \circ \tau_{\text{ENTRY}.n}$ $\tau_{\text{ENTRY}.n} = \text{not}(\lambda) \cdot 1' + \tau^{n-1} \circ \lambda \cdot 1'$ $\tau^{n-1} = d_{7.n-1} \circ \text{not}(p_{8.n}) \cdot 1'$ $\tau^{n-1} = \text{not}(p_{8.n}) * d_{7.n-1}$ $\tau_{\text{ENTRY}.n} = \text{not}(\lambda) \cdot 1' + (\text{not}(p_{8.n}) * d_{7.n-1}) \circ \lambda \cdot 1'$ $\tau_{\text{ENTRY}.n} = \text{not}(\lambda) \cdot 1' + \lambda * (\text{not}(p_{8.n}) * d_{7.n-1})$ $\alpha_{3.n} = d_2 \circ (\text{not}(\lambda) \cdot 1') + \lambda * (\text{not}(p_{8.n}) * d_{7.n-1}))$ $\alpha_{3.n} = d_2 \circ (\text{not}(\lambda) \cdot 1') + d_2 \circ (\lambda * (\text{not}(p_{8.n}) * d_{7.n-1}))$

RULES general formula for $\tau_{\text{ENTRY}}$ star conversion substitution for $\tau^{n-1}$ star conversion substitution for $\tau_{\text{ENTRY}.n}$ $\tau_1 \circ (\tau_2 + \tau_3) = \tau_1 \circ \tau_2 + \tau_1 \circ \tau_3$

FIG.57A

DERIVATION $$\alpha_{3.n} = \text{not}(\lambda) * d_2 + \lambda * (d_2 \circ (\text{not}(p_{8.n}) * d_{7.n-1}))$$

$$\alpha_{3.n} = \text{not}(\lambda) * d_2 + \lambda * (\text{not}(p_{8.n}) * (d_2 \circ d_{7.n-1}))$$

$$\alpha_{3.n} = \text{not}(\lambda) * d_2 + \lambda * (\text{not}(p_{8.n}) * d_{7.n-1})$$

$$\alpha_{5.n} = \text{not}(\lambda) * d_2 + \lambda * (\text{not}(p_{8.n}) * d_{7.n-1})) \circ \text{not}(p_{4.n}) \cdot 1'$$

$$\alpha_{5.n} = \text{not}(p_{4.n}) * (\text{not}(\lambda) * d_2 + \lambda * (\text{not}(p_{8.n}) * d_{7.n-1}))$$

RULES star conversion $$\tau_1 \circ (\kappa * \tau_2) = \kappa * (\tau_1 \circ \tau_2)$$

$$\tau_1 \circ (\kappa * \tau_2) = \kappa * (\tau_1 \circ \tau_2)$$

$$\tau \circ d = d$$

substitution for $\alpha_{3.n}$ star conversion

FIG. 57B

DERIVATION $\alpha_{11.n} = \alpha_{3.n} \circ p_{4.n} \cdot d_{7.n} \circ p_{8.n} \cdot d_{10}$ $\alpha_{11.n} = (\alpha_{3.n} \circ p_{4.n} \cdot d_{7.n}) \circ p_{8.n} \cdot d_{10}$ $\alpha_{11.n} = p_{8.n} \cdot d_{10}$ $\alpha_{15} = \text{not}(p_{4.n}) * (\text{not}(\lambda)) * d_2 +$
$\lambda * (\text{not}(p_{8.n}) * d_{7.n-1})) + p_{8.n} \cdot d_{10}$ $\alpha_{7.n} = \alpha_{3.n} \circ p_{4.n} \cdot 1'$ $\alpha_{7.n} = p_{4.n} * \alpha_{3.n}$

RULES $(\tau_1 \circ \tau_2) \circ \tau_3 = \tau_1 \circ (\tau_2 \circ \tau_3)$ $\tau \circ (\kappa \cdot d) = \kappa \cdot d$ substitution for $\alpha_{5.n}$ and $\alpha_{11.n}$ star conversion

FIG. 57C

B ○ C means that B must be executed <u>before</u> C

FIG.59 b • C means that C is on all paths in the outcome of b indicated, and that b controls the execution of C

FIG.60

$$A_1 \cdot d_1 + A_2 \cdot d_2 + \ldots + A_n \cdot d_n$$

where $d_1, d_2, \ldots, d_n$ = definitions that reach target use $A_j$ = path condition necessary for $d_j$ to reach target use

FIG.61

○     "before" [<open_dot>]
•     "control" [<dot>]
*     "merges with path from"
+     "or"

FIG.62 abbreviations $\alpha$ – signals
d – definition
$\kappa$ — $\kappa$_exp
$\pi$ – predicate
$\sigma$ — $\sigma$_exp
$\mathcal{T}$ — $\mathcal{T}$_exp key properties sequence (o)

not commutative associative $$(\mathcal{T}_1 \circ \mathcal{T}_2) \circ \mathcal{T}_3 = \mathcal{T}_1 \circ (\mathcal{T}_2 \circ \mathcal{T}_3)$$

distributive $$\mathcal{T}_1 \circ (\mathcal{T}_2 + \mathcal{T}_3) = \mathcal{T}_1 \circ \mathcal{T}_2 + \mathcal{T}_1 \circ \mathcal{T}_3$$
$$(\mathcal{T}_1 + \mathcal{T}_2) \circ \mathcal{T}_3 = \mathcal{T}_1 \circ \mathcal{T}_3 + \mathcal{T}_2 \circ \mathcal{T}_3$$
$$\kappa \cdot (\mathcal{T}_1 \circ \mathcal{T}_2) = \kappa \cdot \mathcal{T}_1 \circ \kappa \cdot \mathcal{T}_2$$

unity $$1 \circ \mathcal{T} = \mathcal{T} \circ 1 = \mathcal{T}$$

FIG.63A control (·)

not commutative
$$\tau_1 \cdot \tau_2 = \tau_2$$

associative
$$(\tau_1 \cdot \tau_2) \cdot \tau_3 = \tau_1 \cdot (\tau_2 \cdot \tau_3)$$
$$(\kappa_1 \cdot \kappa_2) \cdot \kappa_3 = \kappa_1 \cdot (\kappa_2 \cdot \kappa_3)$$
$$(\kappa_1 \cdot \kappa_2) \cdot \tau = \kappa_1 \cdot (\kappa_2 \cdot \tau)$$

distributive
$$\tau_1 \cdot (\tau_2 + \tau_3) = \tau_1 \cdot \tau_2 + \tau_1 \cdot \tau_3$$
$$(\tau_1 + \tau_2) \cdot \tau_3 = \tau_1 \cdot \tau_3 + \tau_2 \cdot \tau_3$$
$$\kappa \cdot (\tau_1 + \tau_2) = \kappa \cdot \tau_1 + \kappa \cdot \tau_2$$
$$(\kappa_1 + \kappa_2) \cdot \tau = \kappa_1 \cdot \tau + \kappa_2 \cdot \tau$$

unity
$$1 \cdot \tau = \tau \cdot 1 = \tau$$
$$1 \cdot \kappa = \kappa \cdot 1 = \kappa$$

zero
$$\tau \cdot 0 = 0 \cdot \tau = 0$$

FIG. 63B convergence (*)

> not commutative
>
> right associative
> $$\kappa_1 * \kappa_2 * T = \kappa_1 * (\kappa_2 * T)$$
>
> distributive
> $$\kappa * (T_1 + T_2) = \kappa * T_1 + \kappa * T_2$$
> $$(\kappa_1 + \kappa_2) * T = \kappa_1 * T + \kappa_2 * T$$
> $$\kappa_1 \bullet (\kappa_2 * T) = (\kappa_1 \bullet \kappa_2) * (\kappa_1 \bullet T)$$
>
> unity
> $$1 * T = T$$
> $$1 * 1 = 1$$
>
> zero
> $$0 * T = 0$$
> $$\kappa * 0 = 0$$

alternation (+)

> commutative
> $$T_1 + T_2 = T_2 + T_1$$

FIG.63C associative
$$(T_1 + T_2) + T_3 = T_1 + (T_2 + T_3)$$

complement (predicate)
$$\pi + \text{not}(\pi) = 1$$

absorption
$$1 + 1 = 1$$

zero
$$T + 0 = T$$

mixed operators star conversion
$$T \circ (\kappa \bullet 1') = \kappa * T$$

def-clear outcome conversion
1' that is not in an expression containing parentheses and does not have a coefficient ($\kappa$) is converted to 1 blocking definition
$$T \circ (\kappa \bullet d) = \kappa \bullet d$$
$$T \circ d = d$$

FIG.63D associativity of • and *

$$(\kappa_1 \bullet \kappa_2) * \mathcal{T} = \kappa_1 \bullet (\kappa_2 * \mathcal{T})$$

other $$\kappa \bullet (\sigma) = \kappa \bullet \sigma$$
$$\mathcal{T}_1 \circ (\kappa * \mathcal{T}_2) = \kappa * (\mathcal{T}_1 \circ \mathcal{T}_2)$$
$$\mathcal{T} \circ (\kappa * 1') = \kappa * \mathcal{T}$$

in descending order of precedence: • ○ * + theorems $$\text{not}(\pi) \bullet \mathcal{T} + \pi \bullet \mathcal{T} = \mathcal{T}$$

proof
$$\text{not}(\pi) \bullet \mathcal{T} + \pi \bullet \mathcal{T} = (\text{not}(\pi) + \pi) \bullet \mathcal{T} = 1 \bullet \mathcal{T} = \mathcal{T}$$

FIG.63E $$\alpha_{13} = \text{not}(c) * (\text{not}(b) * d_2 + b \bullet d_6) + c \bullet d_{10}$$

Substituting $$a = b = c = 1$$

into this formula yields $$\alpha_{13} = \text{not}(1) * (\text{not}(1) * d_2 + 1 \bullet d_6) + 1 \bullet d_{10}$$

which reduces to $$\alpha_{13} = d_{10}$$

FIG.64

```
JAVA SOURCE CODE                         DDF
public void strategyExample( int a, int b,    strategyExample {
                int c, int e){}                  d(a), d(b), d(c), d(e);
A:   if(a>0)
B:     if(b>0)                            A:   if(u(a))
         a=1;                             B:     if(u(b))
       else                                        d(a);
         if(c>0)                                 else
           a=2;                                    if(u(c))
           break B;                                  d(a);
         if(e>0)                                     break B;
           break A;                                if(u(e))
         else                                        break A;
           a=3;                                    else
System.out.println("a="+a);                          d(a);

- Ⓓ DEFINITION
- Ⓤ USE
- ⓘ PREDICATE (divergence)
- ⊕ PLUS (convergence)
- ⊛ STAR (convergence)

FIG.87

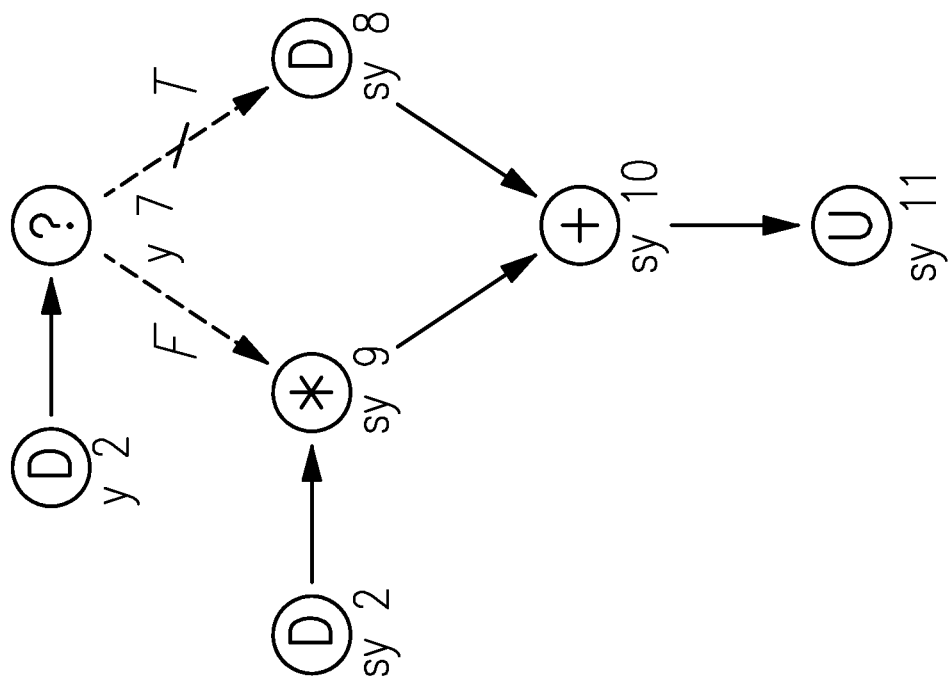
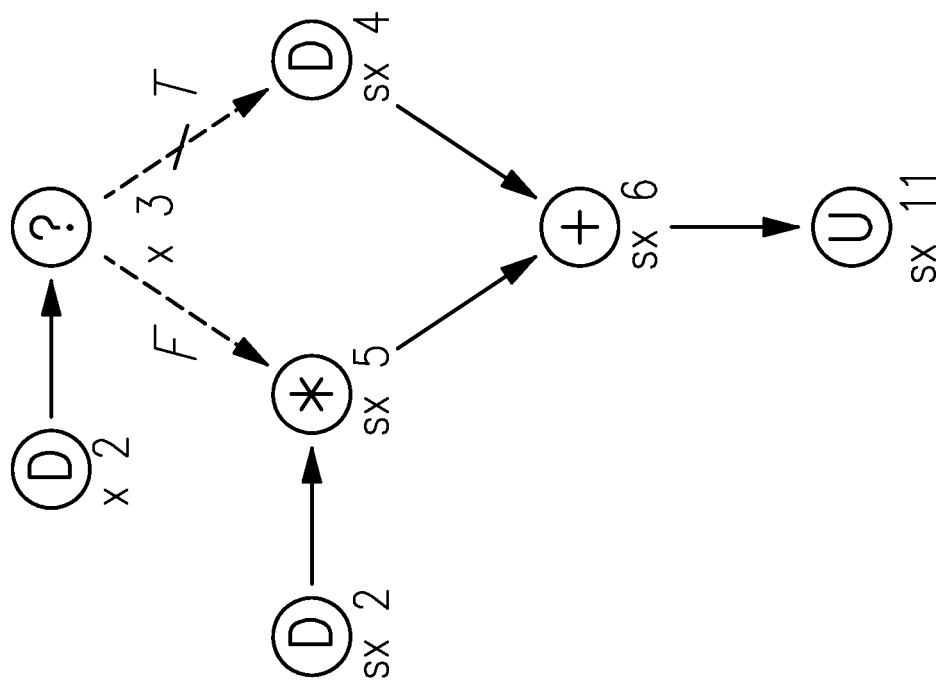
FIG. 88

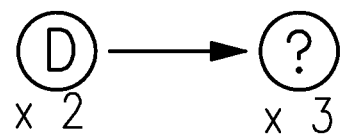
FIG.90
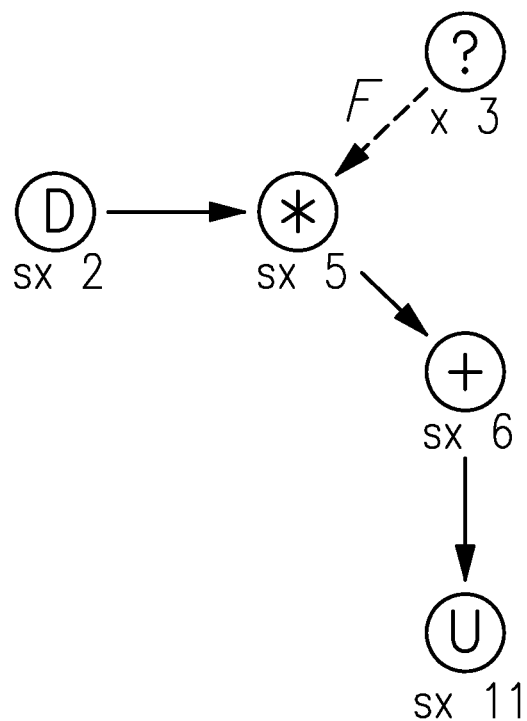 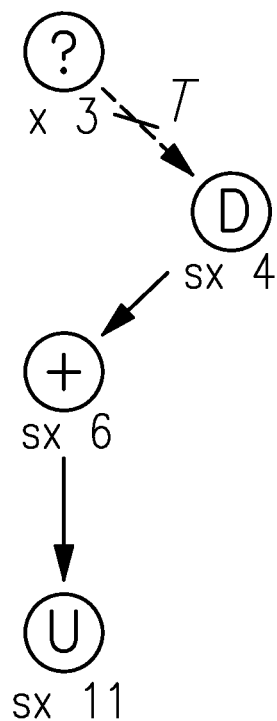
FIG.91  FIG.92

DERIVATION $\tau_7(sx) = not(y) \cdot 1' + y \cdot 1'$
$\phantom{\tau_7(sx)} = 1'$ $\alpha_{11}(sx) = (d_2(sx) \circ \tau_3(sx)) \circ \tau_7(sx)$
$\phantom{\alpha_{11}(sx)} = (d_2(sx) \circ \tau_3(sx)) \circ 1'$
$\phantom{\alpha_{11}(sx)} = d_2(sx) \circ \tau_3(sx)$ $\tau_3(sx) = not(x_3) \cdot 1' + x_3 \circ d_4(sx)$ $\alpha_{11}(sx) = d_2(sx) \circ (not(x_3) \cdot 1' + x_3 \cdot d_4(sx))$
$\phantom{\alpha_{11}(sx)} = d_2(sx) \circ (not(x_3) \cdot 1') +$
$\phantom{\alpha_{11}(sx) =} d_2(sx) \circ (x_3 \cdot d_4(sx))$
$\phantom{\alpha_{11}(sx)} = not(x_3) * d_2(sx) + x_3 \cdot d_4(sx)$

RULES $not(\pi) \cdot \tau + \pi \cdot \tau = \tau$ $(\tau_1 \circ \tau_2) \circ \tau_3 = \tau_1 \circ (\tau_2 \circ \tau_3)$
substitution for $\tau_7(sx)$
outcome conversion substitution for $\tau_3(sx)$
$\tau_1 \circ (\tau_2 + \tau_3) = \tau_1 \circ \tau_2 + \tau_1 \circ \tau_3$ $\tau \circ (\kappa \cdot 1') = \kappa * \tau$
$\tau \circ (\kappa \cdot d) = \kappa \cdot d$

FIG. 94

| OPERATOR | # CHILDREN | SYMBOL |
|---|---|---|
| NOT | 1 | ! |
| AND | 2 | && |
| OR | 2 | \|\| |

SEQUENCE OF EXECUTION IS:

A B C E F *or*
A B C D B C E F *or*
A B C D B C D B C E F *or* ...

DDF:

while ( u(a) )
{. . .}

```
example1( d(x) )
{
    while( u(x) )
        ud( x,x );
    u(x);
}
```

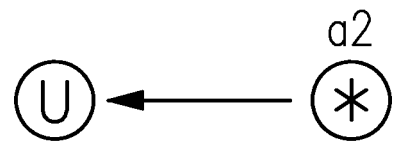
FIG.149  FIG.150
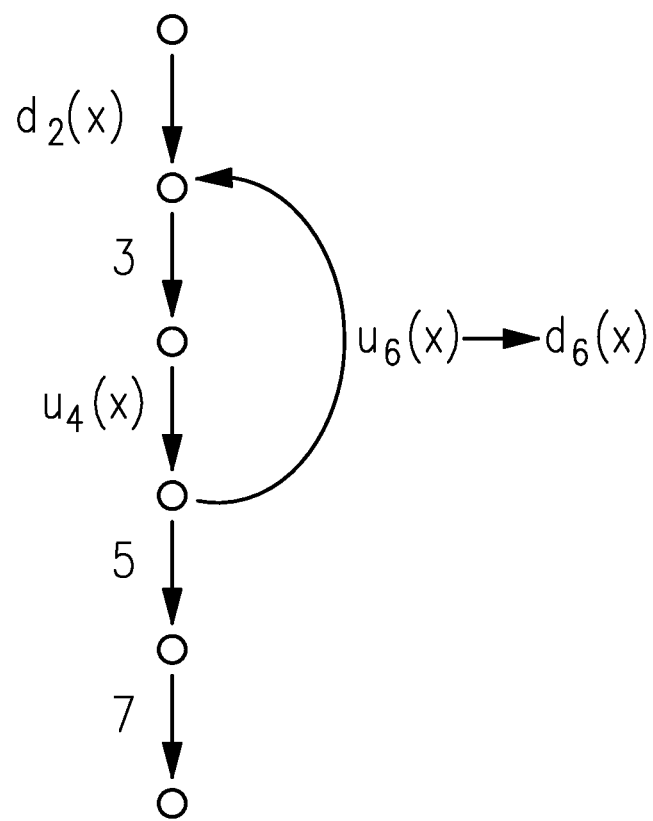
FIG.151

DNode #3.deltaBackUse("a")

> antecedent=LNode #2     3
>    In this case, the DNode has an antecedent, because the DNode contains the target use.
>
> LNode #2.deltaBack("a")
>> Since the LNode contains a definition of the    2 variable 'a', the LNode has no antecedent and therefore no call to deltaBack. The image of this node (LNode #2) is created and returned.
>
> Creates the image of this node (DNode #3) and creates a data edge from the image of its antecedent to the image of this node.

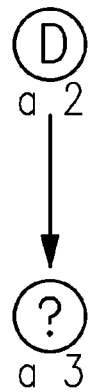

FIG.153

LNode #7.deltaBackUse("x")

> antecedent=CNode #6   7
>
> CNode #6.deltaBack("x")
>
>> antecedent=DNode #3   6
>>
>>> Since the DNode does not contain the target use, it has no antecedent. Instead of calling deltaBack for an antecedent, DNode.deltaBack is called for each outcome node and break node. (An outcome node is a child of the DNode, unless that child is an SNode, in which case the outcome node is the last child of the SNode. A break node is a BNode which has as its target, this DNode.)   3

FIG.154

DNode #3.Delta("x") continued

> false child=LNode #5     *3*
>
> LNode #5.DeltaBack("x")
>
> > antecedent=LNode #2     *5*
> >
> > LNode #2.DeltaBack("x")
> >
> > > This LNode has no antecedent. deltaBack creates and returns a definition alpha node.    *2*
> >
> > Since LNode #5 is empty, a star alpha node is created and a data edge from the image of its antecedent to its image.

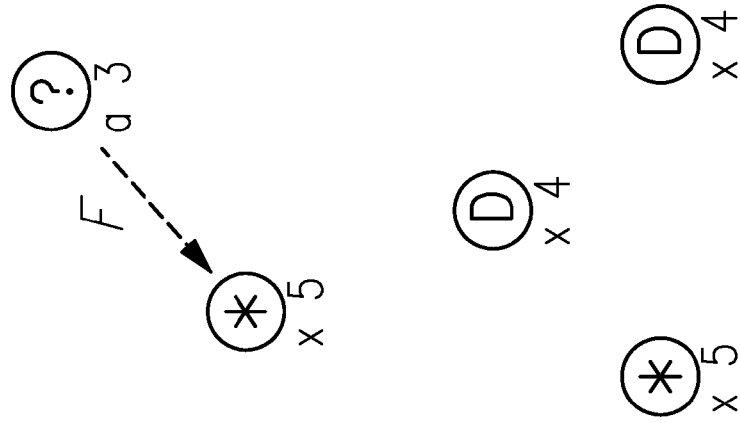

DNode #3.deltaBack("x") continued

Since LNode #5.deltaBack returned a star alpha node, DNode #3.deltaBack will create an exterior control edge from the image of the DNode to the image of the star alpha node.

true child=LNode #4

LNode #4.deltaBack("x")

This LNode has no antecedent. deltaBack creates and returns a definition alpha node.

DNode #3.deltaBack returns the alpha nodes corresponding to its two outcome nodes.

FIG.156

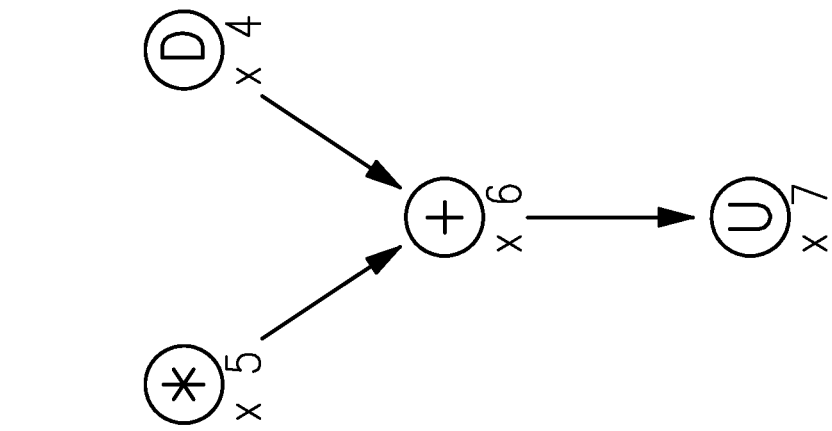

CNode #6.deltaBack("x") continued

| | 6 | 7 |
|---|---|---|
| | | |

Since CNode #6 is a decision exit, its image is a plus alpha node. DeltaBack for its antecedent returned two alpha nodes, so a data flow edge is created from each of these alpha nodes to the image of this node. The image of this node is returned.

The image of LNode #7, which contains the target use, is a use alpha node. After creating this alpha node, a data edge is created from the image of the antecedent of this node to the use alpha node.

FIG.157

LNode #17.deltaBack("x")　　　　　　　(Example #10)

> antecedent=CNode #14　　　　　　　　　　　　　　　17
> CNode #14.deltaStarBack(LNode#17, null, "x")
>> antecedent=DNode #5　　　　　　　　　　　　　　14
>> reference decision=DNode #5
>> Since the partial decision is empty, get the simulated antecedent
>> simulated antecedent of DNode #5=LNode #2
>>　　LNode #2.deltaStarBack(LNode #17, DNode #5, "x")
>>> Since this node contains a definition of 'x',　　2
>>> it has no antecedent. The image of this node,
>>> $d_2(x)$, is created and returned.
>>
>> returns the image returned by deltaStarBack on LNode #2
>
> Creates the image of this node, $*_{17}(x)$, and creates a data edge
> from the image returned by the deltaStarBack to the image
> of this node. Returns the image of this node.

FIG.176

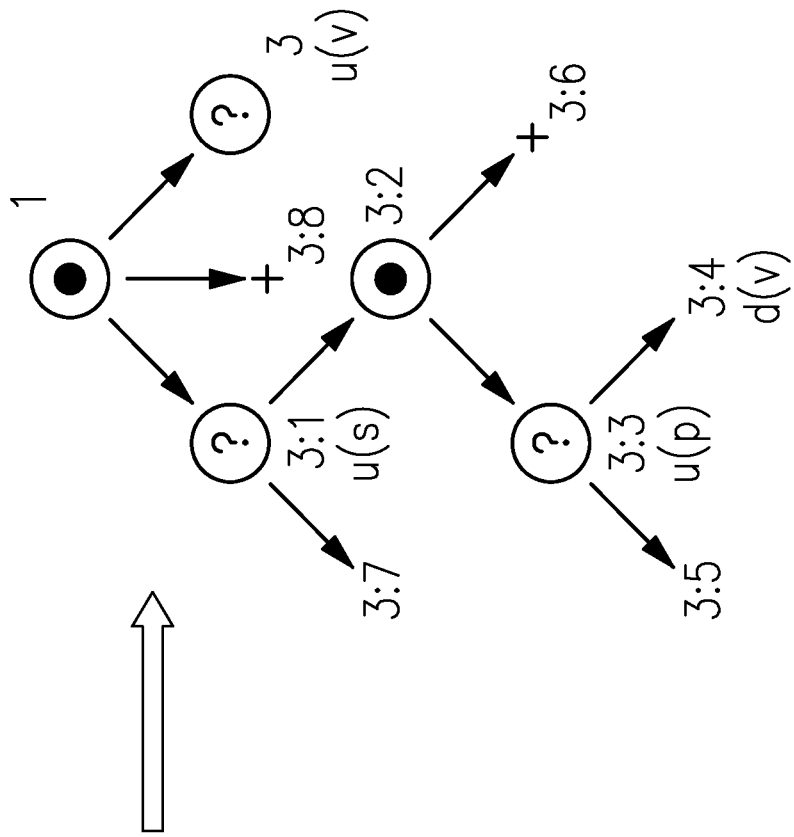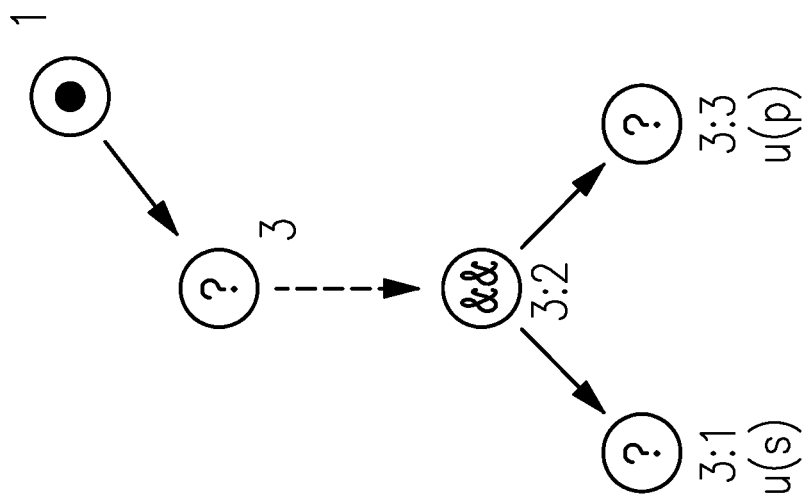
FIG.184

RULES $$\tau \circ (\kappa \cdot 1') = \kappa * \tau$$

$$1 \circ \tau = \tau \circ 1 = \tau$$

substitution for $\tau_{3:1}(v)$ and $\tau_{3:3}(v)$
$$\tau_1 \circ (\tau_2 + \tau_3) = \tau_1 \circ \tau_2 + \tau_1 \circ \tau_3$$

DERIVATION target use = $u_{3:1}(s)$
$\alpha_{3:1}(s) = d_2(s)$ target use = $u_{3:3}(p)$
$\alpha_{3:3}(p) = d_2(p) \circ s \cdot 1'$
$= s * d_2(p)$ target use = $u_3(v)$
$\alpha_3(v) = 1 \circ d_2(v) \circ \tau_{3:1}(v)$
$\tau_{3:1}(v) = not(s) \cdot 1' + s \cdot (1 \circ \tau_{3:3}(v))$
$\tau_{3:3}(v) = not(p) \cdot 1' + p \cdot d_{3:4}(v)$
$\alpha_3(v) = d_2(v) \circ (not(s) \cdot 1' +$
$\quad s \cdot (1 \circ (not(p) \cdot 1' + p \cdot d_{3:4}(v))))$ $= d_2(v) \circ (not(s) \cdot 1') + d_2(v) \circ (s \cdot not(p) \cdot 1')$
$\quad + d_2(v) \circ (s \cdot p \cdot d_{3:4}(v))$

FIG.188A

DERIVATION $$= \text{not}(s) * d_2(v) + s \cdot \text{not}(p) * d_2(v) + s \cdot p \cdot d_{3:4}(v)$$

$$= \text{not}(s) * d_2(v) + \text{not}(p) * d_2(v) + p \cdot d_{3:4}(v)$$

target use $= u_{12}(s)$ $\alpha_{12}(s) = 1 \circ d_2(s) \circ \tau_{3:1}(s) \circ \tau_3(s)$ $\tau_{3:3}(s) = \text{not}(p) \cdot 1' + p \cdot 1'$
$\qquad = 1'$ $\tau_{3:1}(s) = \text{not}(s) \cdot 1' + s \cdot (1 \circ \tau_{3:3}(s))$
$\qquad = \text{not}(s) \cdot 1' + s \cdot (1 \circ 1')$
$\qquad = \text{not}(s) \cdot 1' + s \cdot 1'$
$\qquad = 1'$

RULES $\tau \circ (\kappa \cdot 1') = \kappa * \tau$ $\tau \circ (\kappa \cdot d) = \kappa \cdot d$ precedence of $\cdot$ over $*$
$(\tau_1 \cdot \tau_2) \cdot \tau_3 = \tau_1 \cdot (\tau_2 \cdot \tau_3)$
$\pi_1 \cdot \pi_2 = \pi_2$ $\text{not}(\pi) \cdot \tau + \pi \cdot \tau = \tau$ substitution for $\tau_{3:3}(s)$
$1 \circ \tau = \tau \circ 1 = \tau$ $\text{not}(\pi) \cdot \tau + \pi \cdot \tau = \tau$

FIG.188B

DERIVATION $\tau_6(s) = \text{not}(p) \cdot 1' + p \cdot 1'$
$\quad = 1'$ $\tau_3(s) = \text{not}(v) \cdot 1' + v \cdot (1 \circ 1 \circ \tau_6(s))$
$\quad = \text{not}(v) \cdot 1' + v \cdot (1 \circ 1 \circ 1')$
$\quad = \text{not}(v) \cdot 1' + v \cdot 1'$
$\quad = 1'$ $\alpha_{12}(s) = 1 \circ d_2(s) \circ 1' \circ 1'$
$\quad = d_2(s) \circ 1 \circ 1$
$\quad = d_2(s)$ target use = $u_5(p)$

$\alpha_5(p) = 1 \circ d_2(p) \circ \tau_{3:1}(p) \circ (v \cdot 1')$ $\tau_{3:3}(p) = \text{not}(p) \cdot 1' + p \cdot 1'$
$\quad = 1'$

RULES $\text{not}(\pi) \cdot \tau + \pi \cdot \tau = \tau$ substitution for $\tau_6(s)$
$1 \circ \tau = \tau \circ 1 = \tau$
$\text{not}(\pi) \cdot \tau + \pi \cdot \tau = \tau$ outcome conversion
$1 \circ \tau = \tau \circ 1 = \tau$ $\text{not}(\pi) \cdot \tau + \pi \cdot \tau = \tau$

FIG. 188C

DERIVATION $\tau_{3:1}(p) = \text{not}(s) \cdot 1' + s \cdot (1 \circ \tau_{3:3}(p))$
$= \text{not}(s) \cdot 1' + s \cdot (1 \circ 1')$
$= \text{not}(s) \cdot 1' + s \cdot 1'$
$= 1'$ $\alpha_5(p) = 1 \circ d_2(p) \circ 1' \circ (v \cdot 1')$
$= d_2(p) \circ 1 \circ (v \cdot 1')$
$= d_2(p) \circ (v \cdot 1')$
$= v * d_2(p)$ target use = $u_6(p)$

$\alpha_6(p) = 1 \circ d_2(p) \circ \tau_{3:1}(p) \circ v \cdot (1 \circ 1 \circ d_5(p))$
$= d_2(p) \circ \tau_{3:1}(p) \circ v \cdot d_5(p)$
$= d_2(p) \circ 1' \circ v \cdot d_5(p)$
$= d_2(p) \circ 1 \circ v \cdot d_5(p)$
$= d_2(p) \circ v \cdot d_5(p)$
$= v \cdot d_5(p)$

RULES substitution for $\tau_{3:3}(p)$
$1 \circ \tau = \tau \circ 1 = \tau$
$\text{not}(\pi) \cdot \tau + \pi \cdot \tau = \tau$ $1 \circ \tau = \tau \circ 1 = \tau$
outcome conversion
$1 \circ \tau = \tau \circ 1 = \tau$
$\tau \circ (\kappa \cdot 1') = \kappa * d$ $1 \circ \tau = \tau \circ 1 = \tau$
substitution for $\tau_{3:1}(p)$
outcome conversion
$1 \circ \tau = \tau \circ 1 = \tau$
$\tau \circ (\kappa \cdot d) = \kappa \cdot d$

FIG.188D

RULES $1 \circ \tau = \tau \circ 1 = \tau$ substitution for $\tau_6(p)$ $\tau_1 \circ (\tau_2 + \tau_3) = \tau_1 \circ \tau_2 + \tau_1 \circ \tau_3$ $\kappa \bullet (\tau_1 + \tau_2) = \kappa \bullet \tau_1 + \kappa \bullet \tau_2$ $\kappa \bullet (\tau_1 \circ \tau_2) = \kappa \bullet \tau_1 \circ \kappa \bullet \tau_2$ $\tau \circ (\kappa \bullet 1') = \kappa * \tau$ $\tau \circ (\kappa \bullet d) = \kappa \bullet d$

DERIVATION target use = $u_{12}(p)$ $\alpha_{12}(p) = 1 \circ d_2(p) \circ \tau_{3;1}(p) \circ \tau_3(p)$ $\tau_6(p) = \text{not}(p) \bullet 1' + p \bullet d_7(p)$ $\tau_3(p) = \text{not}(v) \bullet 1' + v \bullet (1 \circ d_5(p) \circ \tau_6(p))$ $= \text{not}(v) \bullet 1' + v \bullet (d_5(p) \circ (\text{not}(p) \bullet 1' + p \bullet d_7(p)))$ $= \text{not}(v) \bullet 1' + v \bullet (d_5(p) \circ (\text{not}(p) \bullet 1') + d_5(p) \circ (p \bullet d_7(p)))$ $= \text{not}(v) \bullet 1' + v \bullet (d_5(p) \circ (\text{not}(p) \bullet 1')) + v \bullet d_5(p) \circ (p \bullet d_7(p))$ $= \text{not}(v) \bullet 1' + v \bullet d_5(p) \circ (v \bullet \text{not}(p) \bullet 1') + v \bullet d_5(p) \circ (v \bullet p \bullet d_7(p))$ $= \text{not}(v) \bullet 1' + v \bullet (\text{not}(p) * v \bullet d_5(p) +$

FIG.188E

DERIVATION $$v \bullet p \bullet d_7(p)$$
$$= not(v) \bullet 1' + not(p) * v \bullet d_5(p) + p \bullet d_7(p)$$

$$\alpha_{12}(p) = 1 \circ d_2(p) \circ 1' \circ \tau_3(p)$$
$$= 1 \circ d_2(p) \circ 1 \circ \tau_3(p)$$
$$= d_2(p) \circ \tau_3(p)$$
$$= d_2(p) \circ (not(v) \bullet 1' + not(p) * v \bullet d_5(p) + p \bullet d_7(p))$$
$$= d_2(p) \circ (not(v) \bullet 1') + d_2(p) \circ (not(p) * v \bullet d_5(p)) + d_2(p) \circ (p \bullet d_7(p))$$
$$= not(v) * d_2(p) + not(p) * v \bullet d_5(p) + p \bullet d_7(p)$$

RULES precedence of $\bullet$ over $*$
$(\tau_1 \bullet \tau_2) \bullet \tau_3 = \tau_1 \bullet (\tau_2 \bullet \tau_3)$
$\pi_1 \bullet \pi_2 = \pi_2$ outcome conversion
$1 \circ \tau = \tau \circ 1 = \tau$ substitution for $\tau_3$ (p)

$\tau_1 \circ (\tau_2 + \tau_3) = \tau_1 \circ \tau_2 + \tau_1 \circ \tau_3$ $\tau \circ (\kappa \bullet 1') = \kappa * \tau$
$\tau \circ (\kappa \bullet d) = \kappa \bullet d$

FIG. 188F

| PATH NUMBER | PREDICATE | | | |
|---|---|---|---|---|
| | $u_{3.1}(s)$ | $u_{3.3}(p)$ | $u_3(v)$ | $u_6(p)$ |
| 1 | F | – | F | – |
| 2 | F | – | T | F |
| 3 | F | – | T | T |
| 4 | T | F | F | – |
| 5 | T | F | T | F |
| 6 | T | F | T | T |
| 7 | T | T | F | – |
| 8 | T | T | T | F |
| 9 | T | T | T | T |

FIG.189

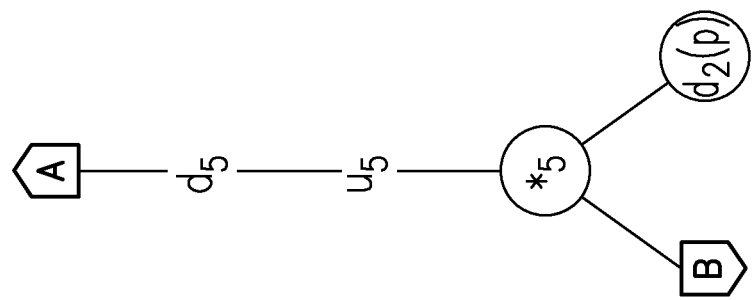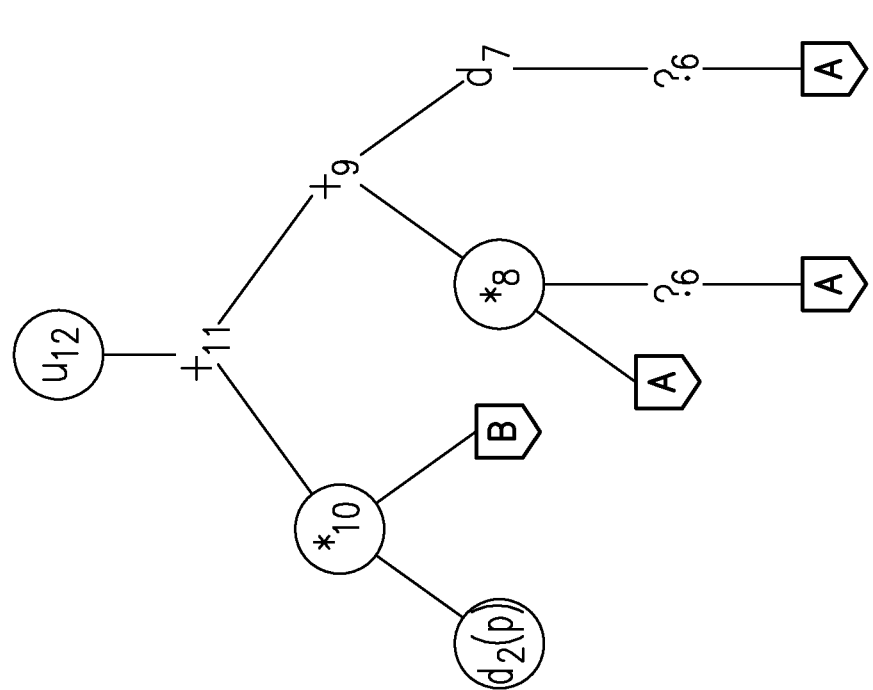
FIG.190A

THE NODES REPRESENTED BY
CIRCLES ARE ENDNODES AND α-JOIN
NODES.

AN ELEMENTARY PATH (ε-PATH)
BEGINS ON A CIRCLE NODE AND
ENDS ON A CIRCLE NODE WITH NO
CIRCLE NODES BETWEEN THE
TERMINAL NODES.

| $\varepsilon$-PATH NUMBER | $\alpha$-NODE SEQUENCE |
|---|---|
| 0 | $u_{12}$ |
| 1 | $*_{10}$ $+_{11}$ $u_{12}$ |
| 2 | $*_8$ $+_9$ $+_{11}$ $u_{12}$ |
| 3 | $*_5$ $u_5$ $d_5$ $?_6$ $d_7$ $+_9$ $+_{11}$ $u_{12}$ |
| 4 | $d_2(p)$ $*_{10}$ |
| 5 | $*_{3:7}$ $+_{3:8}$ $?_3$ $*_{10}$ |
| 6 | $*_{3:5}$ $+_{3:6}$ $+_{3:8}$ $?_3$ $*_{10}$ |
| 7 | $*_{3:3}$ $?_{3:3}$ $d_{3:4}$ $+_{3:6}$ $+_{3:8}$ $?_3$ $*_{10}$ |
| 8 | $d_2(v)$ $*_{3:7}$ |
| 9 | $d_2(s)$ $?_{3:1}$ $*_{3:7}$ |
| 10 | $d_2(v)$ $*_{3:5}$ |
| 11 | $*_{3:3}$ $?_{3:3}$ $*_{3:5}$ |
| 12 | $d_2(s)$ $?_{3:1}$ $*_{3:3}$ |
| 13 | $d_2(p)$ $*_{3:3}$ |
| 14 | $*_5$ $u_5$ $d_5$ $*_8$ |
| 15 | $*_5$ $u_5$ $d_5$ $?_6$ $*_8$ |
| 16 | $*_{3:7}$ $+_{3:8}$ $?_3$ $*_5$ |
| 17 | $*_{3:5}$ $+_{3:6}$ $+_{3:8}$ $?_3$ $*_5$ |
| 18 | $*_{3:3}$ $?_{3:3}$ $d_{3:4}$ $+_{3:6}$ $+_{3:8}$ $?_3$ $*_5$ |
| 19 | $d_2(p)$ $*_5$ |

FIG.191

| α-PATH | ε-PATH SEQUENCE | | | |
|---|---|---|---|---|
| 1 | ε4 | ε1 | | |
| 2 | ε8 | ε5 | ε1 | |
| 3 | ε9 | ε5 | ε1 | |
| 4 | ε10 | ε6 | ε1 | |
| 5 | ε12 | ε11 | ε6 | ε1 |
| 6 | ε13 | ε11 | ε6 | ε1 |
| 7 | ε12 | ε7 | ε1 | |
| 8 | ε13 | ε7 | ε1 | |
| 9 | ε8 | ε16 | ε14 | ε2 |
| 10 | ε9 | ε16 | ε14 | ε2 |
| 11 | ε10 | ε17 | ε14 | ε2 |
| 12 | ε12 | ε11 | ε17 | ε14 | ε2 |
| 13 | ε13 | ε11 | ε17 | ε14 | ε2 |
| 14 | ε12 | ε18 | ε14 | ε2 |
| 15 | ε13 | ε18 | ε14 | ε2 |
| 16 | ε19 | ε14 | ε2 | |

FIG.193A

| α-PATH | ε-PATH SEQUENCE | | | | |
|---|---|---|---|---|---|
| 17 | ε8 | ε16 | ε15 | ε2 | |
| 18 | ε9 | ε16 | ε15 | ε2 | |
| 19 | ε10 | ε17 | ε15 | ε2 | |
| 20 | ε12 | ε11 | ε17 | ε15 | ε2 |
| 21 | ε13 | ε11 | ε17 | ε15 | ε2 |
| 22 | ε12 | ε18 | ε15 | ε2 | |
| 23 | ε13 | ε18 | ε15 | ε2 | |
| 24 | ε19 | ε15 | ε2 | | |
| 25 | ε8 | ε16 | ε3 | | |
| 26 | ε9 | ε16 | ε3 | | |
| 27 | ε10 | ε17 | ε3 | | |
| 28 | ε12 | ε11 | ε17 | ε3 | |
| 29 | ε13 | ε11 | ε17 | ε3 | |
| 30 | ε12 | ε18 | ε3 | | |
| 31 | ε13 | ε18 | ε3 | | |
| 32 | ε19 | ε3 | | | |

FIG.193B

| ELEMENTARY PATH NUMBER | PHYSICAL PATH NUMBER | | | | | | | | |
|---|---|---|---|---|---|---|---|---|---|
| | 1 | 2 | 3 | 4 | 5 | 6 | 7 | 8 | 9 |
| 1 | X | | | X | | | X | | |
| 2 | | X | | | X | | | X | |
| 3 | | | X | | | X | | | X |
| 4 | X | | | X | | | X | | |
| 5 | X | | | | | | | | |
| 6 | | | | X | | | | | |
| 7 | | | | | | | X | | |
| 8 | X | X | X | | | | | | |
| 9 | X | X | X | | | | | | |
| 10 | | | | X | X | X | | | |
| 11 | | | | X | X | X | | | |
| 12 | | | | X | X | X | X | X | X |
| 13 | | | | X | X | X | X | X | X |
| 14 | | X | | | X | | | X | |
| 15 | | X | | | X | | | X | |
| 16 | | X | X | | | | | | |
| 17 | | | | | X | X | | | |
| 18 | | | | | | | | X | X |
| 19 | | X | X | | X | X | | X | X |

FIG.194

| α-PATH NUMBER | COVERED EXCLUSIVELY BY PHYSICAL PATH NUMBER |
|---|---|
| 2 | 1 |
| 9 | 2 |
| 25 | 3 |
| 4 | 4 |
| 11 | 5 |
| 27 | 6 |
| 7 | 7 |
| 22 | 8 |
| 30 | 9 |

FIG.195

A, B   code fragments
T1, T2  test scenarios
P1, P2  processors

| PSEUDO-CODE | DDF |
|---|---|
| 1   input a | d(a); |
| 2   input b | d(b); |
| 3   x = 1 | d(x); |
| 4   if ( a > 0 ) | if ( u(a) ) |
| 5       x = 2 |     d(x); |
| 6   y = x | ud ( x,y ); |
| 7   x = 3 | d(x); |
| 8   if ( b > 0 ) | if( u(b) ) |
| 9       x = 4 |     d(x); |
| 10  print x | u(x); |
| 11  print y | u(y); |

FIG.200

SYSTEMS AND METHODS FOR INFORMATION FLOW ANALYSIS

CROSS-REFERENCE TO RELATED APPLICATIONS

This application claims priority to U.S. Provisional Application No. 61/027,967, filed Feb. 12, 2008, and to U.S. Provisional Application No. 61/027,975, filed Feb. 12, 2008, which are hereby incorporated by reference in their entirety.

BACKGROUND

Program analysis is a discipline which underlies many of the most essential specialties of computer science. These include automatic parallelization, software testing, software verification, software debugging, compiler optimization and program transformation.

The purpose of program analysis is to determine whether a computer program satisfies a set of specified properties either at compile time (static analysis) or during controlled execution (dynamic analysis). Program analysis is an automated method for doing so based on program structure.

In the existing literature, the terms "information flow" and "information flow analysis" have been used to refer to several earlier forms of program analysis that attempt to combine control flow and data flow analysis in some manner other than that disclosed in this patent application. Unless otherwise noted, as used herein these terms refer to the unification of control flow and data flow analysis as disclosed herein.

Although the applications of information flow analysis are myriad, the focus of this section will be on one important application in which the need for new methods of program analysis has been characterized as "critical": automatic parallelization. Copeland, M. V., "A chip too far?," Fortune, September 2008, pp. 43-44.

Methods for Program Analysis have not Kept Pace with the Rapid Improvements in Computer Hardware The computer industry is undergoing a major transition due to fundamental advances in chip design. In particular, the advent of multi-core processors is leading to a spectrum of new computing platforms from high performance computing on desktops to cloud computing. The common denominator in these trends is parallel processing. In parallel processing, a single program is divided into several pieces, and the pieces are executed simultaneously ("in parallel") on multiple processors. An automatic parallelizer is a software tool which separates the program into the individual pieces.

Most existing methods of program analysis were developed in an era in which processing consisted of a single program being executed on a single processor. These methods were not developed with parallelization as a goal, and software tools based on these methods are not sufficient to fully exploit the performance of the new multi-processor machines.

The main exception is in the area of supercomputers, where some program analysis methods for parallelization, such as dependence analysis, have been developed. See Allen, R., Kennedy, K., "Optimizing Compilers for Modern Architectures," Academic Press, 2002.

These methods tend to be restricted in their capabilities due to the problem domain, which is mathematical computations. In particular, these methods focus on mathematical operations involving arrays within loops, which are not as common in commercial applications. Even in this limited problem domain, these program analysis methods do not typically provide full automation, and must be supplemented by the skills of highly trained specialists and the use of niche languages to obtain satisfactory results.

Manual parallelization and the employment of niche languages do not constitute a realistic solution for commercial applications. As high performance computing migrates to the business world and even the home, there is an acute need for software tools which can automatically parallelize software written in mainstream languages such as Java. These must be based on a foundation of new methods of precise program analysis.

SUMMARY

The present invention is generally directed to computer-implemented methods for analyzing computer programs written in semi-structured languages as well as generalized flow networks. More particularly the present invention is directed to a process, and to a system or machine using such a process, which satisfies the need for precise analysis of generalized flow networks that are representable as directed or semi-structured flows (including, for example, flows of data and control within computer programs, electricity within power grids, gas within gas systems, and water within water systems), in order to determine the independent and quasi-independent flows that may occur within the represented networks.

In an exemplary embodiment, the present invention implements a set of parallel, cooperative processes that accept a representation of the flow network to be analyzed and collectively use graph transformation to precisely identify the independent flows within the represented flow network. In this embodiment, the use of graph transformation in combination with a solid mathematical foundation enables accurate, deterministic, automated analysis with a high degree of precision.

In another exemplary embodiment, the central process ("alpha transform") is preceded by one or more application-specific preprocessors that prepare and submit inputs to the central process, and succeeded by one or more application-specific postprocessors. The overall effect of the alpha transform is to convert each network model input (such as a decision graph) into one or more "alpha graph" outputs, each of which describes a set of independent flows discovered by analyzing the input using the method of the present invention.

In a further exemplary embodiment, each conceptual sub-process or process step of the central process is loosely coupled to the others, and may be multiply instantiated, any instance of which may be implemented as an application-specific hardware device (e.g., ASIC), a software process, or in any of various hybrid combinations, such that the various instantiations of processes or process steps may operate independently, asynchronously, and in parallel, thereby enabling both upward and downward scalability, and straightforward, platform-agnostic implementation on a wide variety of digital processing architectures.

In an additional exemplary embodiment oriented toward certain disciplines related to computer programming, the present invention enables precise analysis of an arbitrarily complex computer program (which is typically a complex flow network having both control and data flows that are not constrained by the laws of physics) in order to identify the independent and quasi-independent control and data flows occurring within its program units. In this embodiment, the use of graph transformation in combination with the new signal flow algebra further enables native support for semi-structured programming constructs (such as break, multiple returns in a single method, continue, and exceptions) that previously required "work-arounds" such as structuring preprocessors. Said embodiment enables an exemplary application where the identified control and data flows may be used for automated generation of the test cases needed for efficiently performing path testing. Said embodiment further enables another exemplary application where the identified control and data flows may be used for the automatic parallelization of software source codes in order to enable more efficient use of multicore processors, multi-way processor configurations, and computing clusters such as those typically found in supercomputers and cloud computing.

In another exemplary embodiment, a digital-processor-implemented method for analyzing computer programs written in semi-structured languages is provided, the method comprising: transforming source (or object) code of the program into decision graphs which represent the control flow structure of said program, with data flow elements attached to the graphs; transforming said decision graphs into one or more information flowgraphs which represent control flow and data flow in a unified manner, and which identify the independent and quasi-independent flows therein; and converting said information flowgraphs into the source (or object) code of the original programming language for use in automatic parallelization or efficient automated software testing approximating all-paths testing. Also provided herein is a digital-processor-implemented method for analyzing any directed-flow network that is representable as directed or semi-structured flows, the method comprising: transforming an application-specific representation of the directed-flow network into decision graphs which represent the control flow structure of said flow network, with data flow elements attached to the graphs; transforming said decision graphs into one or more information flowgraphs which represent the directed flows of said flow network in a unified manner, and which identify the independent and quasi-independent flows therein; and transforming said information flowgraphs into application-specific artifacts for identifying independent and quasi-independent flows occurring in said flow network. Also provided herein are a digital-processor-controlled apparatus comprising at least one digital processor and at least one machine-readable storage medium, the digital-processor-controlled apparatus being capable of performing the methods referred to above; and a computer-readable storage medium having instructions encoded thereon which, when executed by a computer, cause the computer to perform the methods referred to above.

BRIEF DESCRIPTION OF THE DRAWINGS

These and other features, aspects, and advantages of the present invention will become better understood with regard to the following description, appended claims, and accompanying drawings where:

Summary

Intra-Method Graphs

FIG. 2 shows memory access elements.

FIG. 3 shows intra-segment data flow elements.

FIG. 4 shows Java source code and DDF for signxy example.

Figure 5:
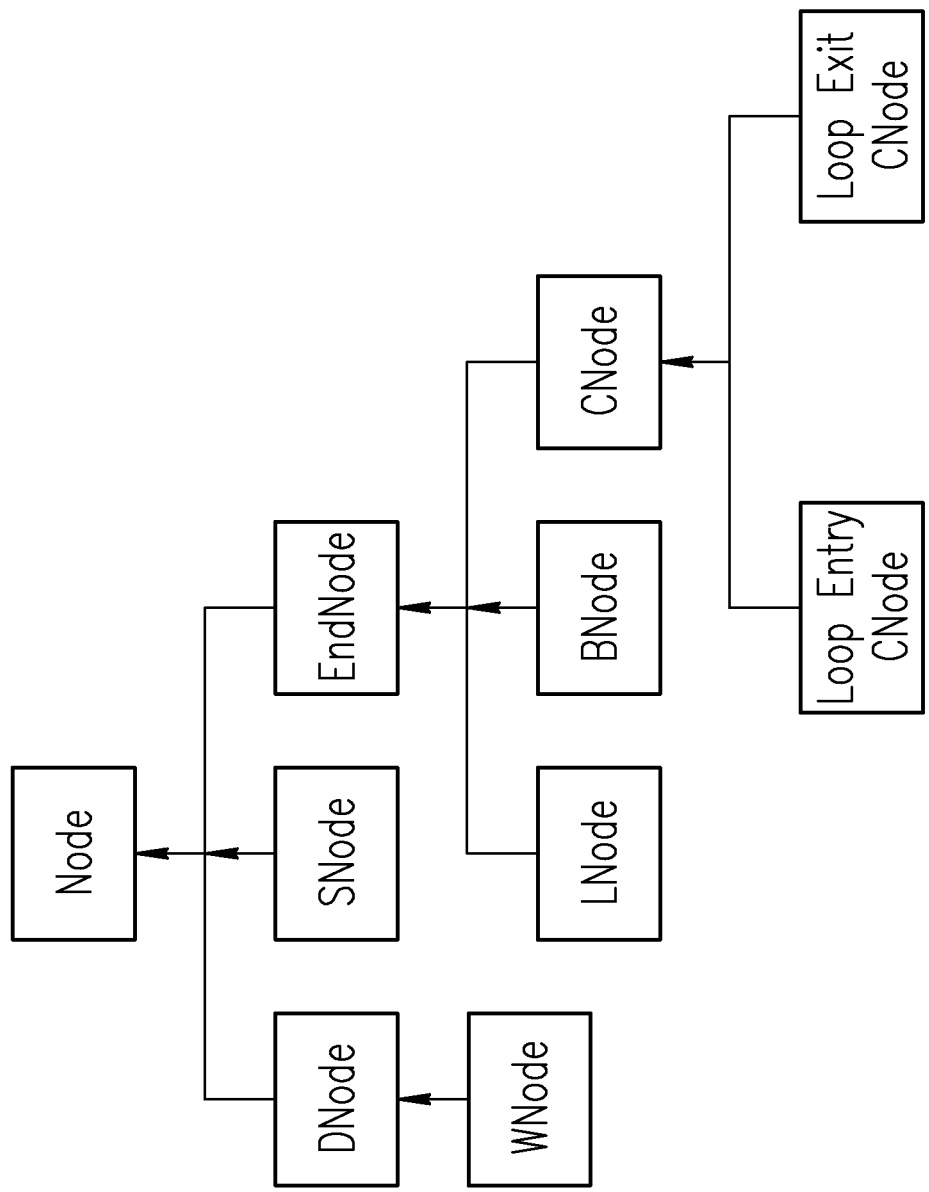

FIG. 5 shows class diagram for the decision graph Node.

Figure 6:
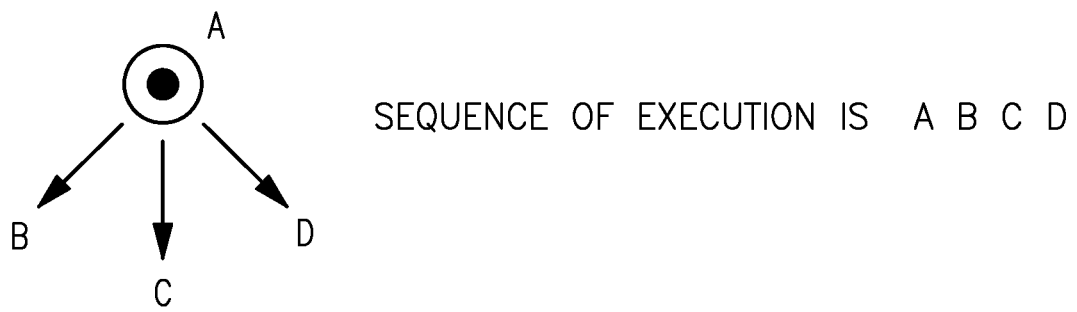

FIG. 6 shows example of a sequence node.

Figure 7:
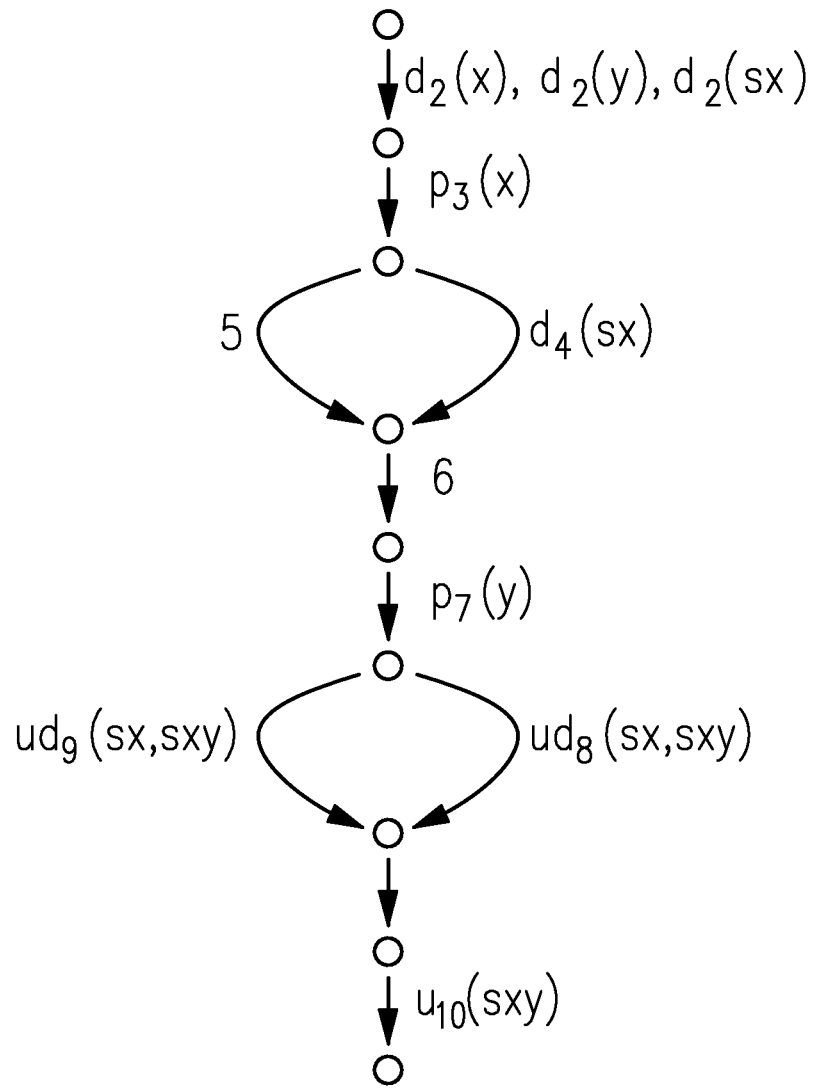

FIG. 7 shows control flowgraph of signxy example.

Figure 8:
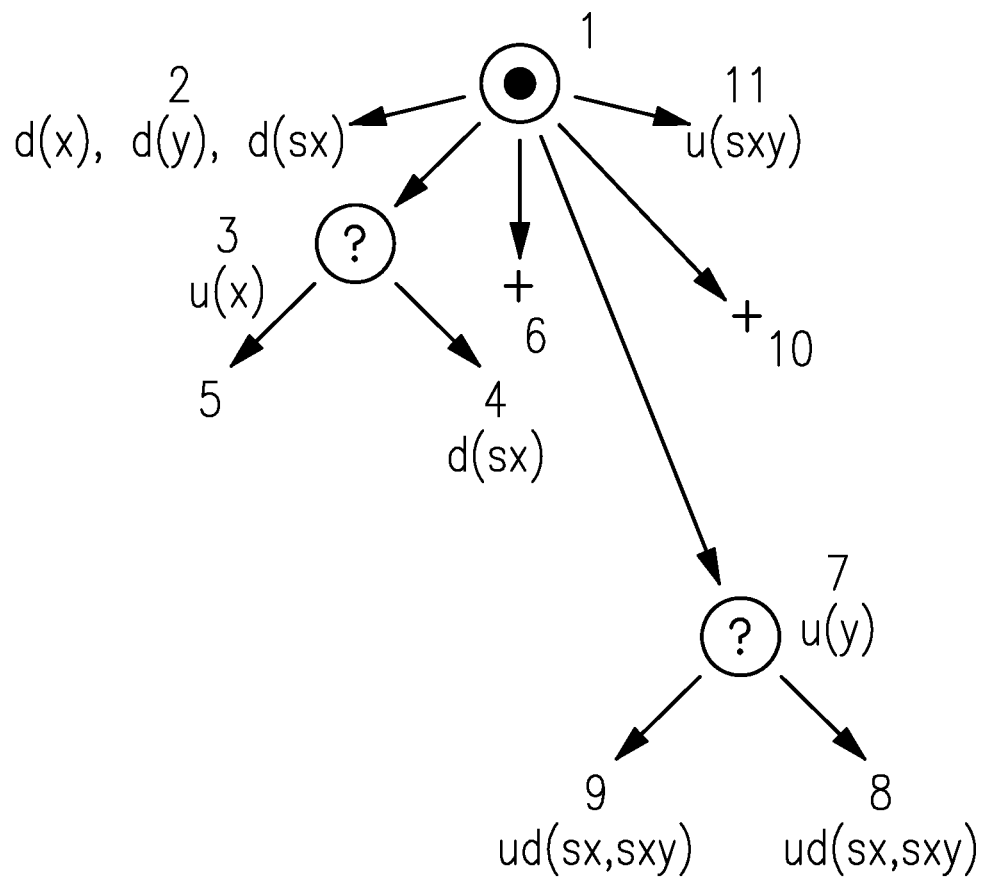

FIG. 8 shows decision graph of signxy example.

Figure 9:
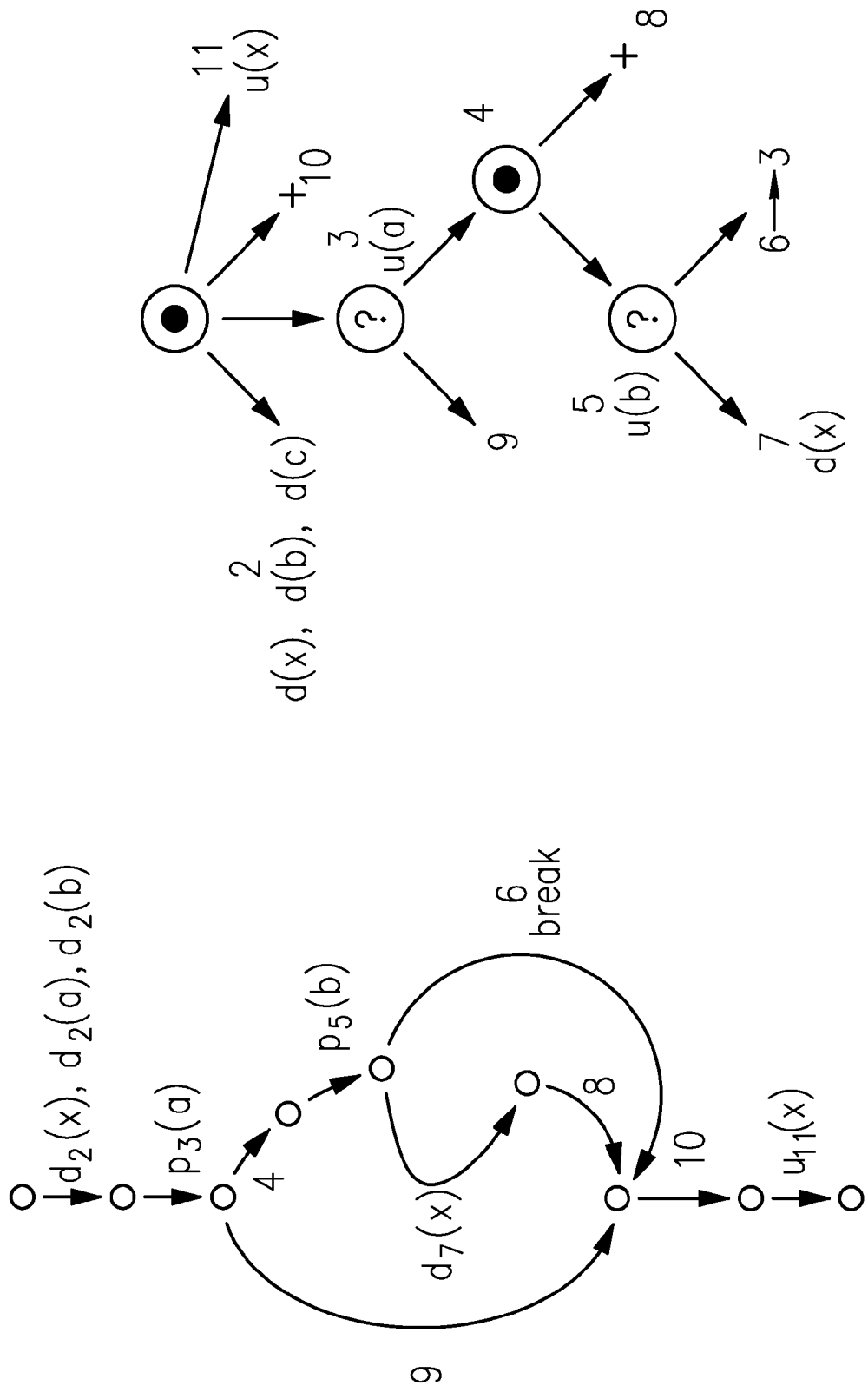

FIG. 9 shows example of normal form for decision graph containing a "break."

Figure 10:
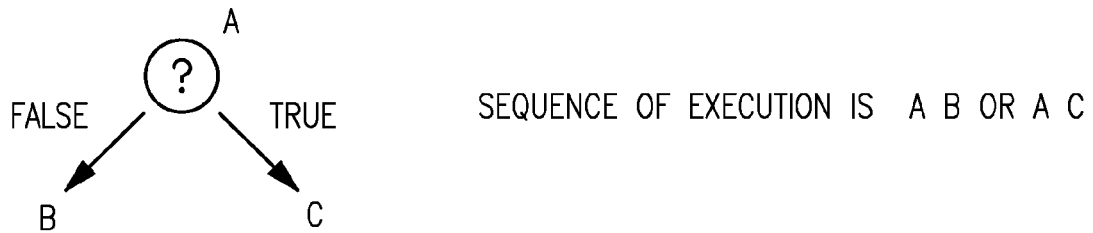

FIG. 10 shows example of a divergence node.

Figure 11:
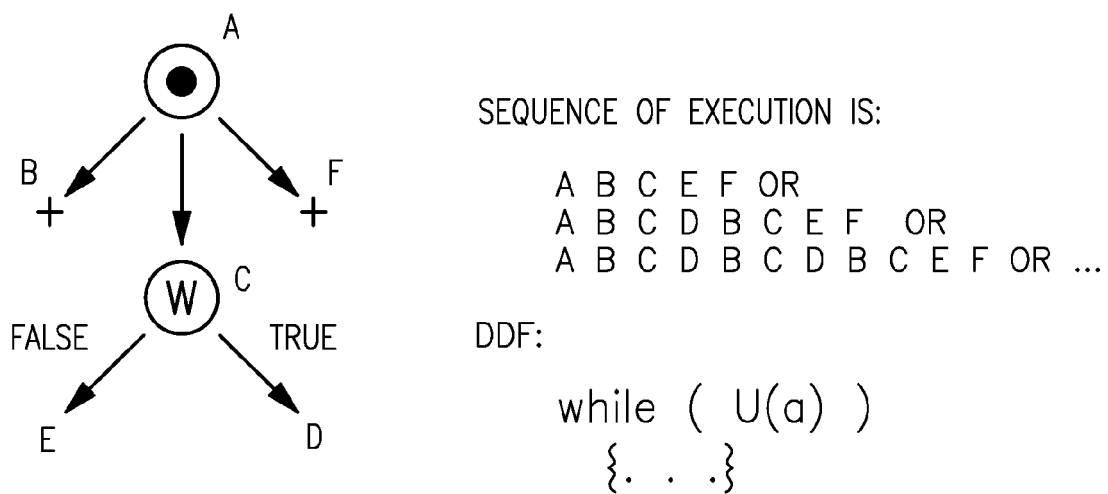

FIG. 11 shows simplified example of a while node.

Figure 12:
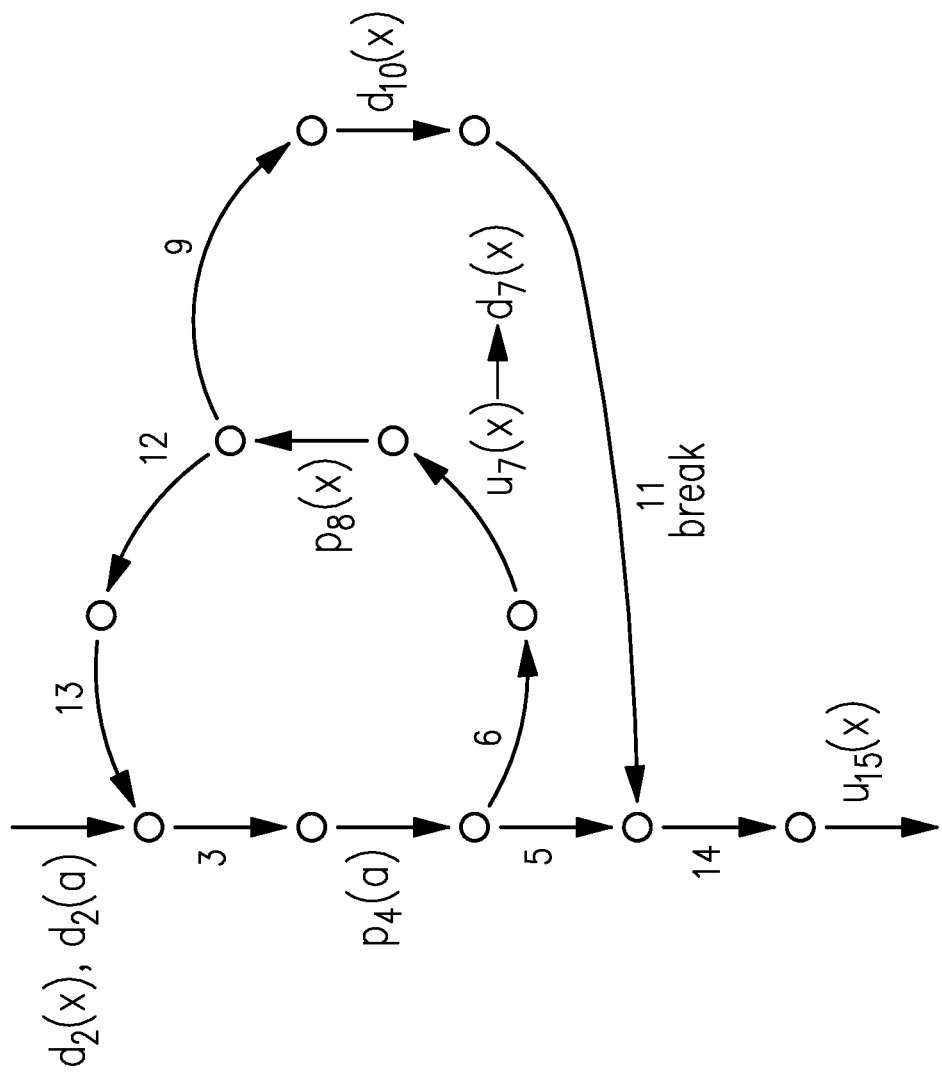

FIG. 12 shows annotated control flowgraph of "loop with break" example.

Figure 13:
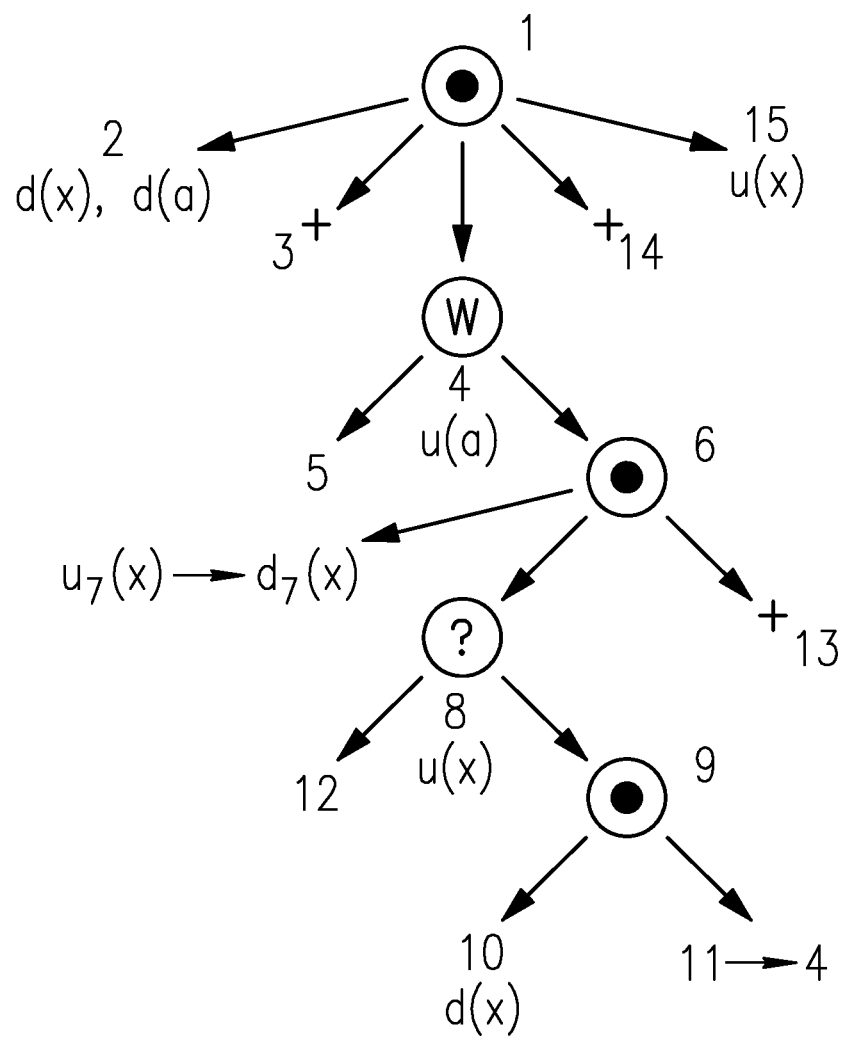

FIG. 13 shows decision graph of "loop with break" example.

FIG. 14 shows primary types of alpha nodes.

FIG. 15 shows special types of plus alpha nodes.

FIG. 16 shows fields associated with each type of alpha node.

FIG. 17 shows flow rules for definition alpha node.

FIG. 18 shows flow rules for use alpha node.

FIG. 19 shows flow rules for alpha node.

FIG. 20 shows flow rules for plus alpha node.

FIG. 21 shows flow rules for control plus alpha node.

FIG. 22 shows flow rules for star alpha node.

Figure 23:
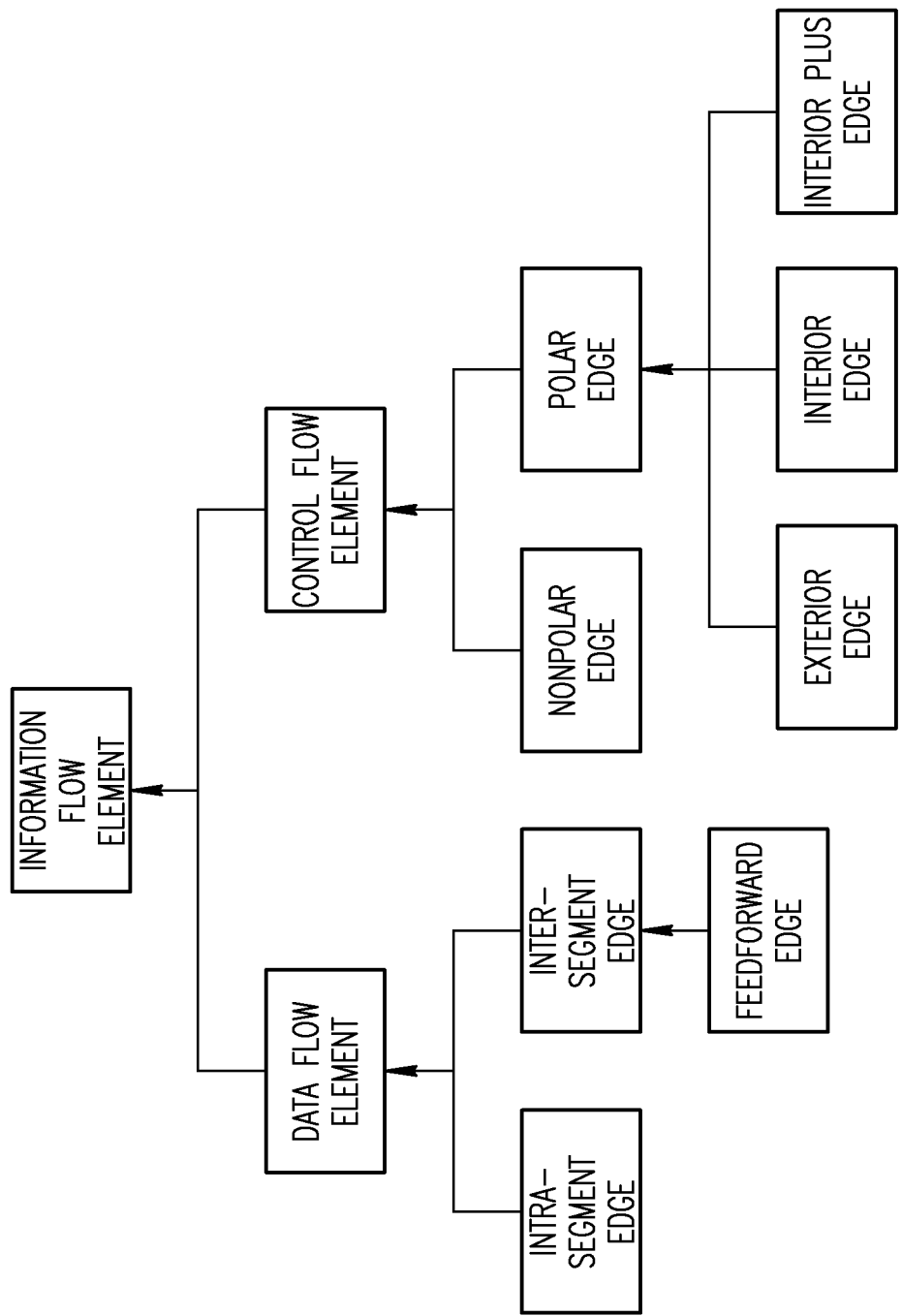

FIG. 23 shows class diagram for information flow elements.

Figure 24:
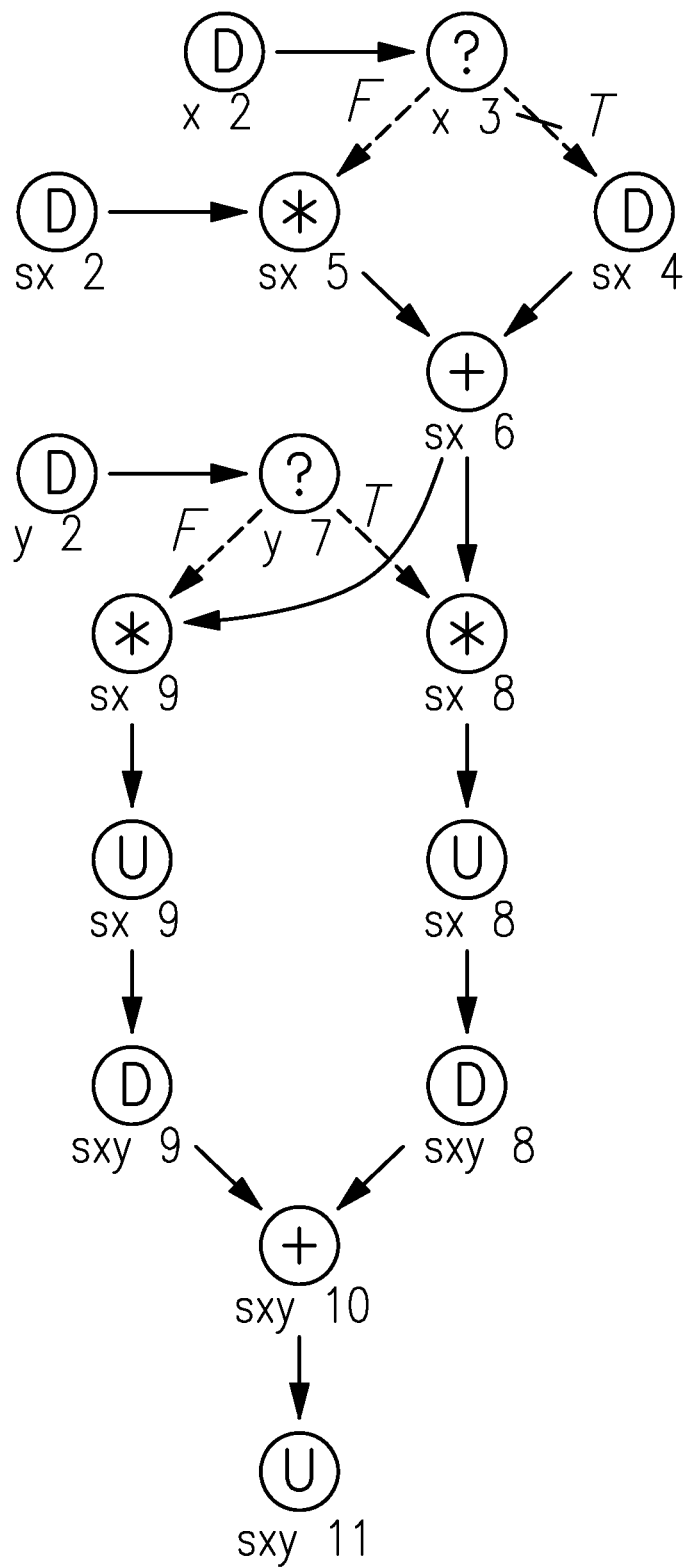

FIG. 24 shows alpha graph of signxy example.

Figure 25:
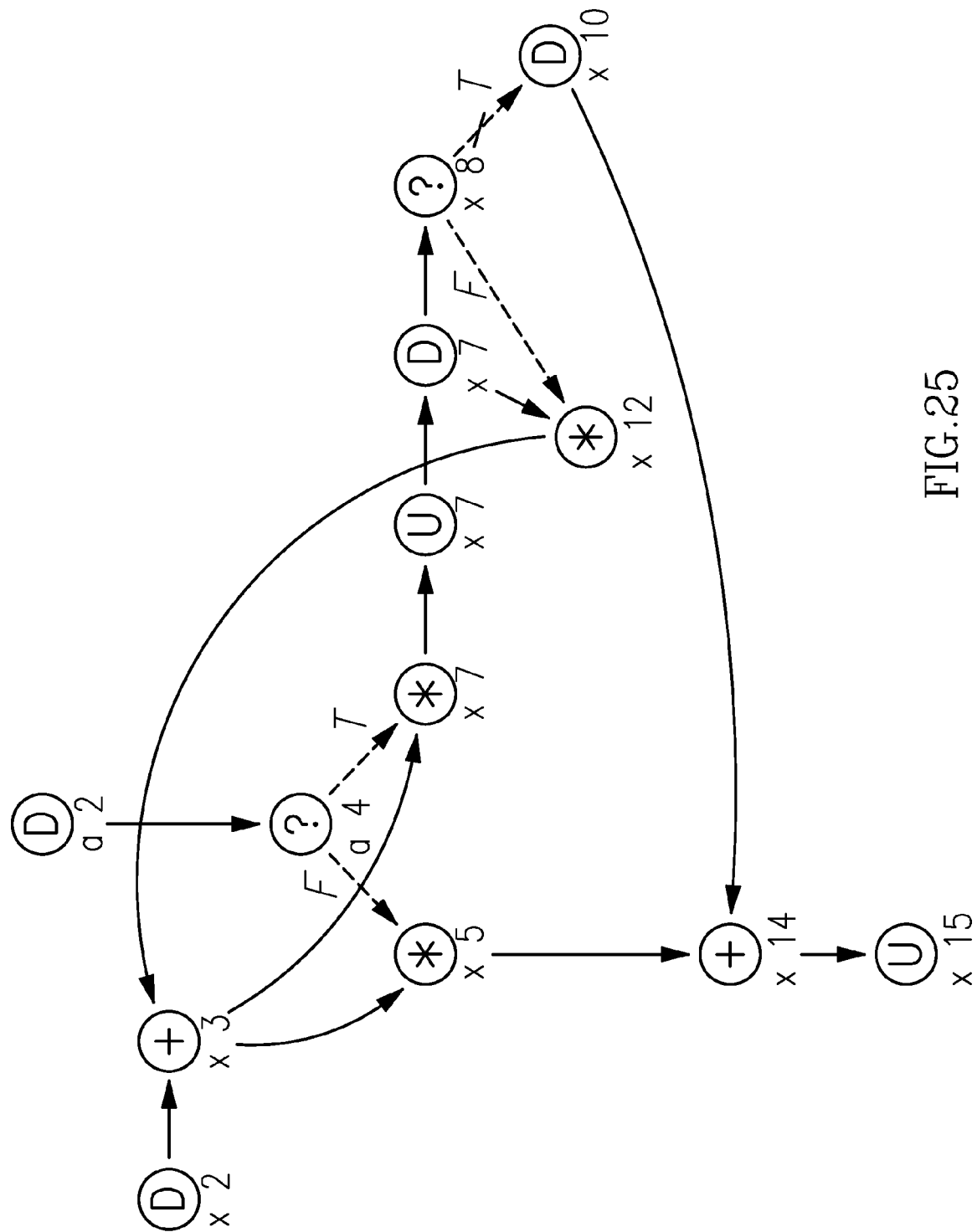

FIG. 25 shows static alpha graph of "loop with break" example.

Figure 26:
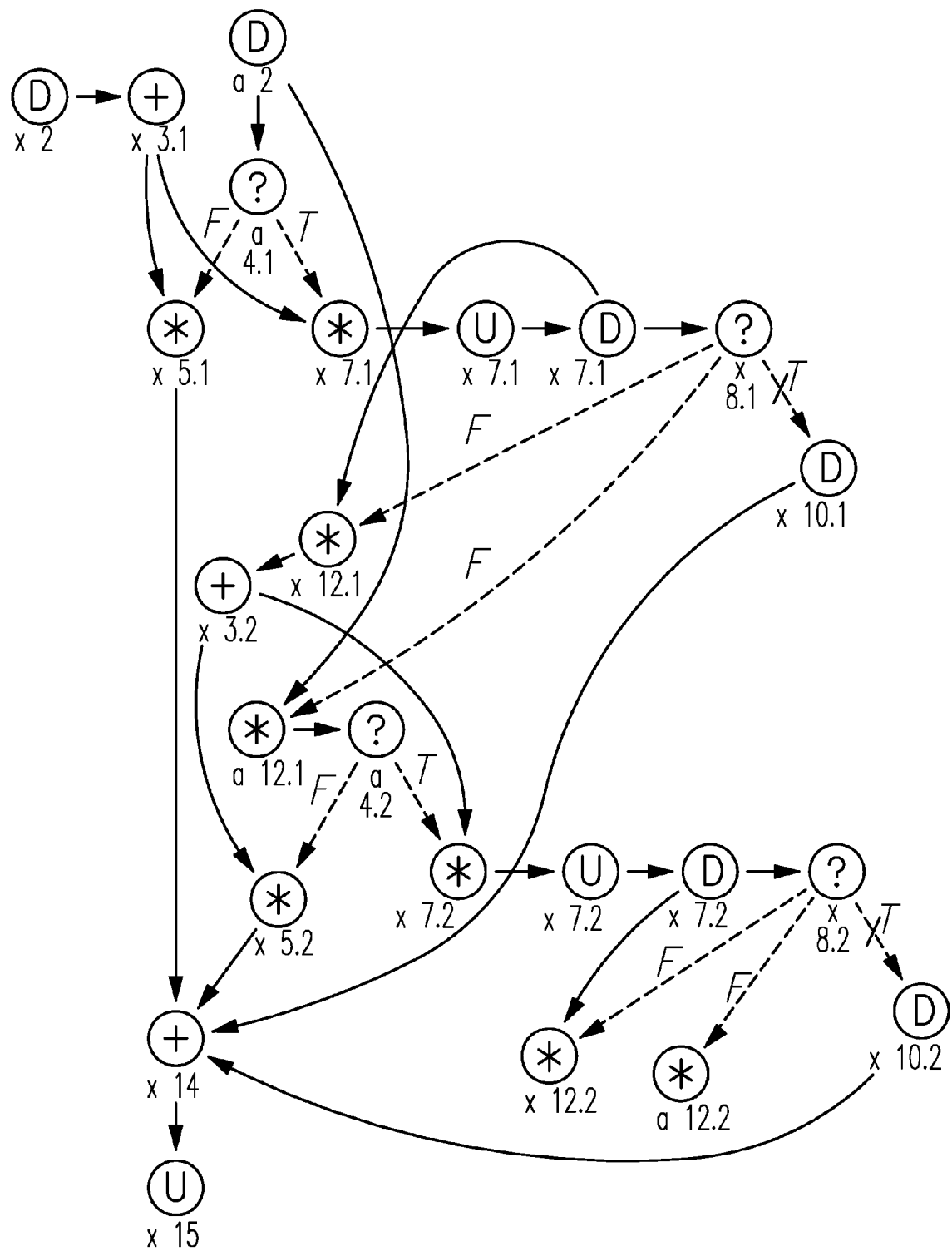

FIG. 26 shows initial part of dynamic alpha graph of "loop with break" example.

FIG. 27 shows flow rules for loop entry plus alpha node.

FIG. 28 shows flow of state in loop exit node.

Signal Flow Algebra

Figure 29:
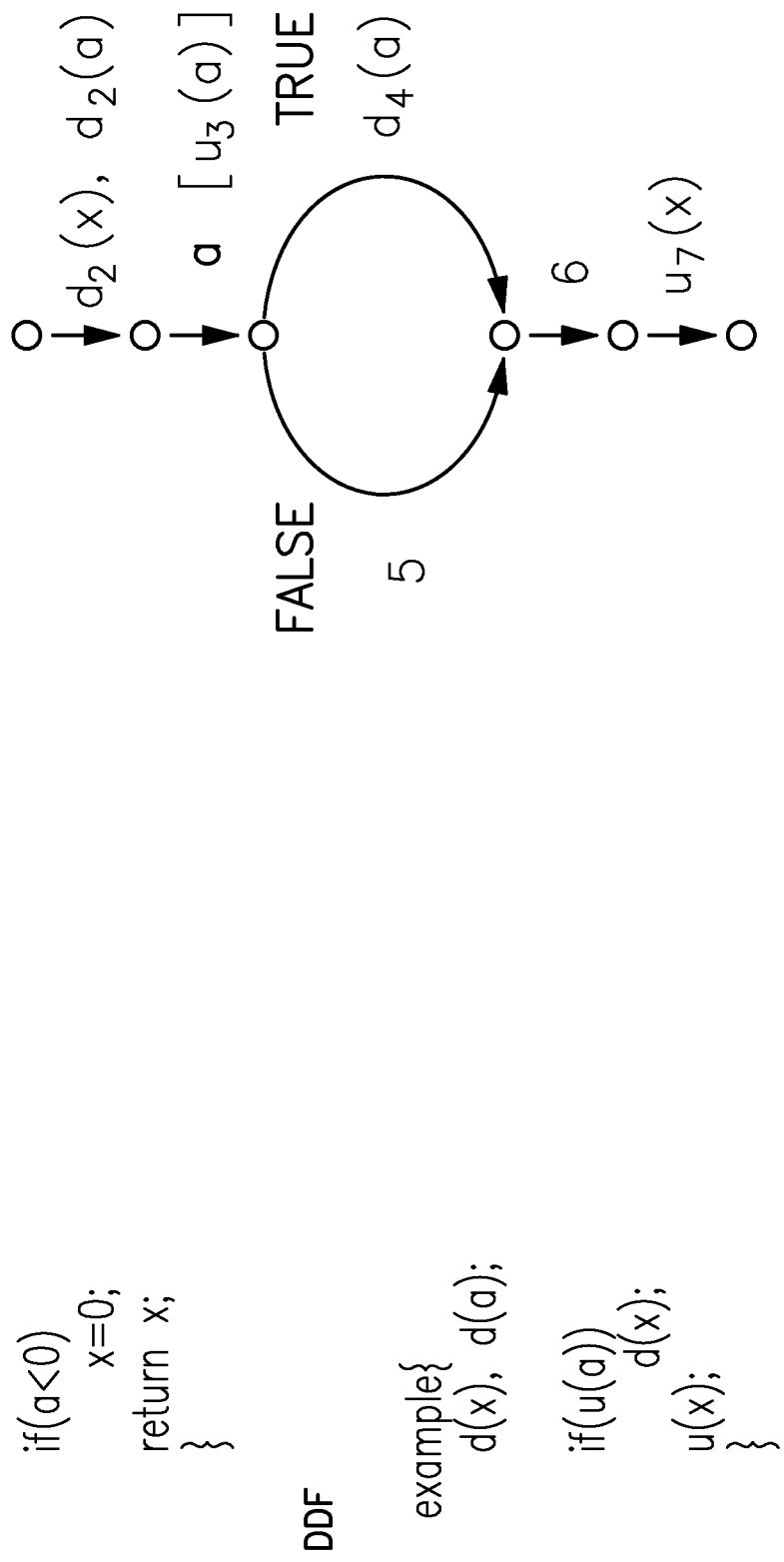

FIG. 29 shows example of a simple decision.

Figure 30:
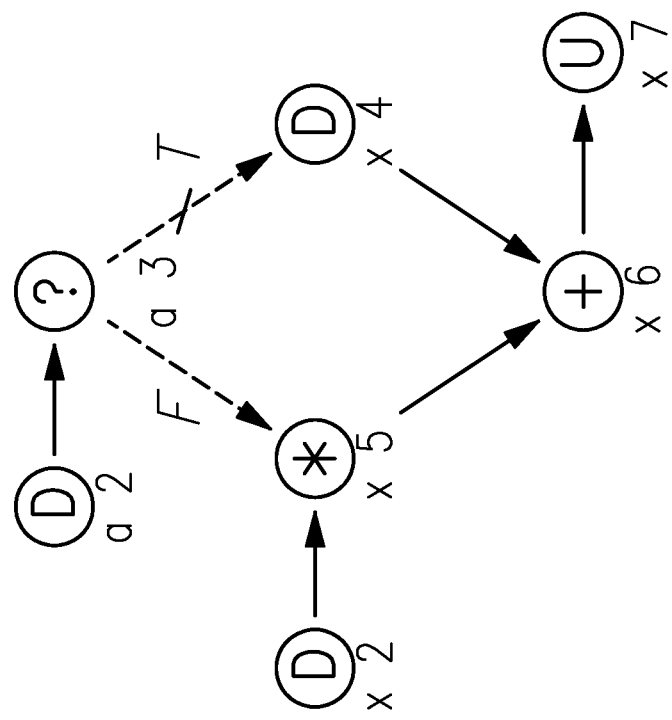

FIG. 30 shows signal flow equations and alpha graph for simple decision.

Figure 31:
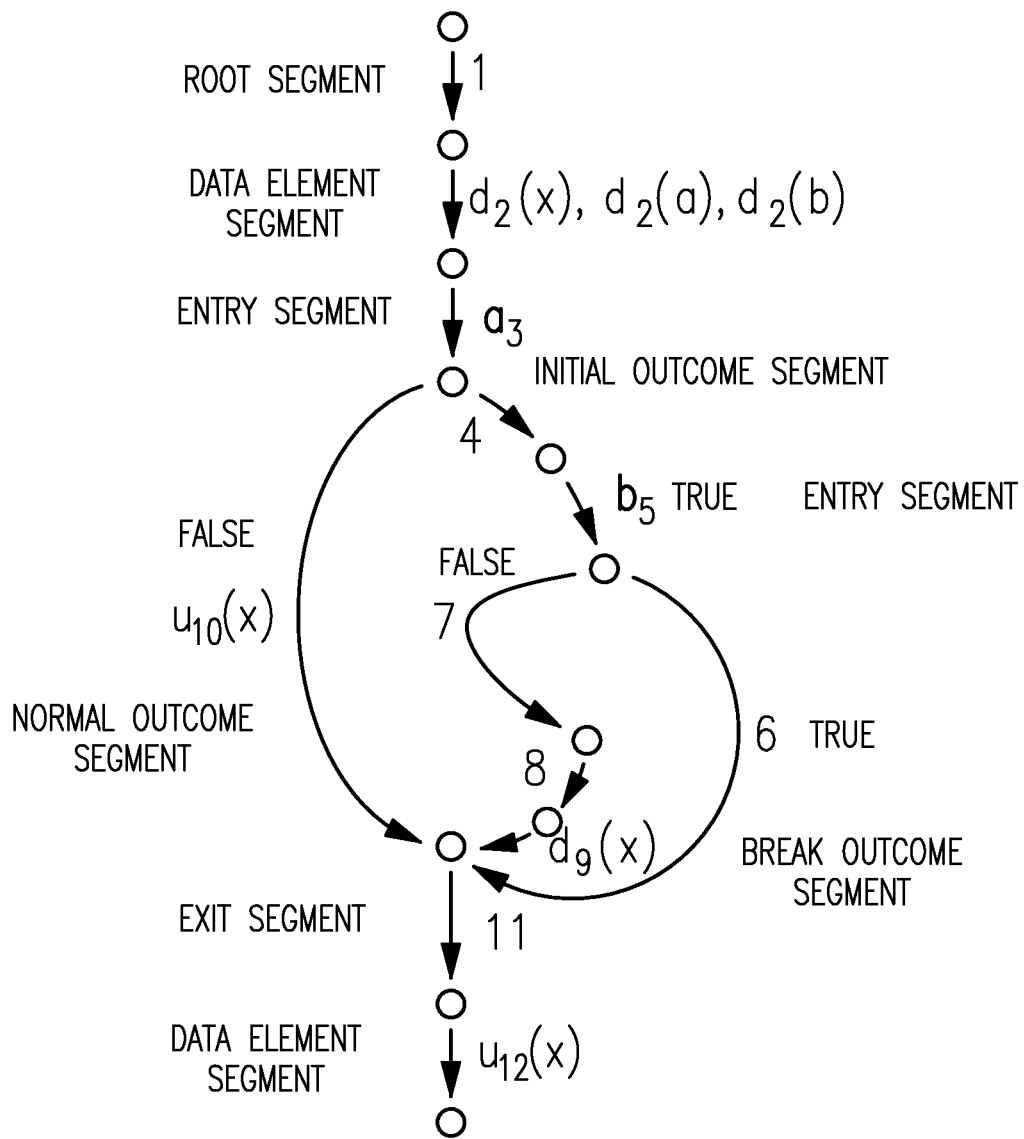

FIG. 31 shows augmented control flowgraph.

Figure 32:
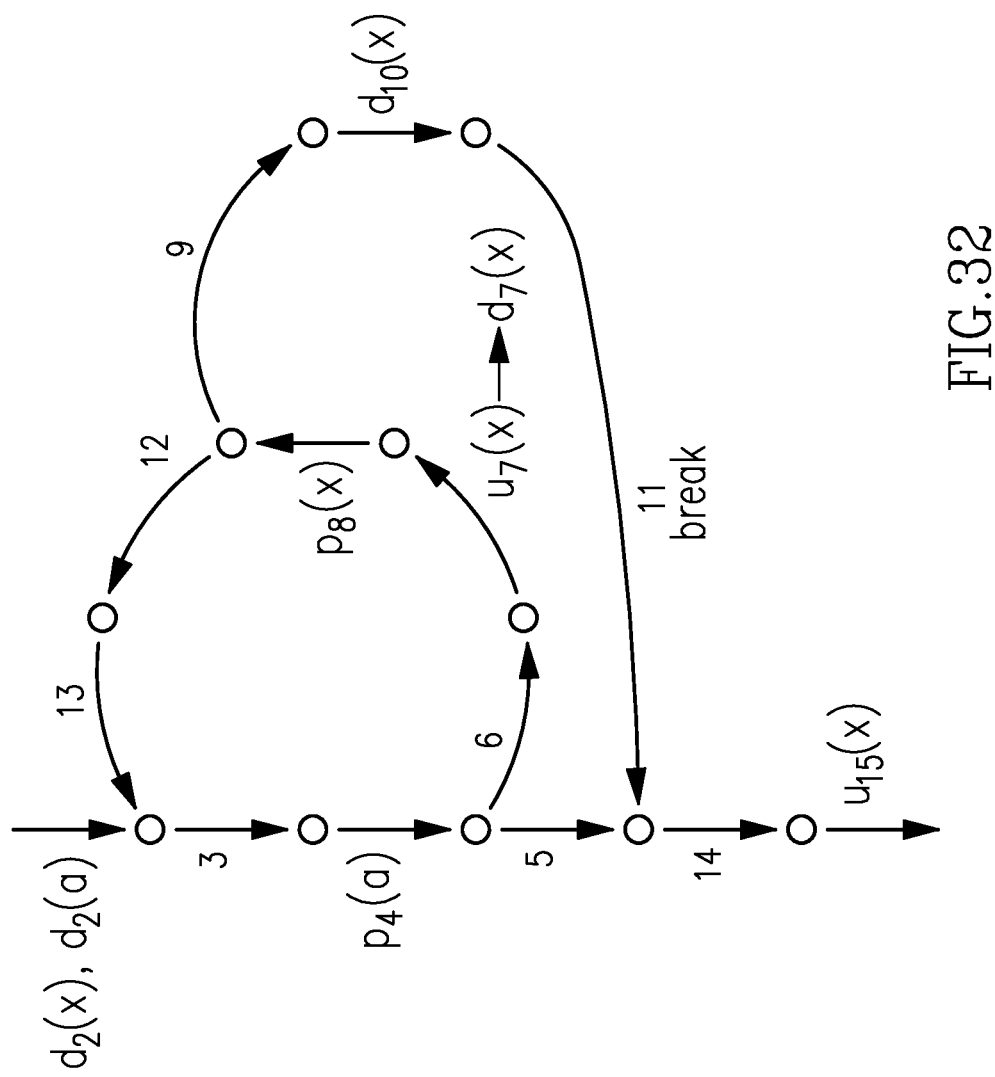

FIG. 32 shows augmented control flowgraph of "loop with break" example.

FIG. 33 shows DDF for example of plus interior use partial outcomes.

Figure 34:
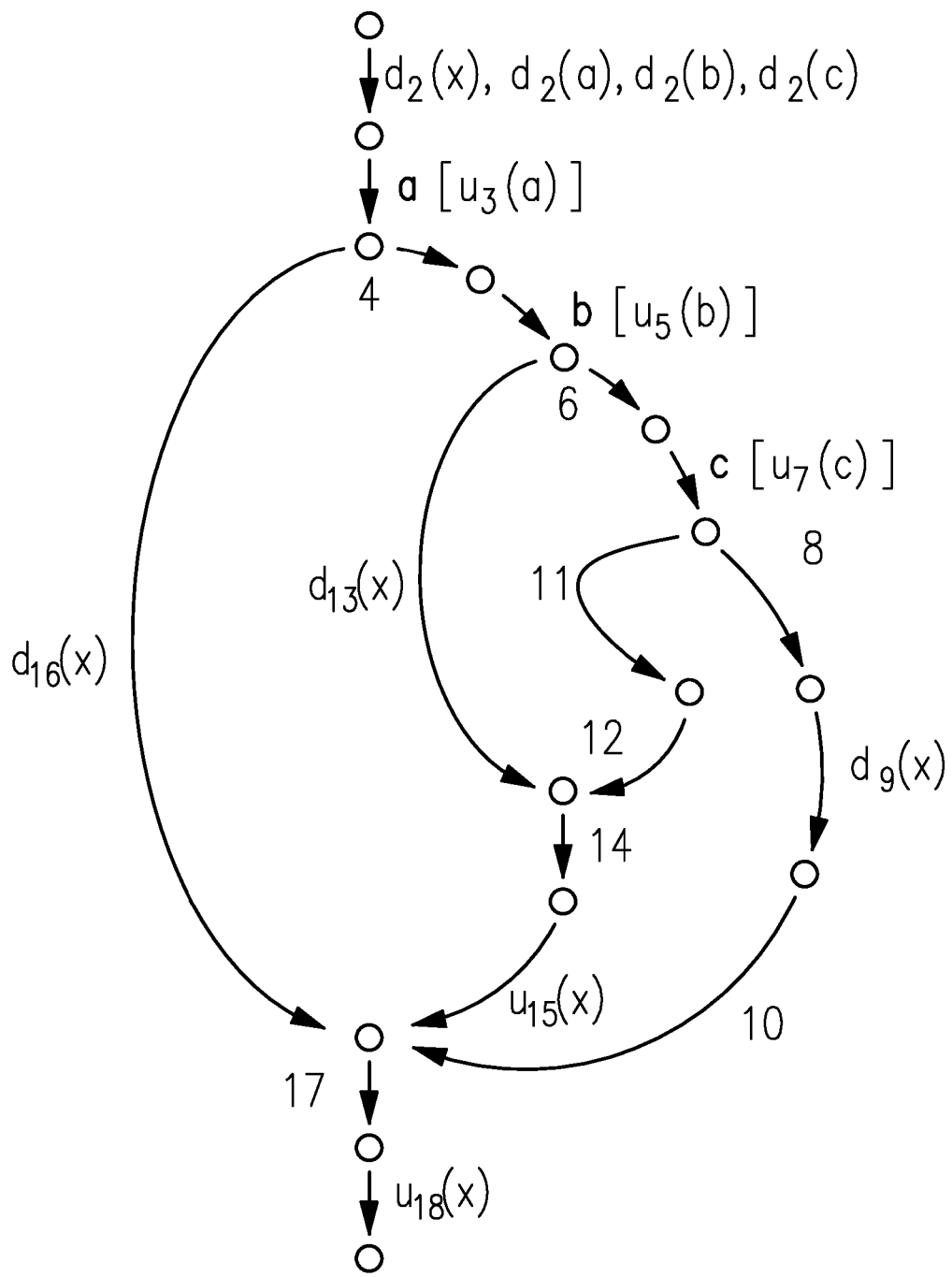

FIG. 34 shows control flowgraph for example of plus interior use partial outcomes.

Figure 35:
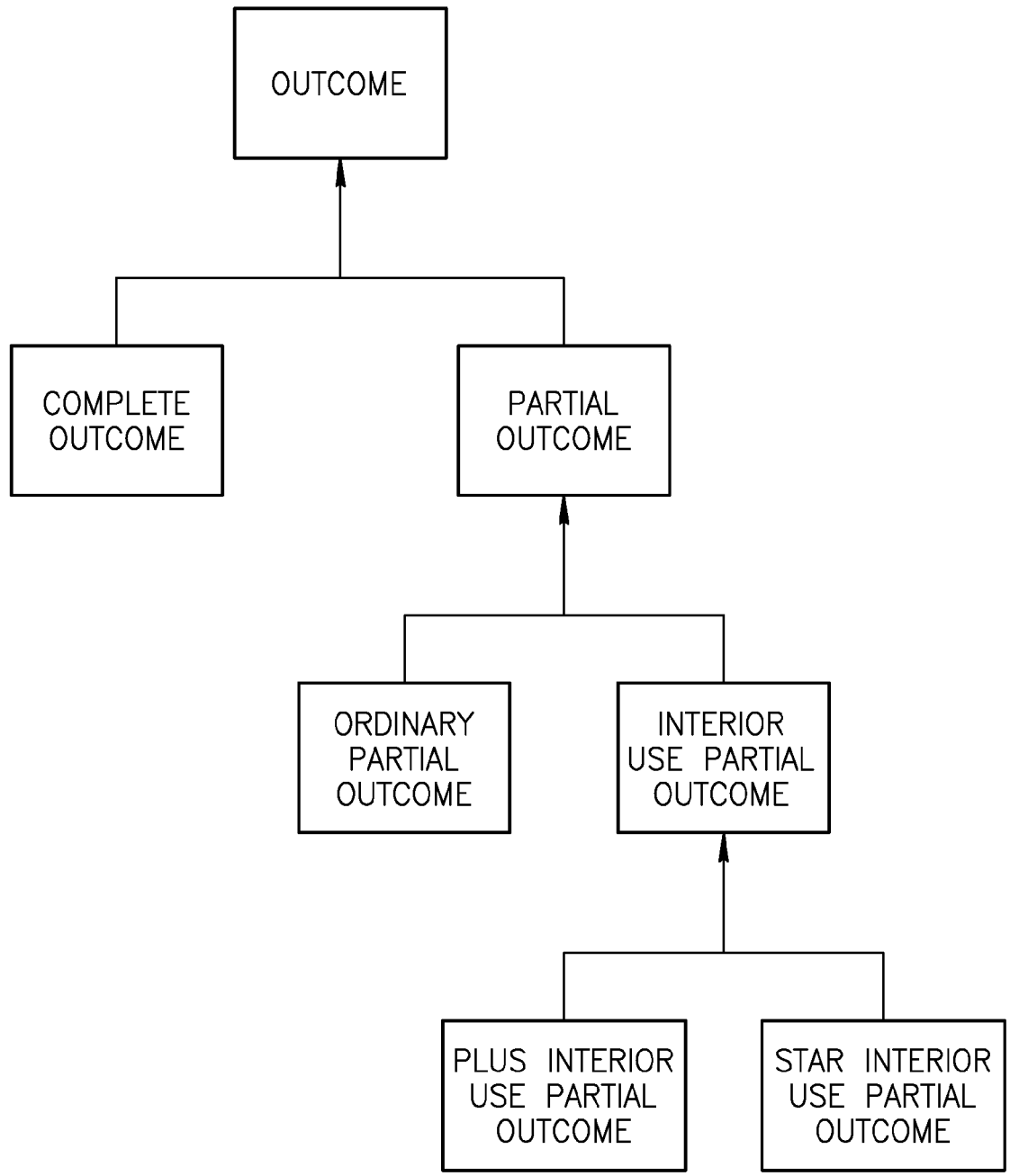

FIG. 35 shows class diagram for outcome.

FIG. 36 shows DDF for example of def-clear plus interior use partial outcomes.

Figure 37:
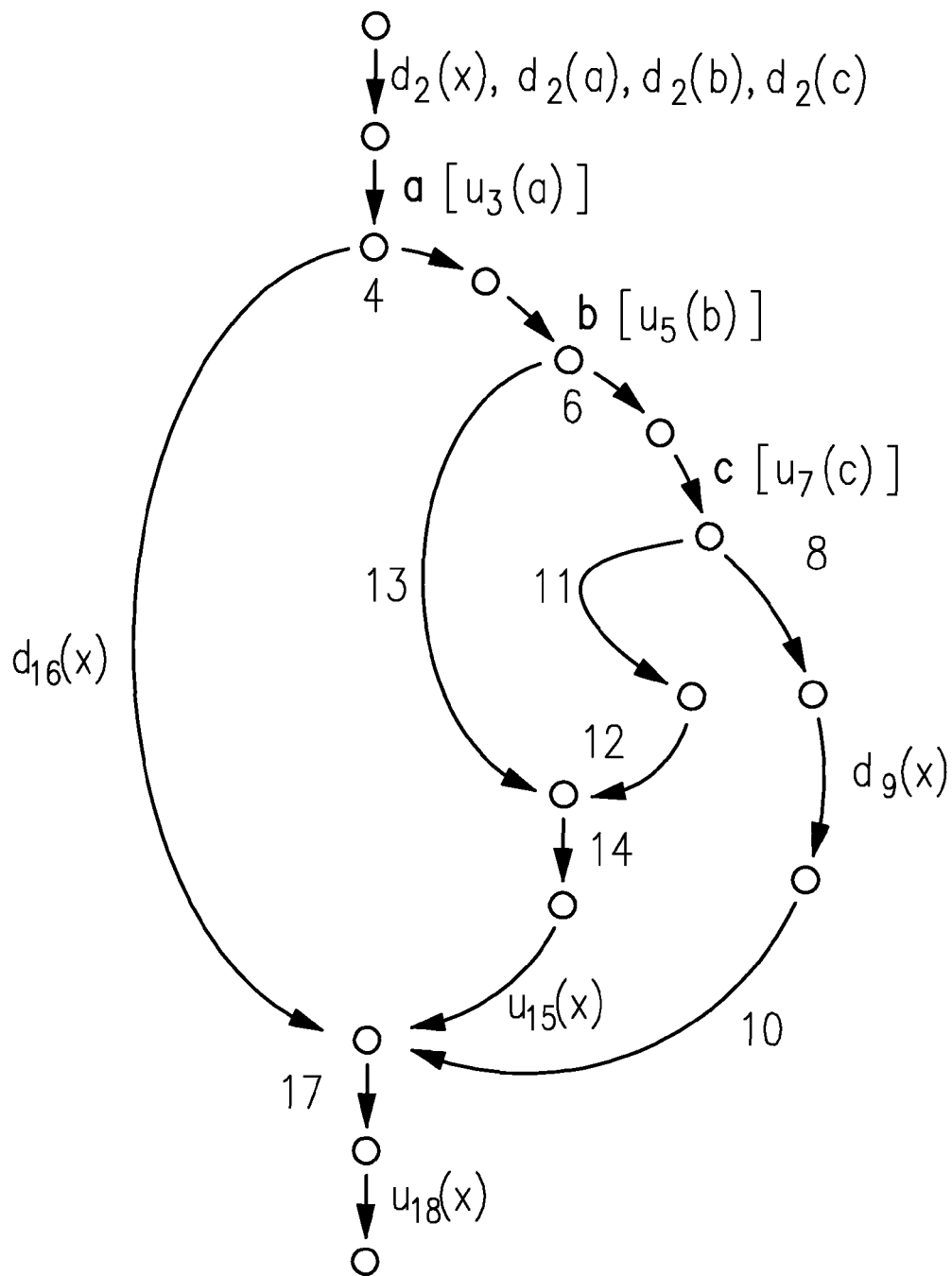

FIG. 37 shows control flowgraph for example of def-clear plus interior use partial outcomes.

FIG. 38 shows signal at node 'n'.

FIG. 39 shows transmission of segment.

FIG. 40 shows transmission of sequence.

FIG. 41 shows transmission of outcome.

FIG. 42 shows transmission of decision.

FIG. 43 shows star conversion law.

FIG. 44 shows transmission of decision in which both outcomes are def-clear.

FIG. 45 shows derivation of transmission in which both outcomes are def-clear.

FIG. 46 shows transmission of decision in which only one outcome is def-clear.

FIG. 47 shows transmission of a loop.

FIG. 48 shows transmission at the n'th iteration of a loop.

FIG. 49 shows definition of <lambda>.

FIG. 50 shows value of <tau>ENTRY at instance n.

FIG. 51 shows transmission of loop without external break.

FIG. 52 derivation illustrating the disappearance of loop entry node.

FIG. 53 shows DDF for non-cyclic example for signal flow equations.

Figure 54:
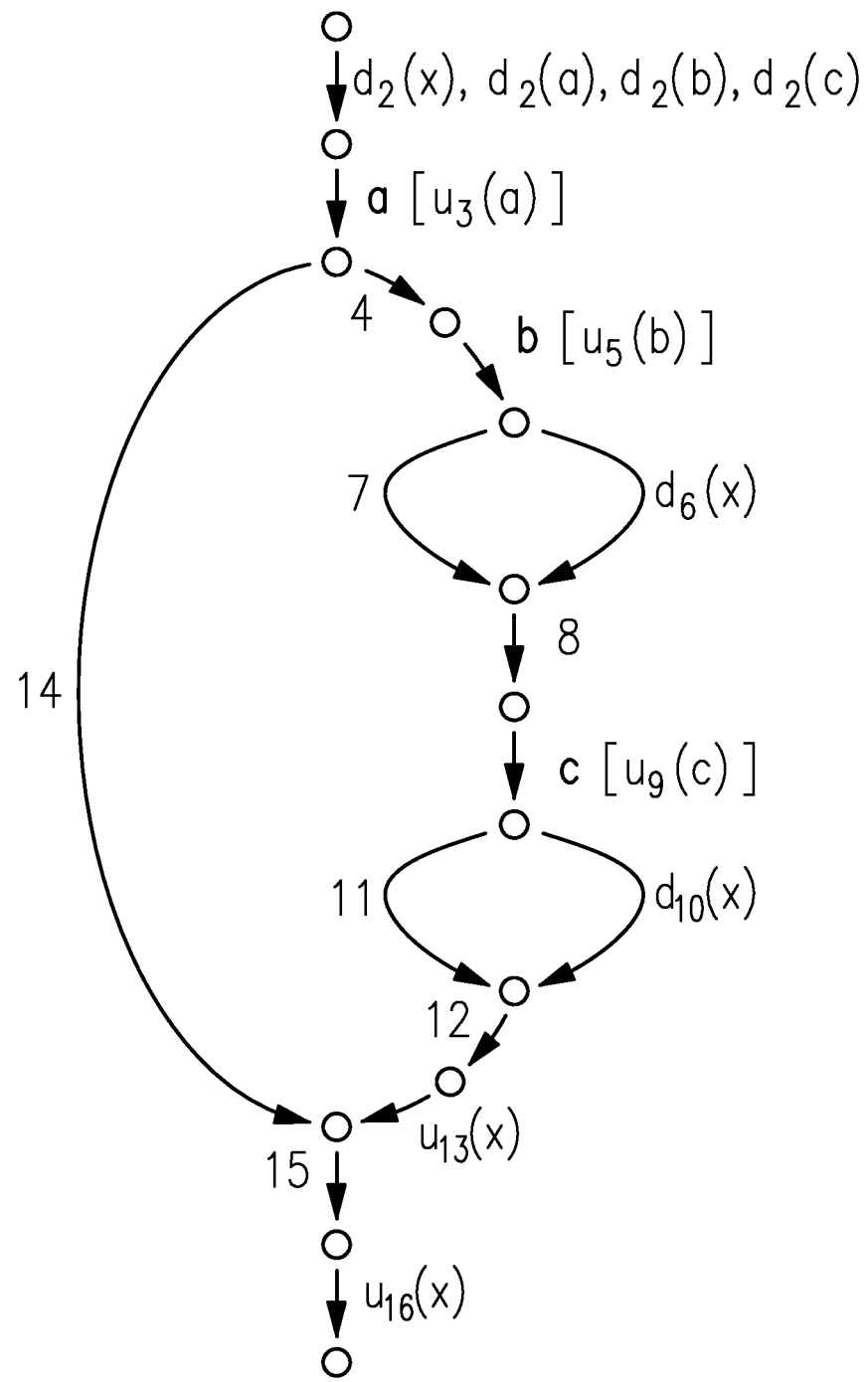

FIG. 54 shows control flowgraph of non-cyclic example for signal flow equations.

FIGS. 55A and 55B show derivation of signal flow equations for non-cyclic example.

Figure 56:
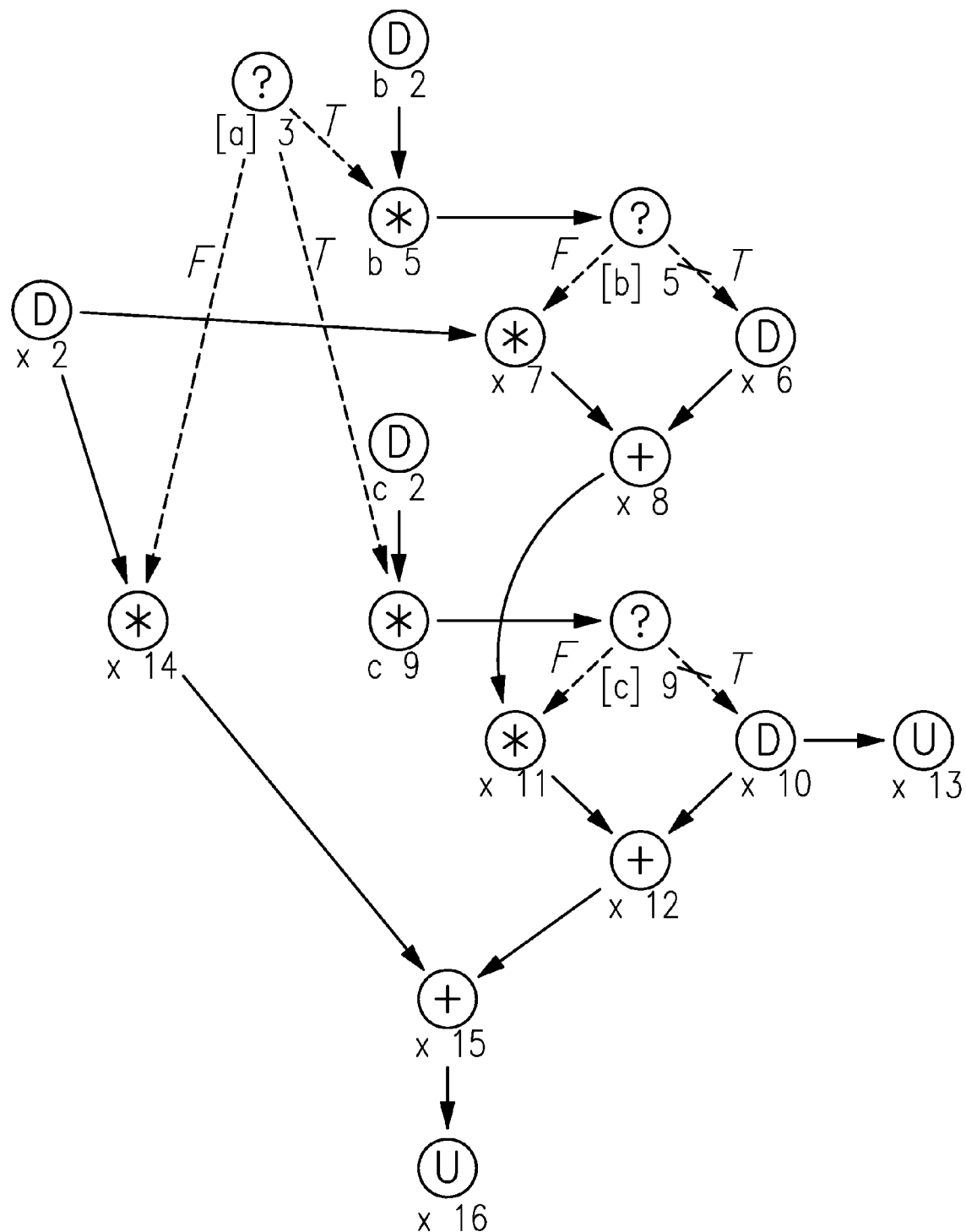

FIG. 56 shows alpha graph of non-cyclic example.

Figure 58:
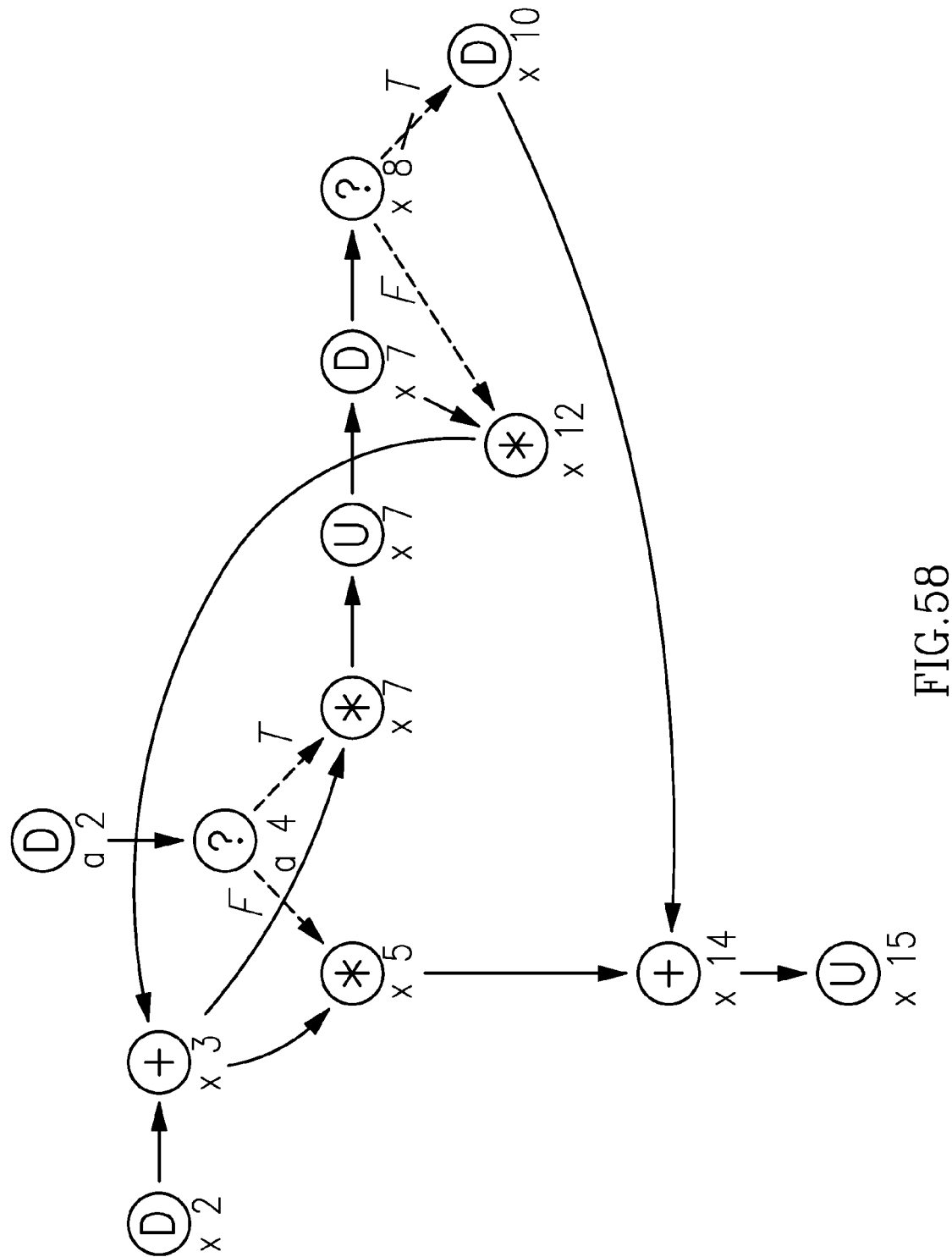

FIGS. 57A, 57B and 57C show derivation of signal flow equations for cyclic example.
FIG. 58 shows alpha graph of cyclic example.
FIG. 59 shows "before" operator.
FIG. 60 shows "controls" operator.
FIG. 61 shows normal form for transmission.
FIG. 62 shows informal meaning of the four binary operators.
FIGS. 63A through 63E show the axioms (and theorem) of signal flow algebra.
FIG. 64 shows evaluation by substitution.

Figure 65:
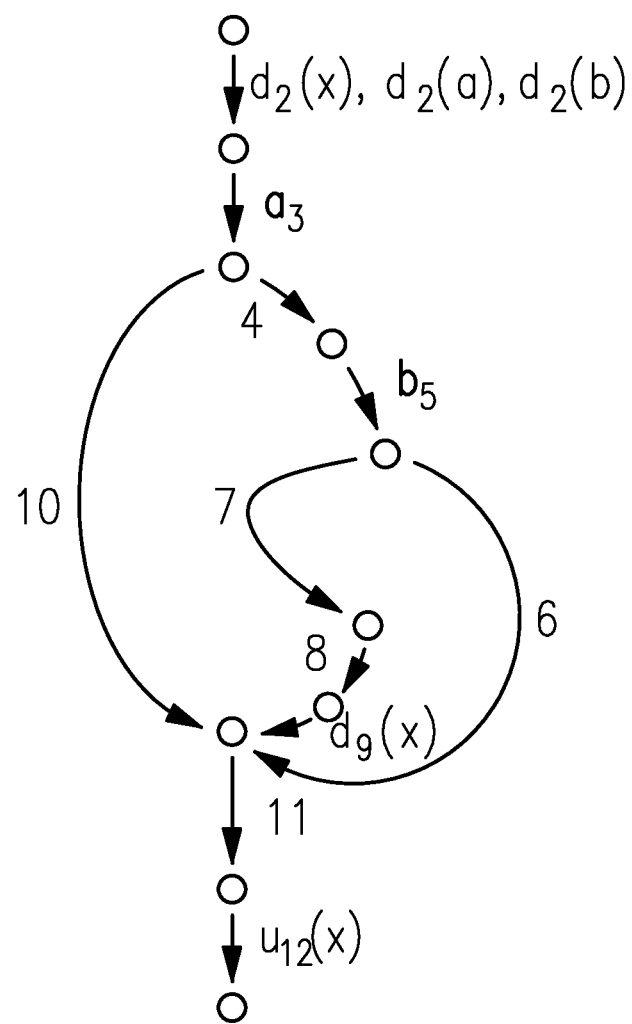
Figure 66:
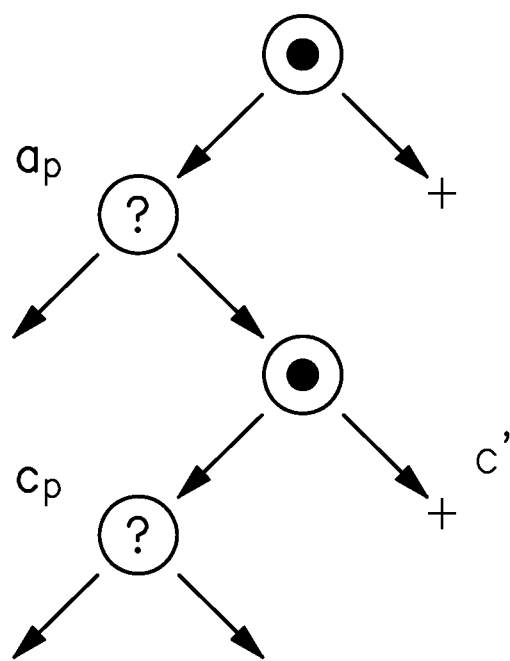
Figure 67:
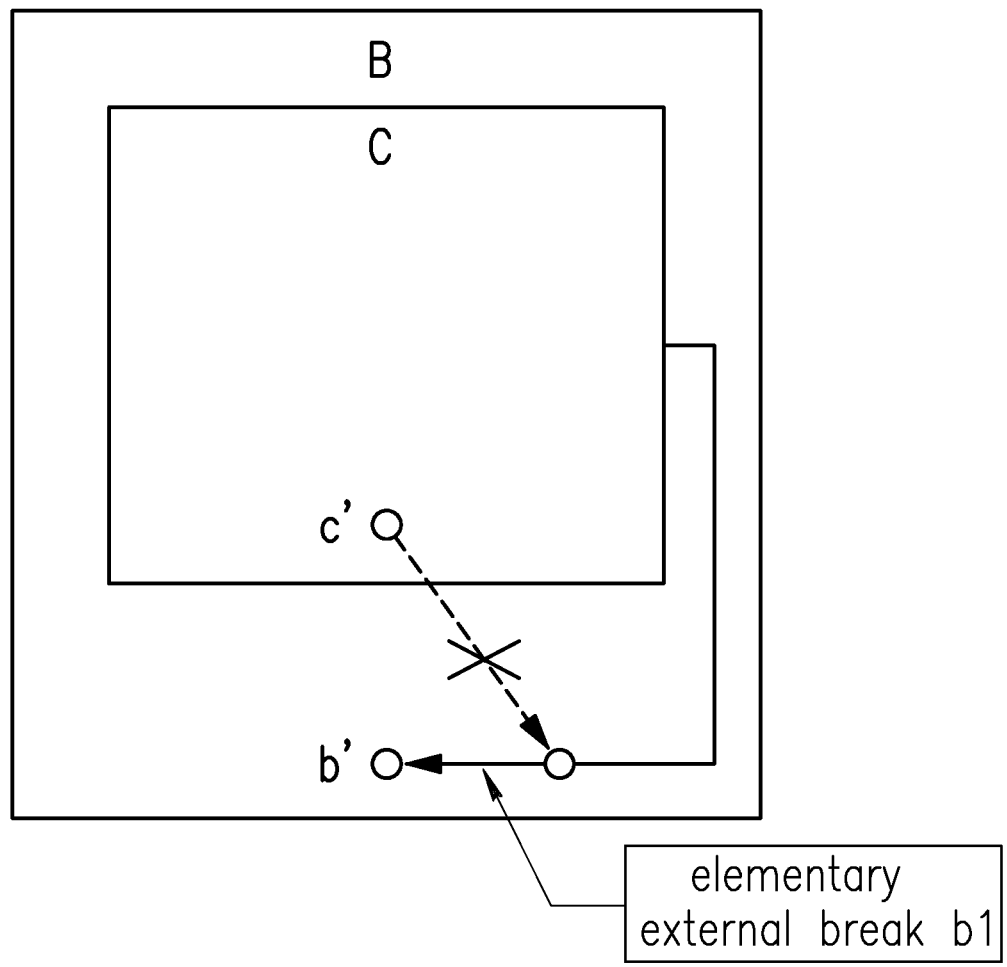
Figure 68:
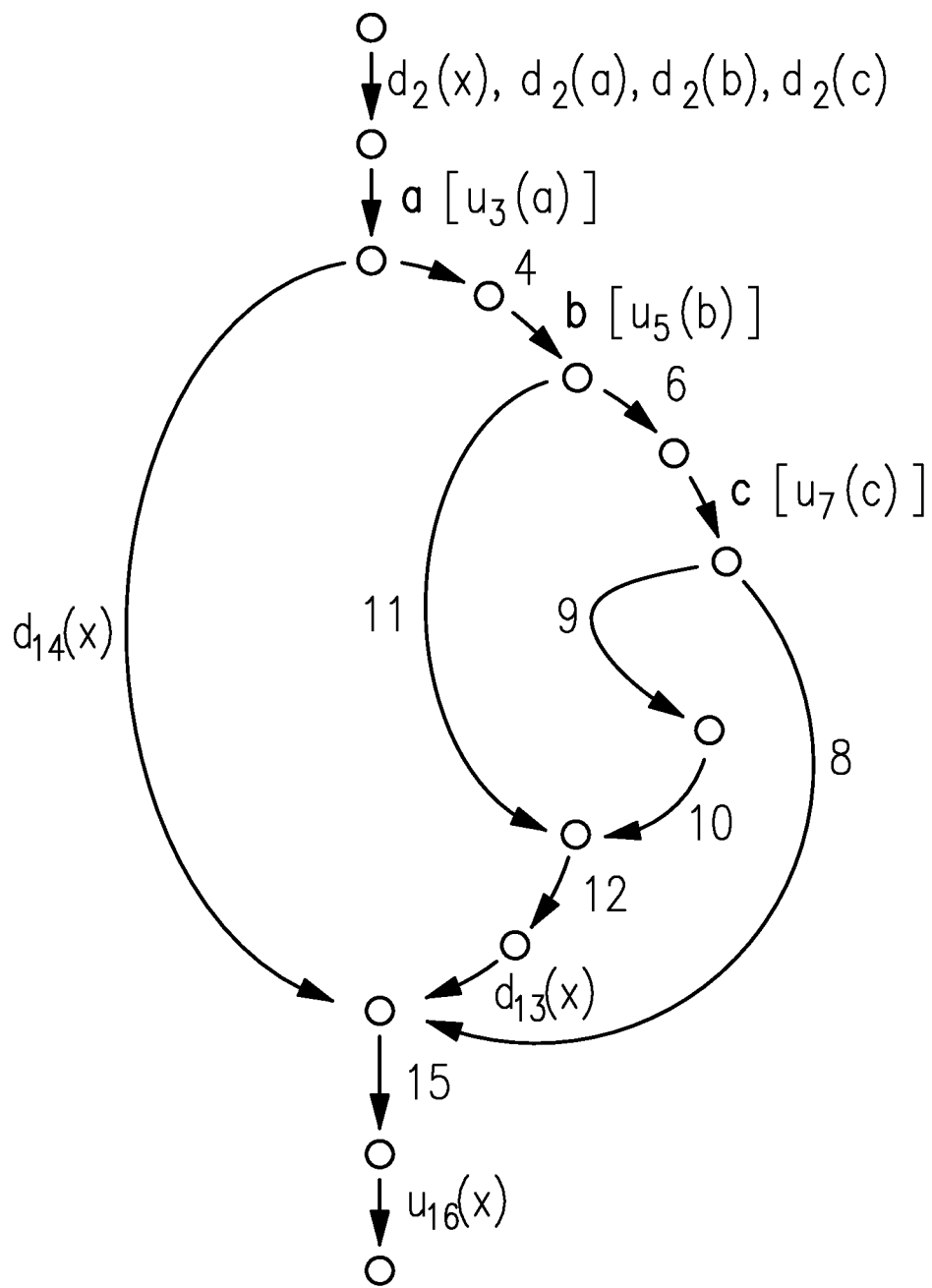
Figure 69:
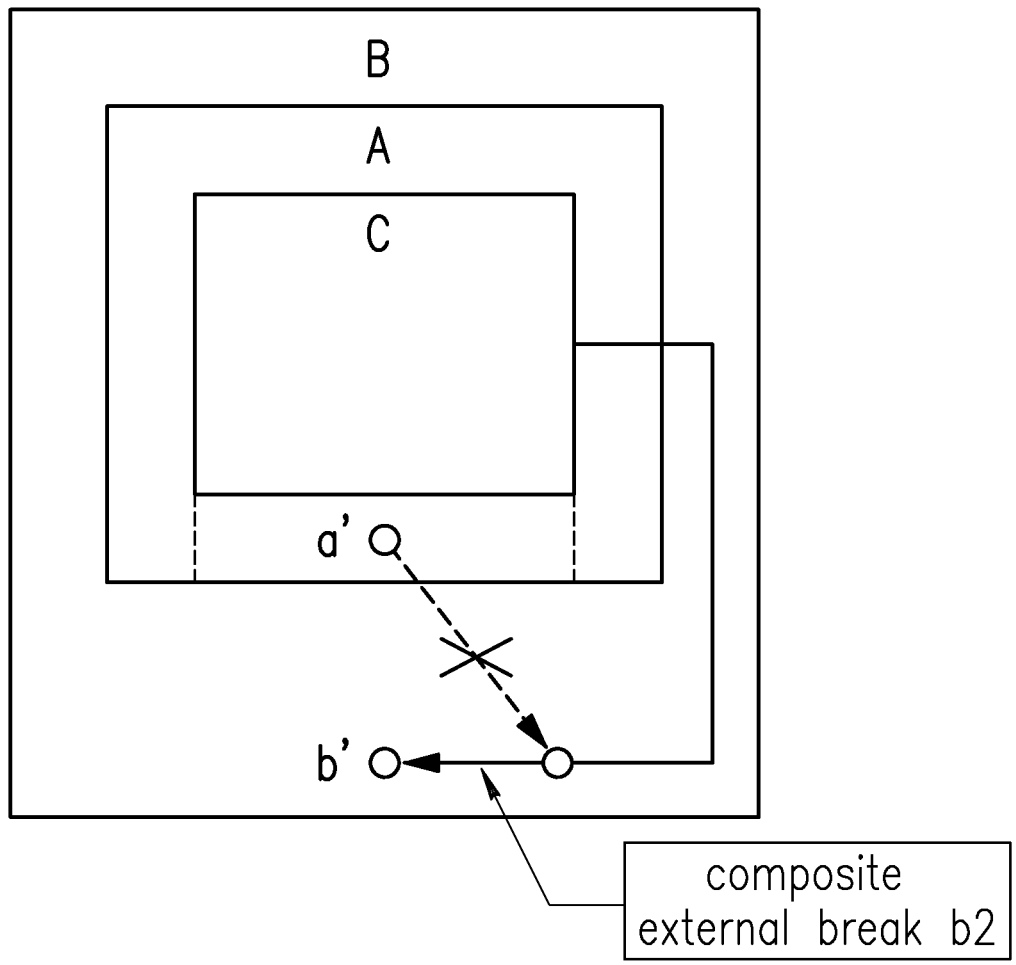
Figure 70:
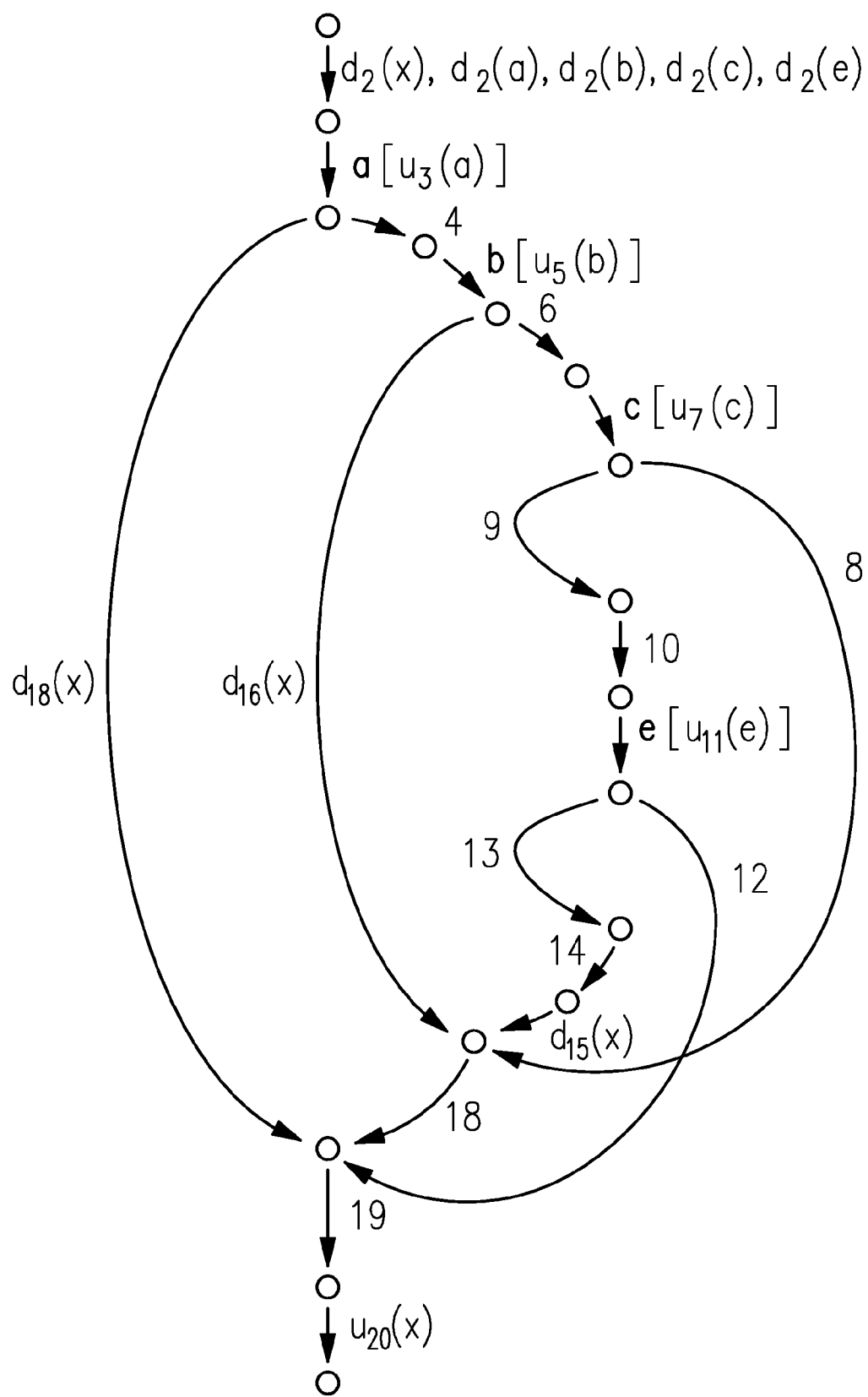
Figure 71:
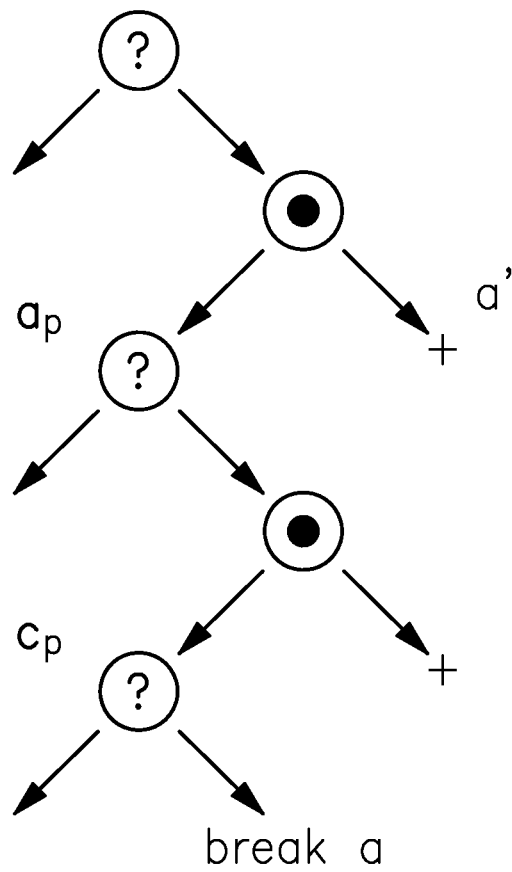
Figure 72:
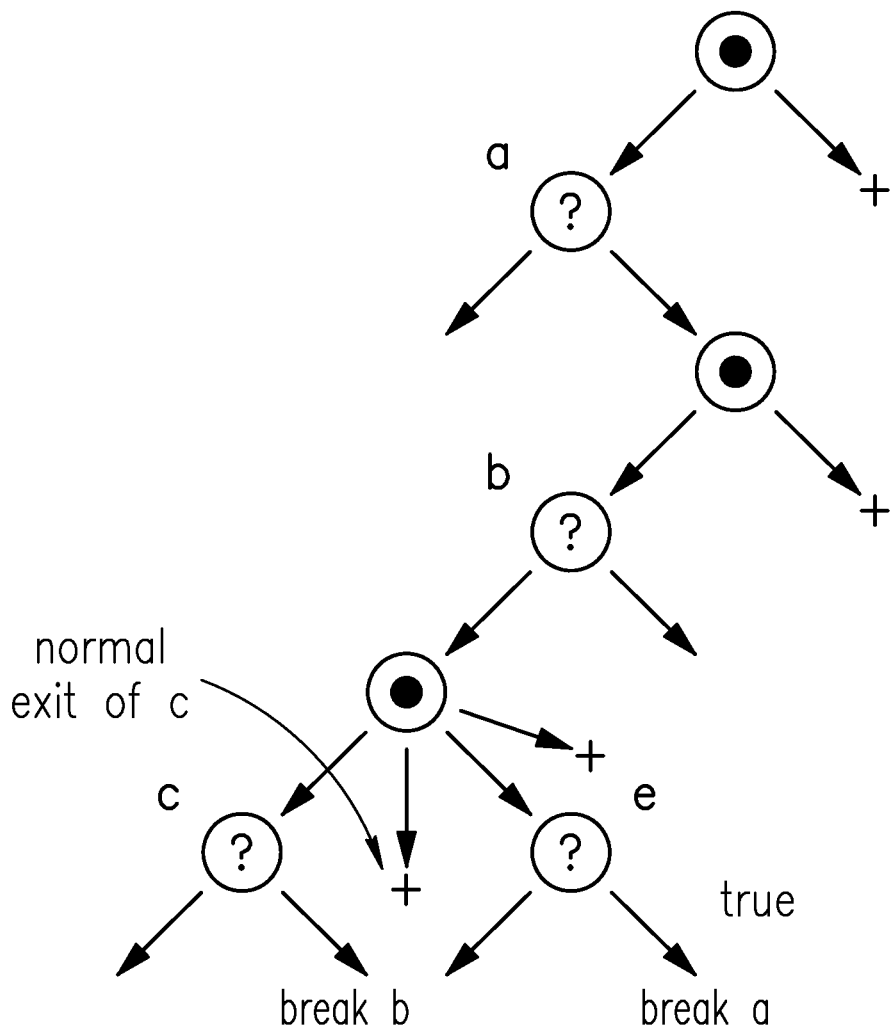
Figure 73:
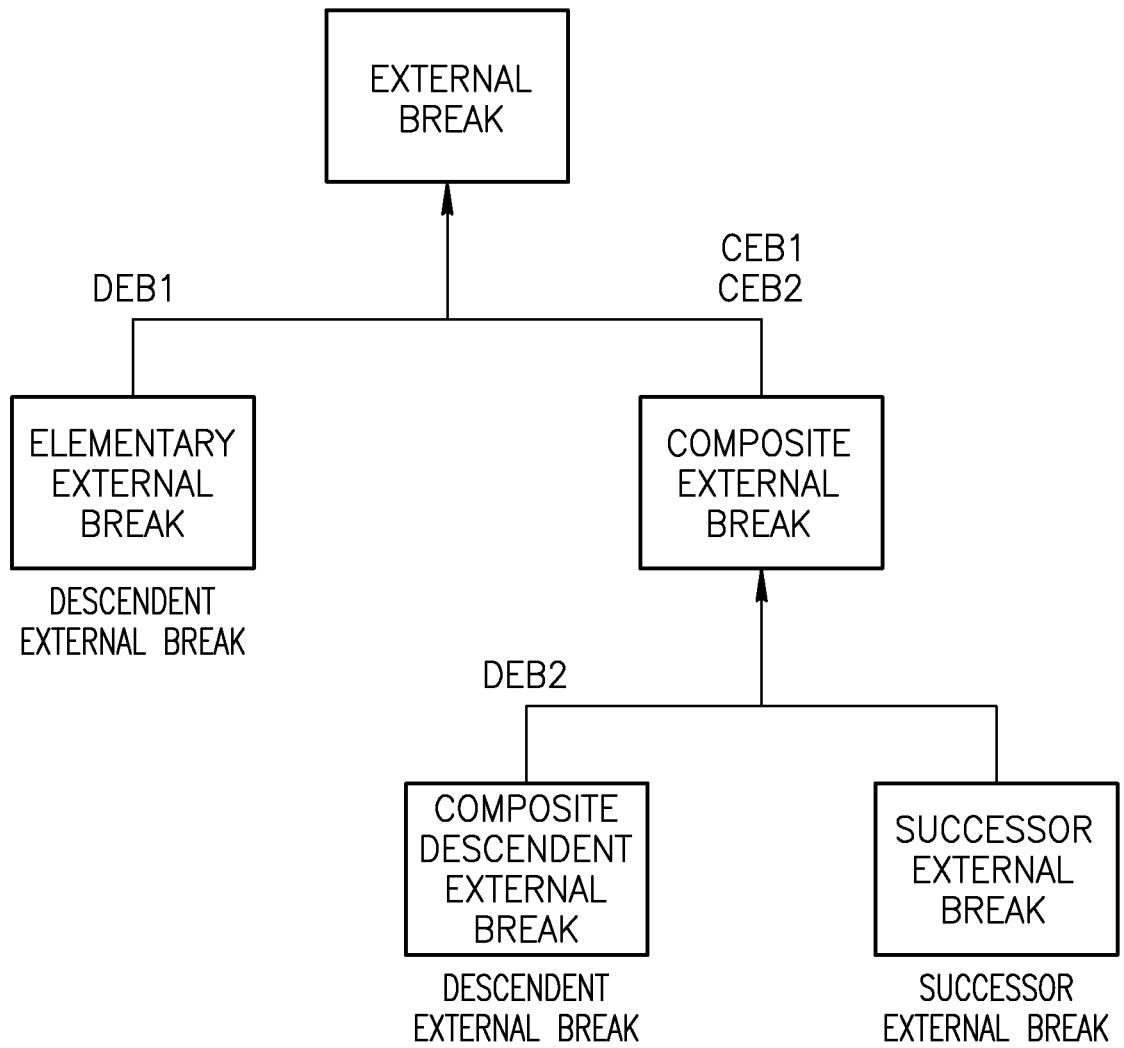
Figure 74:
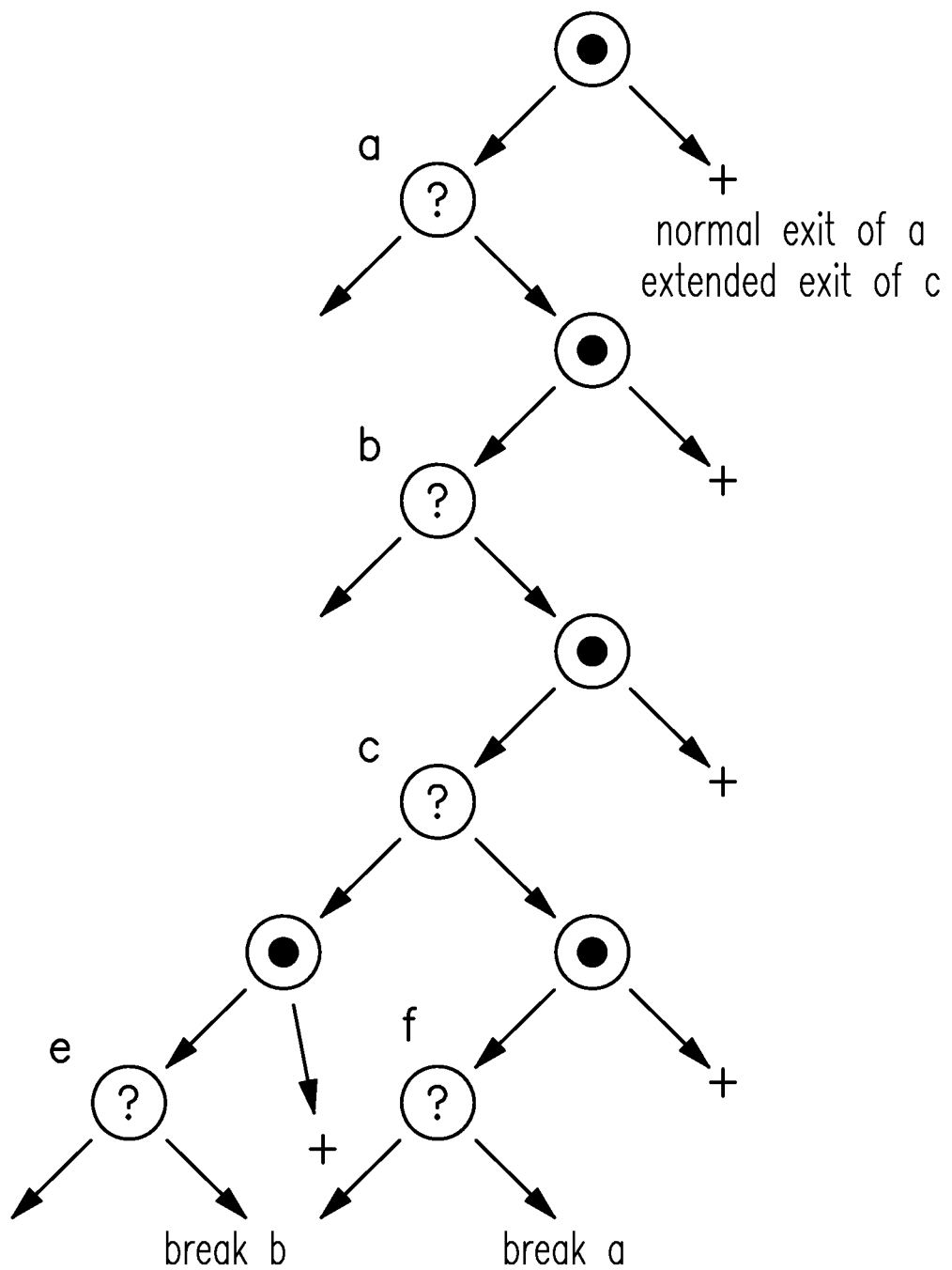
Figure 75:
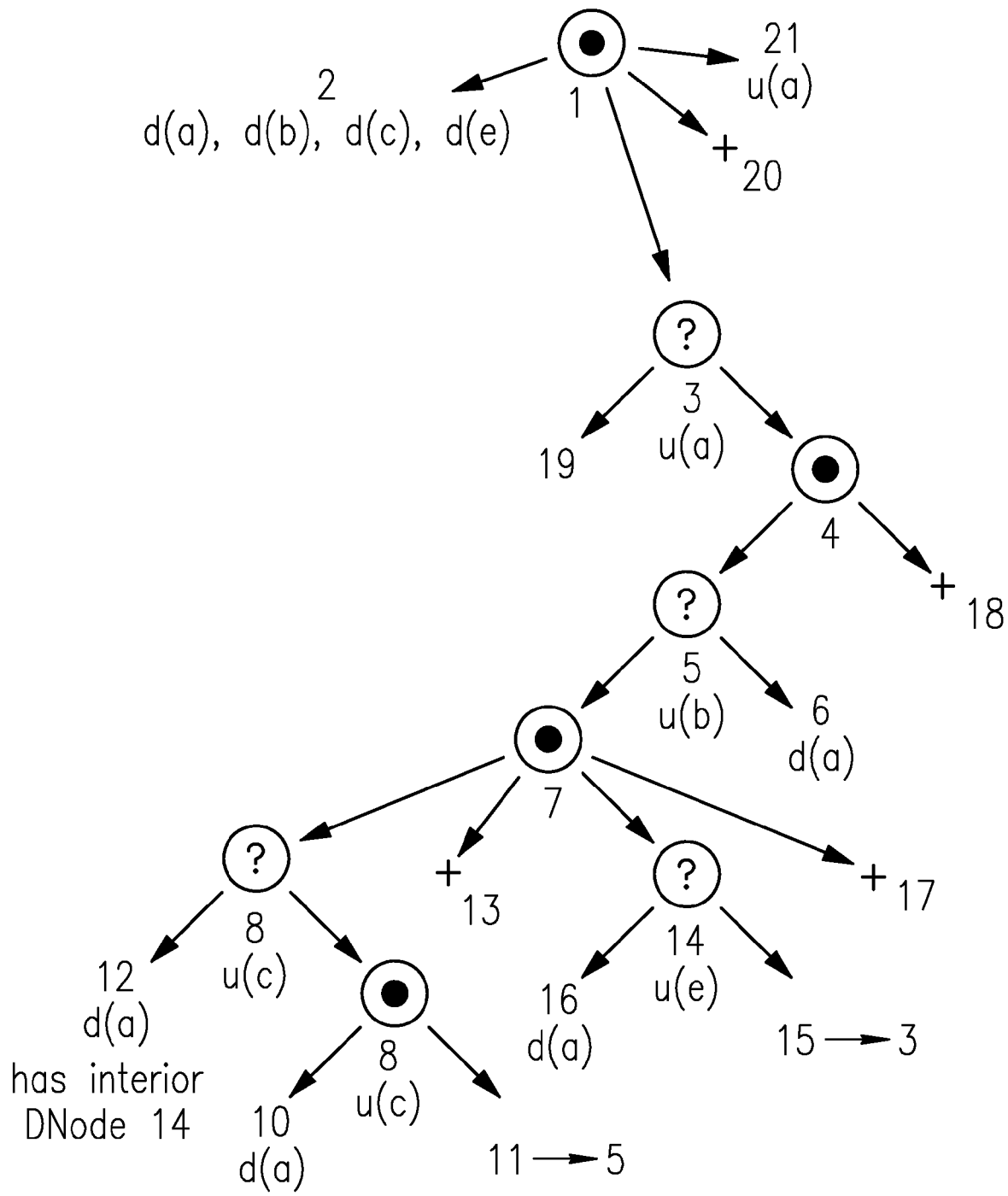

External Breaks
FIG. 65 shows control flowgraph—decision with break.
FIG. 66 shows decision graph—normal decision and containment.
FIG. 67 shows diagram of an elementary external break.
FIG. 68 shows control flowgraph—elementary external break.
FIG. 69 shows control flowgraph of example #15 [Kappa Transform].
FIG. 69 shows diagram of composite external break.
FIG. 70 shows control flowgraph—composite external break.
FIG. 71 decision graph—elementary (descendent) external break.
FIG. 72 shows decision graph—composite (successor) external break.
FIG. 73 shows class diagram for break.
FIG. 74 shows decision graph—maximal element.
FIG. 75 shows decision graph of strategy example.

Figure 76:
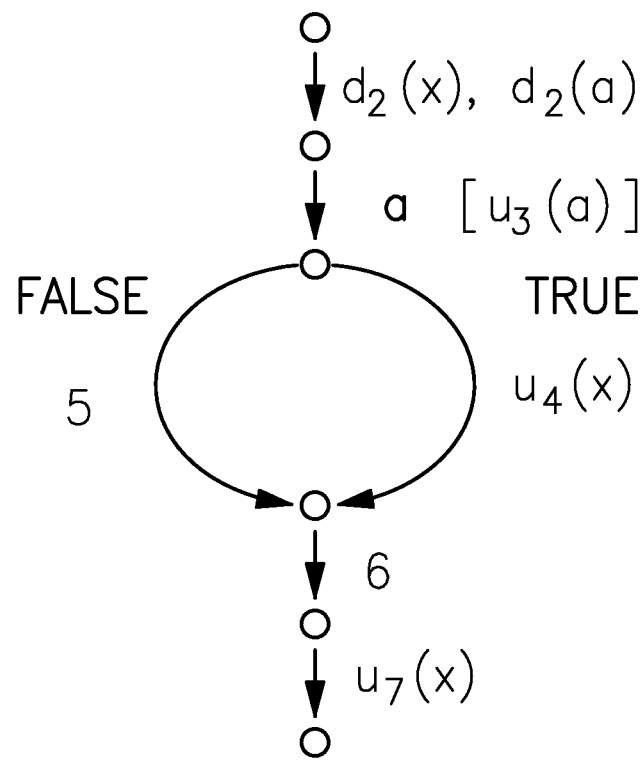
Figure 77:
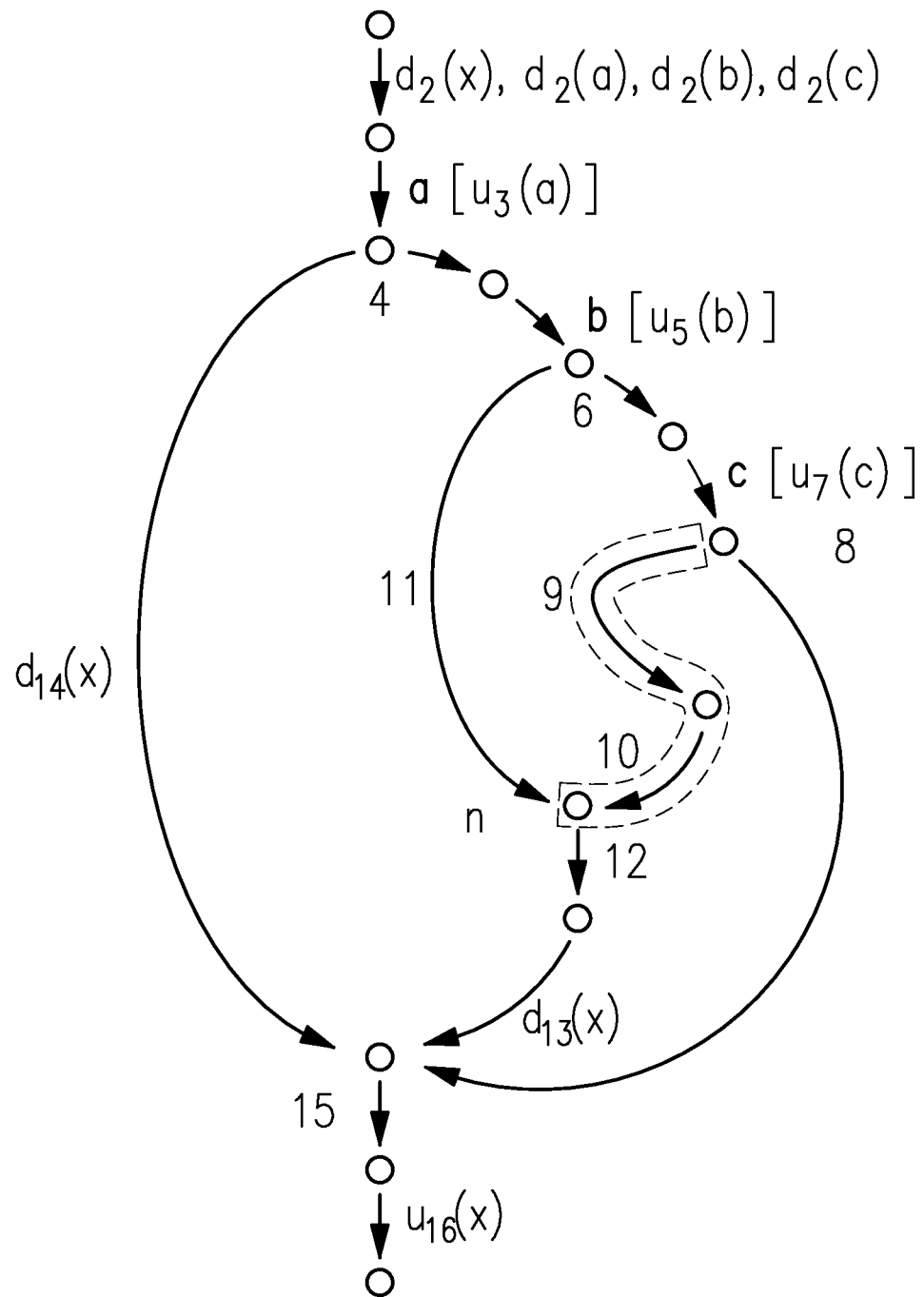
Figure 78:
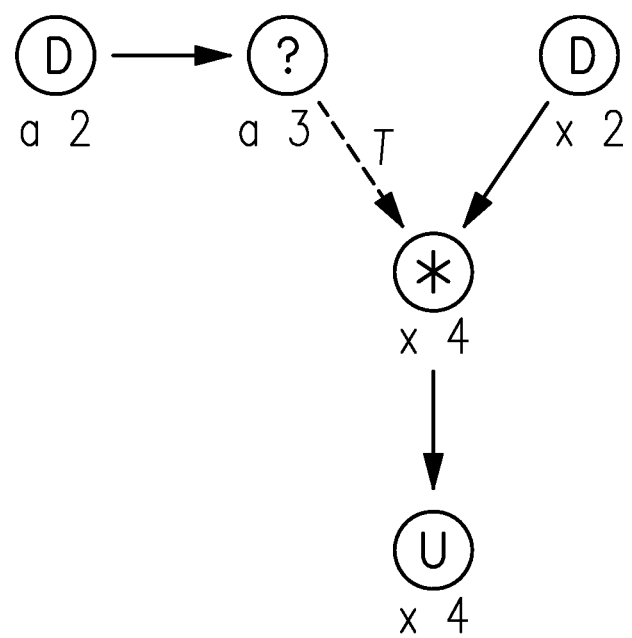
Figure 79:
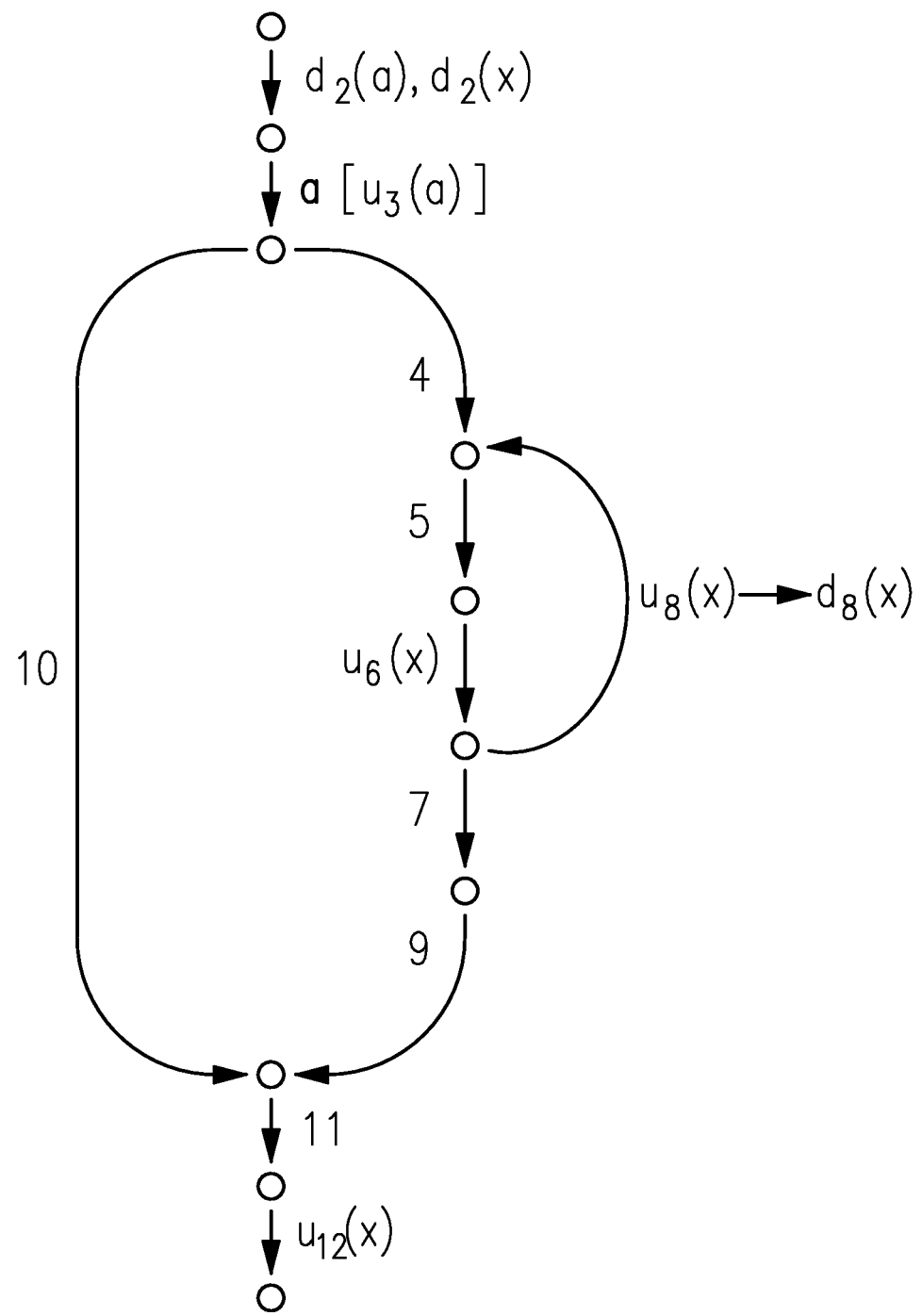
Figure 80:
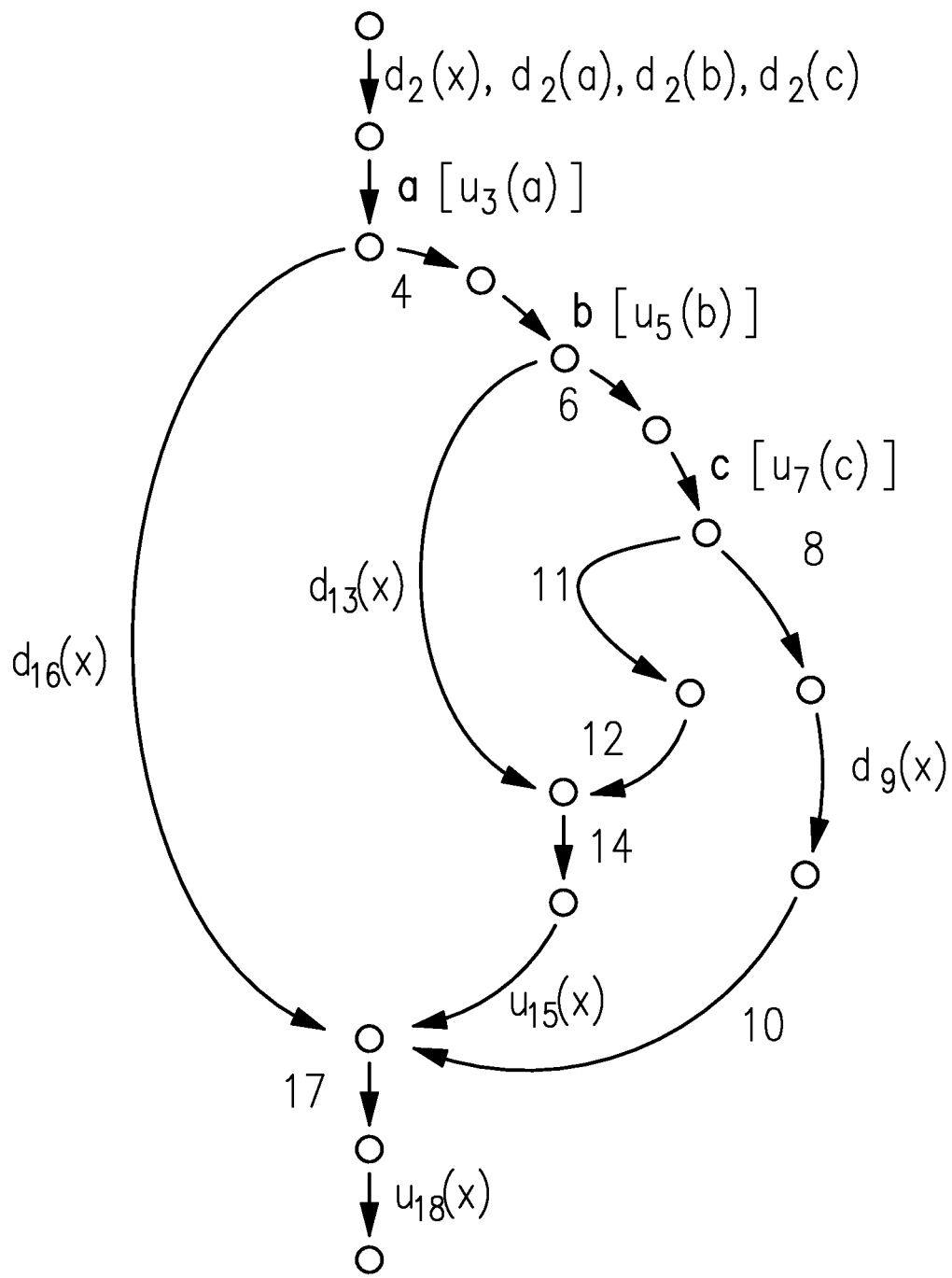
Figure 81:
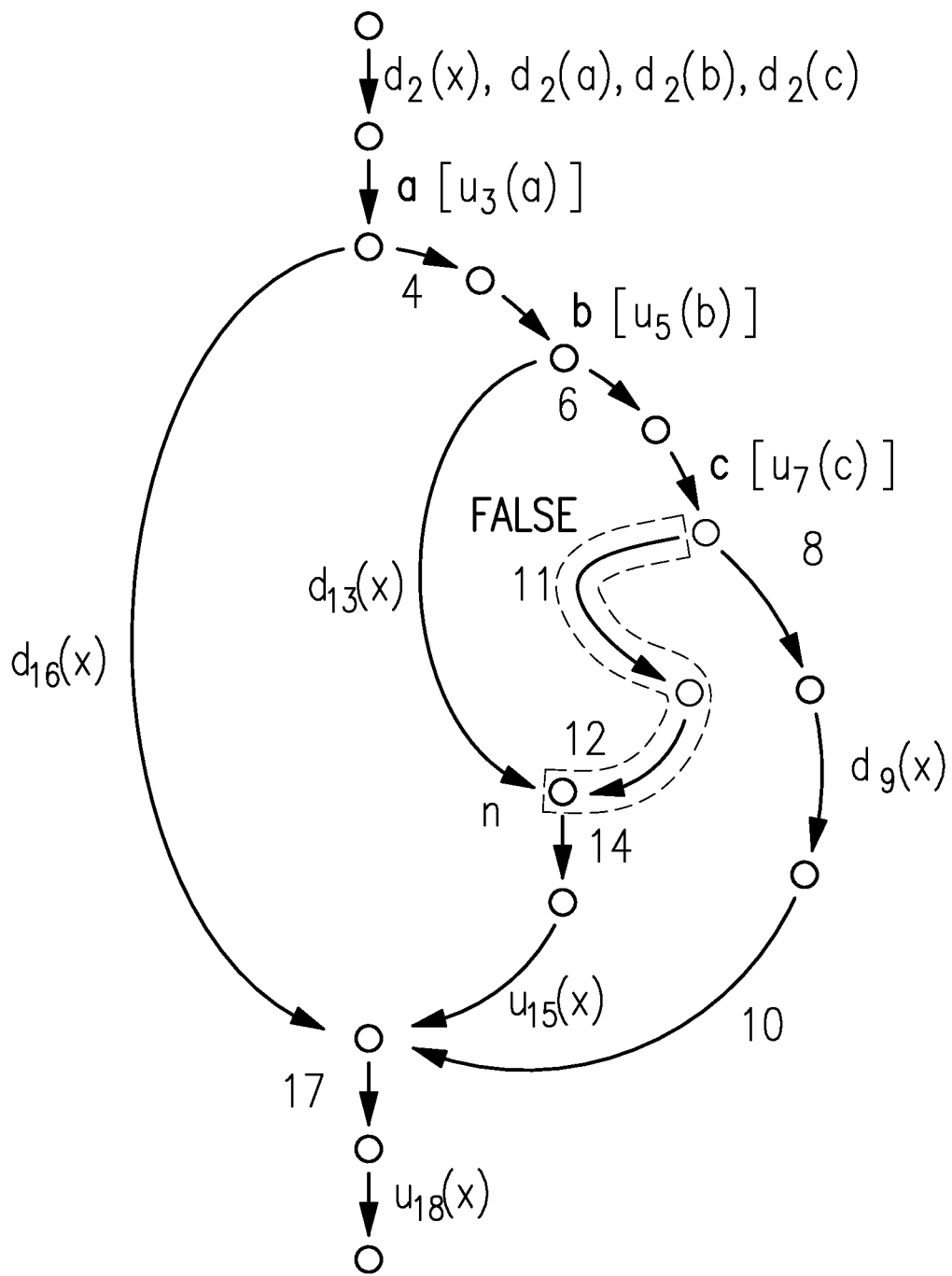
Figure 82:
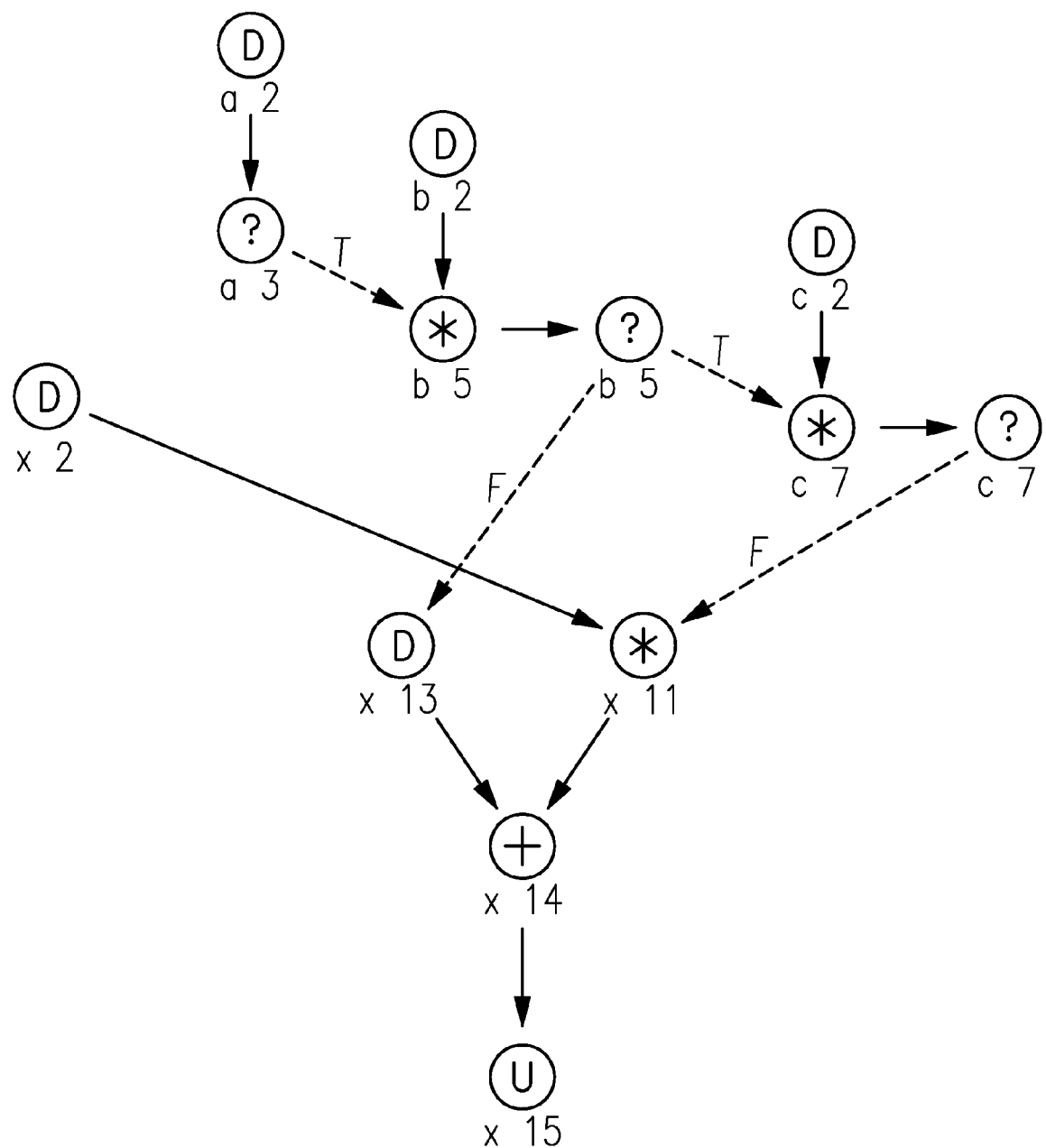

Partial Outcome
FIG. 76 shows control flowgraph—star interior use.
FIG. 77 shows control flowgraph—ordinary partial outcome.
FIG. 78 shows alpha graph (fragment)—star interior use partial outcome.
FIG. 79 shows control flowgraph—interior use in loop predicate.
FIG. 80 shows control flowgraph of Example #3.
FIG. 81 shows control flowgraph—plus interior use partial outcome.
FIG. 82 shows alpha graph (fragment)—plus interior use partial outcome.

Figure 84:
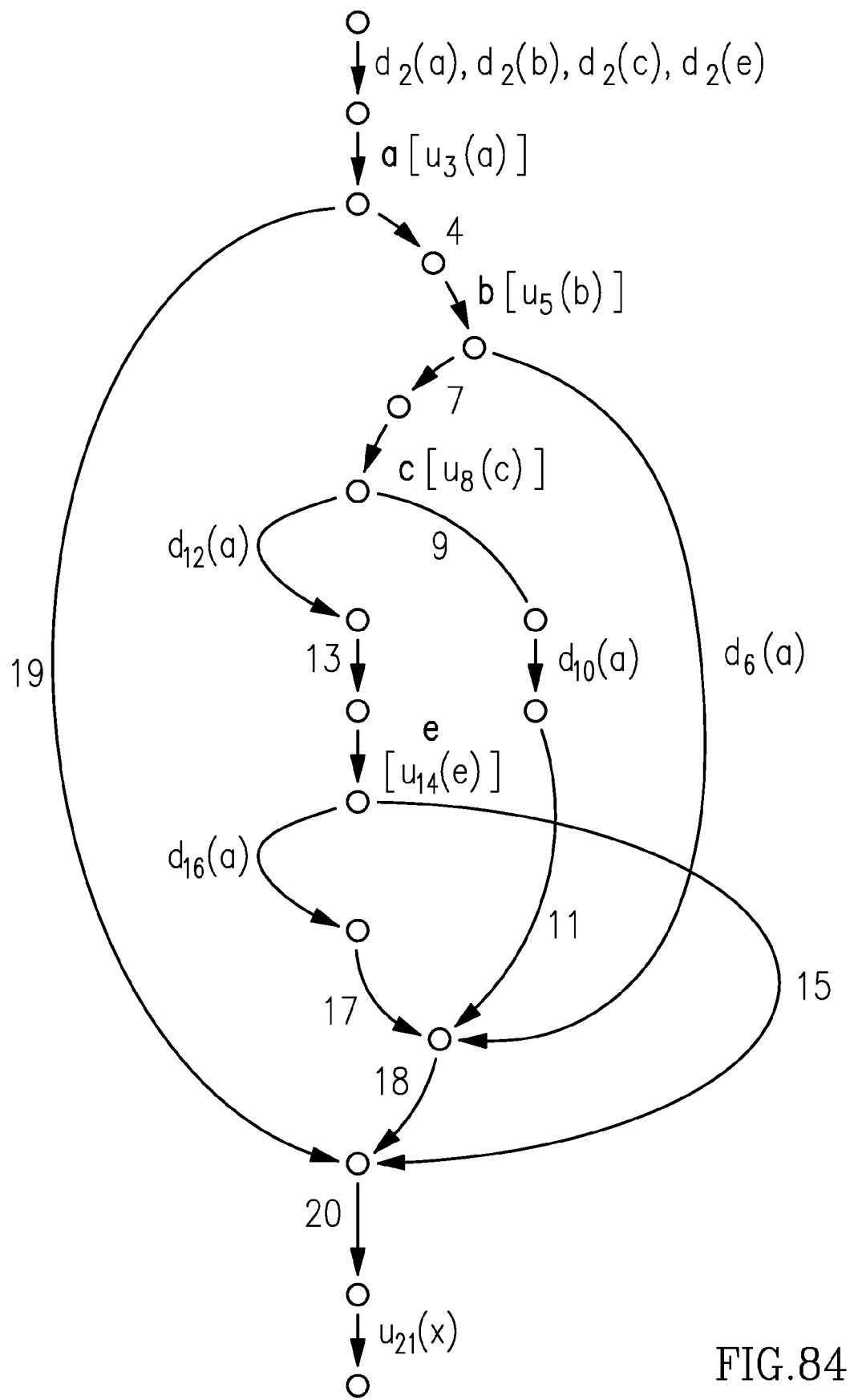
Figure 85:
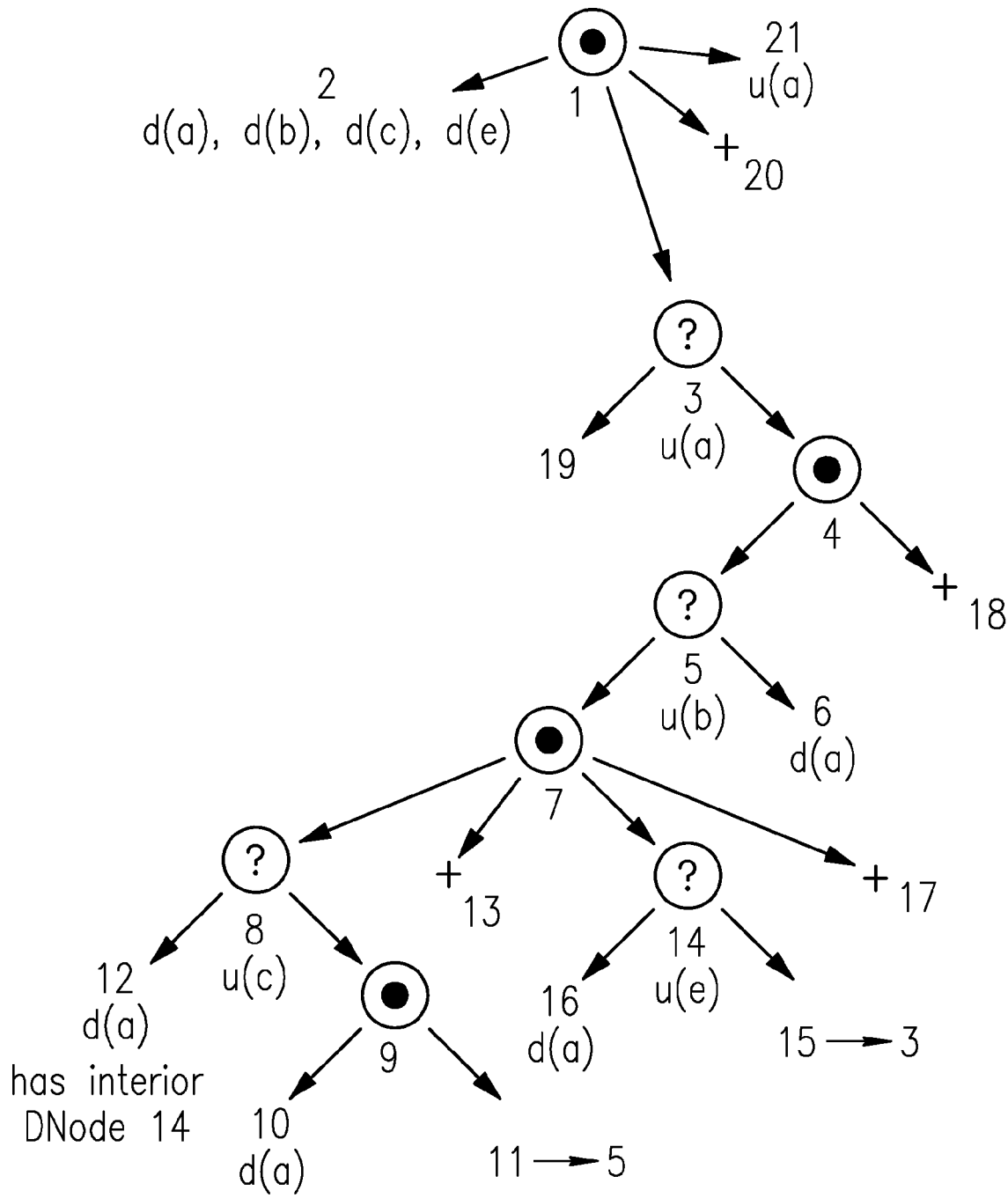
Figure 86:
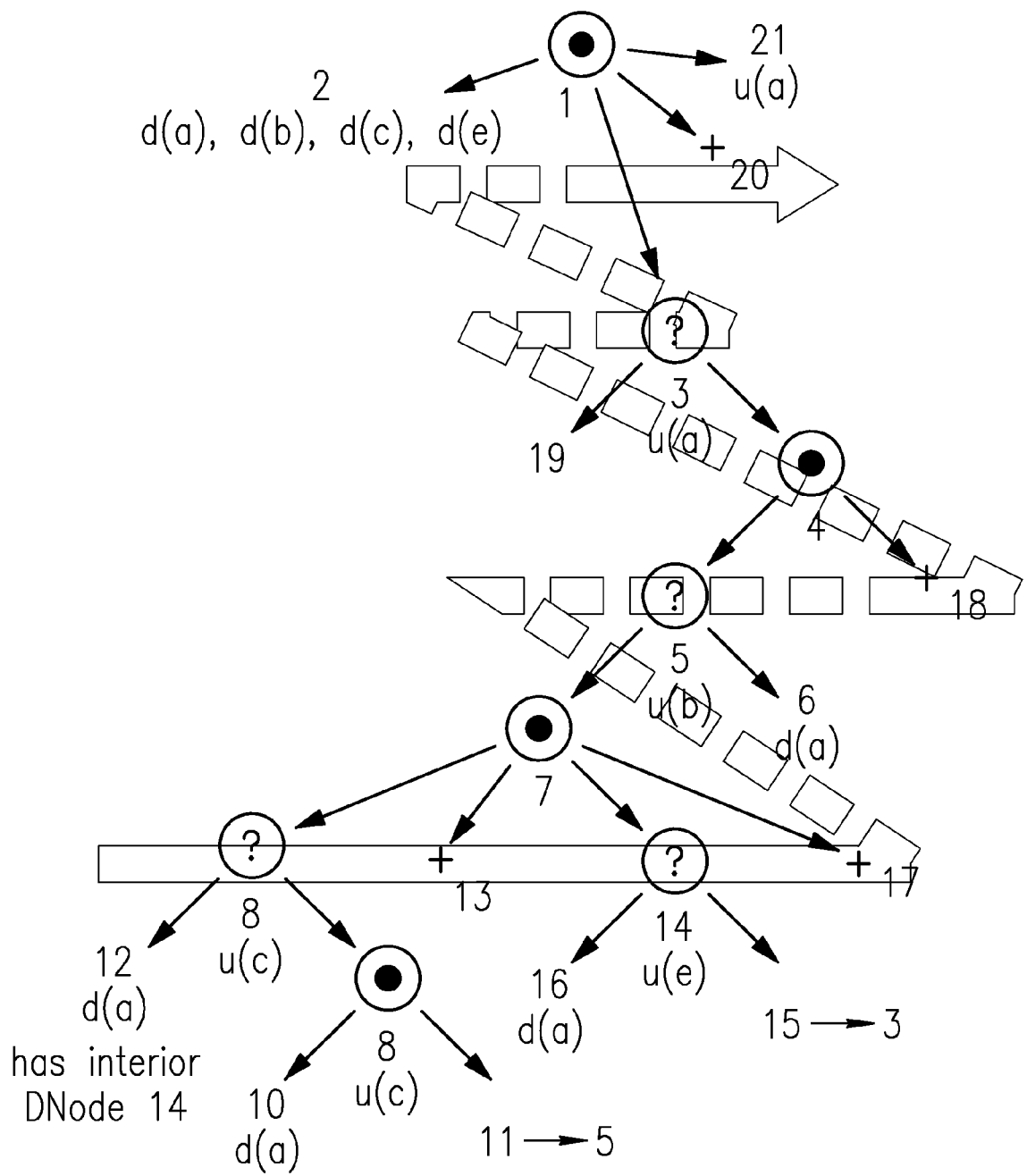

Generalized Search of the Decision Graph
FIG. 83 shows Java source code and DDF for strategy example.
FIG. 84 shows control flowgraph of strategy example.
FIG. 85 shows decision graph of strategy example.
FIG. 86 shows backbone search of strategy example.

Figure 89:
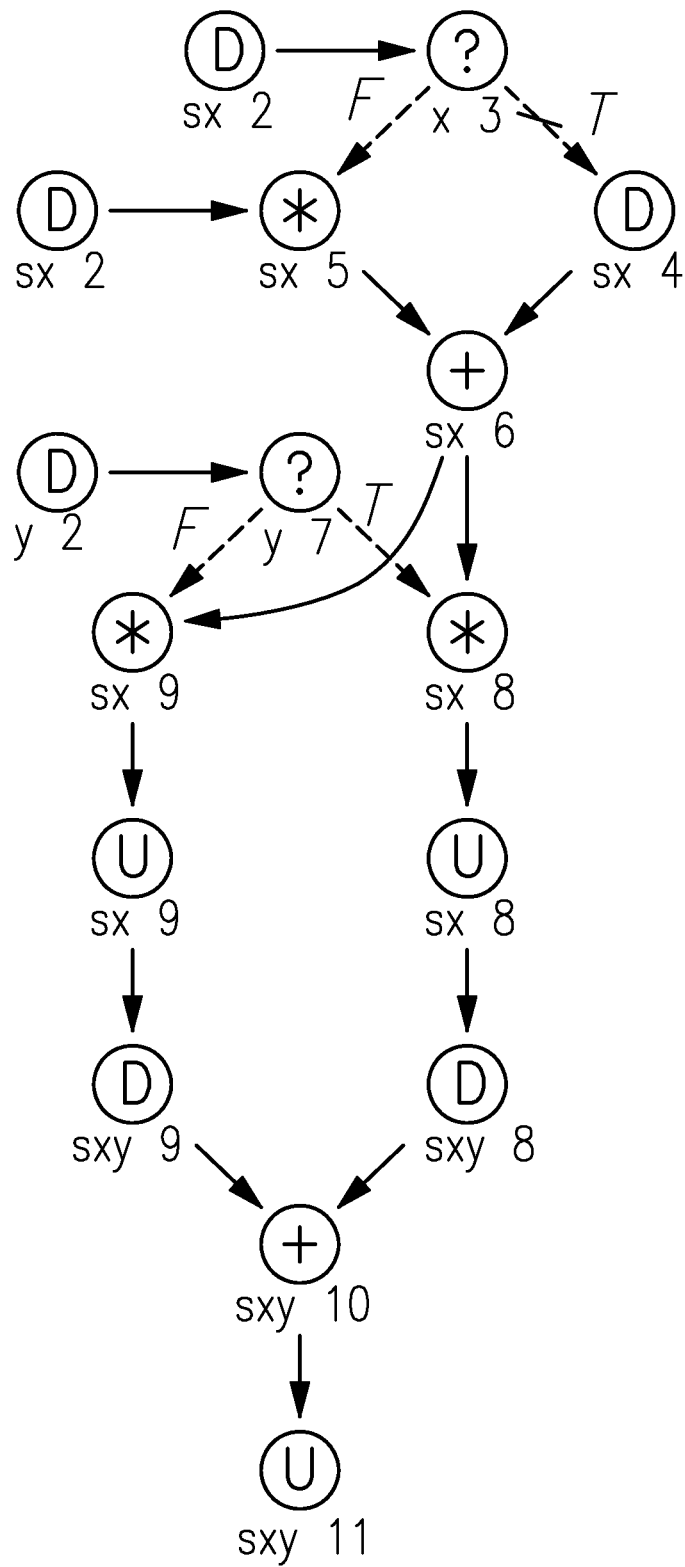
Figure 93:
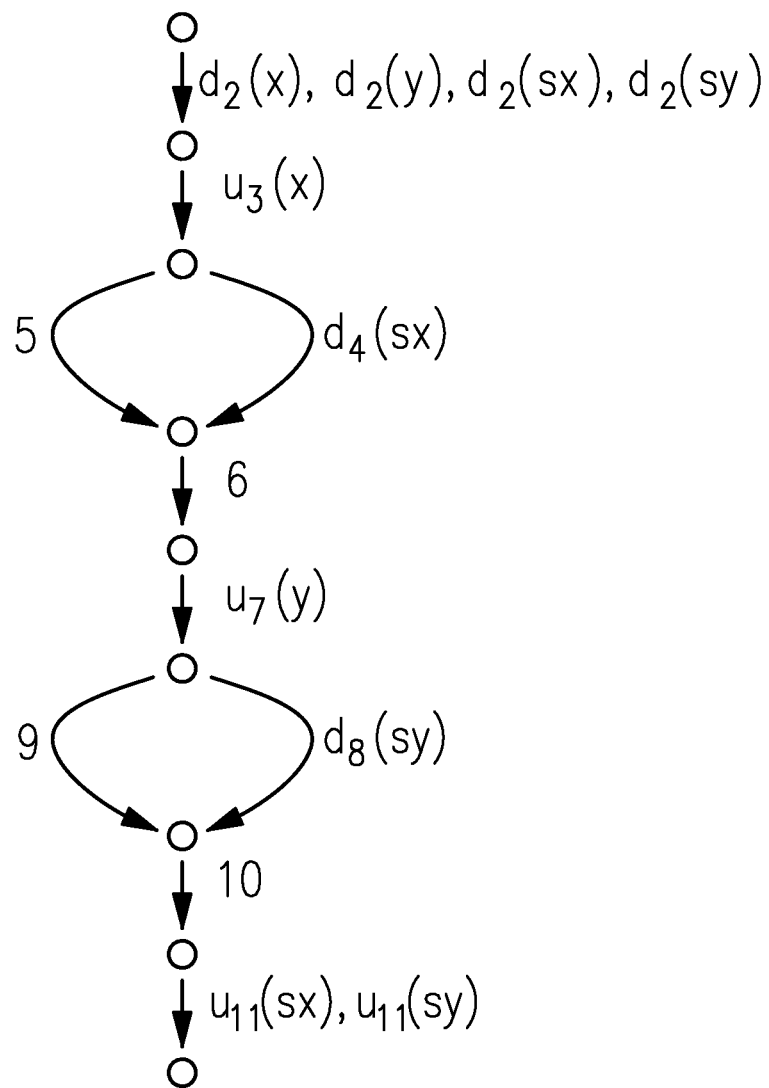

Sign Examples
FIG. 87 shows alpha graph nodes.
FIG. 88 shows alpha graph of signXandY example.
FIG. 89 shows alpha graph of signXY example.
FIG. 90 shows signal flow for u3(x).
FIG. 91 shows signal flow for first term of <alpha>11(sx).
FIG. 92 shows signal flow for second term of <alpha>11(sx).
FIG. 93 shows annotated control flowgraph of signXandY example.
FIG. 94 shows derivation of signal flow equation for <alpha>11(sx).

Figure 95:
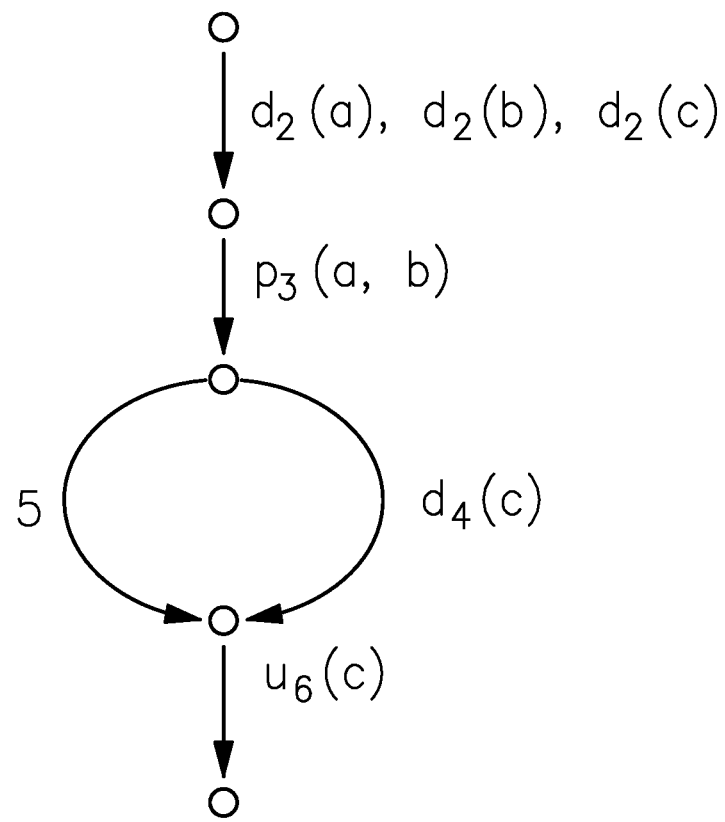
Figure 96:
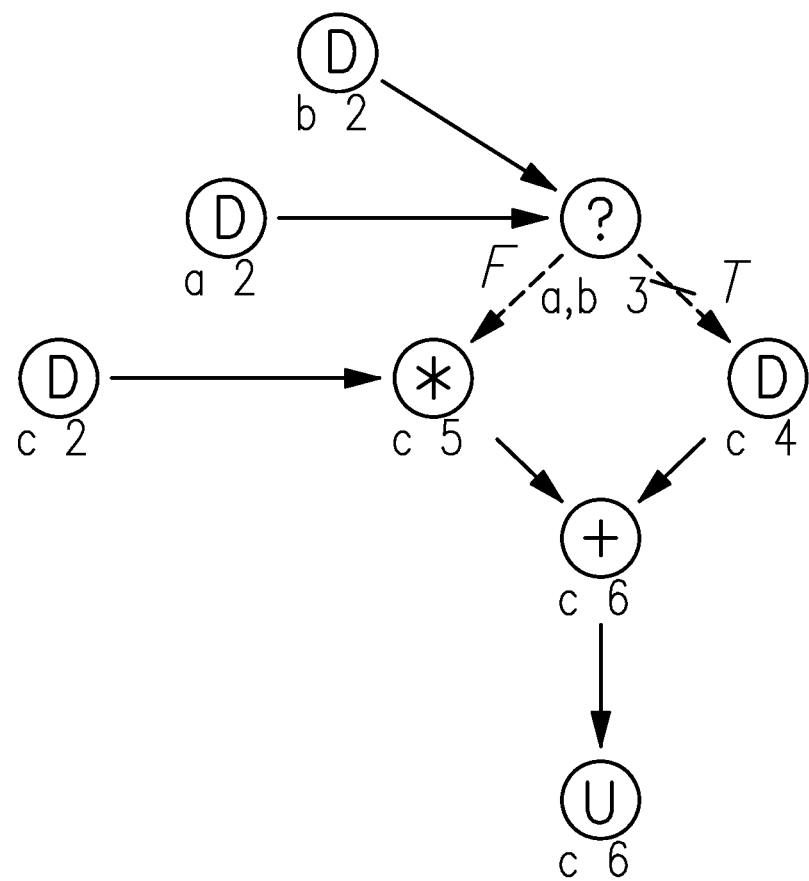
Figure 97:
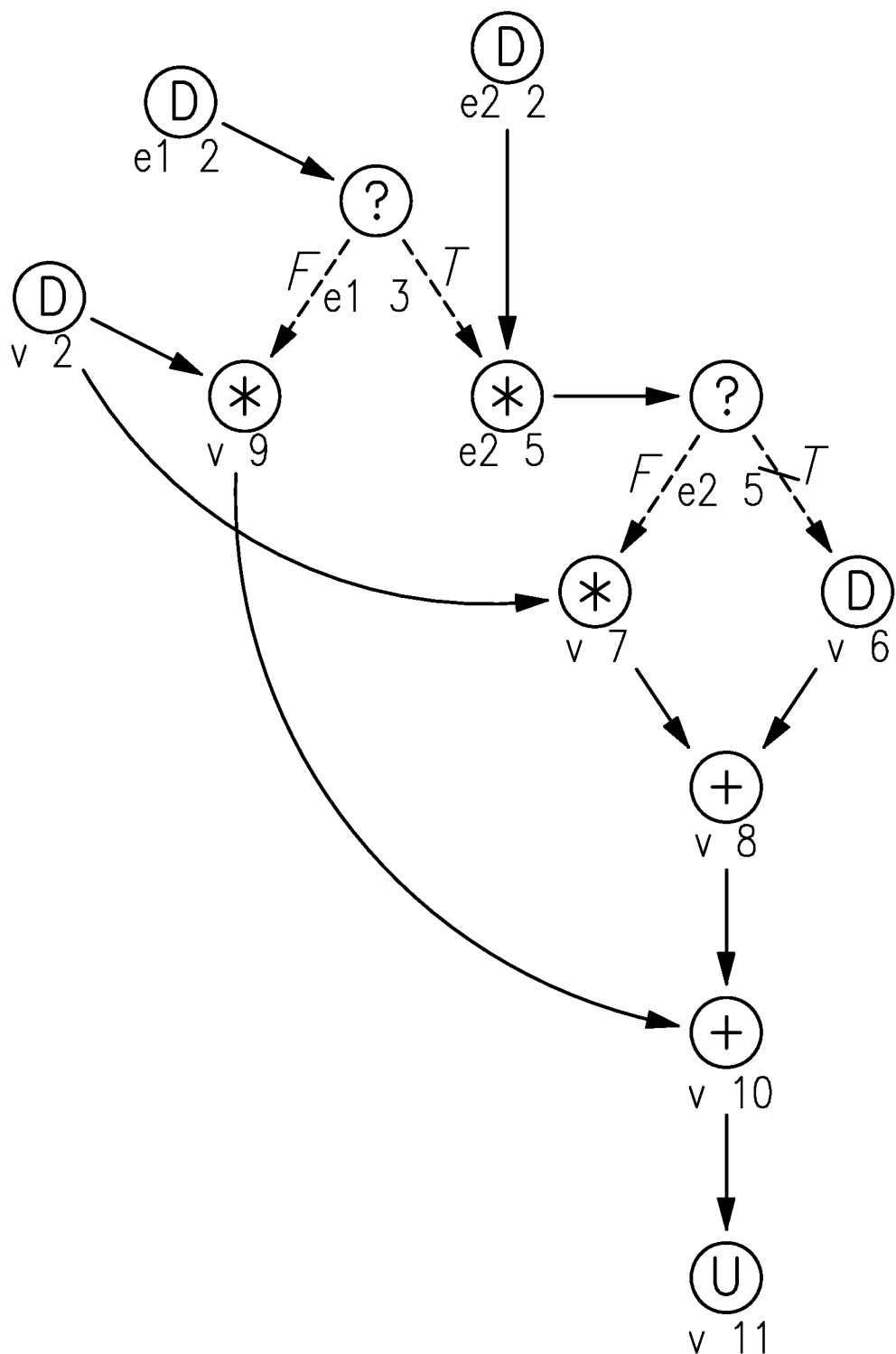
Figure 98:
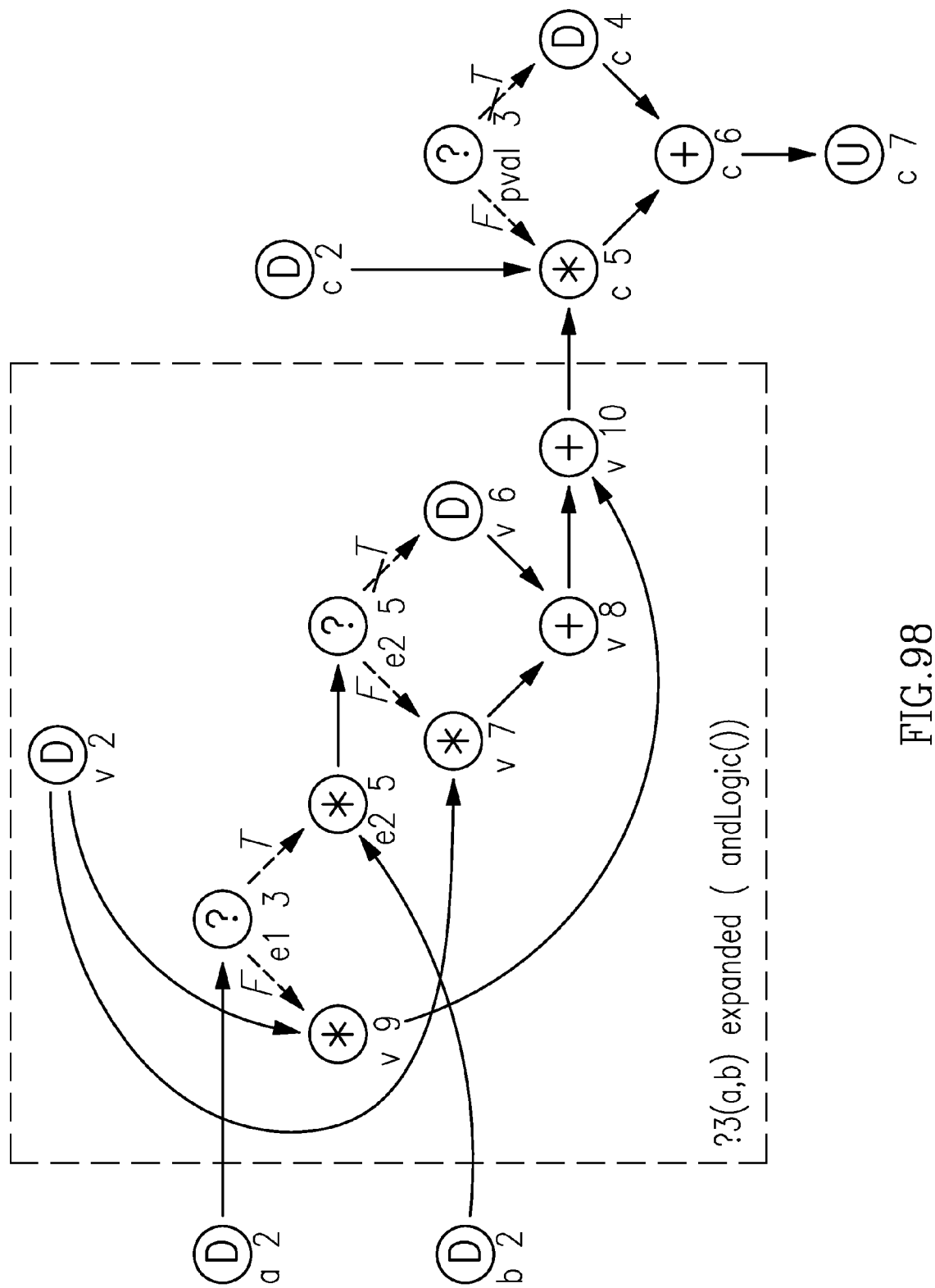
Figures 99, 100:
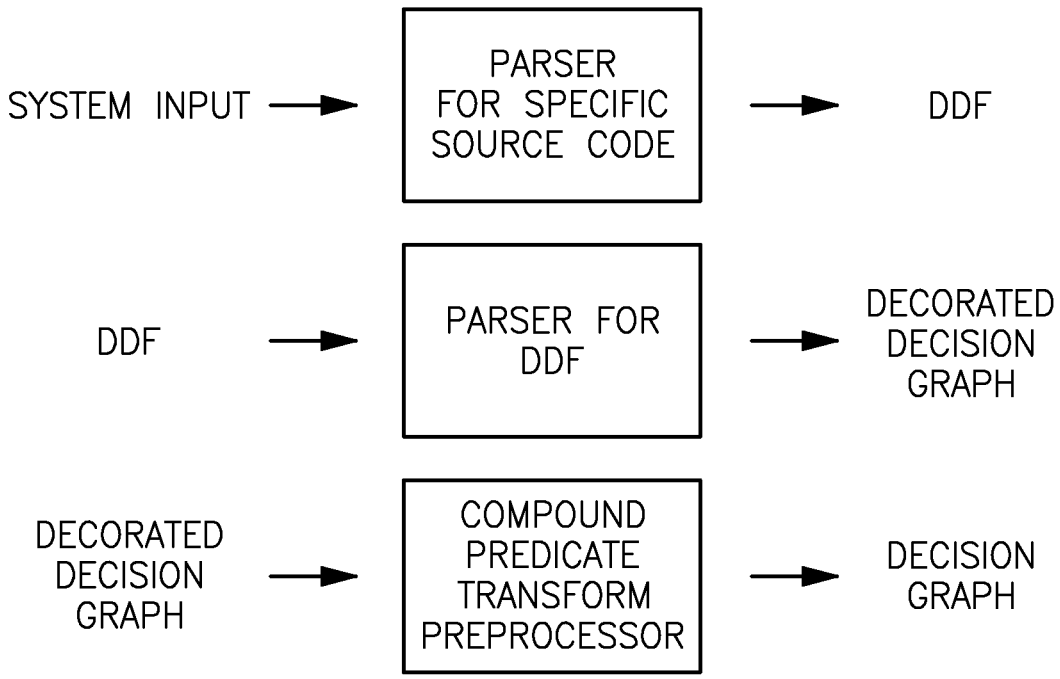
Figure 101:
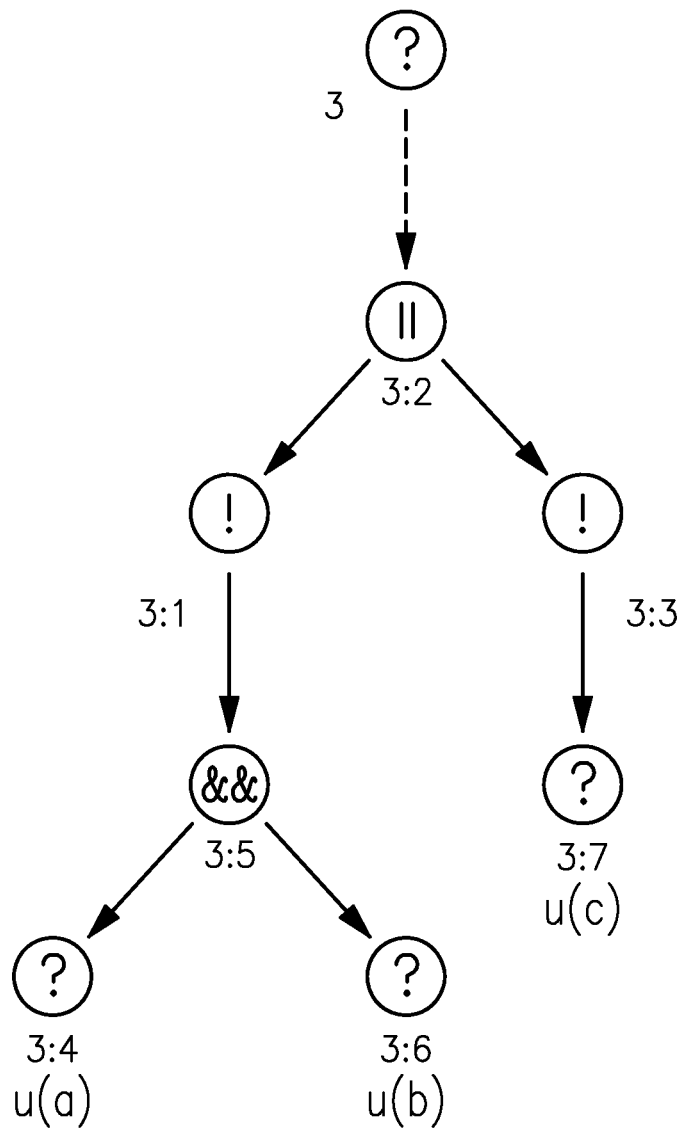
Figure 102:
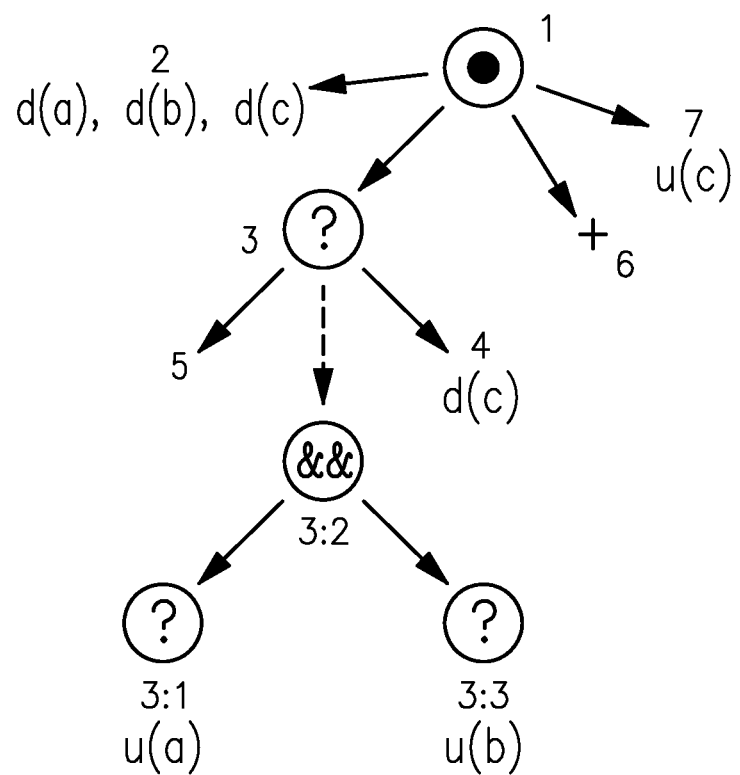
Figure 103:
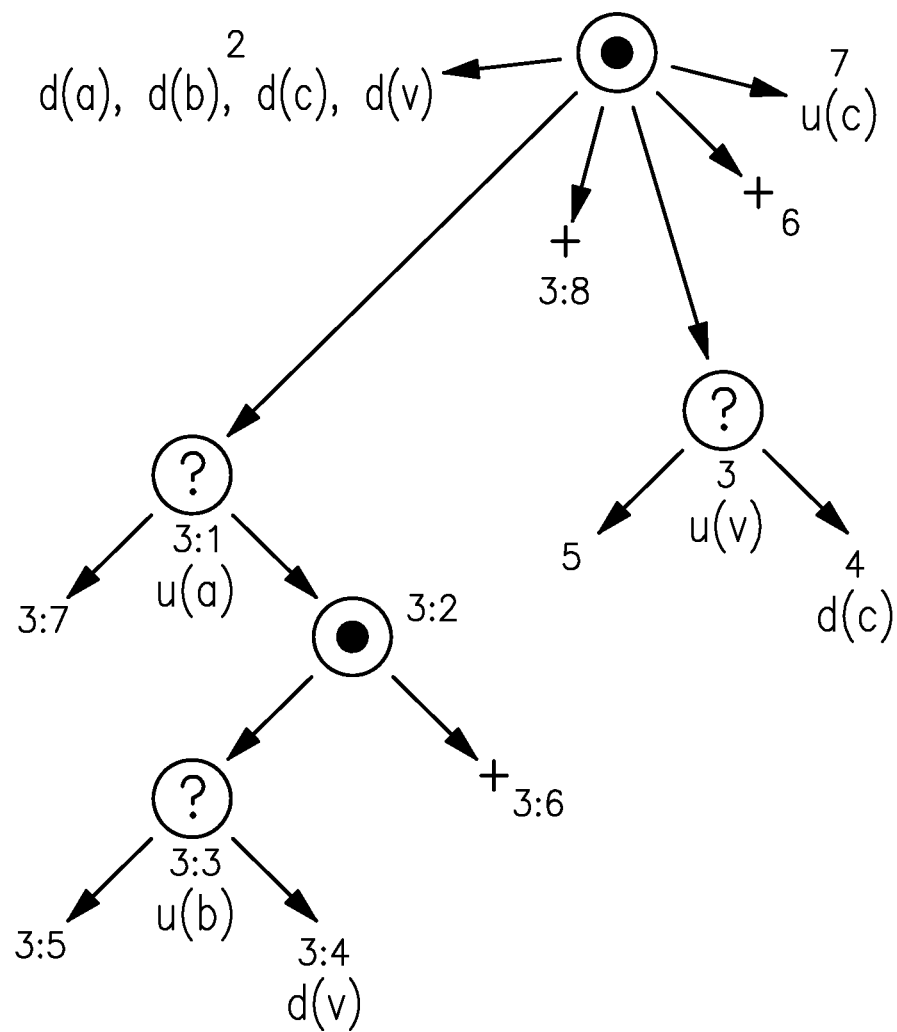

Compound Predicate
FIG. 95 shows control flowgraph of is NonNegative.
FIG. 96 shows unexpanded alpha graph of is NonNegative.
FIG. 97 shows alpha graph of and Logic.
FIG. 98 shows alpha graph of is NonNegative with ?3(a,b) expanded.
FIG. 99 shows processing steps prior to alpha transform.
FIG. 100 shows table—nodes in predicate tree.
FIG. 101 shows sample predicate tree.
FIG. 102 shows decorated decision graph for is NonNegative.
FIG. 103 shows decision graph of is NonNegative.

Figure 104:
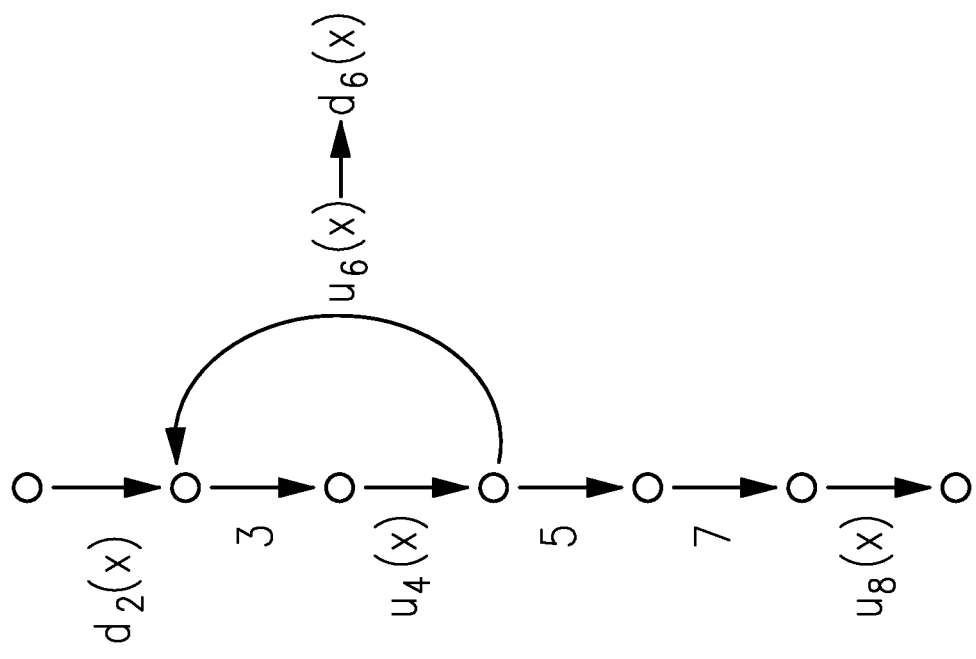
Figure 105:
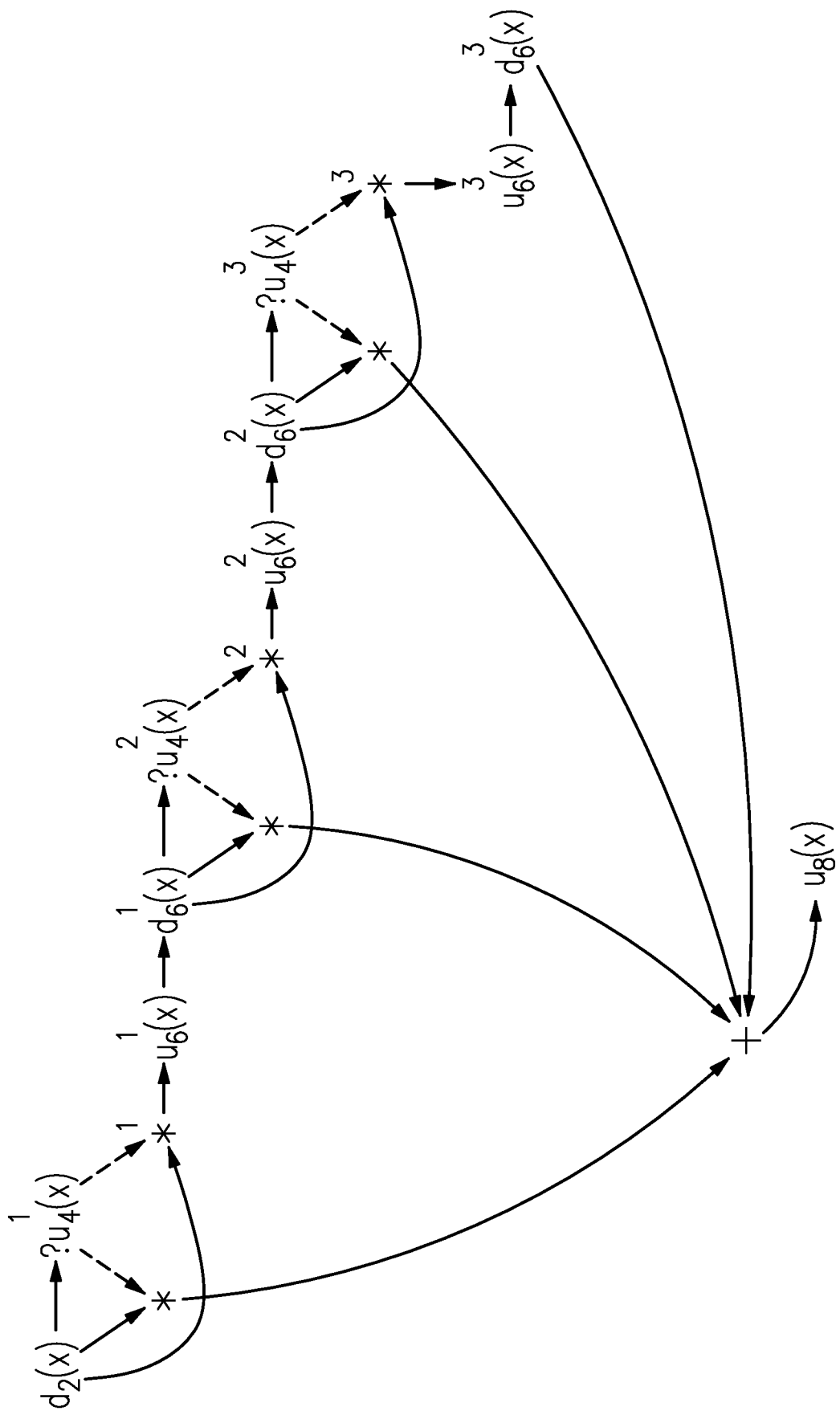
Figure 106:
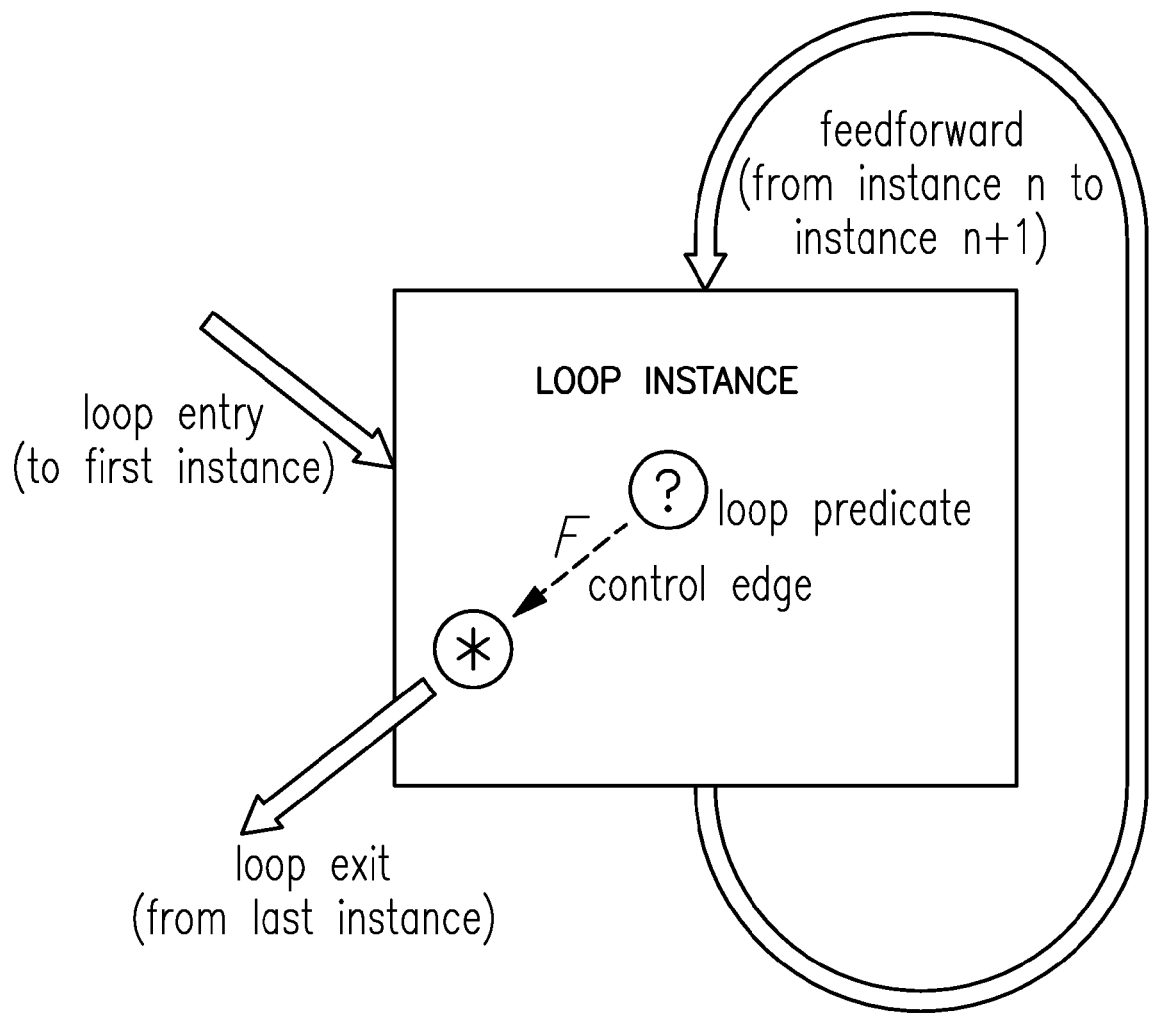
Figure 107:
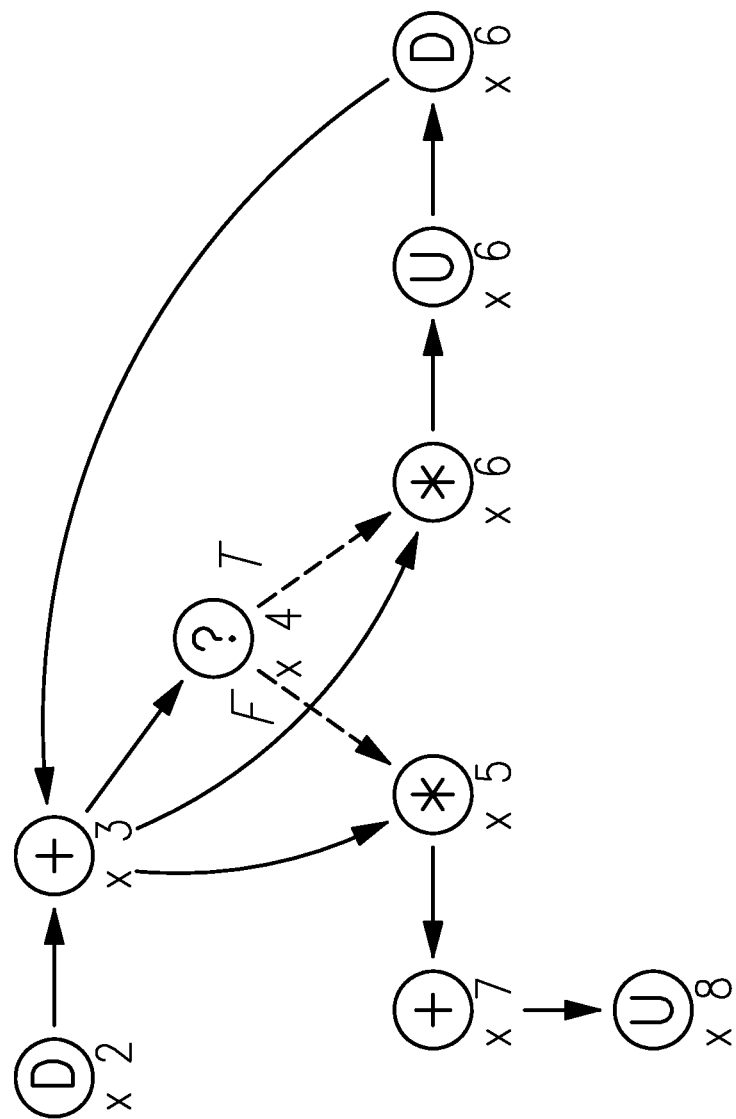
Figure 108:
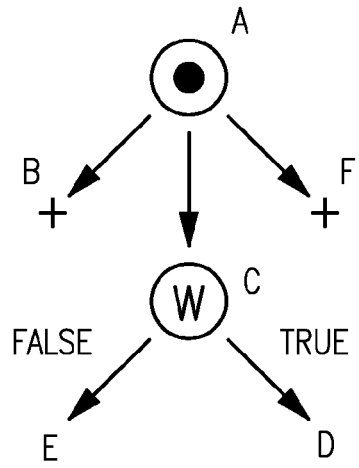
Figure 109:
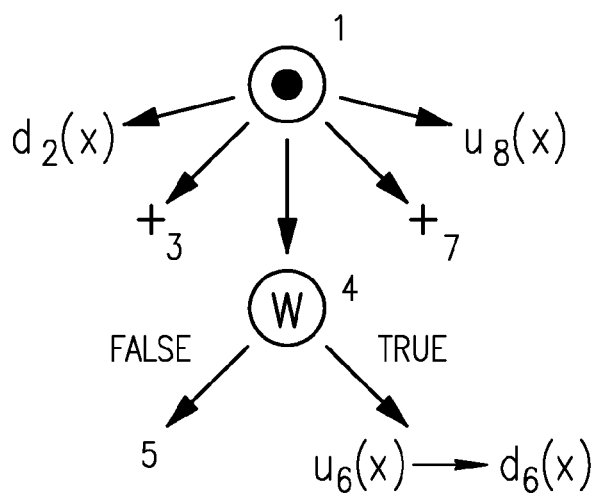
Figure 110:
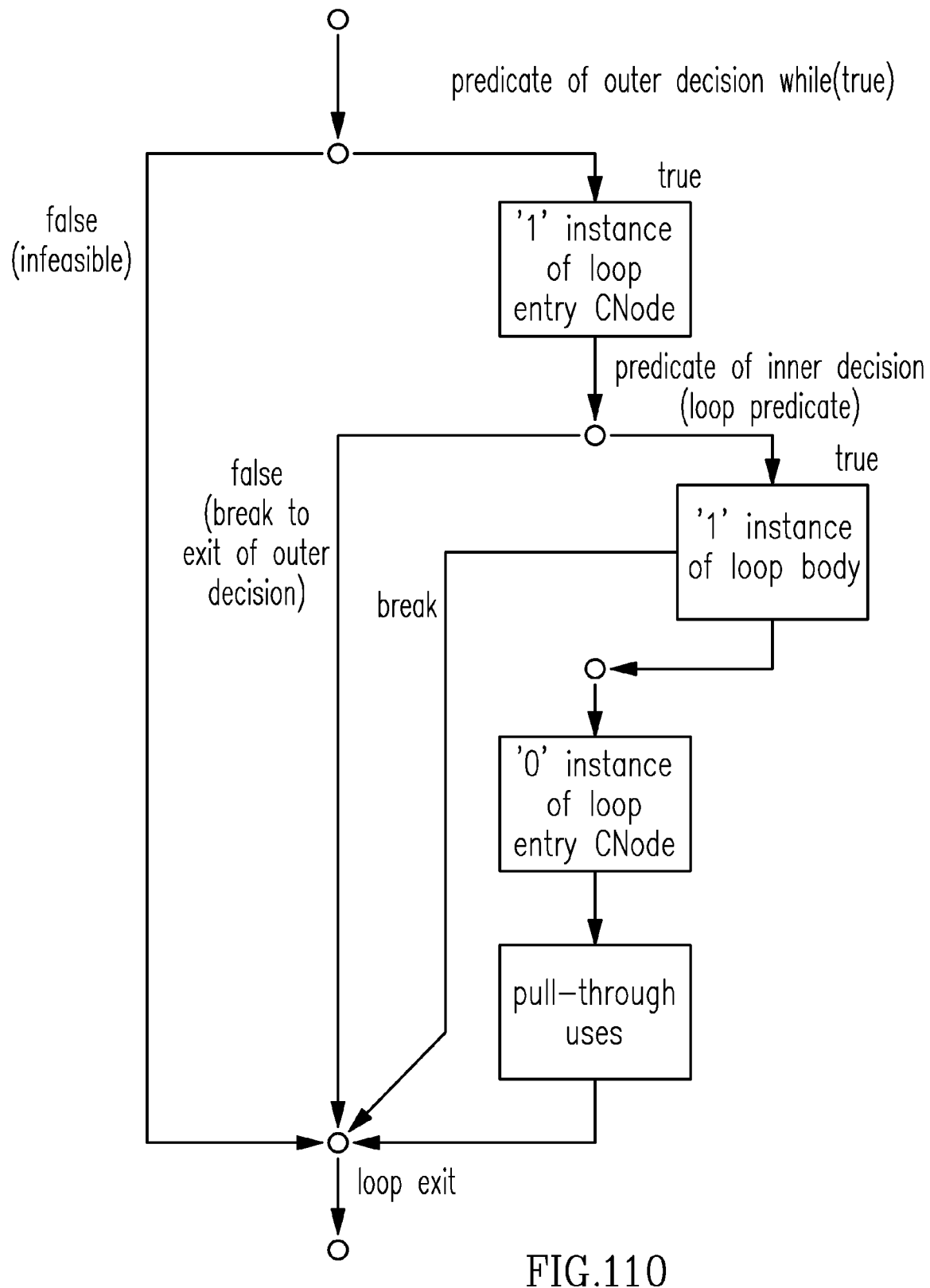
Figure 111:
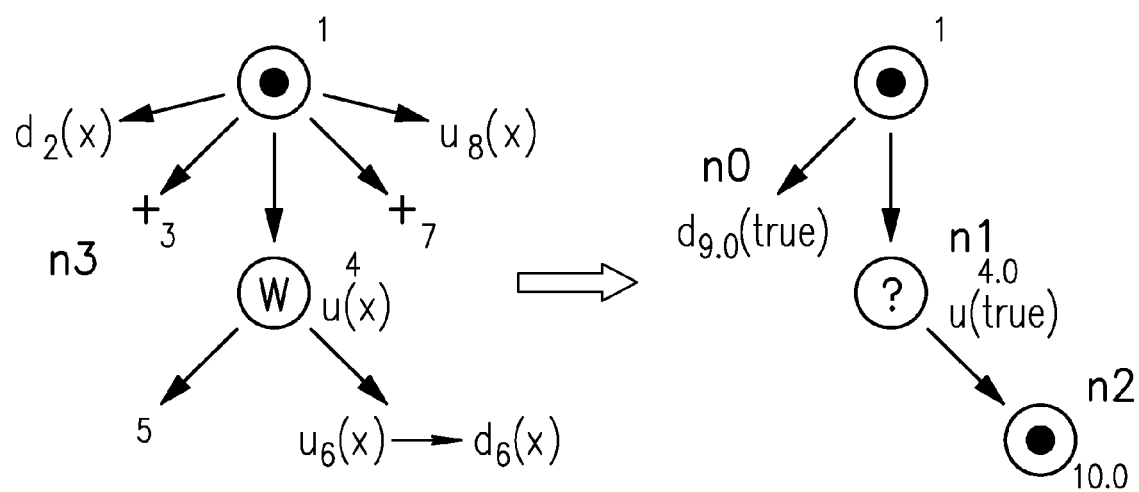
Figure 112:
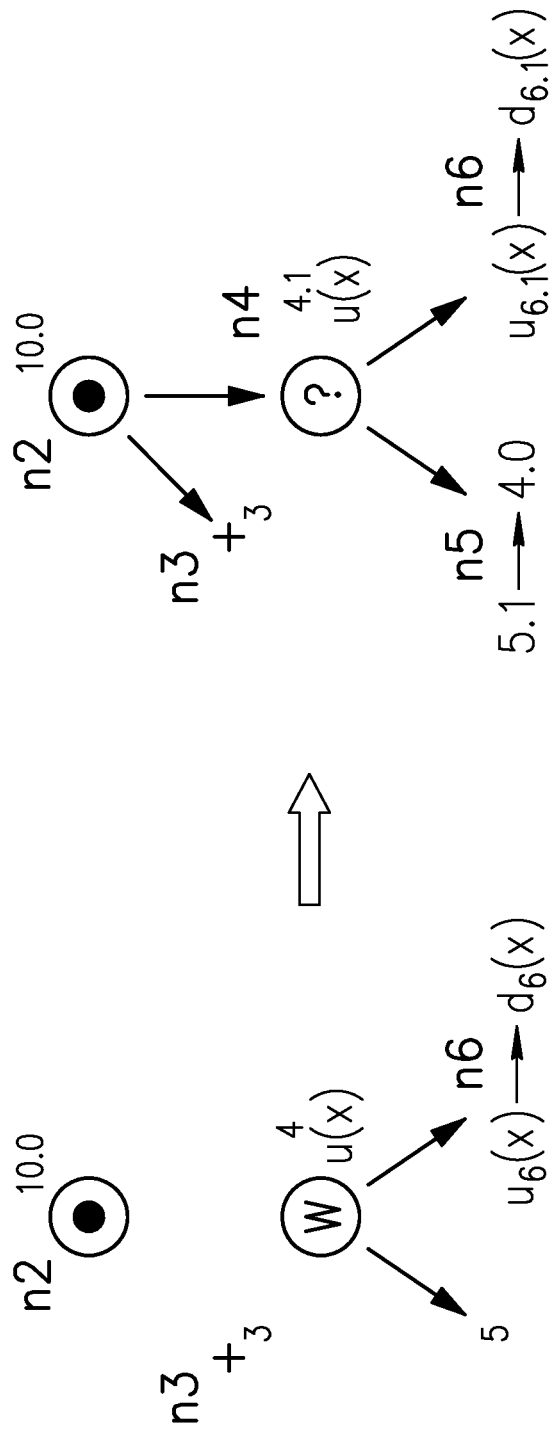
Figure 113:
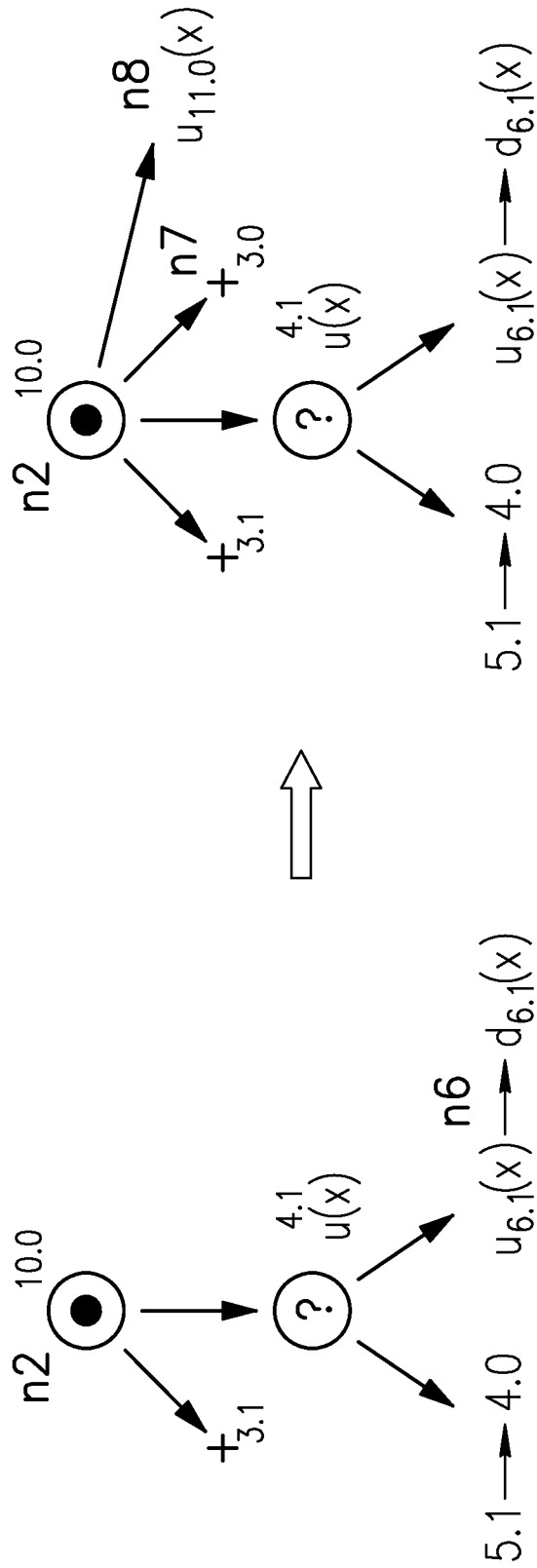
Figure 114:
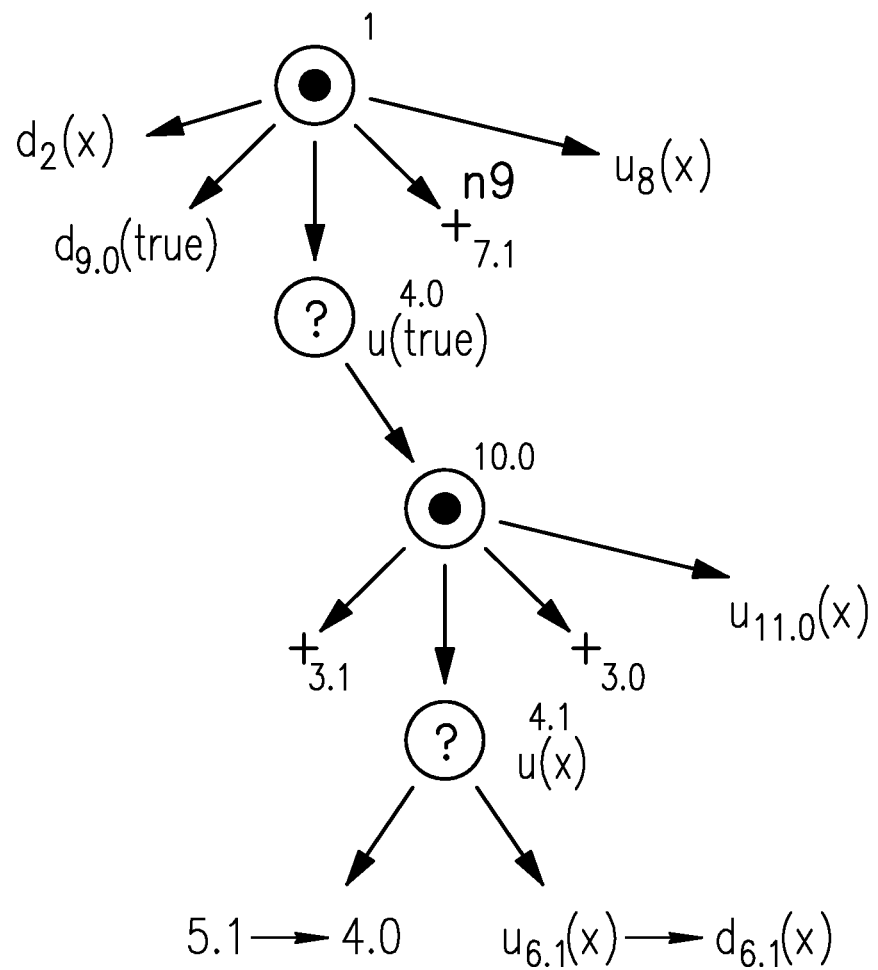
Figure 115:
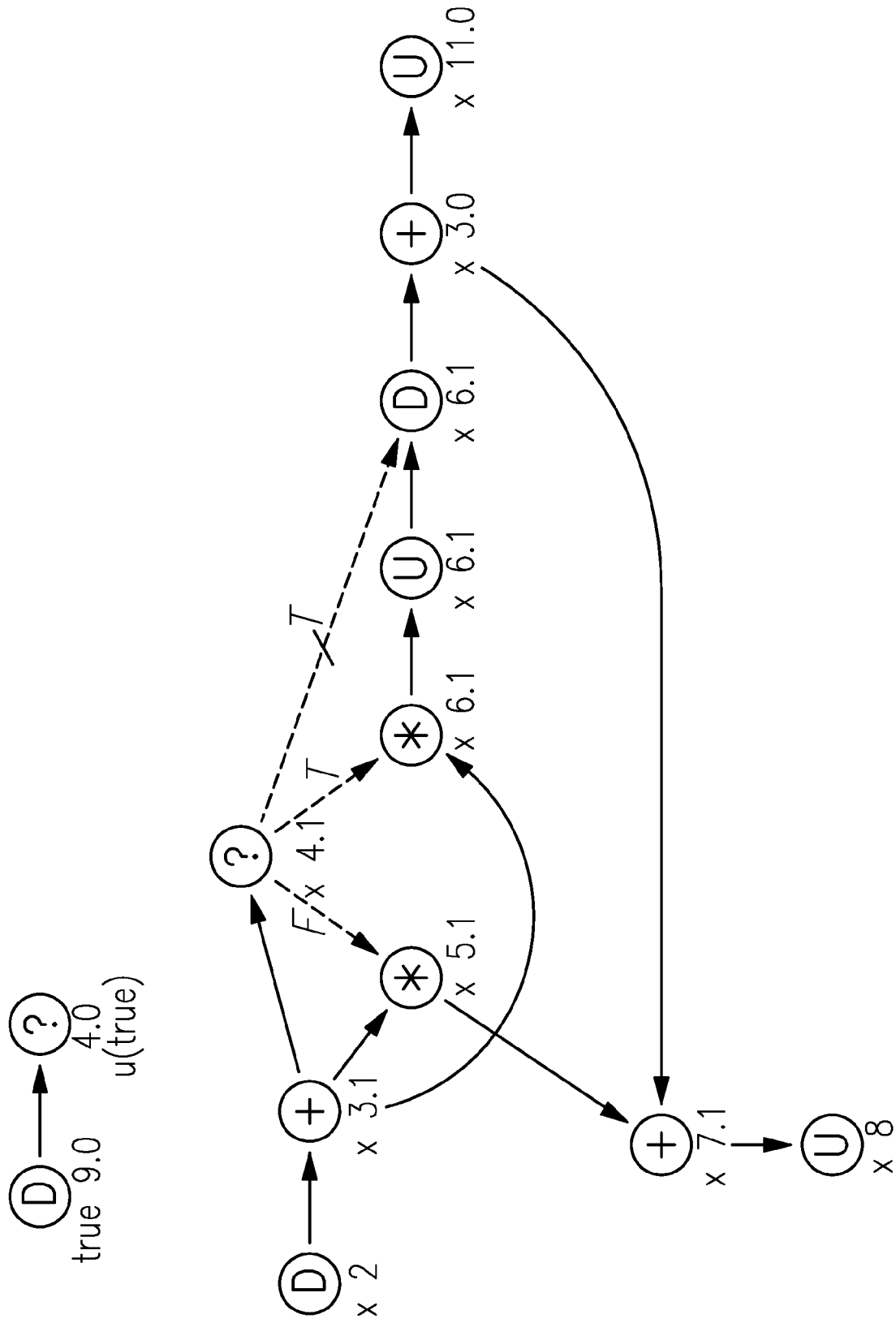
Figure 116:
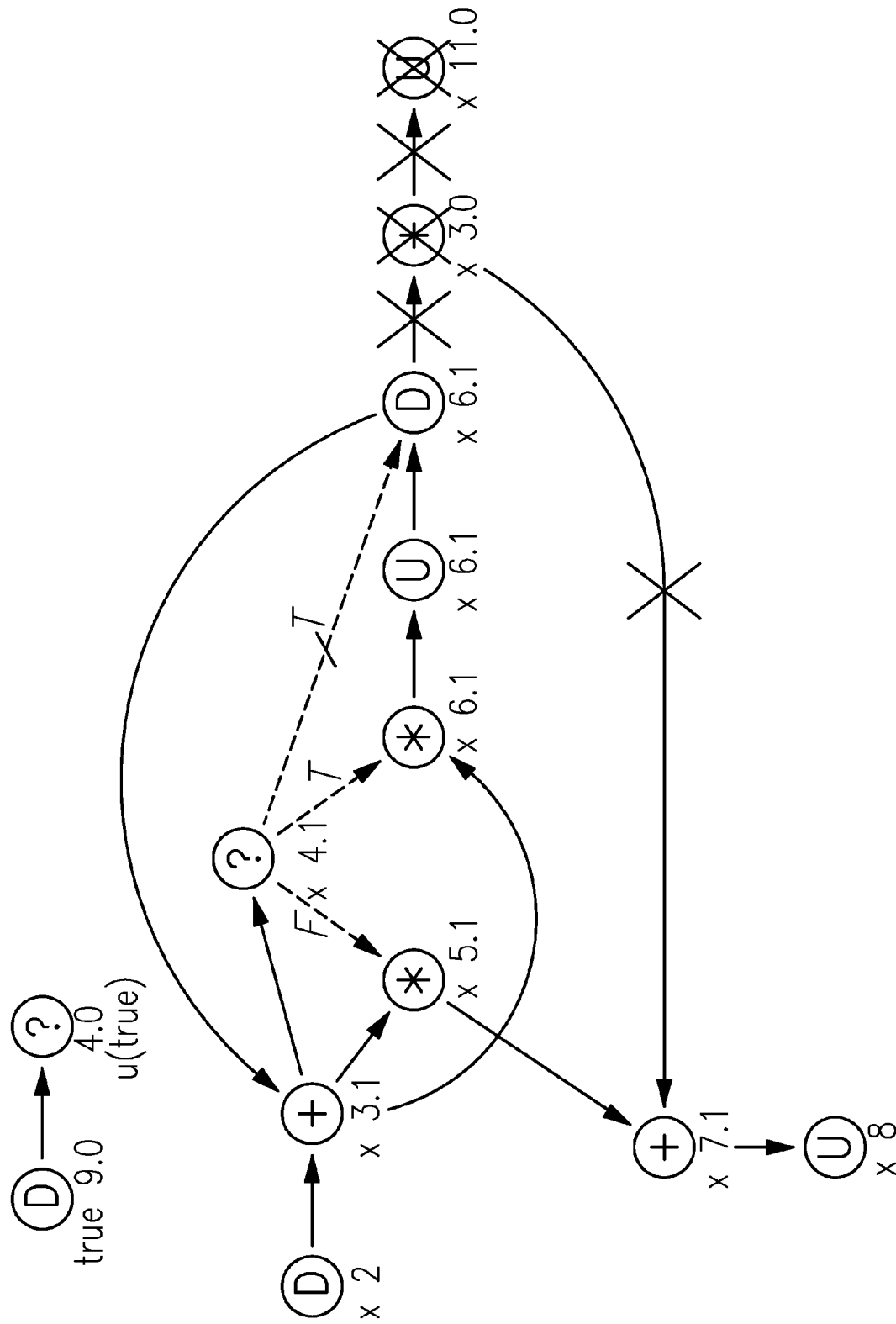
Figure 117:
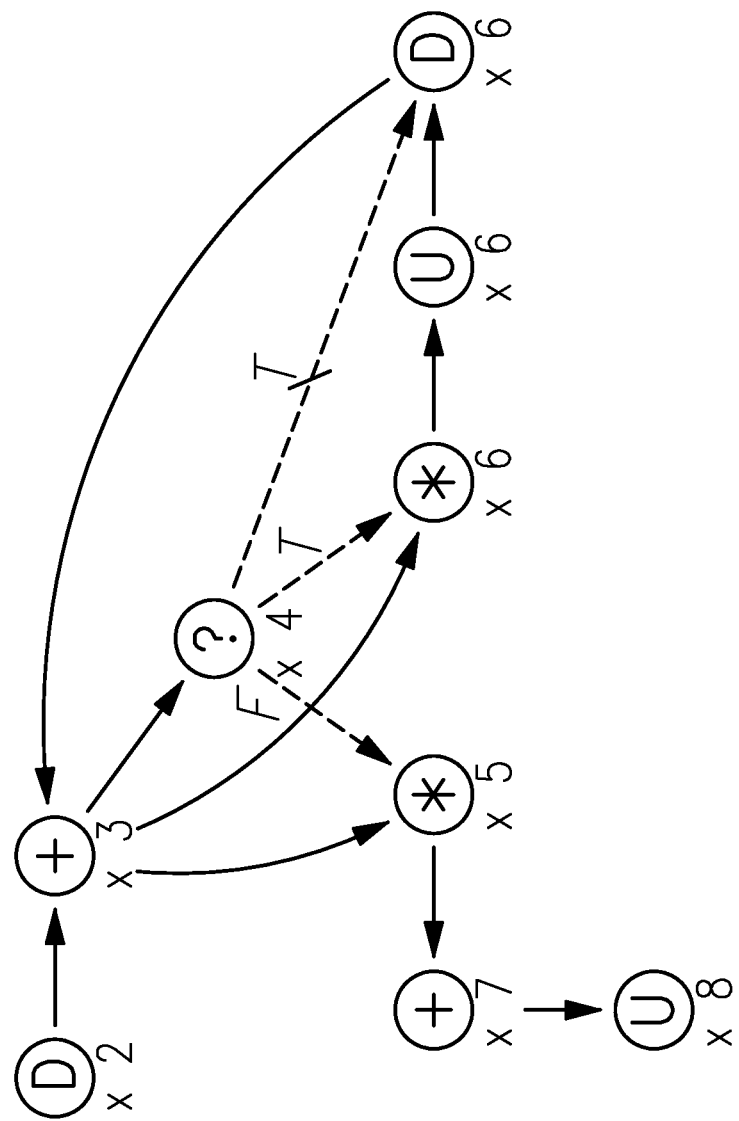
Figure 118:
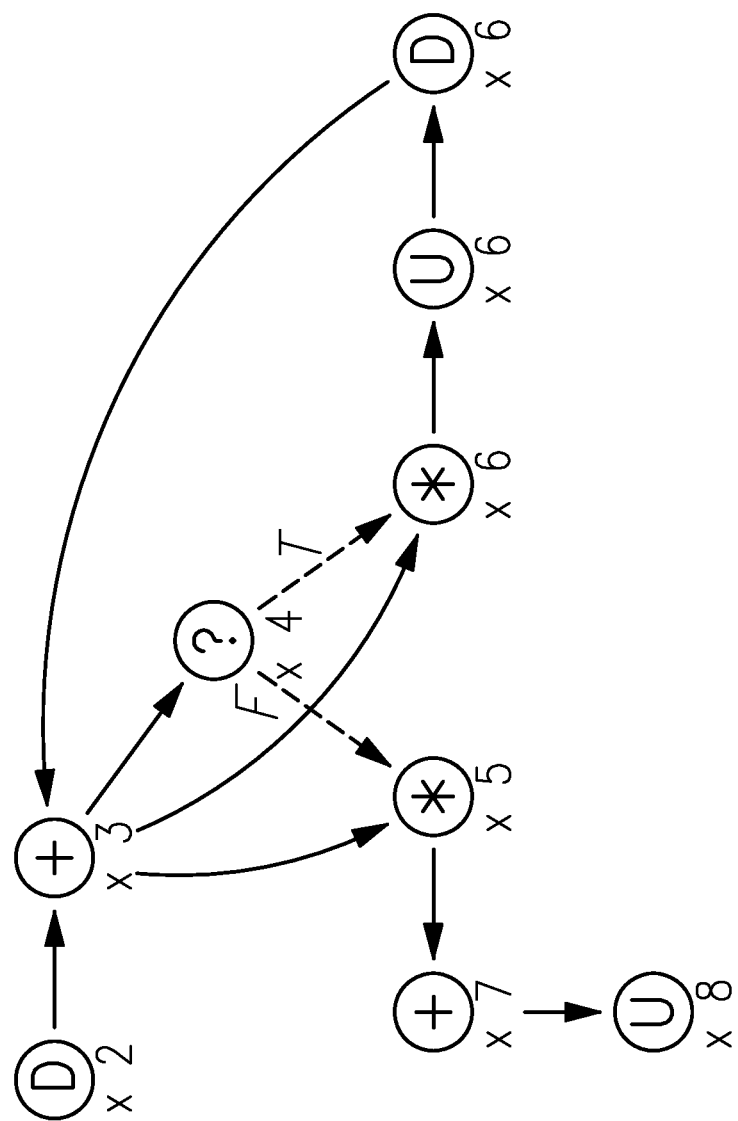

Loop Transform
FIG. 104 shows example #1—autoiterator.
FIG. 105 shows k=3 unrolling of autoiterator.
FIG. 106 shows fundamental data flows associated with loop.
FIG. 107 shows alpha graph of autoiterator.
FIG. 108 shows example of a decision graph loop node.
FIG. 109 shows DDF and decision graph of autoiterator.
FIG. 110 shows loop expansion as nested decision.
FIG. 111 shows create outer decision.
FIG. 112 shows create inner decision.
FIG. 113 shows complete inner decision.
FIG. 114 shows decision graph of autoiterator after loop expansion.
FIG. 115 shows alpha graph of autoiterator before loop reconstitution.
FIG. 116 shows alpha graph showing removal of pull-through use and creation of feedforward edge.
FIG. 117 shows alpha graph of autoiterator prior to cleanup transform.
FIG. 118 shows final alpha graph of autoiterator.

Figure 119:
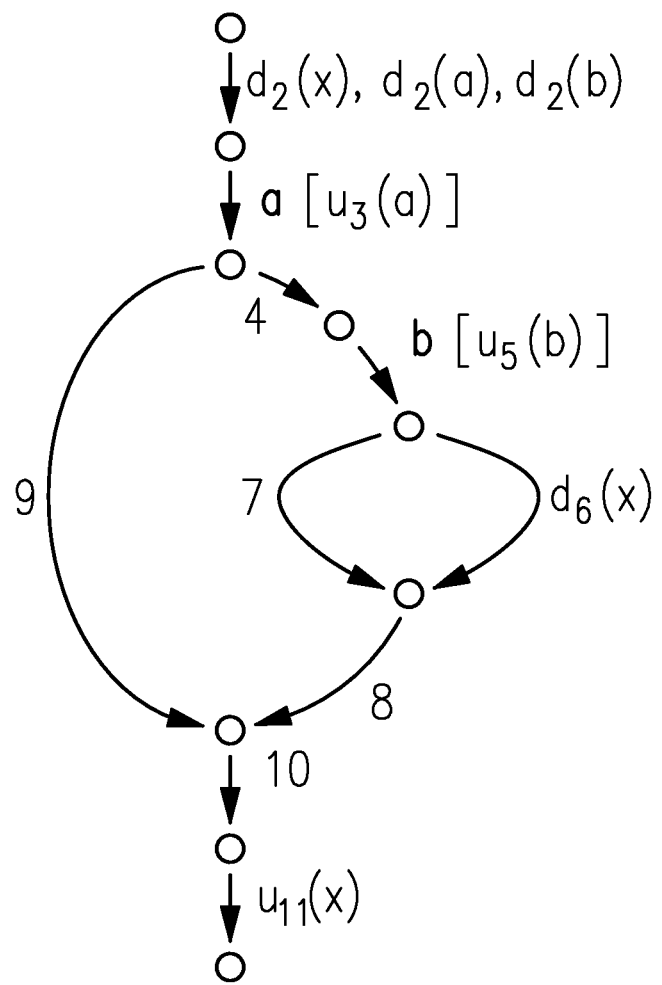
Figure 120:
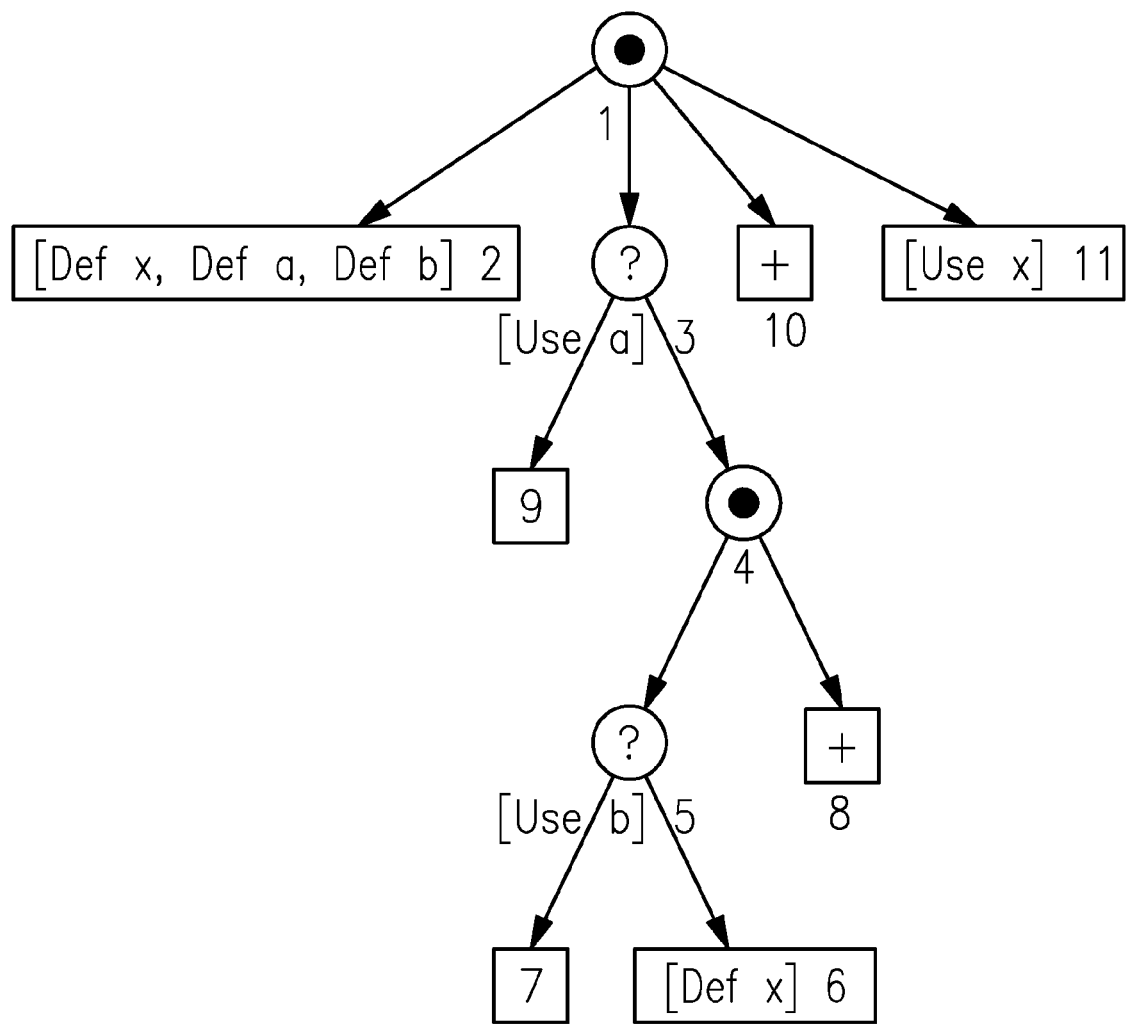
Figure 121:
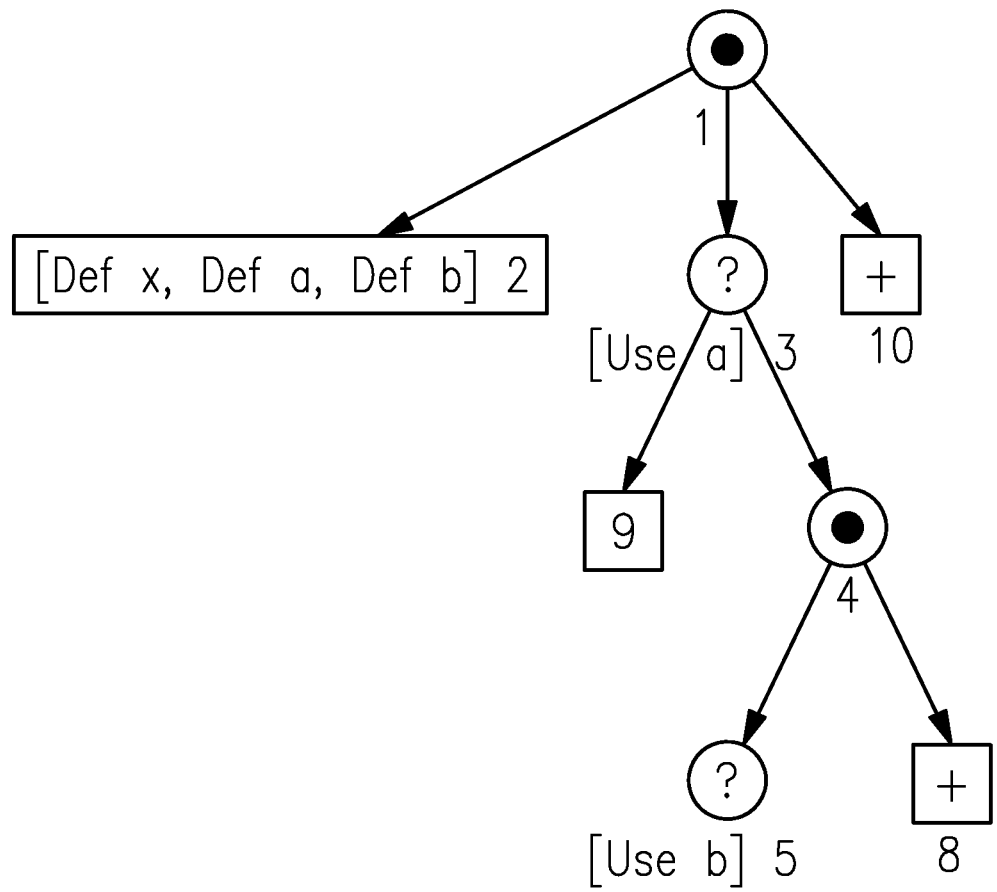

Partition Transform
FIG. 119 shows control flowgraph of example #4.
FIG. 120 decision graph of example #4.
FIG. 121 shows one-use decision graph for target use u5(b).

Figure 122:
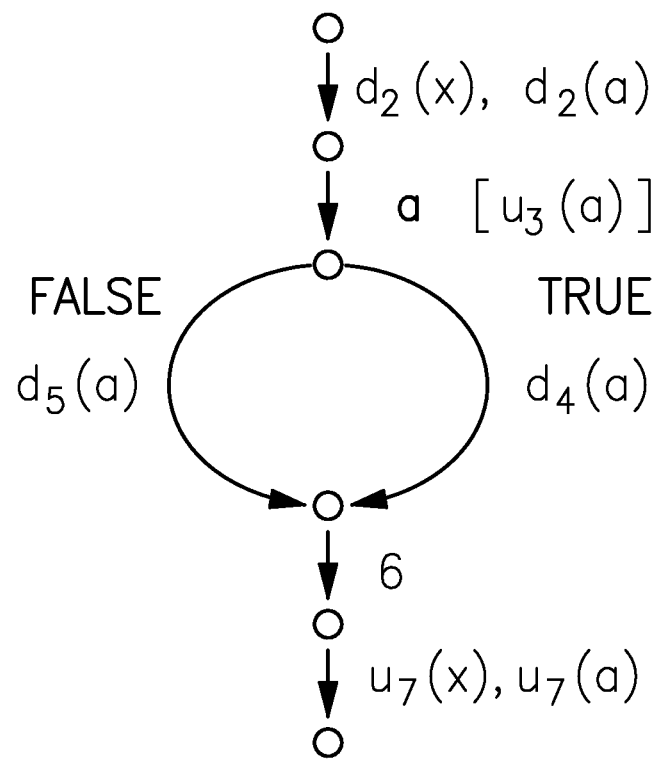
Figure 123:
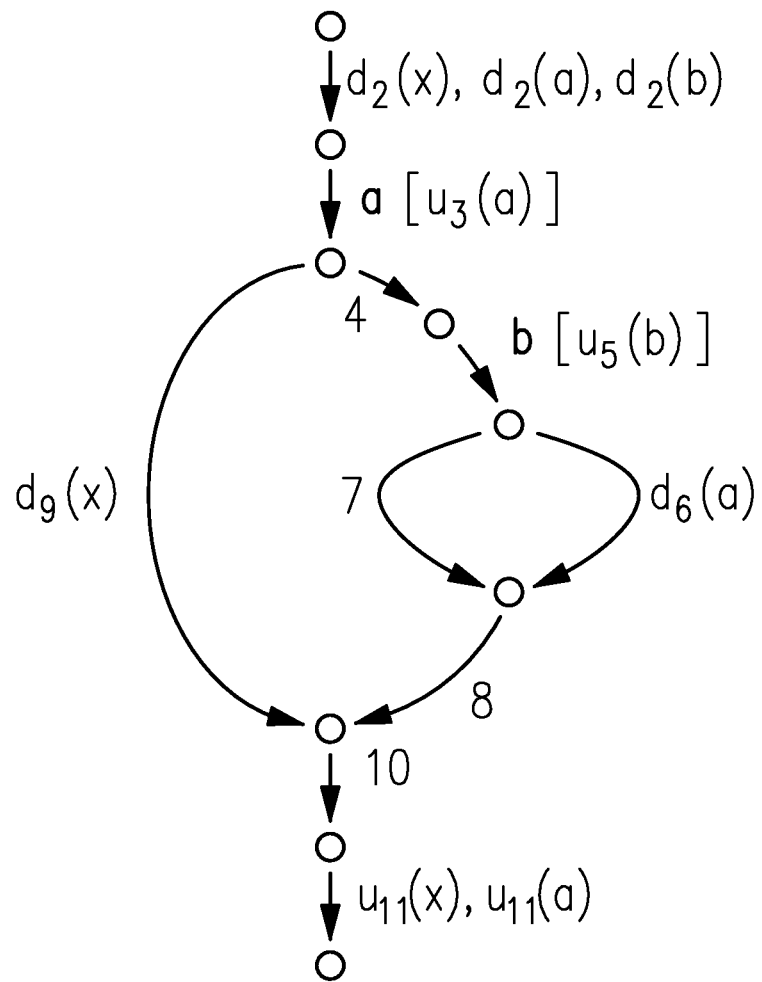
Figure 124:
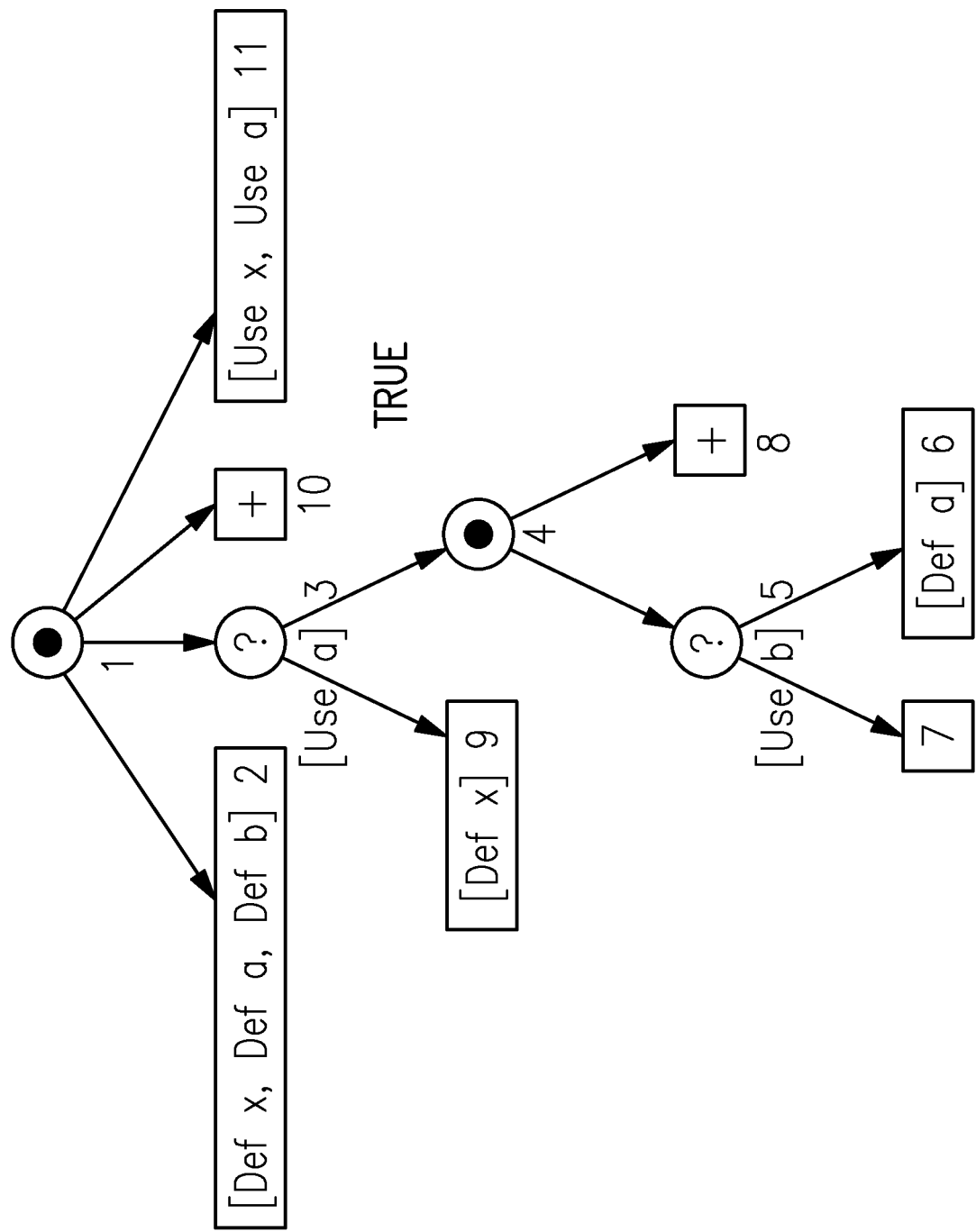
Figure 125:
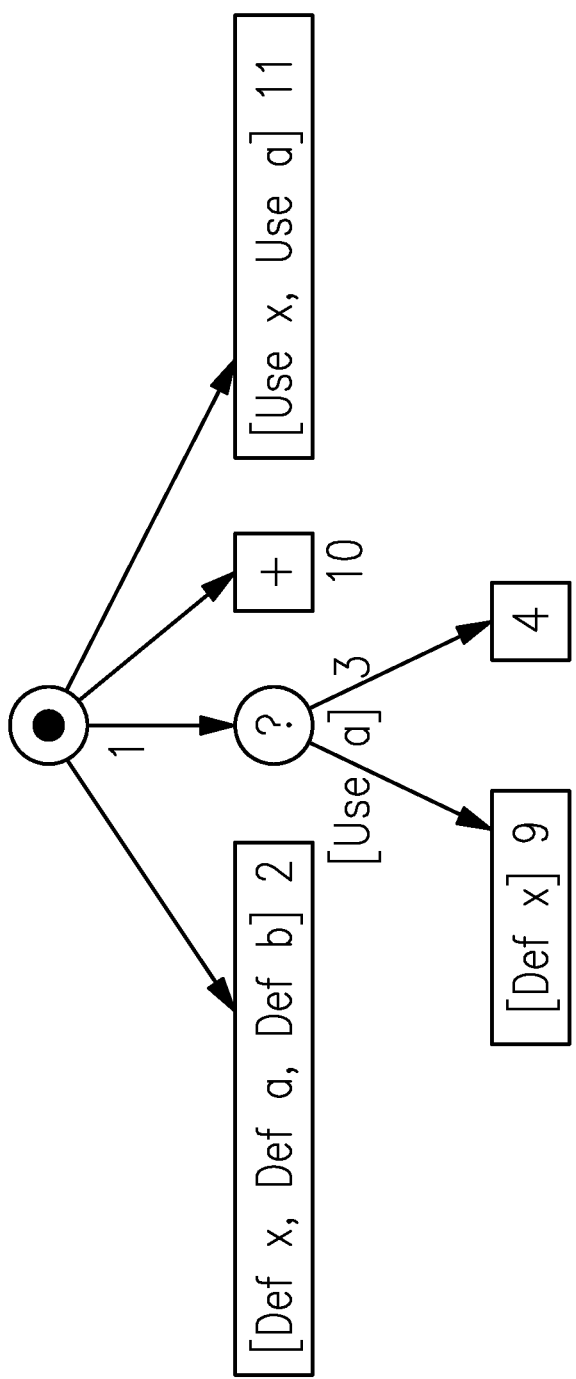
Figure 126:
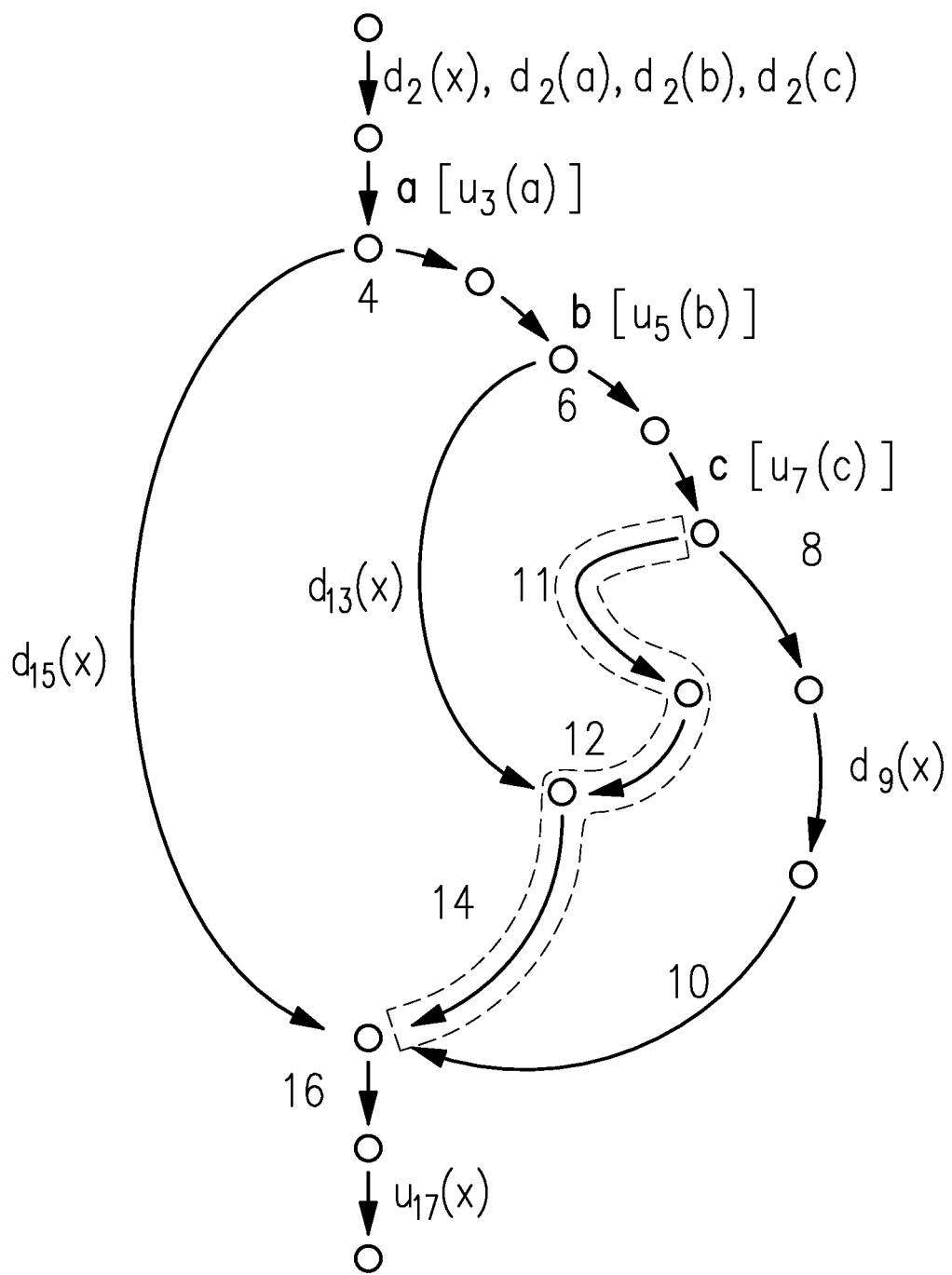
Figure 127:
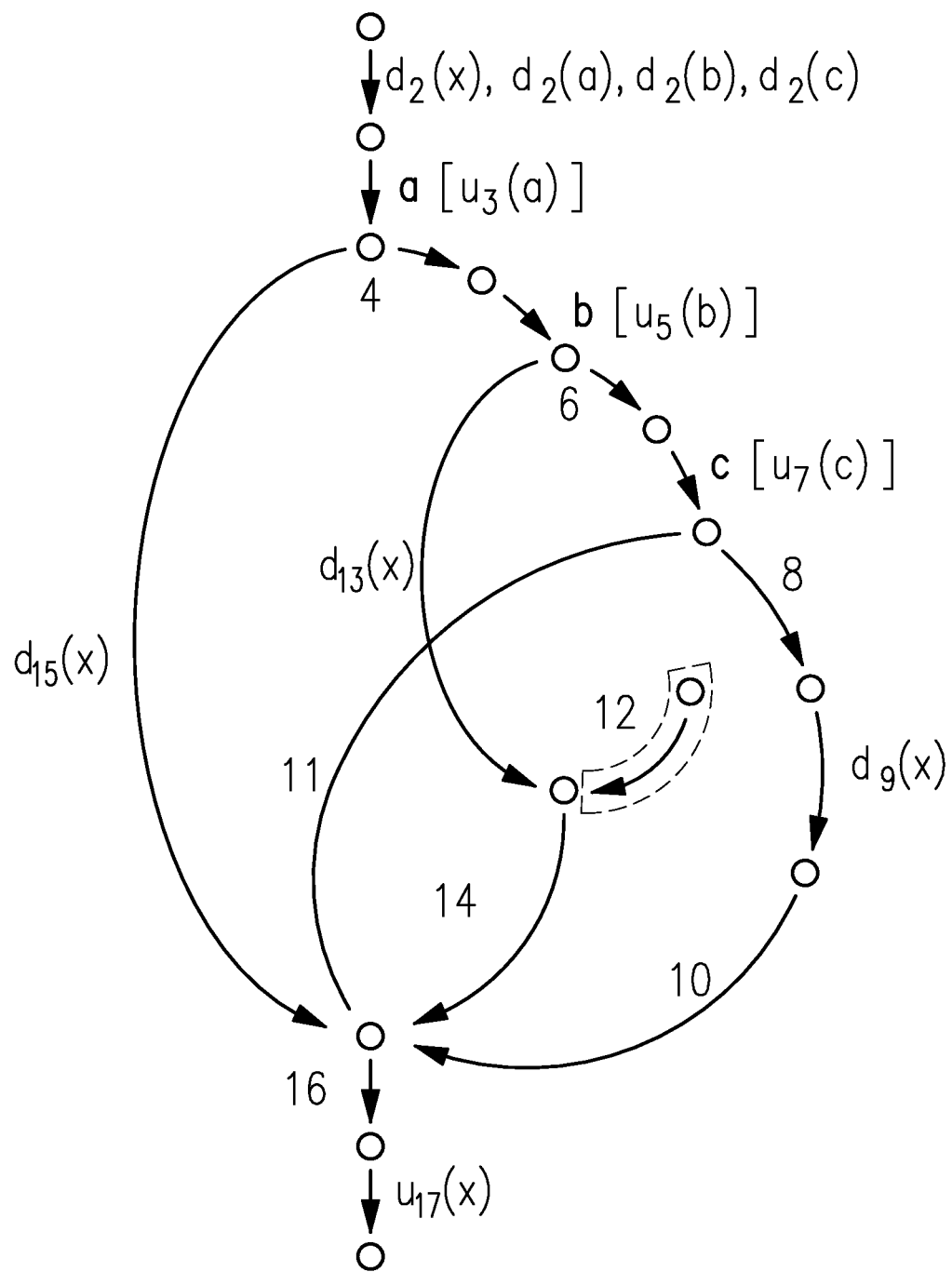
Figure 128:
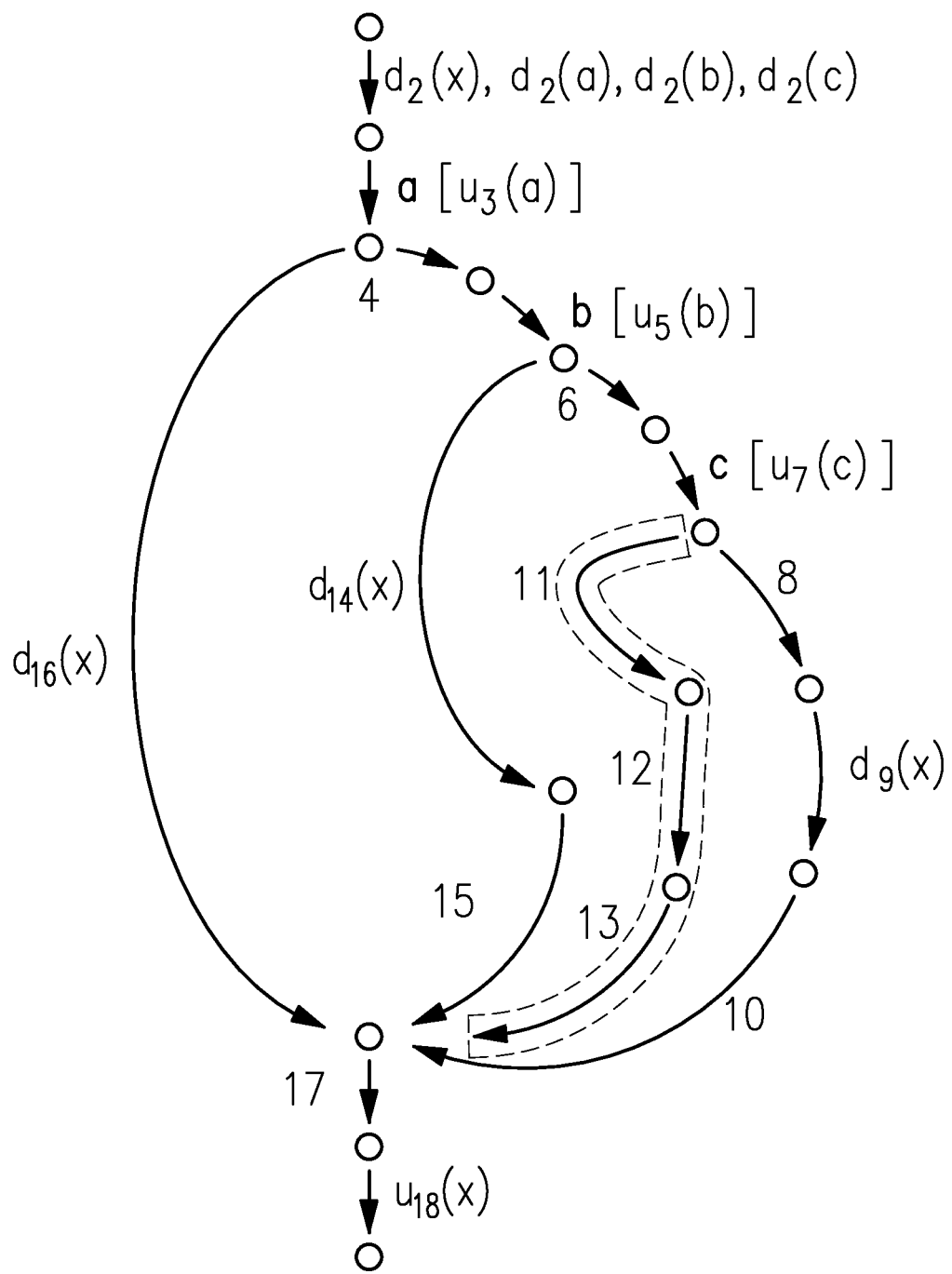
Figure 129:
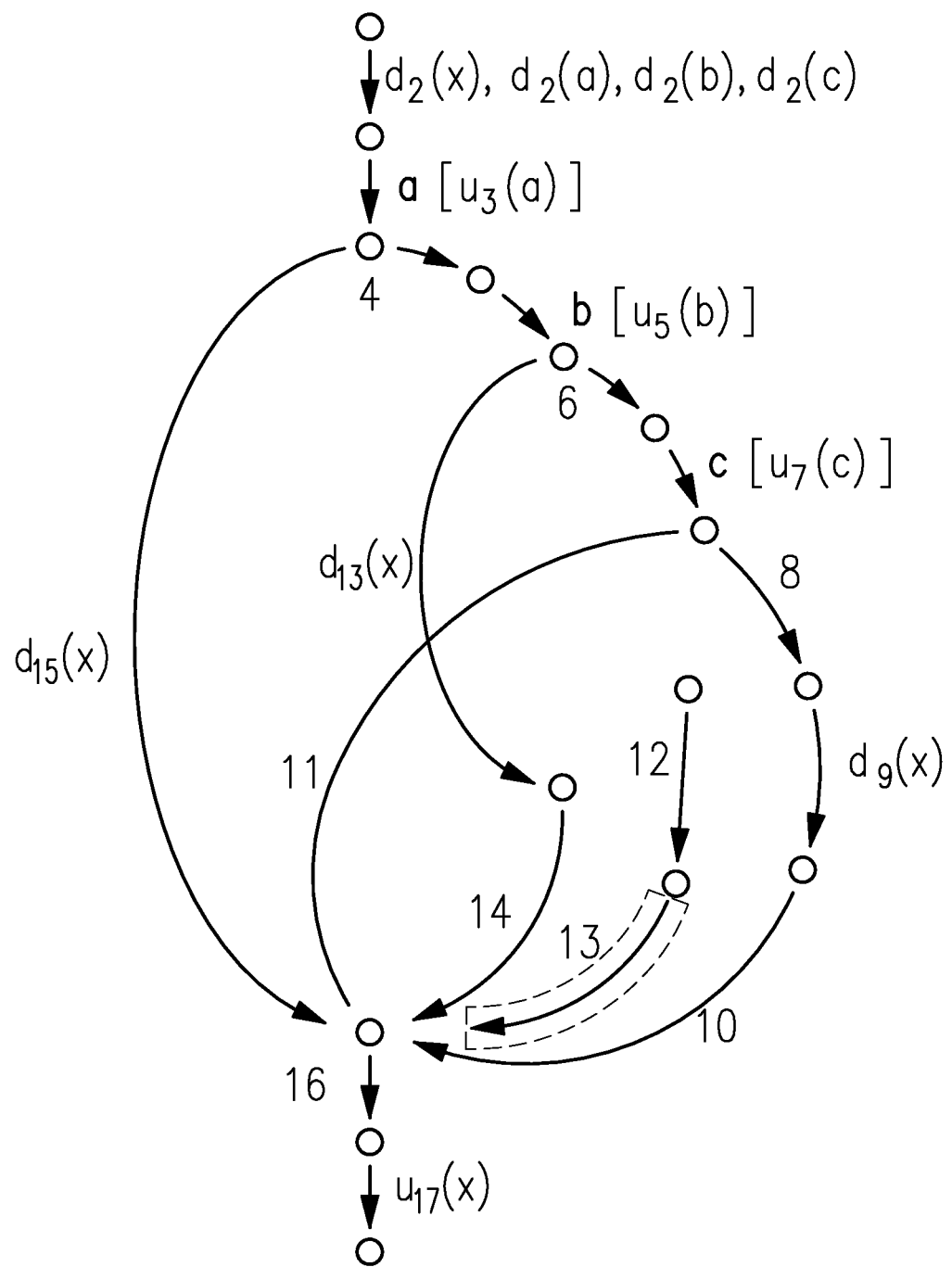

Star Transform
FIG. 122 shows maximal reducible path set.
FIG. 123 shows control flowgraph of example #5.
FIG. 124 shows decision graph of example #5.
FIG. 125 shows decision graph of example #5 after star transform.
FIG. 126 shows empty maximal reducible outcome which will be replaced by BNode.
FIG. 127 shows edge in control flowgraph which corresponds to isolated CNode.
FIG. 128 shows another empty maximal reducible outcome which will be replaced by BNode.
FIG. 129 shows isolated subpath.

Figure 130:
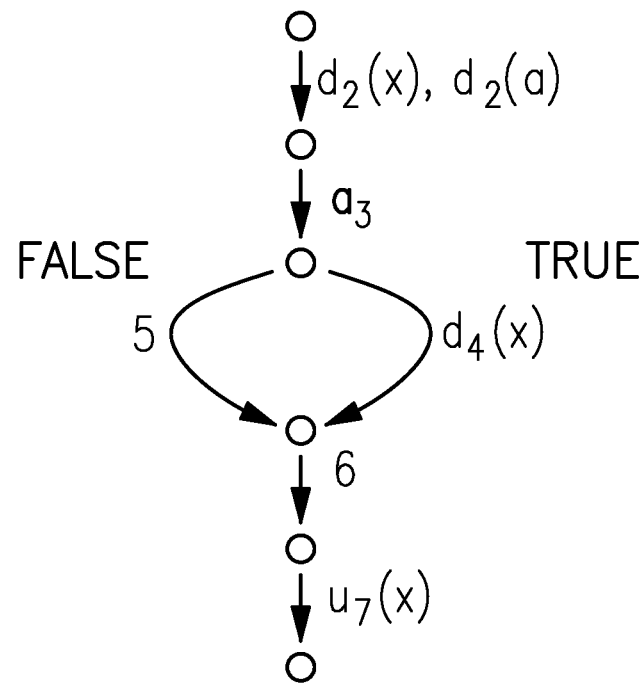
Figure 131:
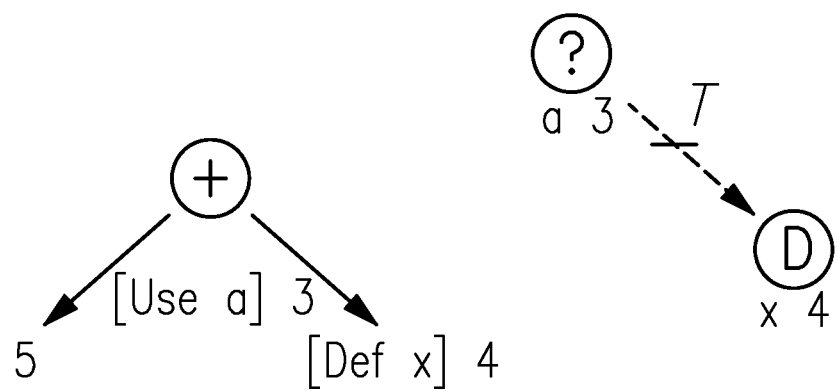
Figure 132:
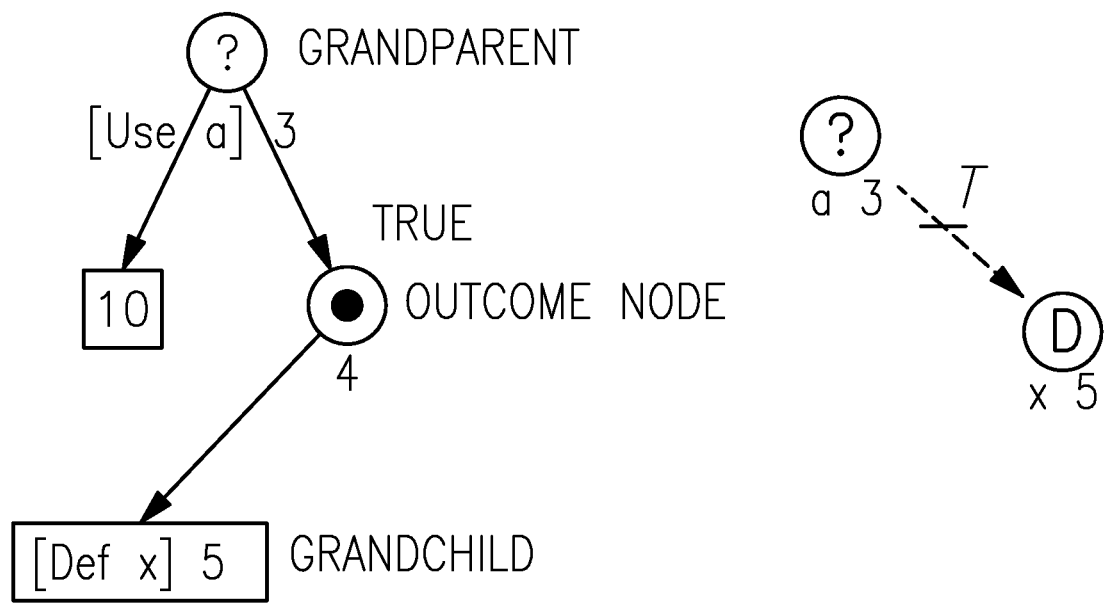
Figure 133:
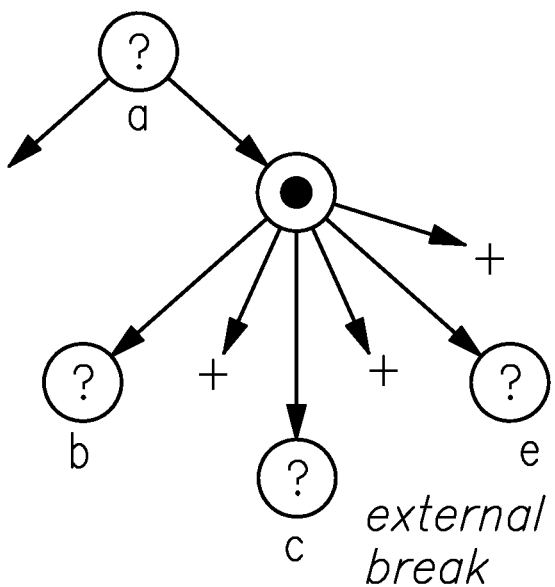
Figure 134:
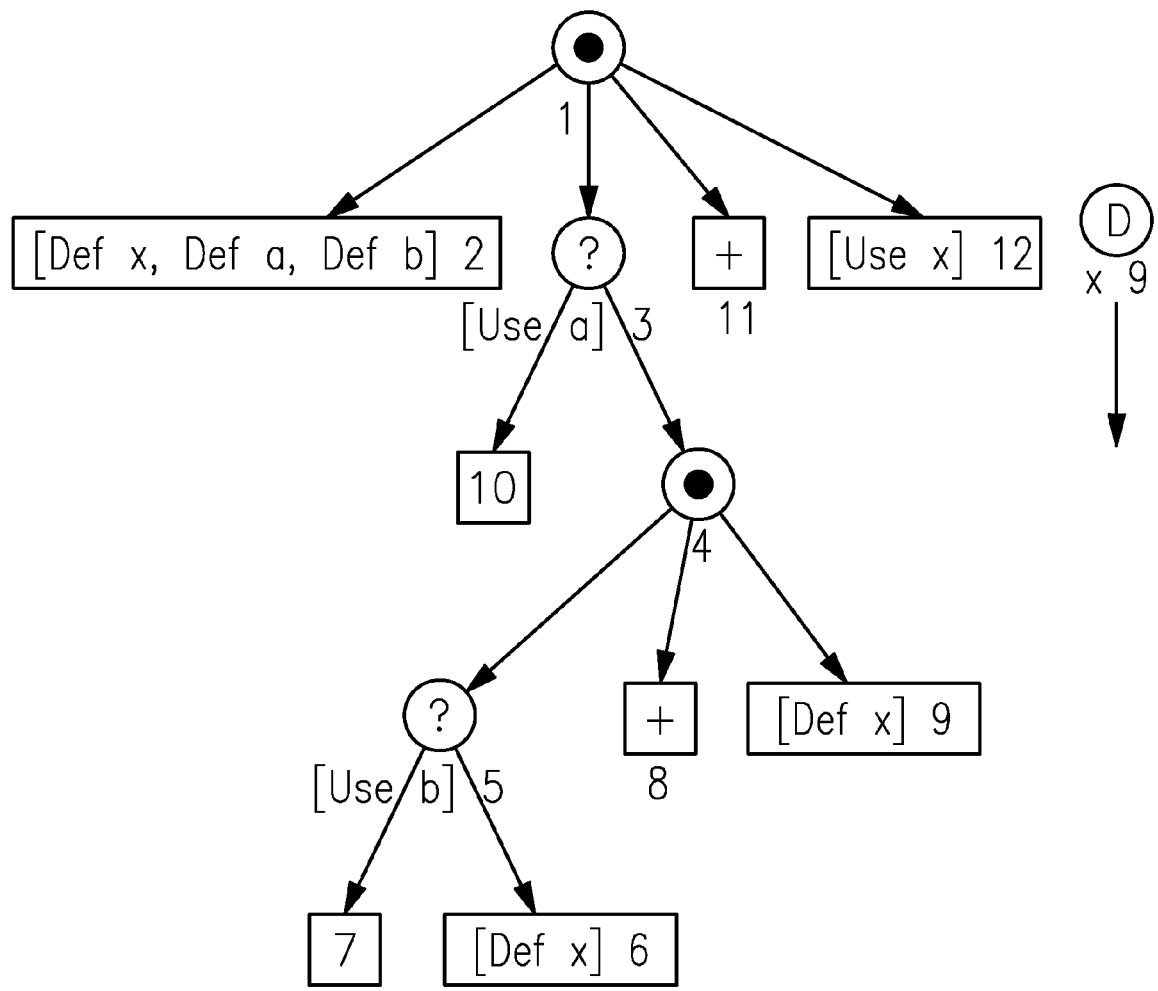
Figure 135:
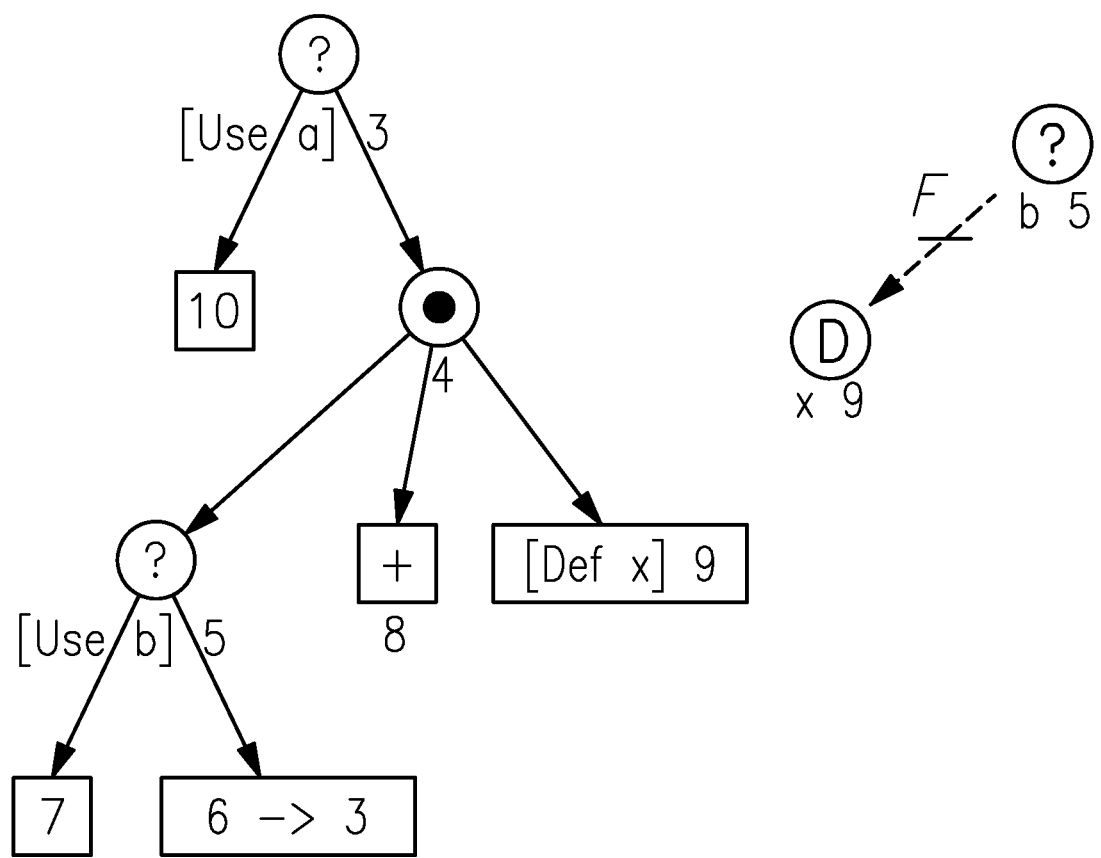
Figure 136:
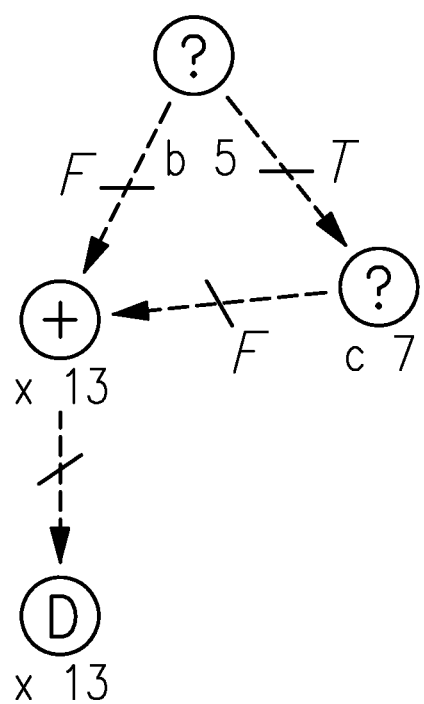
Figure 137:
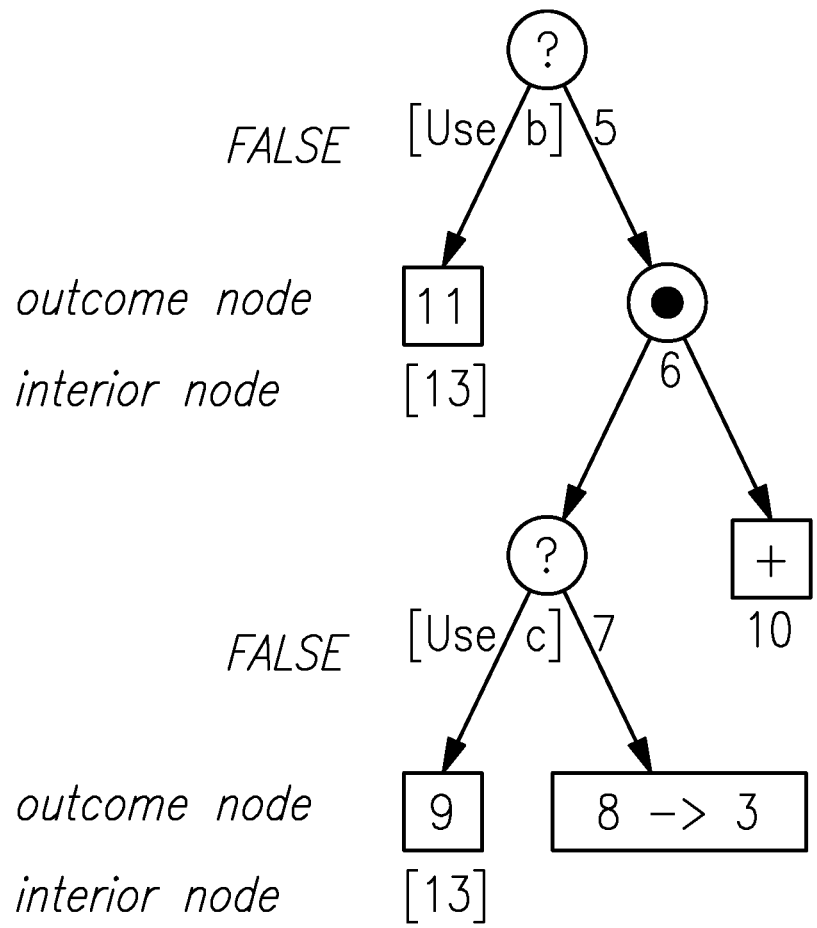
Figure 138:
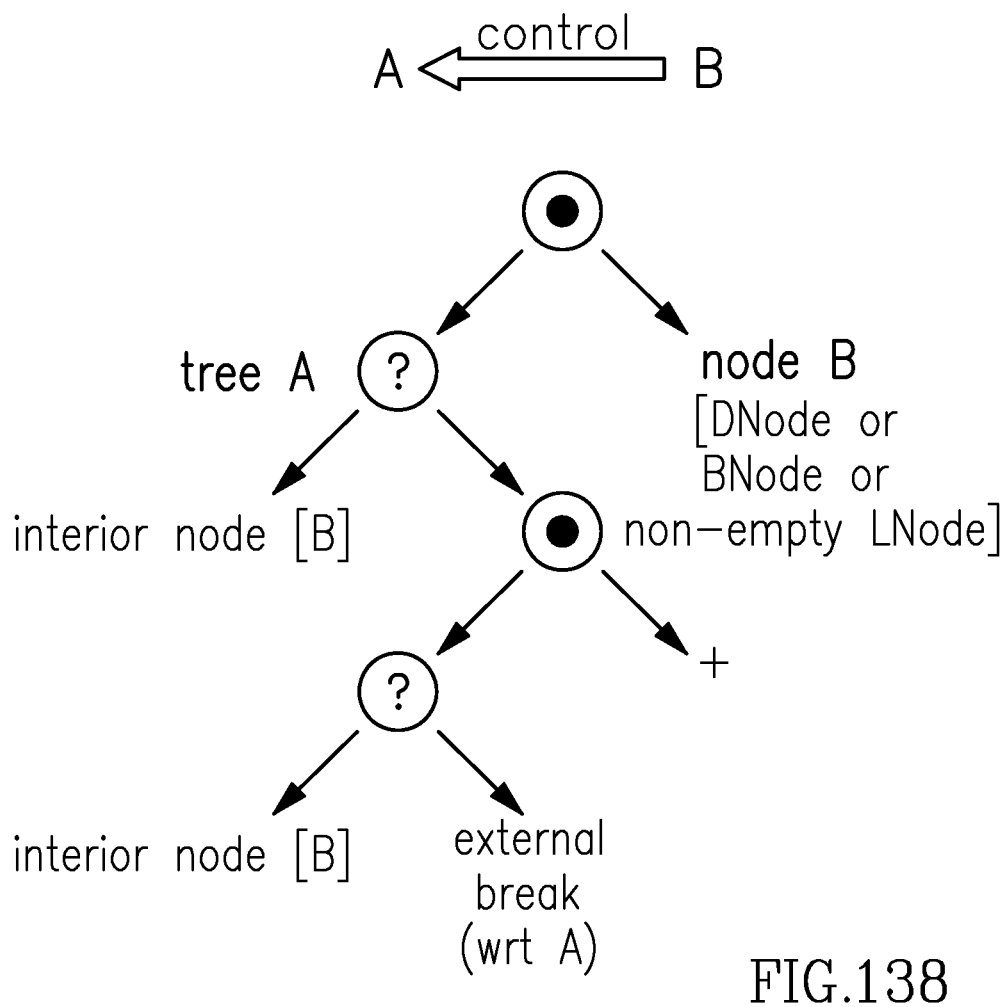
Figure 139:
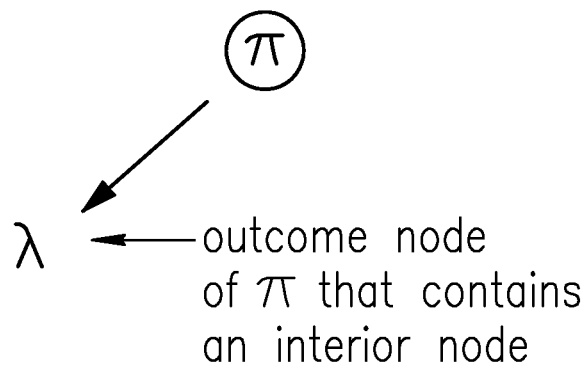
Figure 140:
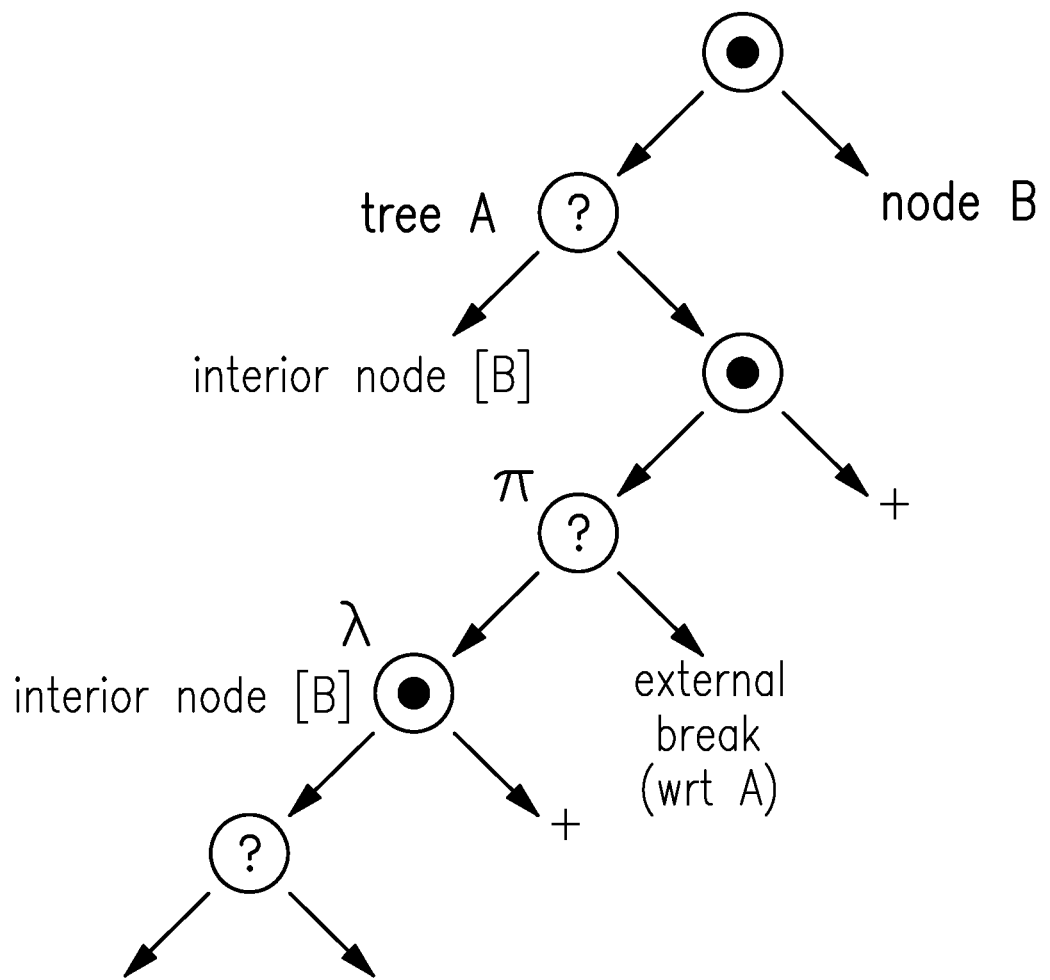
Figure 141:
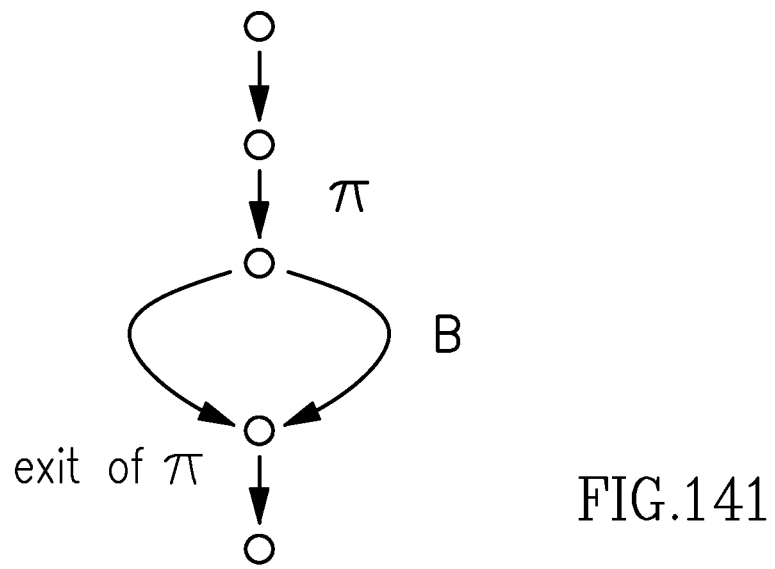
Figure 142:
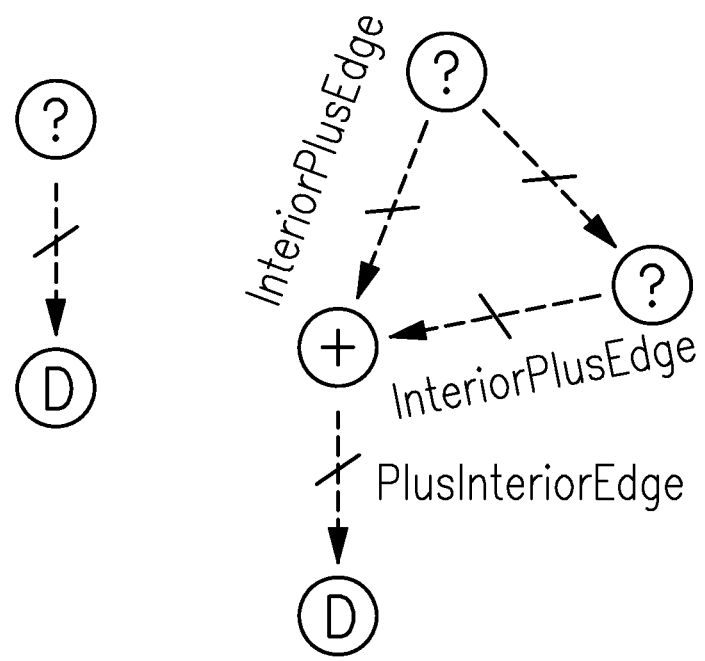

Kappa Transform
FIG. 130 shows control flowgraph of example #11 and control flowgraph of example #6 [Delta Transform]
FIG. 131 shows derivation of interior edge from DNode/child edge in decision graph.
FIG. 132 shows derivation of interior edge from DNode/grandchild edge in decision graph.
FIG. 133 shows skip children of SNode after DNode with external break.
FIG. 134 shows decision graph of example #13.
FIG. 135 shows decision graph of example #14.
FIG. 136 shows alpha graph of example #15.
FIG. 137 shows decision graph of example #15.
FIG. 138 shows schematic of operation of kappaCombine
FIG. 139 shows <lambda> is an outcome node which contains an interior node.
FIG. 140 shows <lambda> is the root of a maximal subtree.
FIG. 141 shows control flowgraph—exit of <pi> must be successor of B.
FIG. 142 shows schematic of the generation of a control plus alpha node.

Delta Transform

Figure 143:
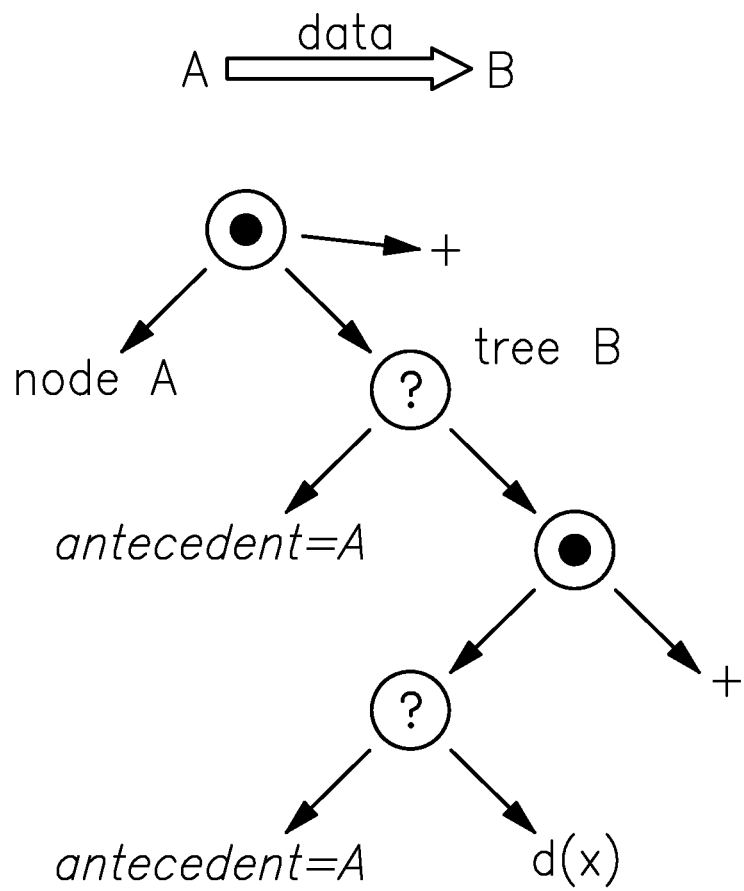

FIG. 143 shows propagation of data from A to B.

Figure 144:
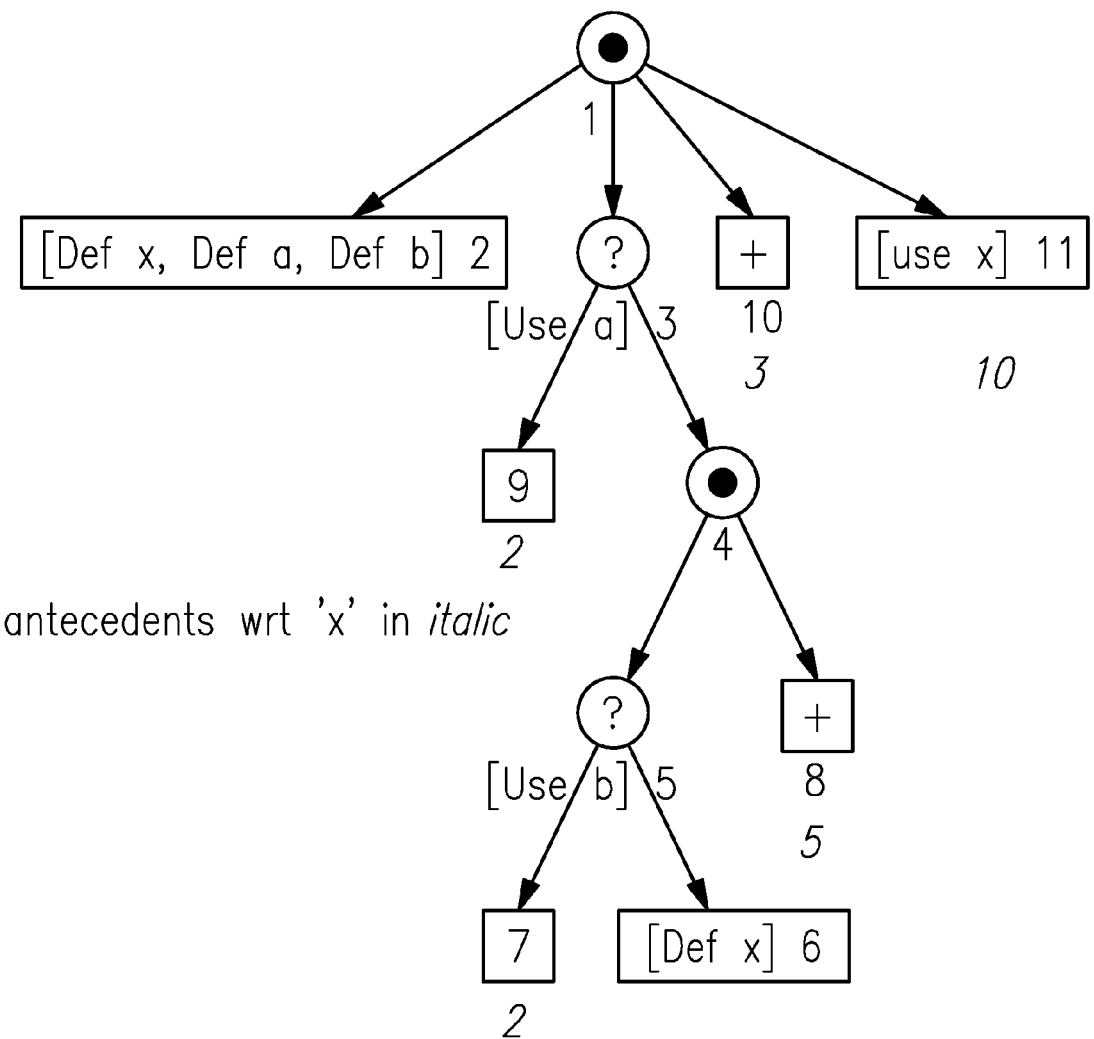

FIG. 144 shows decision graph with antecedents wrt 'x'.

Figure 145:

FIG. 145 shows image of a dcco.

Figure 146:
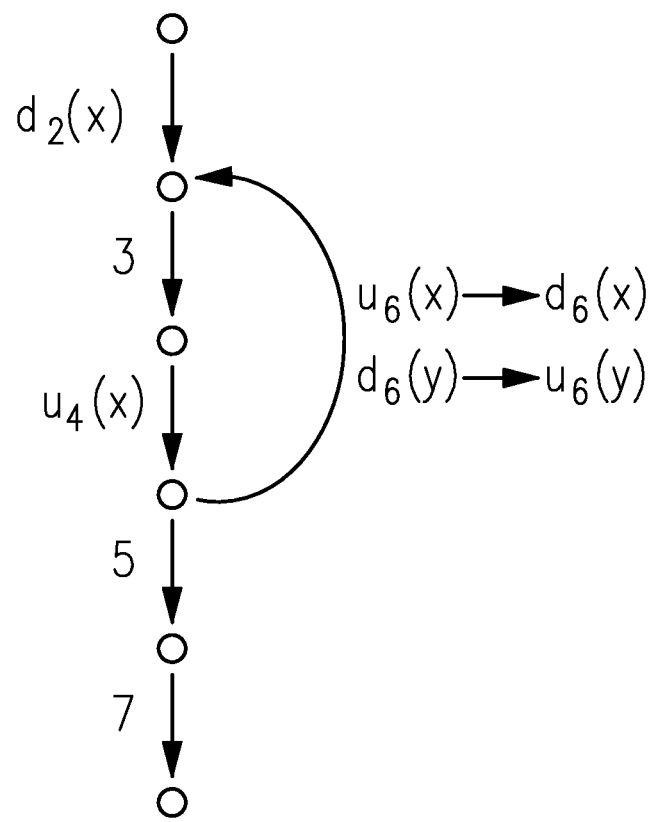
Figures 147, 148:
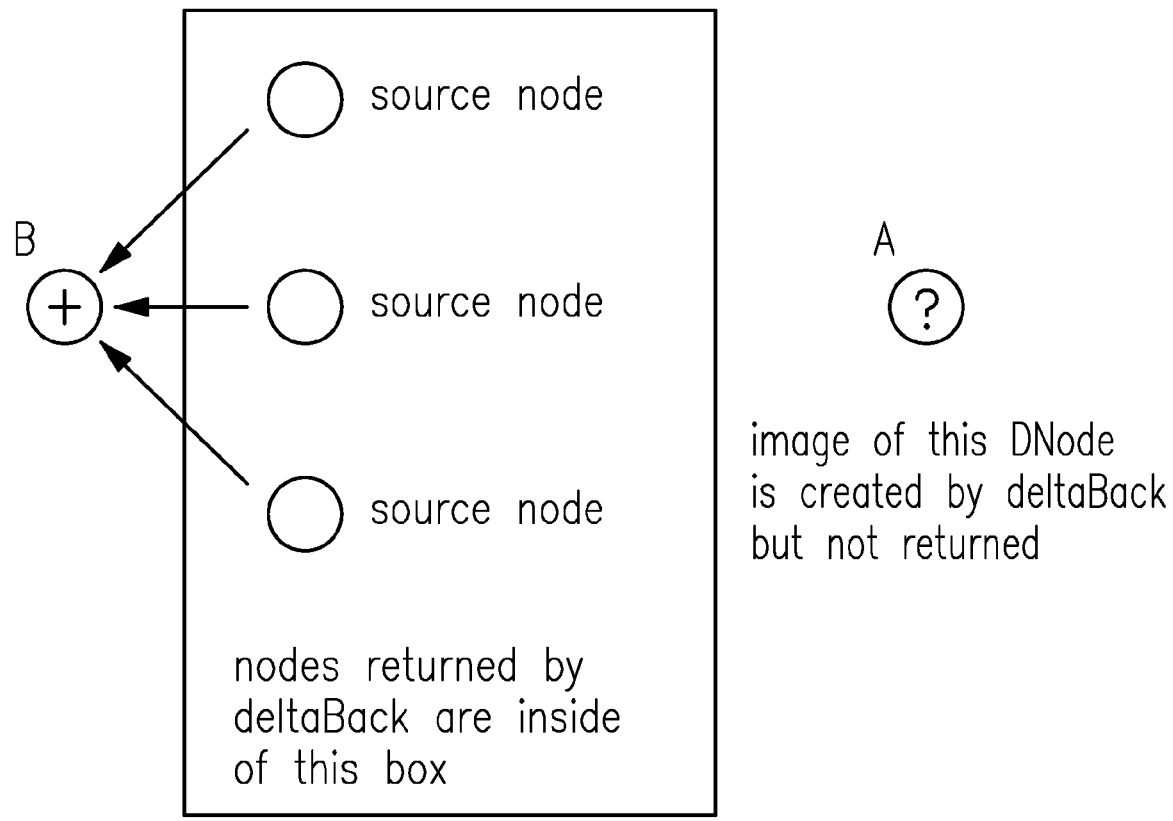

FIG. 146 shows control flowgraph that leads to spurious loop entry CNode and spurious pull-through use FIG. 147 shows image of DNode; the source nodes returned by delta back.

FIG. 148 shows image of LNode that is not a dcco.

FIG. 149 shows action of delta back use on a normal use.

FIG. 150 shows action of delta back use on a star interior use.

FIG. 151 shows control flowgraph of example that generates a normal pull-through use.

Figure 152:
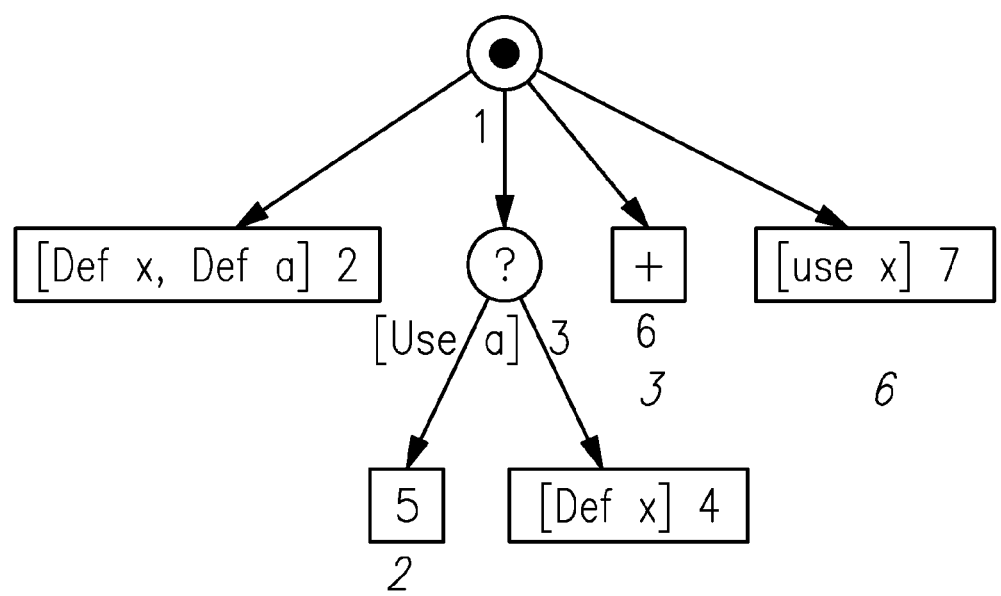

FIG. 152 shows decision graph of example #6 with antecedents wrt 'x'.

FIG. 153 shows trace for target use u(a) in DNode #3 of Example #6 and delta graph.

FIG. 154 shows trace for target use u(x) in LNode #7 of Example #6.

Figure 155:
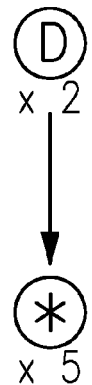

FIG. 155 shows trace of delta back on DNode #3 in Example #6 and delta graph.

FIG. 156 shows continuation of trace of delta back on DNode #3 of Example #6 and delta graph.

FIG. 157 shows trace of delta back on CNode #6 of Example #6 and delta graph.

Figure 158:
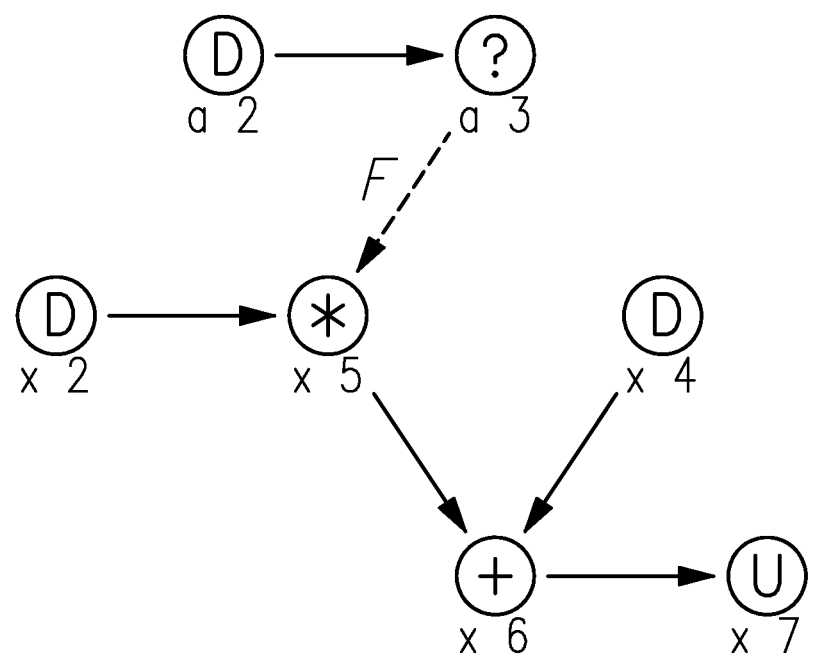

FIG. 158 shows alpha graph fragment of Example #6.

Delta Star Transform

Figure 159:
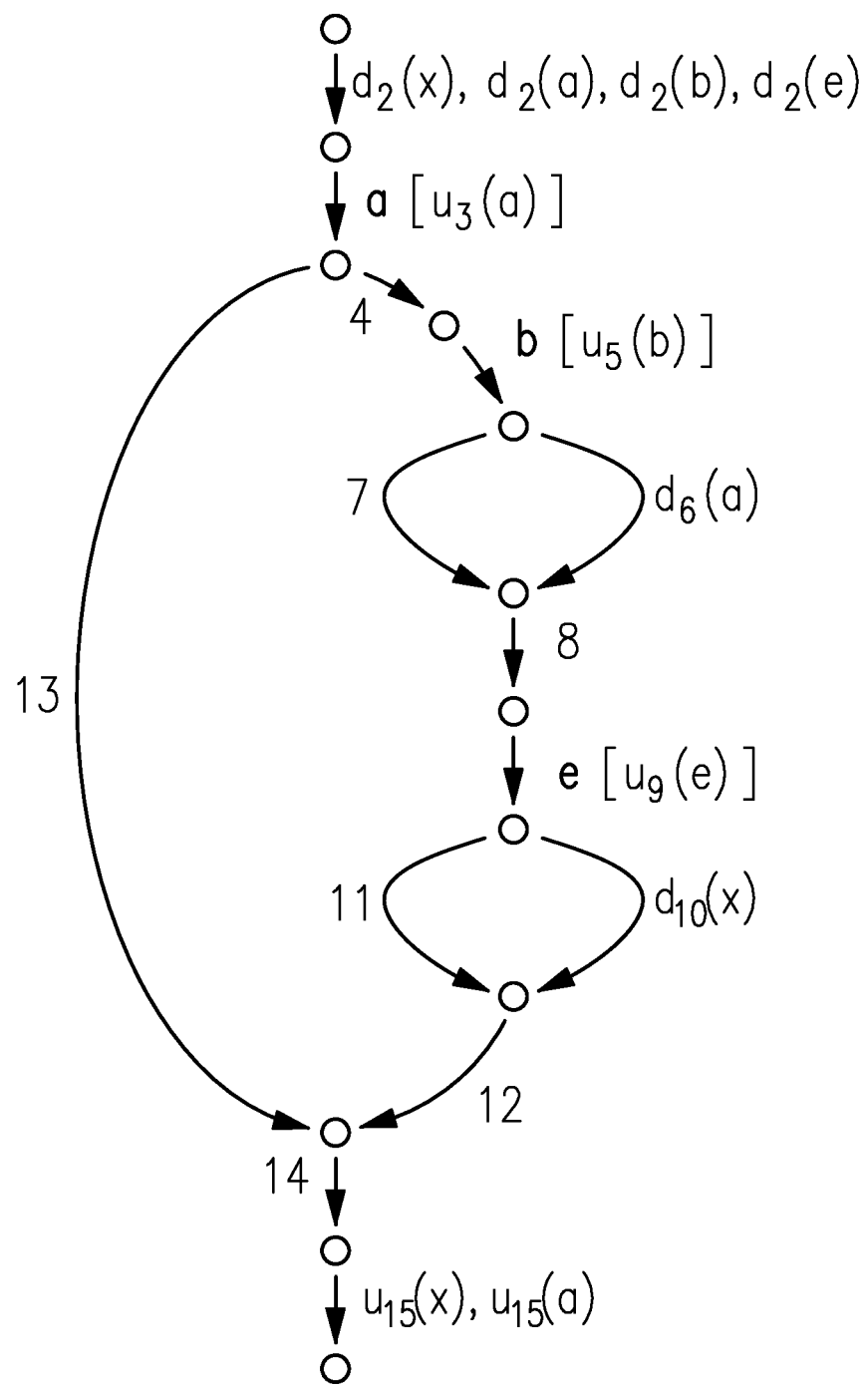

FIG. 159 shows control flowgraph of example #9.

Figure 160:
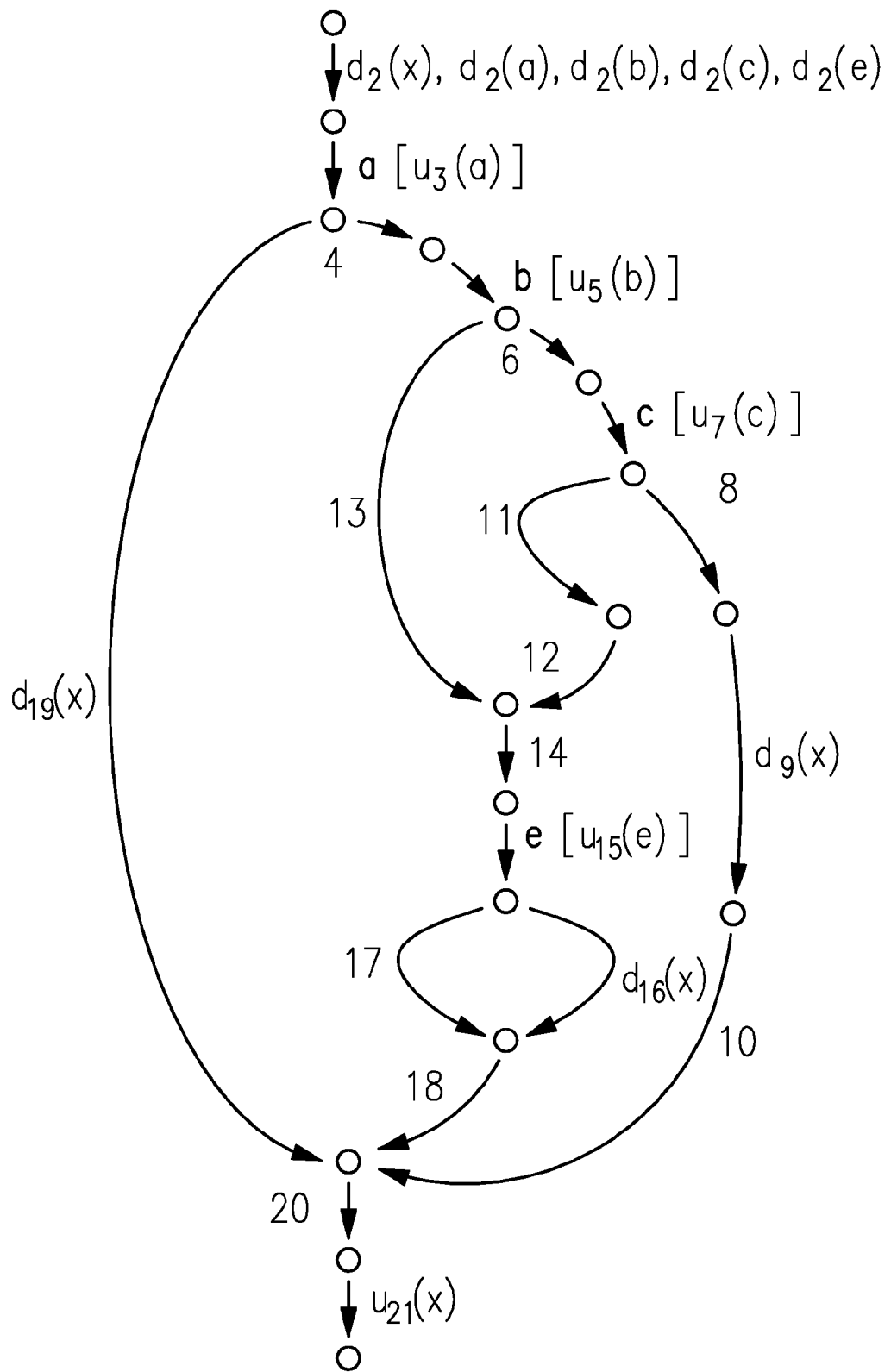

FIG. 160 shows control flowgraph of example #10.

Figure 161:
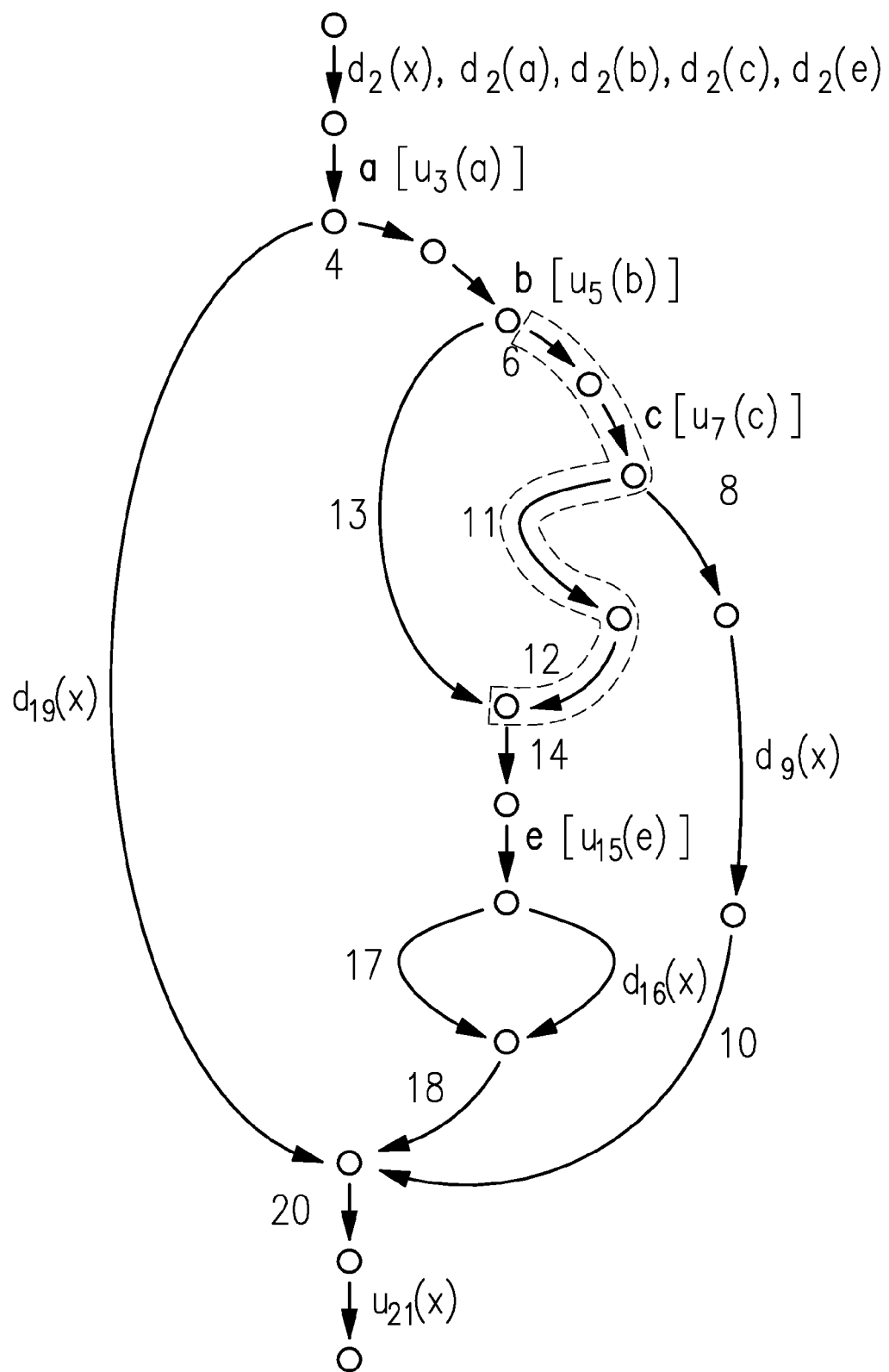

FIG. 161 shows partial outcome.

Figure 162:
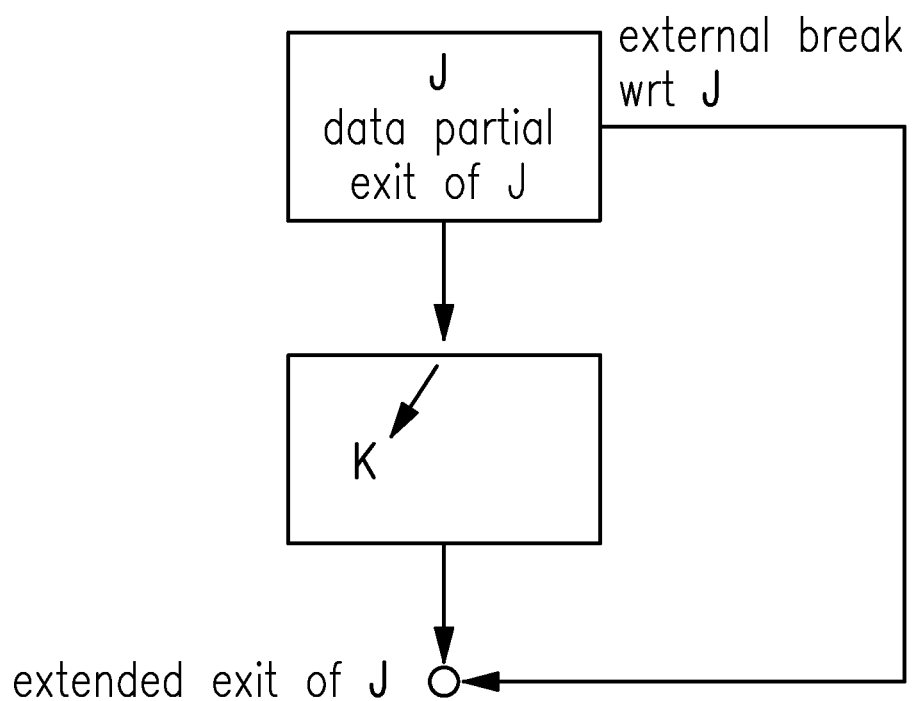

FIG. 162 shows control flow diagram—conditions for applicability of delta star back.

Figure 163:
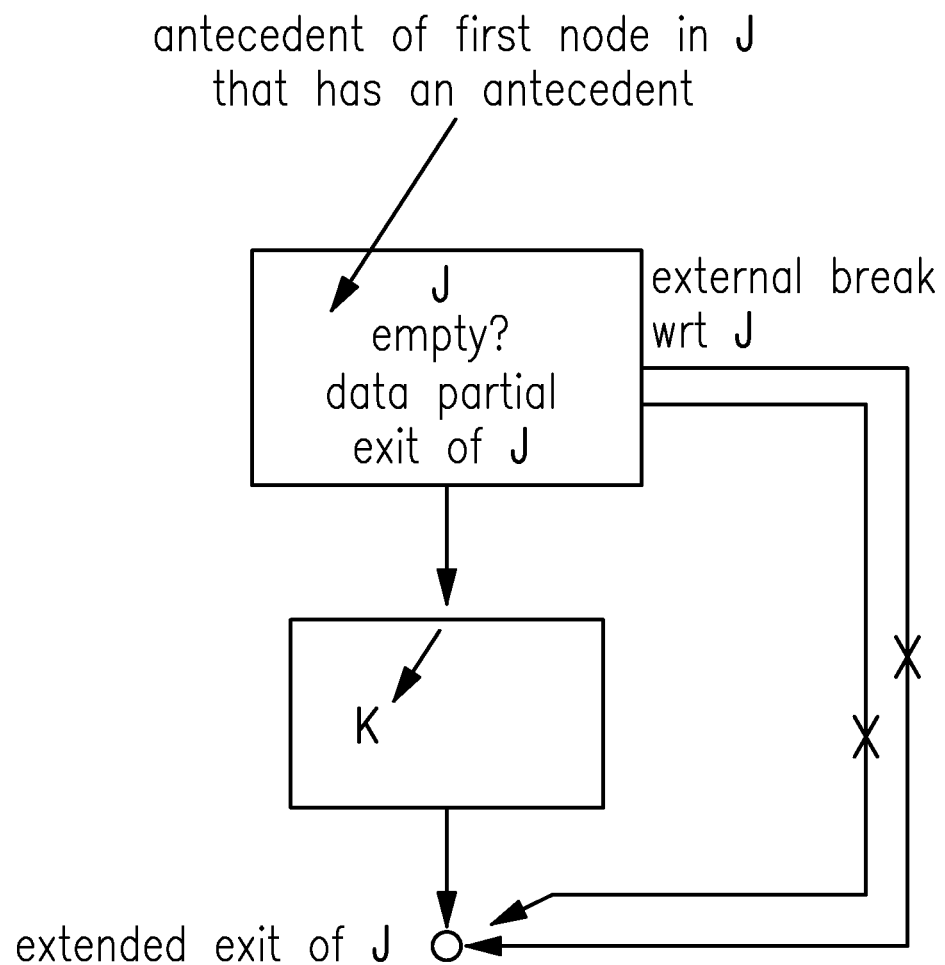

FIG. 163 shows control flow diagram—analysis of the reference decision

Figure 164:
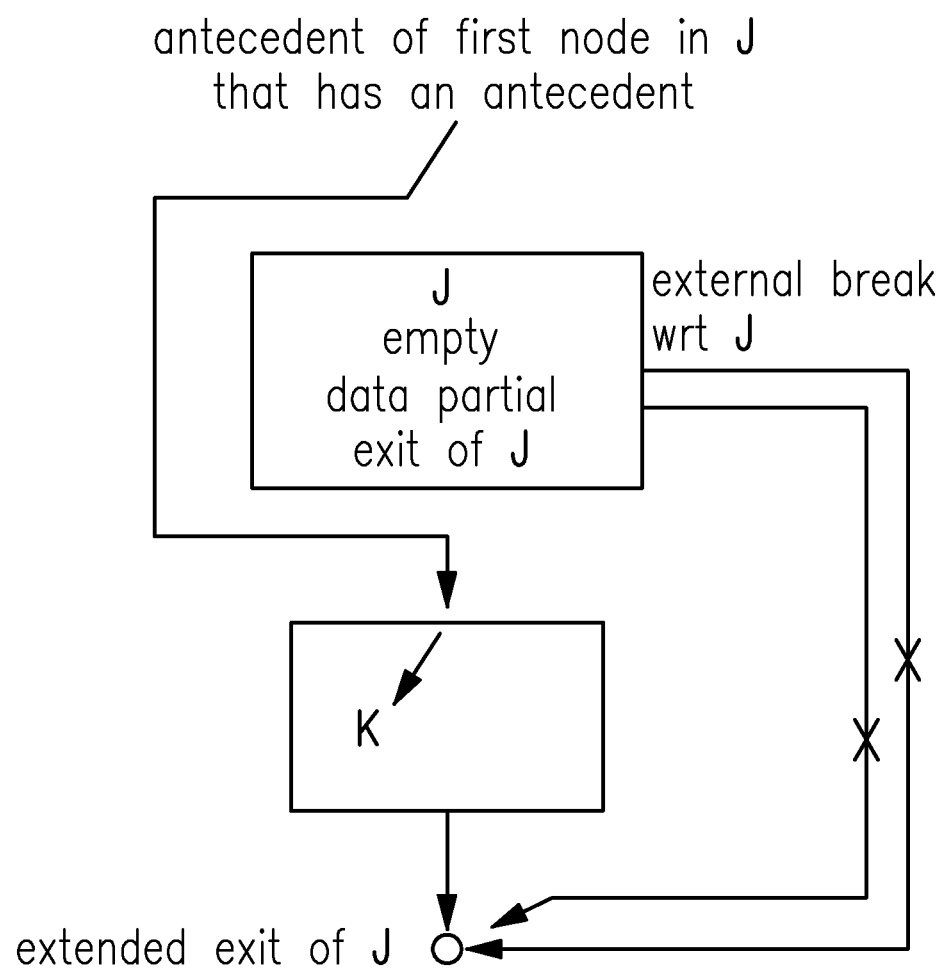

FIG. 164 shows control flow diagram—analysis of empty reference decision.

Figure 165:
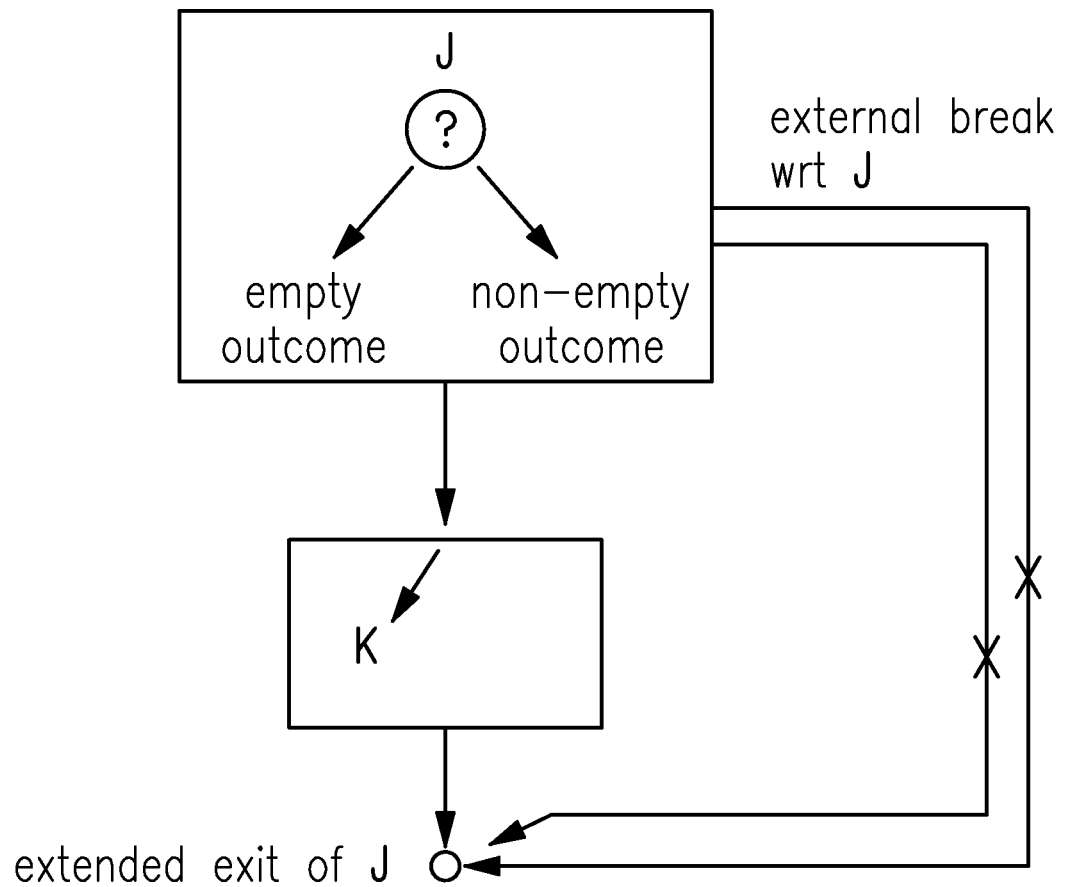

FIG. 165 shows control flow diagram—backtracking empty partial outcome.

Figure 166:
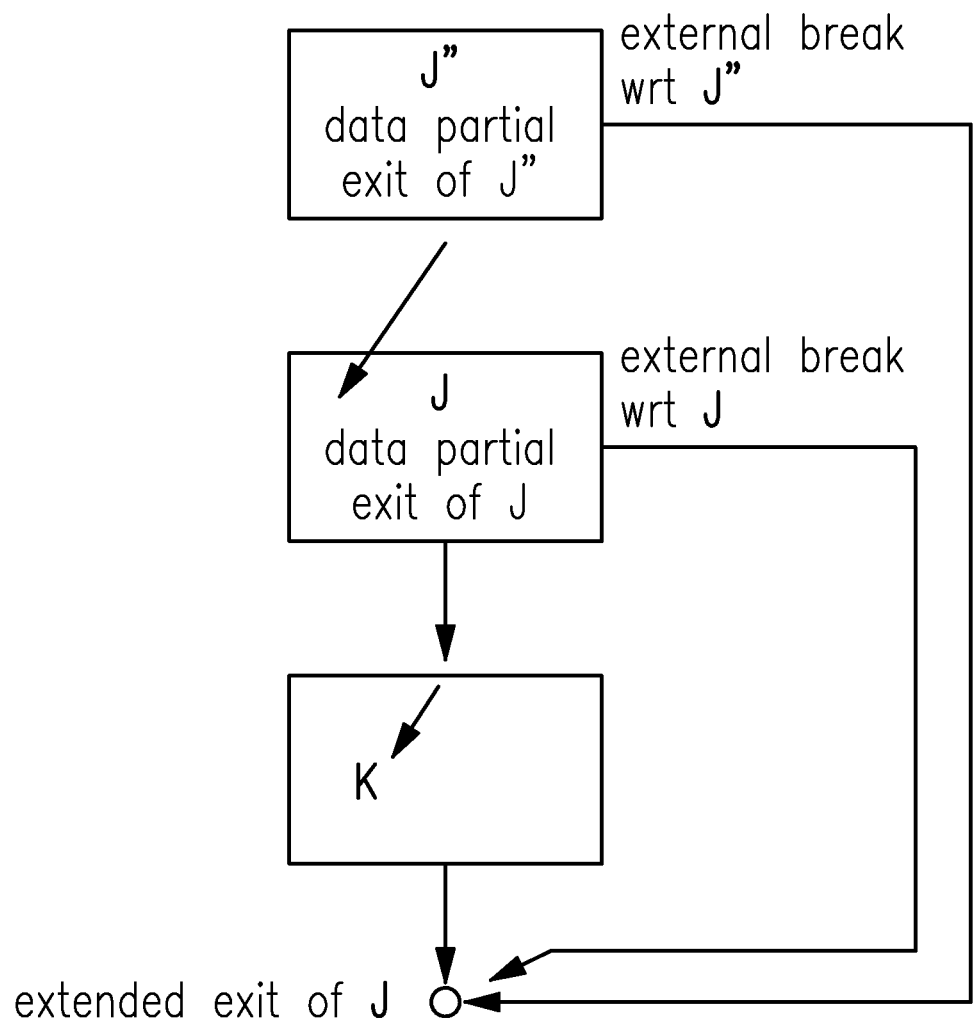

FIG. 166 shows control flow diagram—predecessor partial decision.

Figure 167:
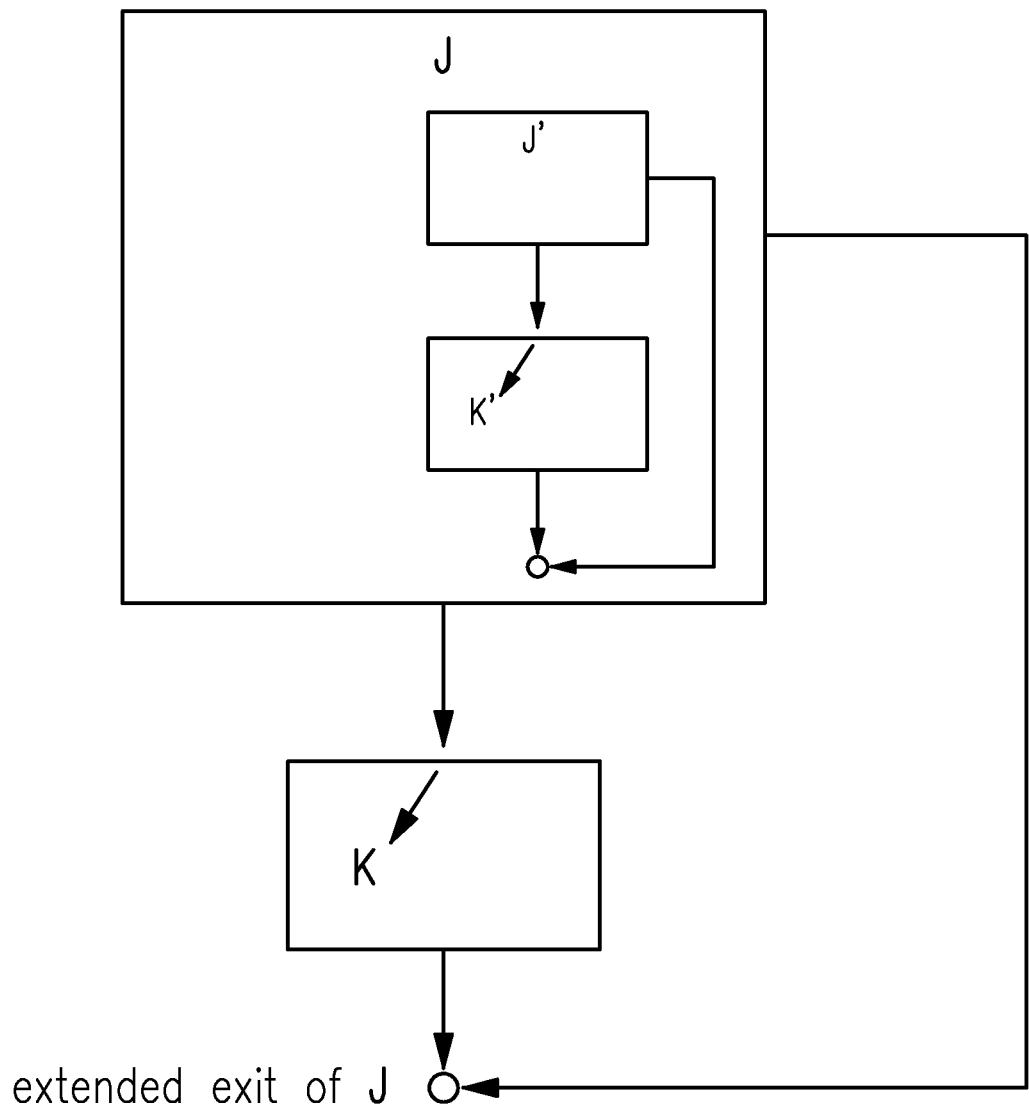

FIG. 167 shows control flow diagram—nested partial decision.

Figure 168:
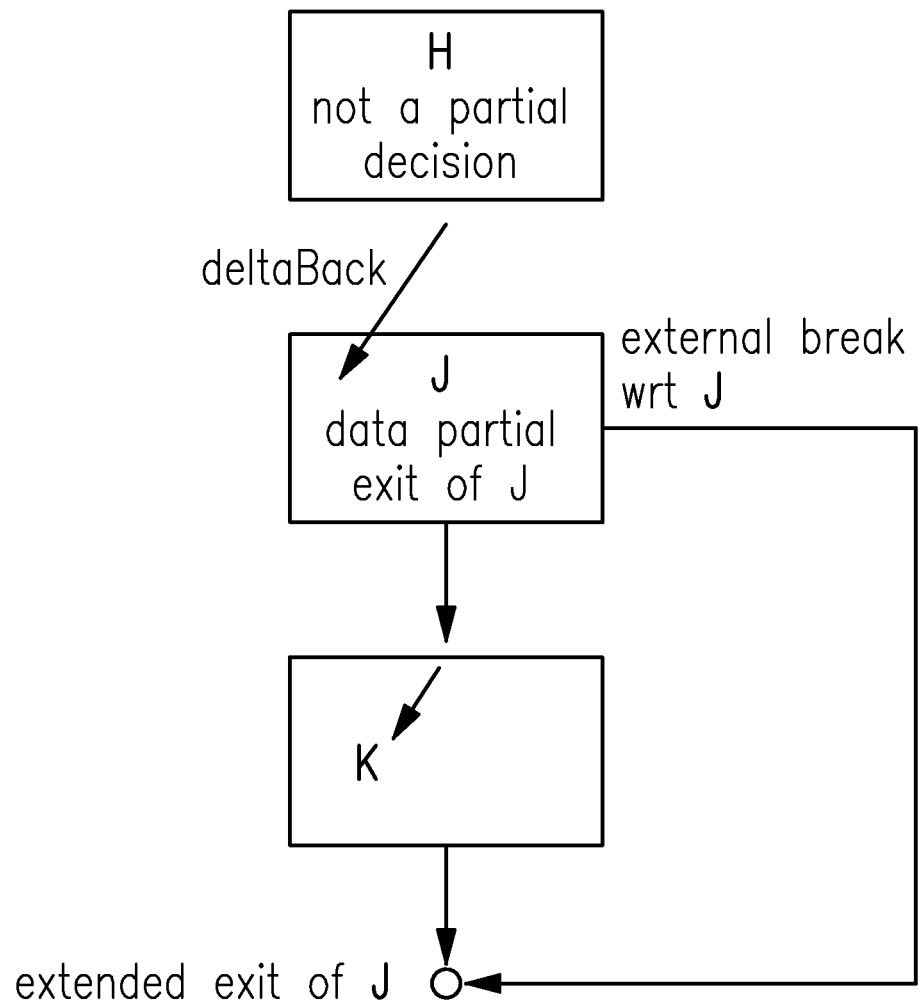

FIG. 168 shows control flow diagram—completion.

Figure 169:

FIG. 169 shows partial exit of new reference decision that is empty.

Figure 170:
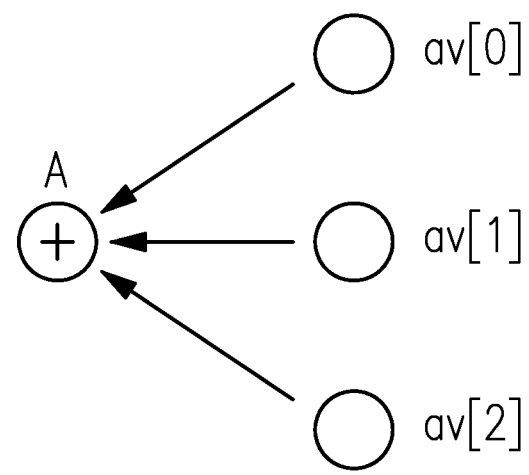

FIG. 170 shows partial exit of new reference decision that is not empty; image of a normal CNode and its incoming data flows [Delta Transform]

Figure 171:
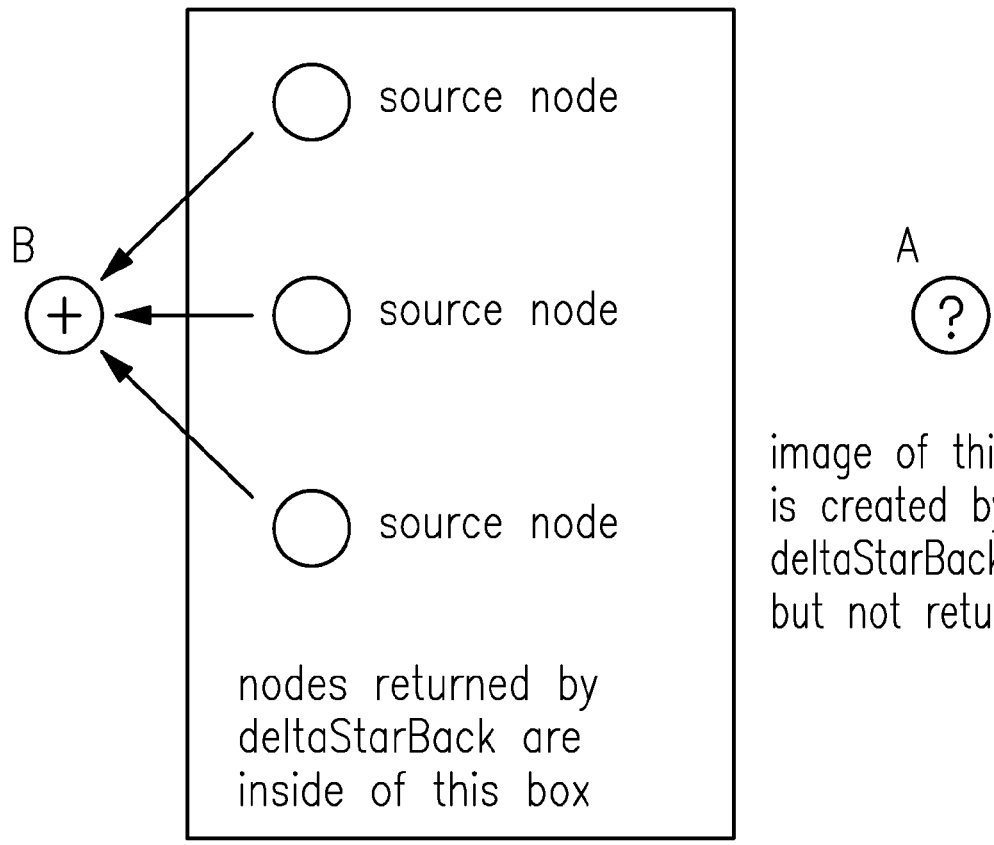

FIG. 171 shows image of DNode; the source nodes returned by delta star back

Figure 172:
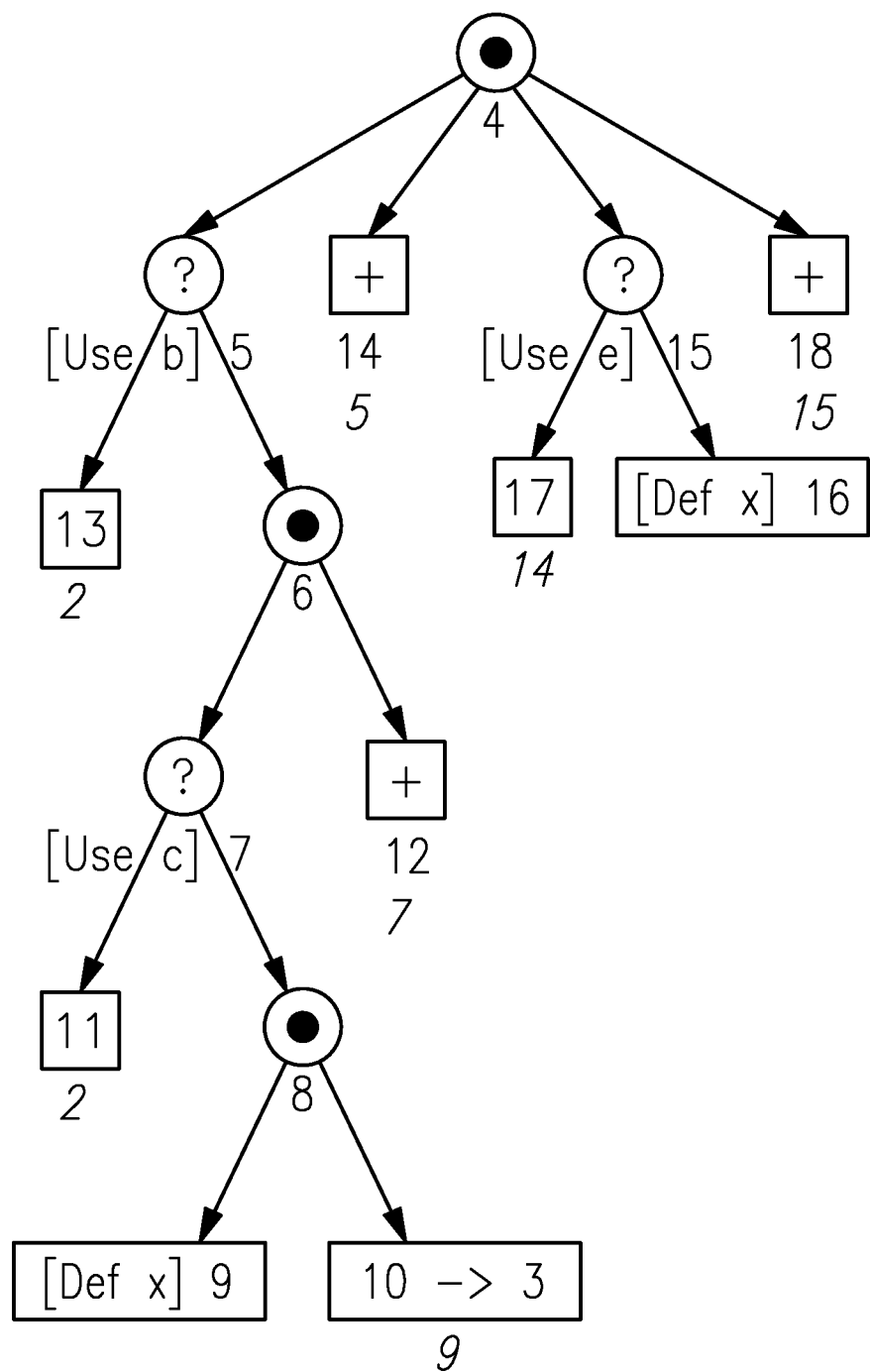

FIG. 172 shows decision graph fragment of example #10.

Figure 173:
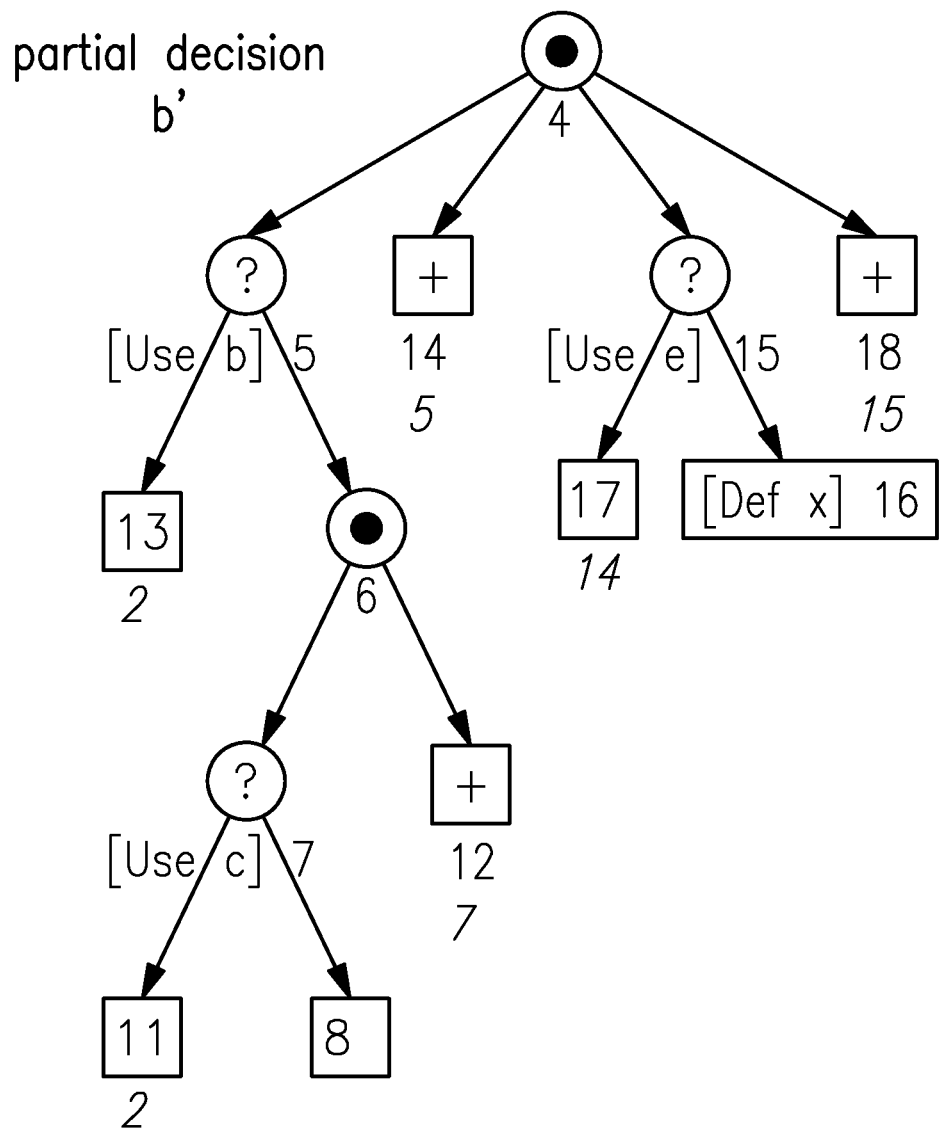

FIG. 173 shows decision graph as b' appears to delta star back.

Figure 174:
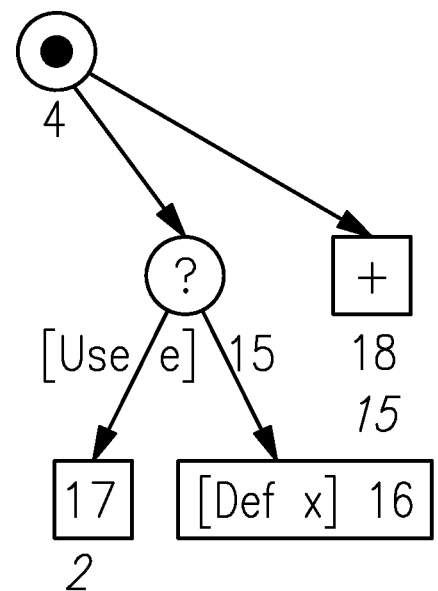

FIG. 174 shows decision graph equivalent to effect of delta star back.

Figure 175:
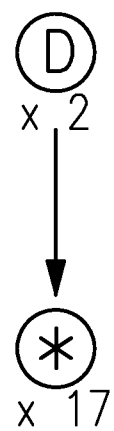

FIG. 175 shows delta graph produced by delta star back on LNode #17.

FIG. 176 shows trace for delta star back on u(x) in LNode #17 of example #10.

Kappa Cleanup Transform

Figure 177:
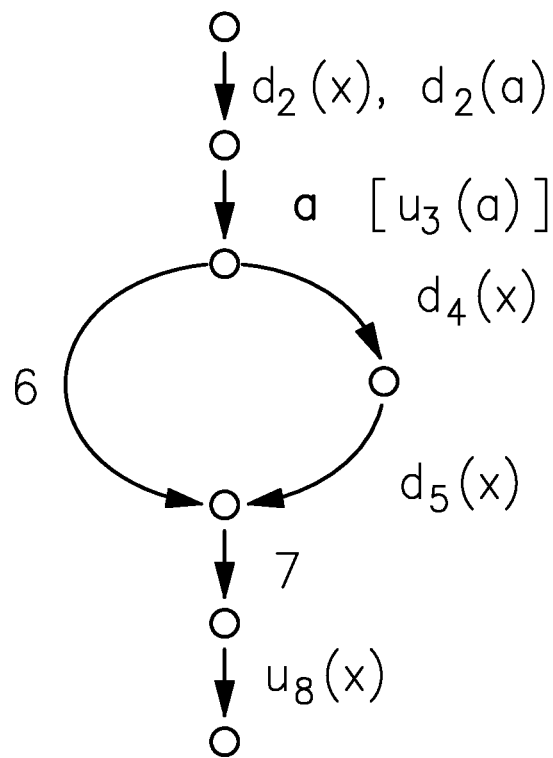

FIG. 177 shows control flowgraph—image of d4(x) is a vestigial alpha node.

Figure 178:
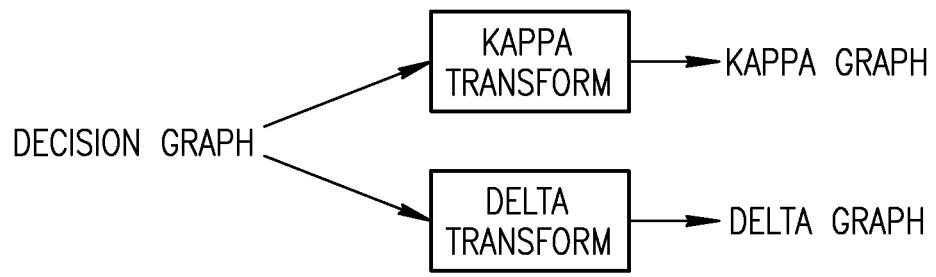

FIG. 178 shows correspondence between kappa graph and delta graph.

Figure 179:
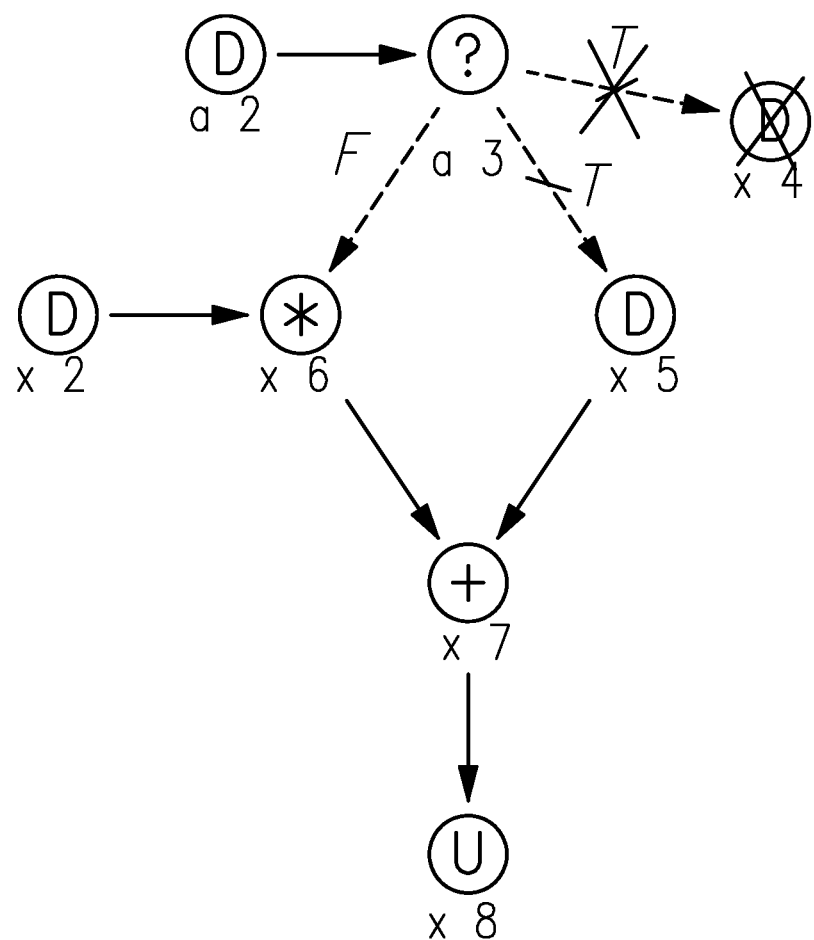

FIG. 179 shows kappa graph which contains vestigial alpha node d4(x).

Cleanup Transform

Figure 180:
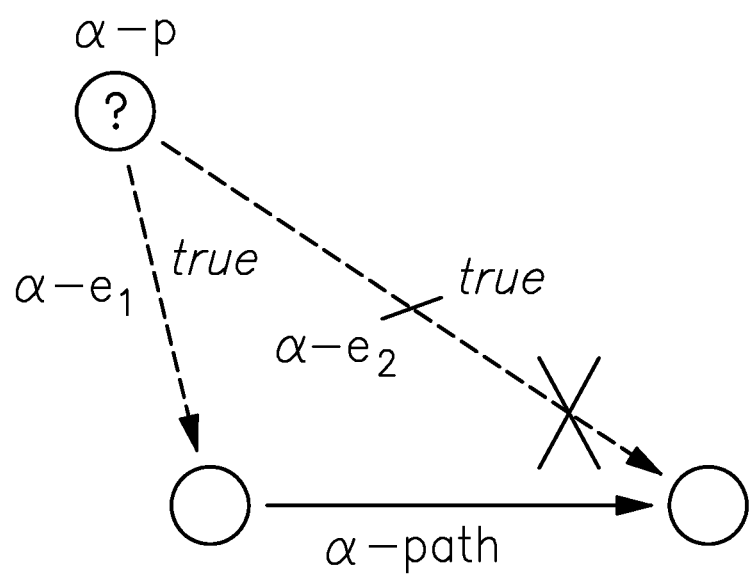

FIG. 180 shows removal of redundant control edge.

Figure 181:
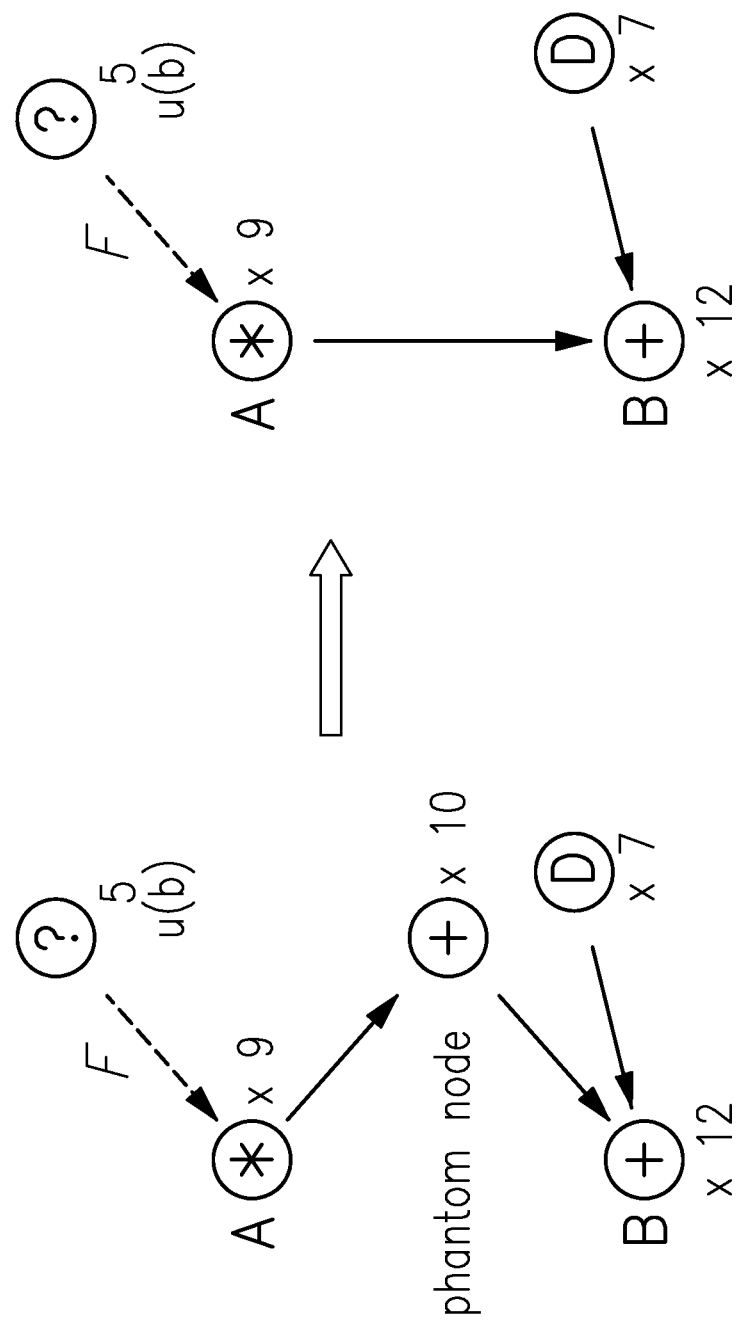

FIG. 181 shows removal of phantom node.

Path Testing

Figure 182:
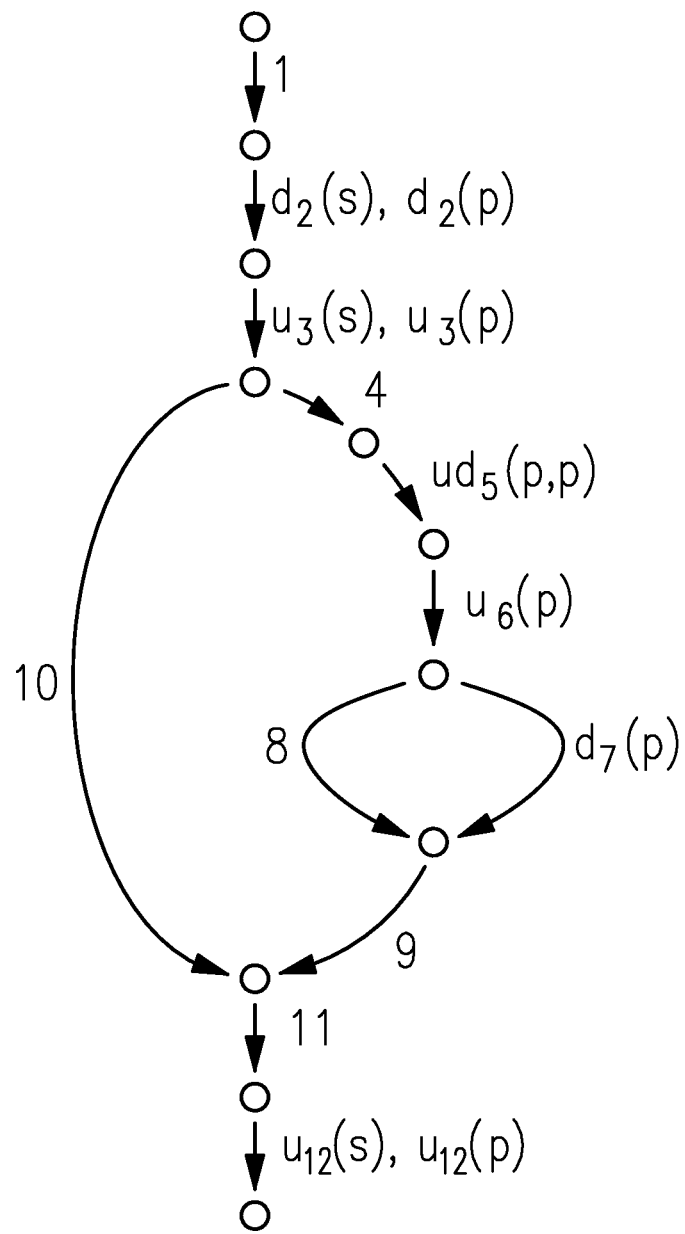

FIG. 182 shows control flowgraph of MorePower.

Figure 183:
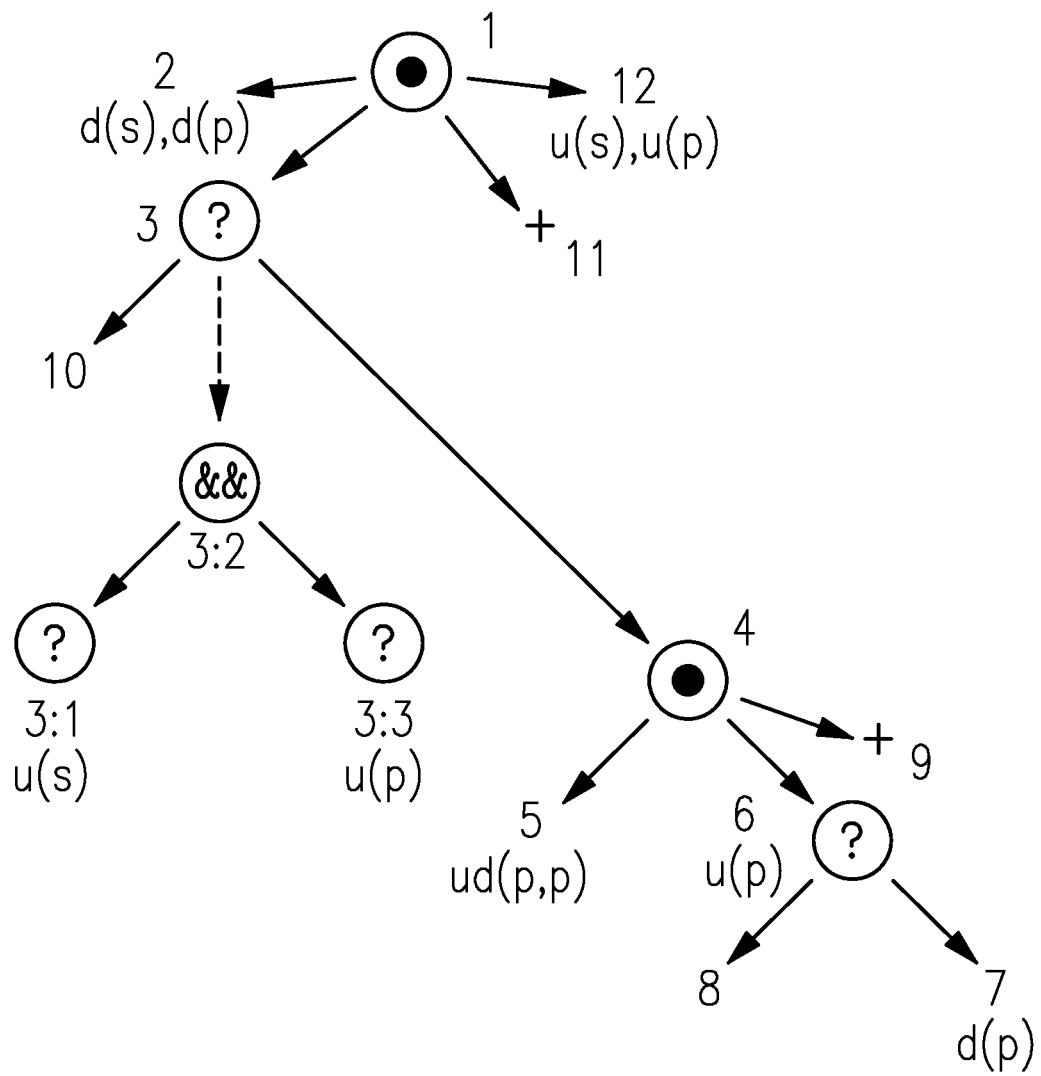

FIG. 183 shows decision graph of MorePower before predicate expansion.

FIG. 184 shows predicate expansion.

Figure 185:
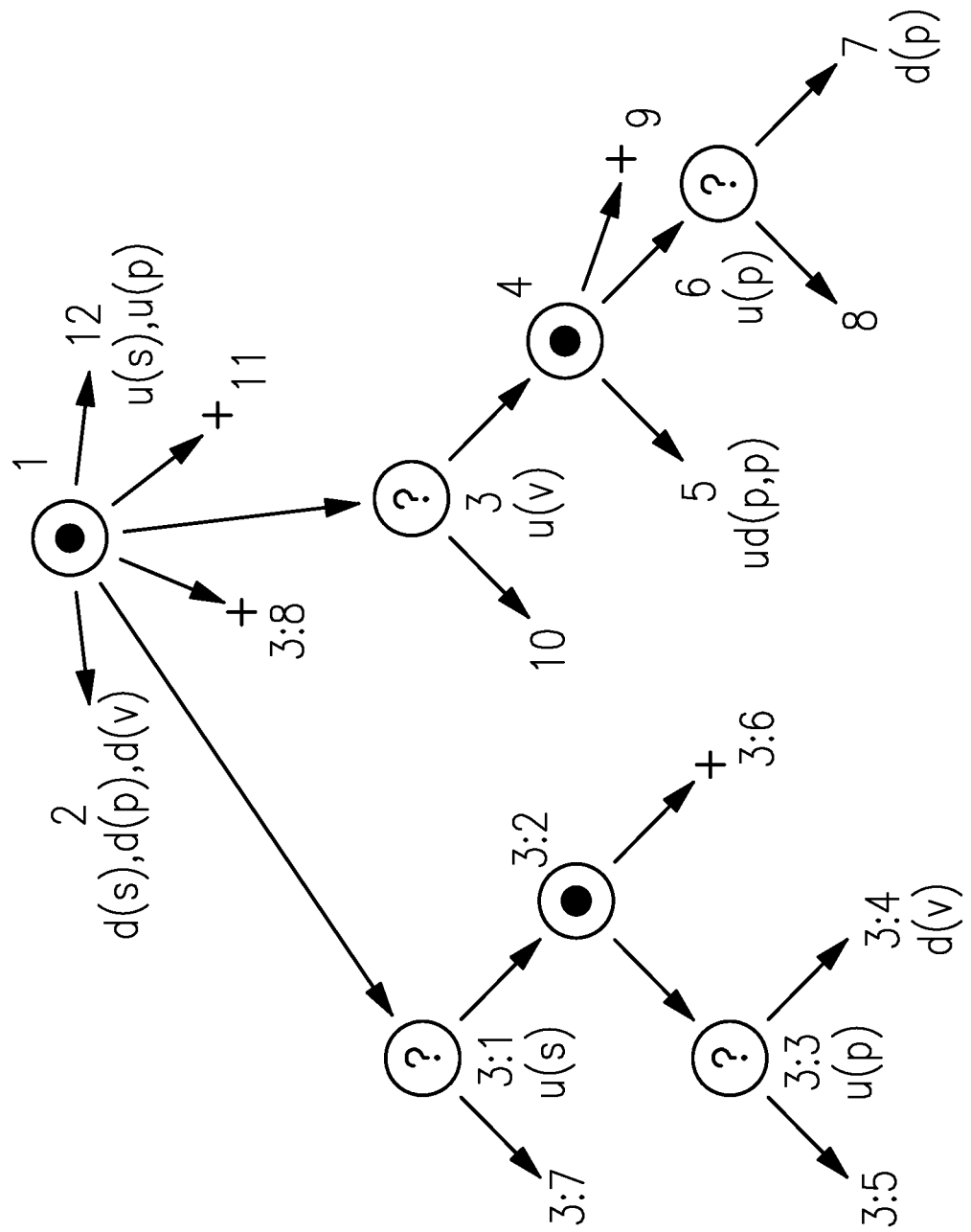

FIG. 185 shows decision graph of MorePower after predicate expansion.

Figure 186:
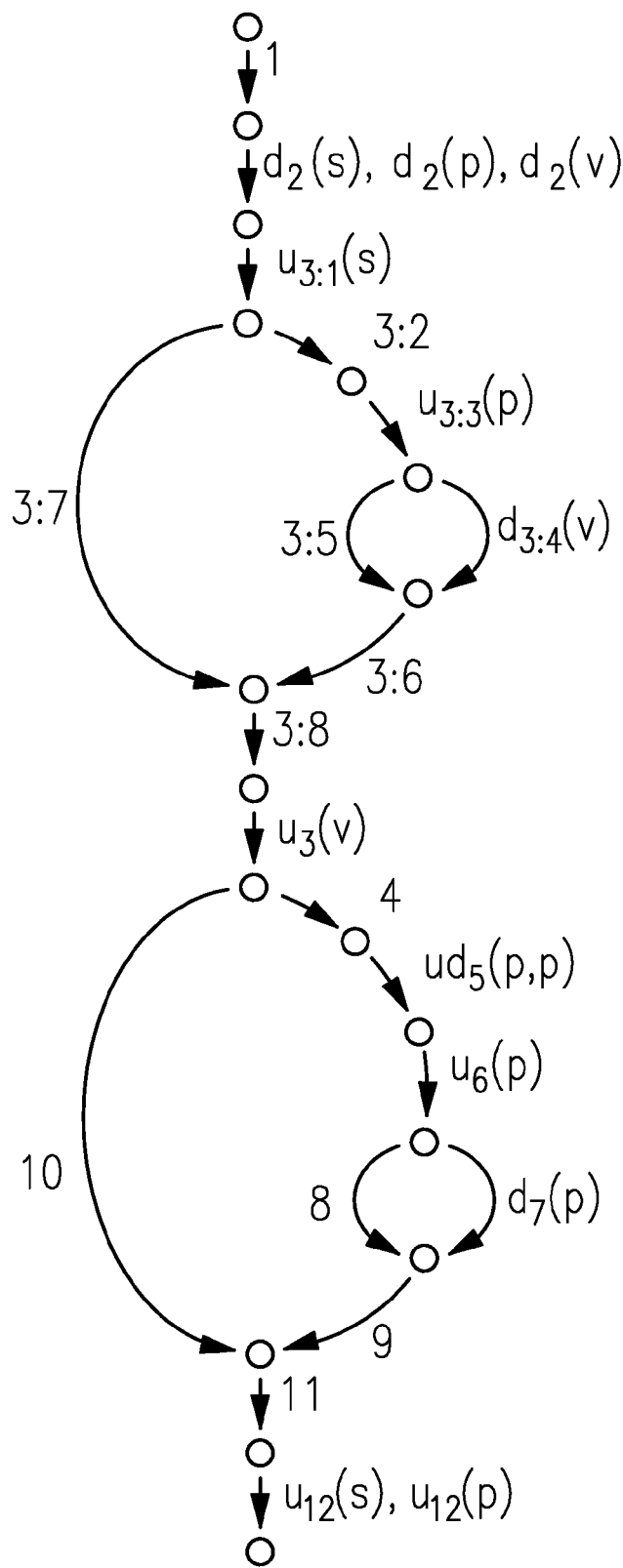

FIG. 186 shows control flowgraph corresponding to decision graph after predicate expansion.

Figure 187:
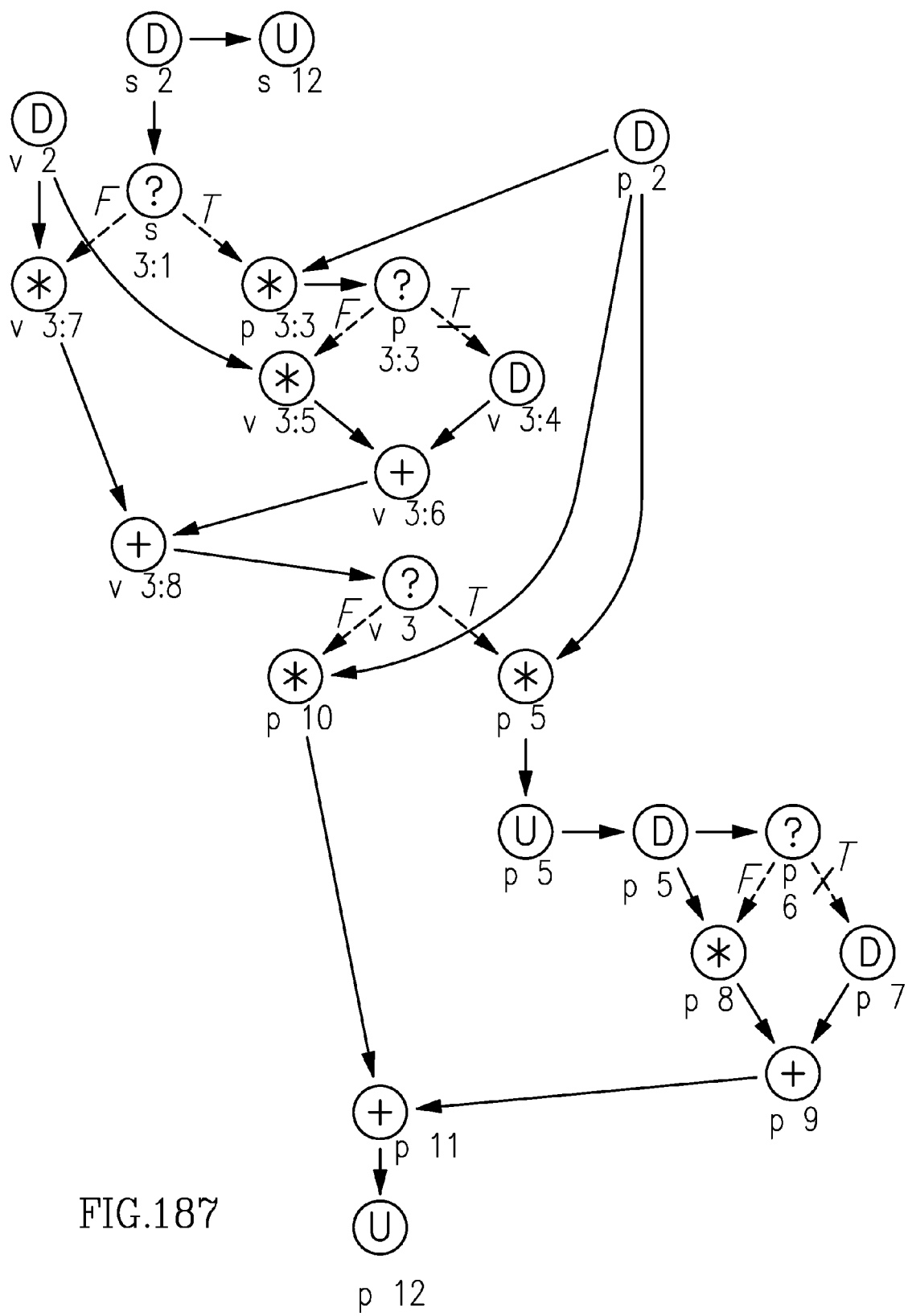

FIG. 187 shows alpha graph of MorePower.

FIGS. 188A through 188F show derivation based on control flowgraph corresponding to expanded decision graph.

FIG. 189 shows complete physical paths for MorePower.

Figure 190B:
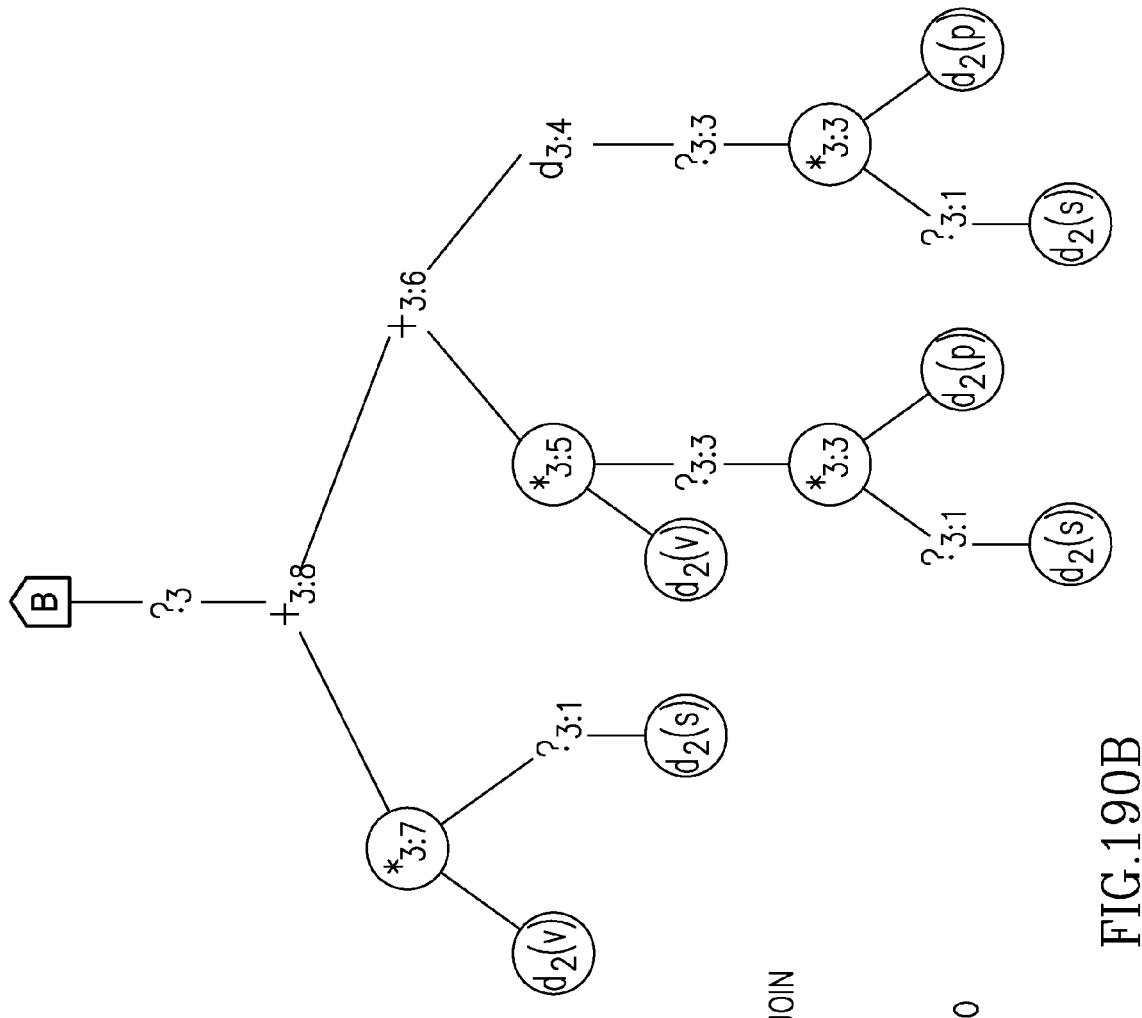

FIGS. 190A and 190B show alpha tree for u12(p) of MorePower.

FIG. 191 shows <epsilon>-paths for MorePower.

Figure 192:
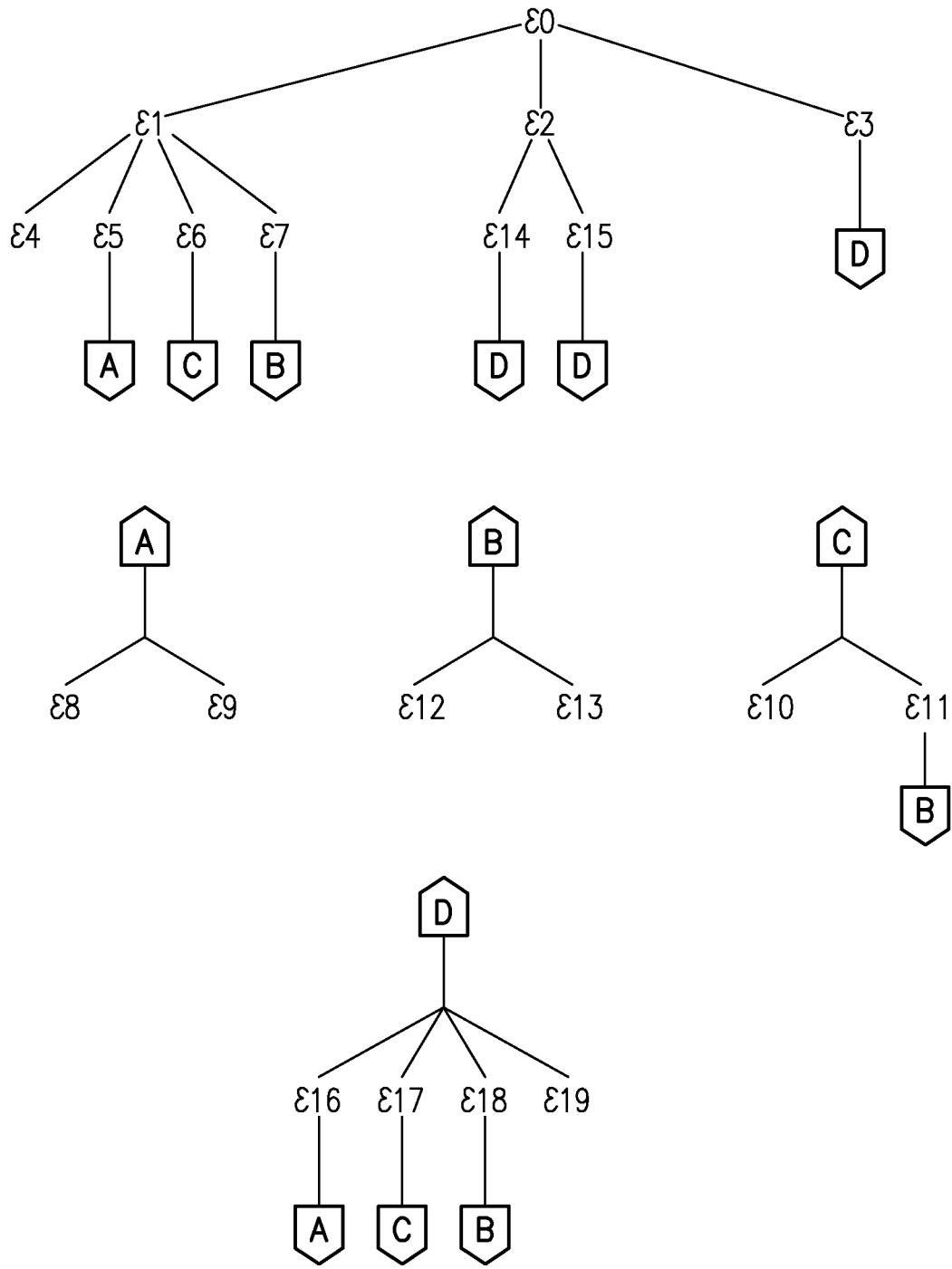

FIG. 192 shows <epsilon>-tree for u12(p) of MorePower.

FIGS. 193A and 193B show complete alpha paths in terms of <epsilon>-paths.

FIG. 194 shows correlation between physical paths and elementary paths.

FIG. 195 shows physical paths necessary for the execution of alpha paths.

Automatic Parallelization

Figure 196:
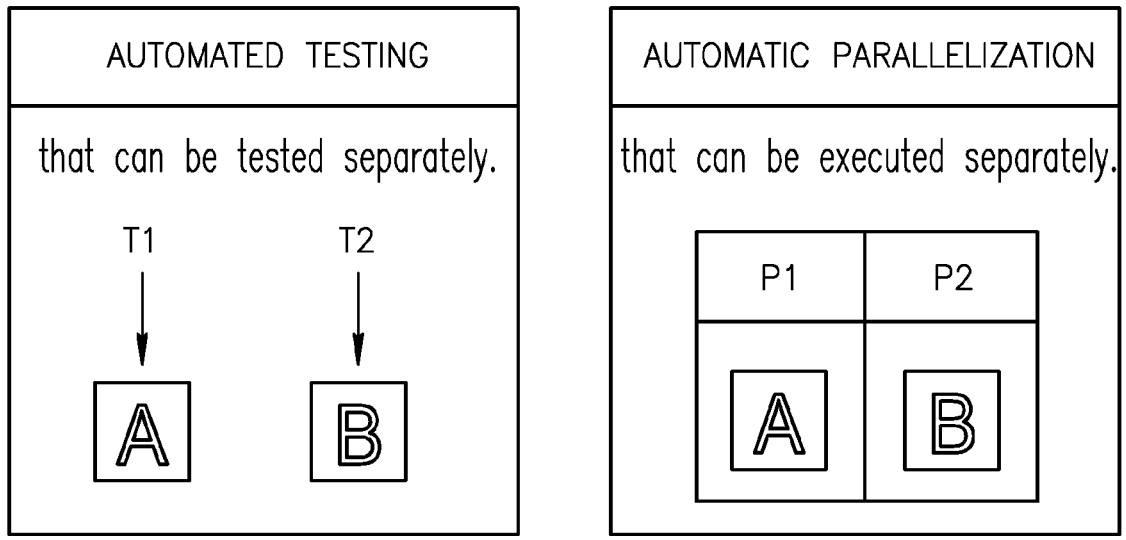

FIG. 196 illustrates that discovering independence is fundamental problem

Figure 197:
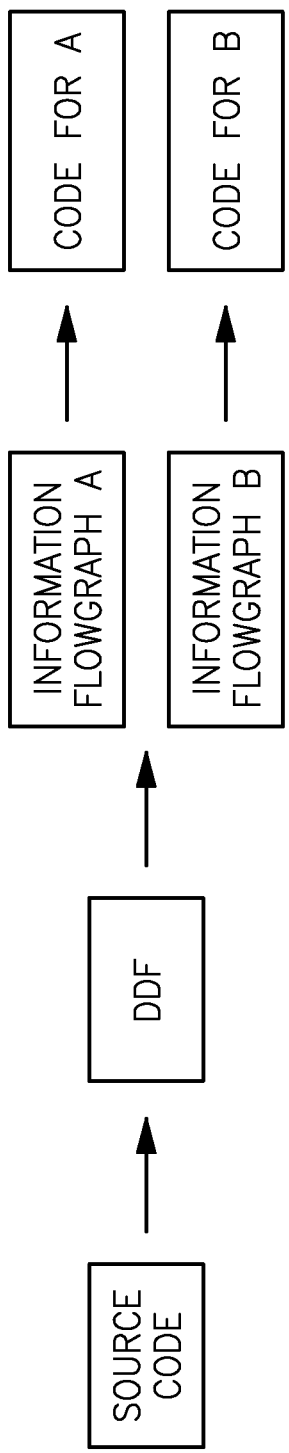

FIG. 197 shows overall process steps in information flow analysis.

Figure 198:
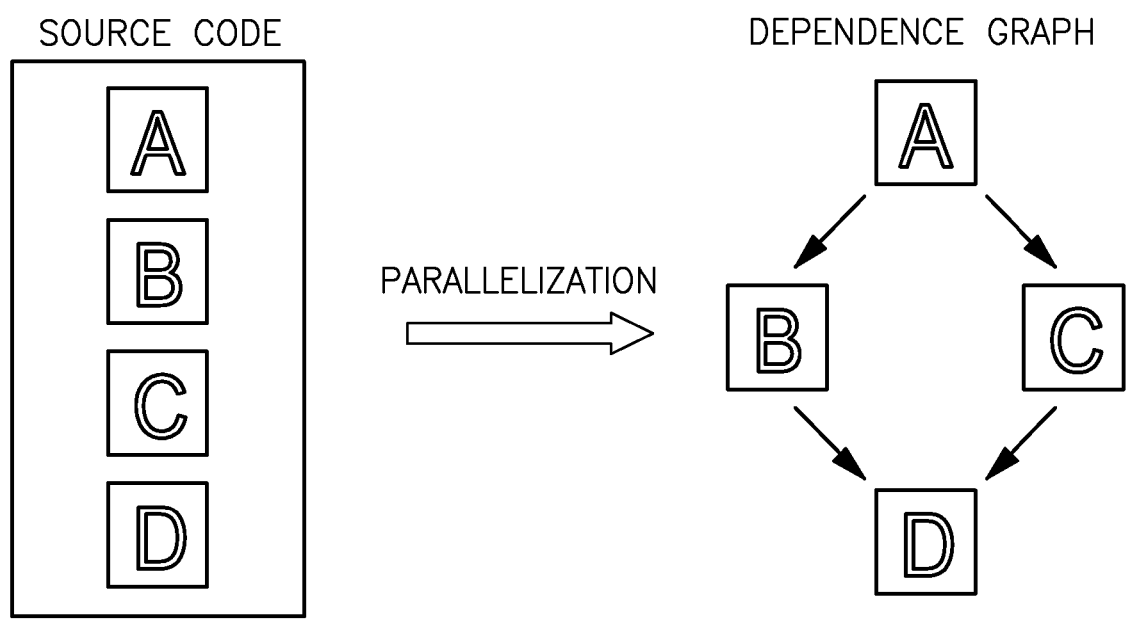

FIG. 198 shows parallelization via dependence graph.

Figure 199:
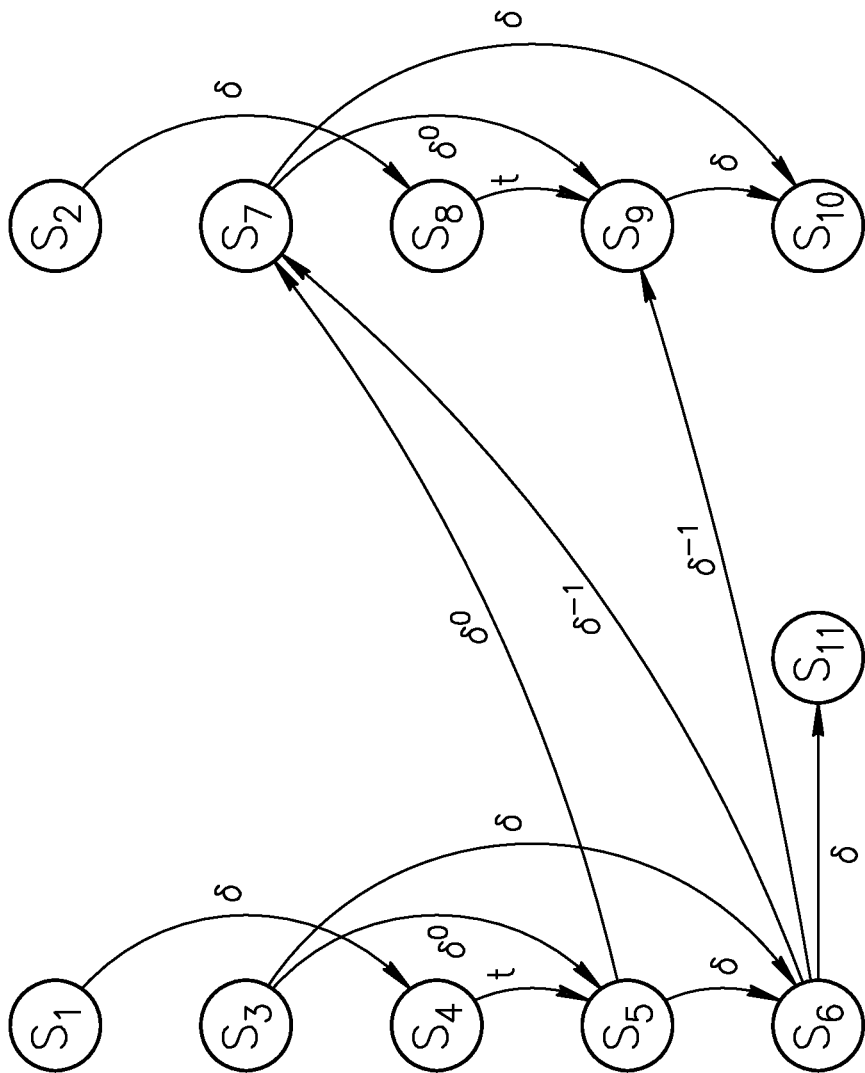

FIG. 199 shows pseudocode and dependence graph of example for parallelization.

FIG. 200 shows pseudocode and DDF of example for parallelization.

Figure 201:
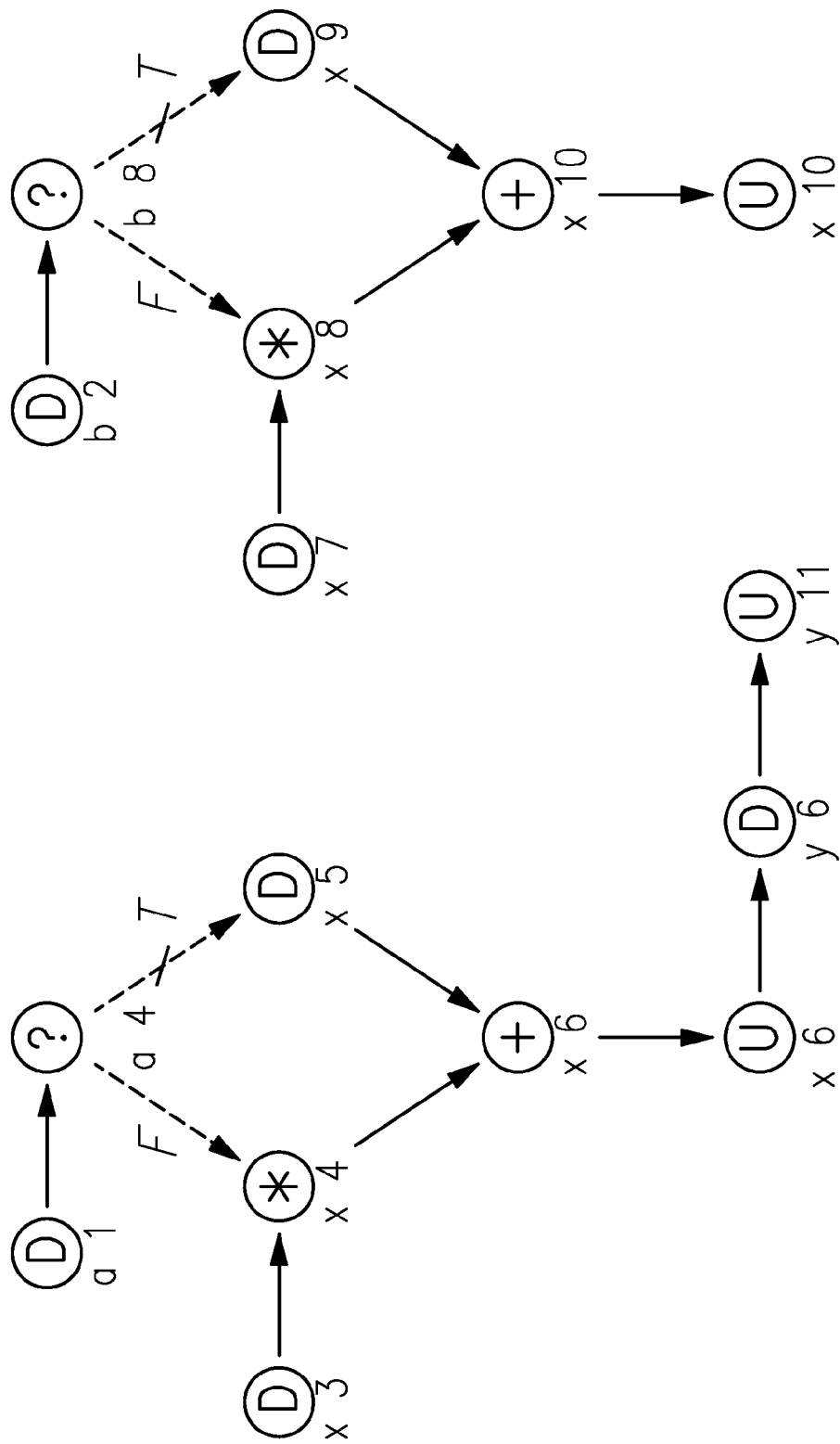

FIG. 201 shows two information flowgraphs produced by information flow analysis.

Figure 202:
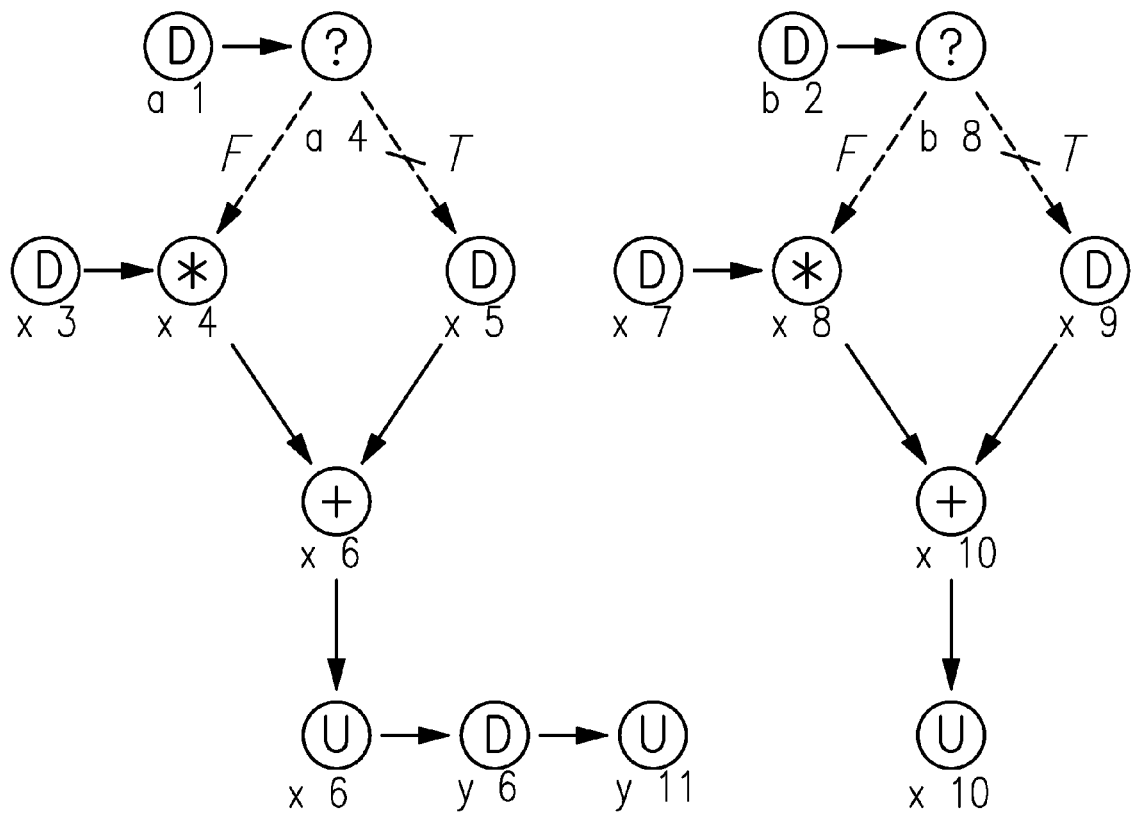

FIG. 202 shows two independent tasks produced by information flow analysis.

DESCRIPTION

General Description

Program analysis refers to some means of analyzing a computer program (or similar system) based on its static structure (for software, at compile-time) or dynamic structure (for software, at run-time). The systems addressable by the present invention fall within the general class of systems that can be described by languages (most notably computer programming languages) that possess semi-structured control-flow. This class includes computer programs developed with those languages most widely employed in industrial practice (such as Java).

Flow Analysis

The identification of independent processes is a fundamental problem in program analysis, and therefore in the numerous essential specialties of computer science which programs analysis underlies. Informally speaking, process A and process B are independent if changing the ordering of the processes (for example, from "A before B" to "B before A") does not change the behavior of the system. If process A supplies a necessary input for process B, then the two processes are not independent, and process A must precede process B to avoid incorrect system behavior. The constraint imposed by A's supplying a necessary input for B can be modeled by a flow from A to B. In this context, the flow is called a "necessary" flow because it represents a necessary ordering of A and B.

If process A can somehow control whether process B occurs, then there is control flow from A to B. If process A and process B both occur and A supplies data to B, then there is a data flow from A to B. These flows are often represented by graphs, in which A and B are nodes of the graph and flows are edges of the graph. A path is a series of edges in the graph. In an ideal representation for flow analysis, if there is a necessary flow from A to B, then there is a path in the graph from A to B. Conversely, in an ideal representation, if processes A and B are independent, then there is no path in the graph from A to B.

Traditional models used in program analysis have been typically based on analysis of either control flow or data flow but not both. The main limitation of analyzers based exclusively on control flow is that, in general, not all paths in the control flowgraph represent necessary flows. The main limitation of analyzers based exclusively on data flow is that the data flowgraph is not capable of representing all necessary flows. More recent systems for program analysis have attempted to combine the control flowgraph with the data flowgraph in some manner to overcome these limitations. These systems inherit at least some limitations of the traditional models, since their methods for combining the two forms of flow analysis, which have been empirically derived, do not represent a full unification.

Information Flow Analysis

The foundation for the advancements presented herein is the signal flow algebra, which is a mathematical system for describing necessary flows. Signal flow analysis was originally developed in the middle of the 20th century for analyzing analog electronic circuits. The signal flowgraph represented the equations governing voltages and current flow in these circuits.

By analogy, the information flowgraph presented herein represents the signal flow equations governing the control and data flow in computer programs and similar systems. The signal flow algebra disclosed herein, being non-associative, bears little resemblance to the signal flow algebra underlying circuit analysis, which is similar to the algebraic rules of arithmetic.

The information flowgraph is the central part of the flow analyzer disclosed in this patent. The information flowgraph is a single, unified representation of both control and data flow. The information flowgraph is closer to an ideal representation of flow than its predecessors because it has a sound mathematical basis. (Note that a static representation that consists exclusively of necessary flows is a theoretical impossibility for the general class of computer programs.)

The main features of the information flow analyzer are:
- a sound mathematical foundation
- an implementation based on graph transformation (see overview in this section under the heading, "Process") versus the iterative algorithms typically used by other methods
- a physical model (see "the flow of state" in the section, "Intra-method Graphs")
- native support for semi-structured constructs (break, multiple returns in a single method, continue, exceptions) versus the structuring preprocessor typically required for other methods Applications The implications of this theoretical and practical advancement is a program analyzer better suited for the challenges posed by contemporary trends, such as multicore processors, highly parallel supercomputers, and cloud computing. Although program analysis has many applications to software and computer controlled systems, two are highlighted in this patent application. The potential benefits of the information flow analyzer for transforming programs to run on multicore processors and highly parallel systems are demonstrated in the section "Automatic Parallelization." The application of the information flow analyzer to software testing is introduced in the section "Path Testing." The central part of information flow analysis, the information flowgraph, is an inherently parallel representation of flow and is therefore ideally suited to these applications.

The effectiveness of any program analysis method for these applications depends directly upon its precision. As demonstrated in the section "Automatic Parallelization," information flow analysis offers greater precision than traditional methods such as dependence analysis, because of its ability to distinguish necessary and unnecessary flows.

In general, as noted above there is a wide range of applications of information flow analysis. The present invention is capable of analyzing virtually any system of generalized flow models representable as directed or semi-structured flows (including, in addition to control and data flows in computer programs, flows of gas, power, and water in utility systems) in order to determine the independent flows that may occur in the represented system.

For example, if flow paths of an arbitrary system (such as a community water supply system) can be represented as a semi-structured flow (such as DDF, an intermediary language described elsewhere) that can be translated (e.g., via preprocessors or other means) into a format suitable for input into the central process of the present invention, then the present invention can precisely identify the independent flows of the subject system.

In the case of the example community water supply system having multiple sources of supply, multiple consumers, and numerous flow paths, knowing the system's independent flows would allow the determination of which consumers would be affected by a shock to the system such as pump failure or sabotage at a particular point. Conversely, given a set of affected consumers, knowing the system's independent flows would allow the determination of which upstream points could be responsible for a particular symptom. Furthermore, knowing the system's independent flows would enable maximally efficient testing of the system flows, as well as enable the optimization of energy used to meet the needs of various subsets of consumers (in this example, water need only flow along the shortest path from suitable supplies to the consumers who currently need it).

Overview of Process

In a preferred embodiment, each conceptual process and/or process step described herein is loosely coupled to the others, and may be multiply instantiated, any instance of which may be implemented as an application-specific hardware device (e.g., ASIC), a software process, or in any of various hybrid combinations, such that the various instantiations of processes and/or process steps may operate independently, asynchronously, and in parallel.

Since the inputs to the analysis to be performed may span from relatively simple to arbitrarily complex, and any number of such inputs may need to be analyzed at the same time, the process described herein scales downward as easily as upward, and is straightforward to implement on a wide variety of digital processing architectures. In particular, the process lends itself to hardware implementation and/or acceleration, yet is also well-suited for massively parallel supercomputing and cloud-computing architectures.

Figure 1A:
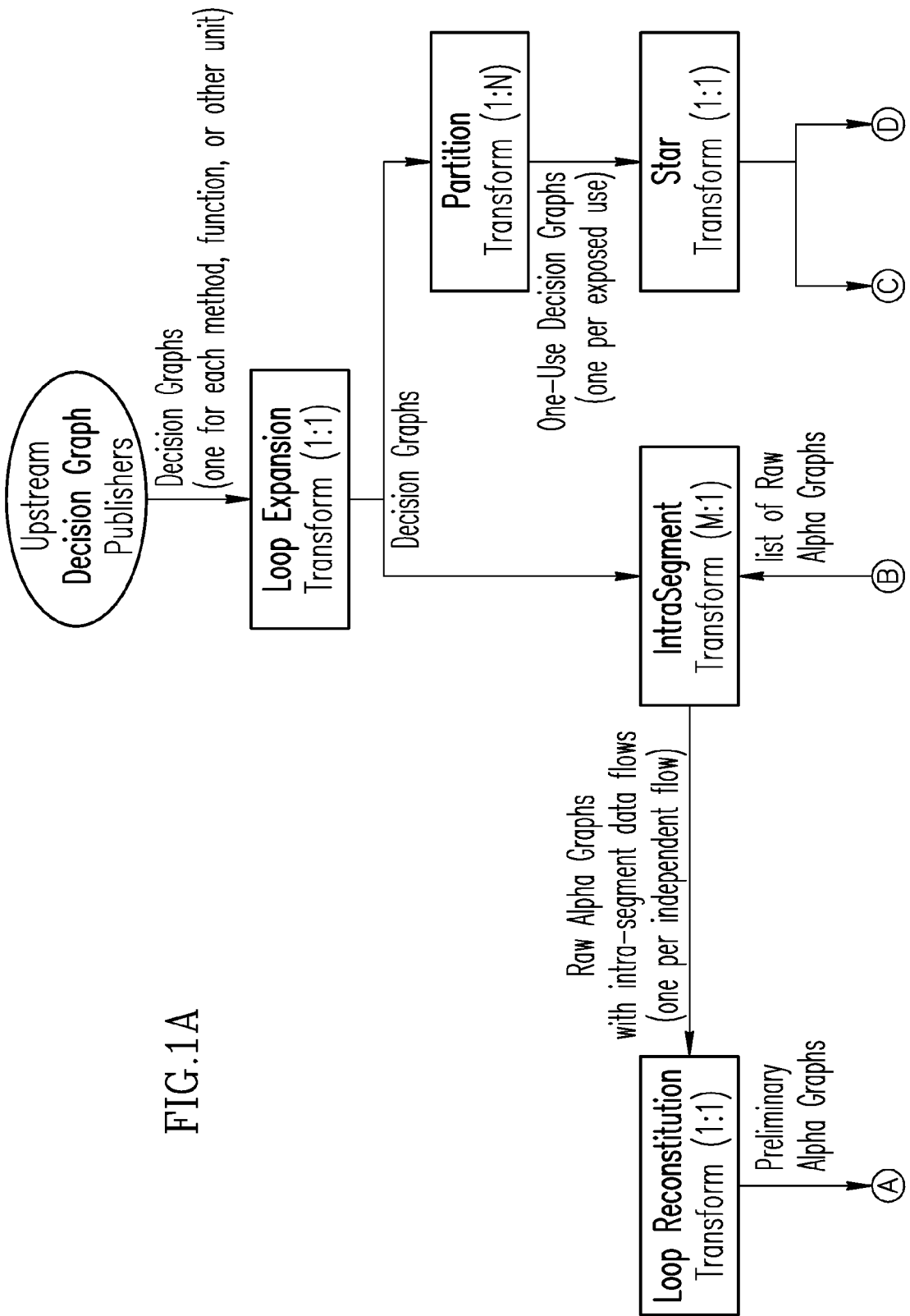
FIGS. 1A and 1B show process steps in the alpha transform.
Figure 1B:
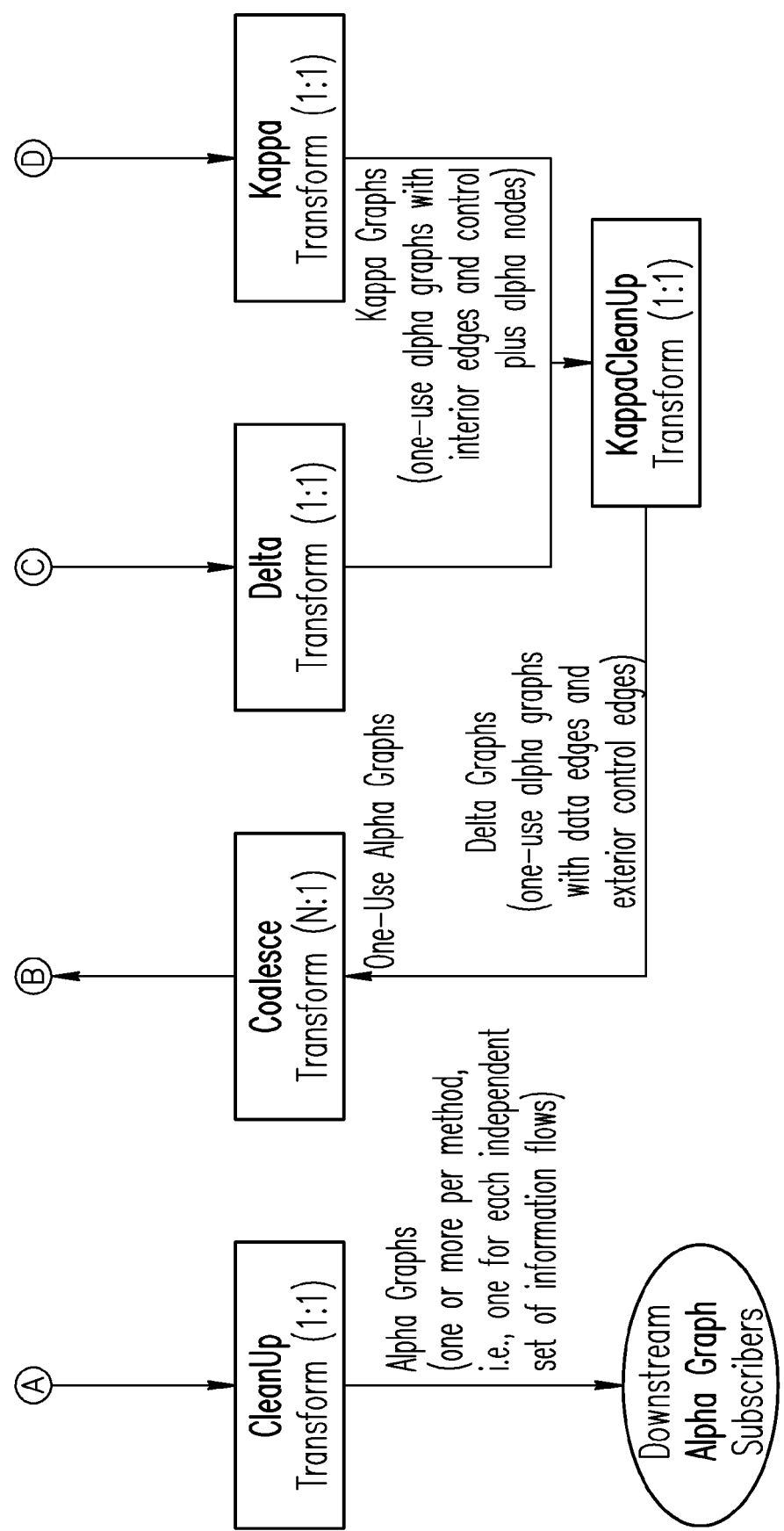

The central process in the information flow analyzer is called the "alpha transform," as depicted in FIGS. 1A and 1B. In a preferred embodiment, the alpha transform is preceded by one or more application-specific preprocessors (collectively depicted by the single oval in FIG. 1A, labeled "Upstream Decision Graph Publishers") that prepare and submit inputs to the central process, and succeeded by one or more application-specific postprocessors (collectively depicted by the single oval in FIG. 1B, labeled "Downstream Alpha Graph Subscribers").

The overall effect of the alpha transform is to convert each decision graph received as input to one or more alpha graph outputs, each of which describes a set of independent flows discovered by analyzing the input using the method of the present invention. Subsequently, the alpha graph outputs may be post-processed (e.g., by downstream "subscribers") to achieve application-specific goals such as automatic test-case generation (approximating all-paths testing), automatic parallelization of software codes (such as for maximizing achievable throughput from multicore or massively parallel processors), and other uses.

As noted above, in a preferred embodiment the alpha transform is preceded by one or more preprocessors (collectively depicted by the single oval in FIG. 1A). These preprocessors collectively convert an external flow model representation (for example, the source code of a software unit, such as a Java method) to a decision graph, which is the input of the alpha transform. The decision graph generated via preprocessing is then "pushed," "published," or otherwise made available as input to one or more downstream instantiations of the alpha transform process.

The operation of the aforementioned preprocessors will vary, depending on the system and flow model. For example, the use of various programming languages or object codes as inputs to be analyzed in a software system may call for diverse preprocessors. In some scenarios, a single preprocessor may directly convert the available representation (e.g., source language) of a system into the decision graph format needed as input by the alpha transform process, whereas other scenarios may call for a multiplicity of preprocessors.

In this summary, we assume a preferred embodiment having a standard preprocessing architecture where three loosely coupled preprocessors collectively implement the requisite preprocessing sequence conceptually encapsulated by the single oval in FIG. 1A.

In a preferred embodiment, the first preprocessor (sometimes referred to in the art as a "front-end") converts the representation of the system to be analyzed (e.g., source code) to an optional intermediary language called DDF that may serve as a target language for a wide variety of front-end preprocessors. This front-end preprocessor may be implemented most straightforwardly as a parser using compiler-writing techniques well known in the art. Note that DDF is a human-readable form that may also be manually generated, such as for testing purposes.

In a preferred embodiment, the second preprocessor, which also may be implemented as a parser, converts the DDF output received from a front-end preprocessor (or, in some cases, manually generated DDF) to another intermediary form called a "decorated decision graph."

In a preferred embodiment, the third preprocessor accepts decorated decision graphs and converts them to the decision graph format required as input to the alpha transform process depicted by the boxes in FIGS. 1A and 1B. This third preprocessor is a graph transformation which expands compound predicates as described in the section "Compound Predicates," and a further example of its operation appears in the section "Path Testing."

In an alternate embodiment of preprocessors, the three conceptual preprocessors may occur singly or in any combination that provides a decision graph suitable for use by the alpha transform process.

The remainder of this section presents a synopsis of how the graph transformations in FIG. 1A and FIG. 1B constitute the alpha transform. Since the alpha transform was designed for execution on highly parallel machines, the opportunities for parallel execution are indicated in the figures and in the text below. For a description of the primary transforms of the alpha transform, the sections cited should be consulted. The section "Pseudocode" provides a detailed description of the graph transformations.

1. As depicted in FIG. 1A, the first step of the alpha transform is the loop expansion transform. This transform is described in the section "Loop Transform," and an example of the input and output of the loop transformation appears in the section "Intra-method Graphs." For every decision graph input to the loop expansion transform, there is exactly one decision graph output, and it is pushed, published, or otherwise made available as input to the downstream transforms "Partition" and "IntraSegment," which are also depicted in FIG. 1A. In a preferred embodiment, the transforms "Partition" and "IntraSegment" may operate asynchronously and in parallel. Furthermore, each input received from the loop expansion transform by intrasegment transform comprises part of a mated pair of inputs needed by the intrasegment transform, and which may rendezvous at or before the intrasegment transform (described further below).

2. As depicted in FIG. 1A, the second step of the alpha transform is the partition transform, which converts each decision graph received from transform to a set of one-use decision graphs (i.e., typically there are multiple outputs for each input, such that there is one output for each "exposed use" encountered in the input). (Note: This is not a formal partition of a set in the mathematical sense, since the one-use decision graphs may overlap. The analogy is that, like a partition, the union of the one-use decision graphs does equal the original decision graph and each one-use decision graph in the "partition" is unique.) The one-use decision graphs are pushed, published, or otherwise made available as input to the one or more downstream processes implementing the star transform of FIG. 1A (and which, in a preferred embodiment, operate in parallel).

3. As depicted in FIG. 1A, the third step of the alpha transform is the star transform. In this step, each one-use decision graph received from an instantiation of the partition transform is processed by an instance of the star transform, and multiple instances of star transform may be executed in parallel. This transform is described in the section "Star Transform." For every one-use decision graph input to the star transform, there is exactly one delta decision graph output, which is pushed, published, or otherwise made available as input to both of the downstream transforms "Delta" and "Kappa." As depicted in FIG. 1B, transforms "Delta" and "Kappa" are independent and may operate in parallel. Although the outputs to the downstream transforms "Delta" and "Kappa" are identical, in the context of the delta transform, where it is viewed as input, it is called a "delta decision graph." Likewise, in the context of the kappa transform, where it is also viewed as input, it is called a "kappa decision graph." The delta decision graph and its corresponding kappa decision graph are mated pairs that may be processed independently and in parallel by processes implementing transforms "Delta" and "Kappa."

4. As depicted in FIG. 1B, the fourth step of the alpha transform is the delta transform, which is described in the section "Delta Transform." Each delta decision graph processed by the delta transform yields a single one-use alpha graph called a delta graph.

5. As depicted in FIG. 1B, the fifth step of the alpha transform is the kappa transform, which is described in the section "Kappa Transform." Each kappa decision graph processed by the kappa transform yields a single one-use alpha graph called a kappa graph.

Note: A mated pair of one-use alpha graphs consists of the delta graph and kappa graph produced from a mated pair of decision graphs. For every mated pair of one-use decision graphs input to the transforms "Delta" and "Kappa," there is exactly one mated pair of one-use alpha graphs output, the parts of which are pushed, published, or otherwise made available as input to the downstream transform "KappaCleanUp," as depicted in FIG. 1B. In a preferred embodiment, the delta and kappa transforms may operate asynchronously, with the rendezvous of their mated-pair outputs occurring downstream (e.g., at or before the "KappaCleanUp" transform).

6. As depicted in FIG. 1B, the sixth step of the alpha transform is the kappa cleanup transform. In this step, each mated pair of one-use alpha graphs (i.e., a mated pair comprising a delta graph from the delta transform and a kappa graph from the kappa transform) is submitted to the kappa cleanup transform, which, in a preferred embodiment, comprises multiple lower-level kappa cleanup transforms operating asynchronously and in parallel. This transform is described in the section "Kappa Cleanup Transform." For every mated pair of one-use alpha graphs input to an instance of the kappa cleanup transform (multiple such instances may operate asynchronously and in parallel), there is a single one-use alpha graph output, which is pushed, published, or otherwise made available as input to the downstream "Coalesce" transform.

7. As depicted in FIG. 1B, the seventh step of the alpha transform is the coalesce transform. In this step, multiple one-use alpha graphs from the kappa cleanup transform that share one or more common alpha nodes are merged together and a single list of raw alpha graphs is generated for each such merged result, which list is then pushed, published, or otherwise made available as input to the downstream transform "Intra-Segment." Furthermore, each list of raw alpha graphs received from the coalesce transform by the downstream coalesce transform comprises part of a mated pair of inputs needed by the coalesce transform, and which may rendezvous at or before the coalesce transform (described further below).

8. As depicted in FIG. 1A, the eighth step of the alpha transform is the intra-segment transform, described in the section, "Delta Back." In this step, multiple alpha graphs identified by the coalesce transform that are connected by intra-segment data flows are merged together. The intra-segment data flows are obtained from the corresponding decision graphs produced by the loop (expansion) transform. Despite the multiple alpha graphs that may be identified in the inputs to the intra-segment transform, a single raw alpha graph is output for each independent flow represented in the multiple inputs, and each such alpha graph is pushed, published, or otherwise made available as input to the downstream transform "Loop Reconstitution."

9. As depicted in FIG. 1A, the ninth step of the alpha transform is the loop reconstitution transform, which is described in the section, "Loop Transform." For each raw alpha graph received from an instance of the intra-segment transform, exactly one preliminary alpha graph is generated and pushed, published, or otherwise made available as input to the downstream transform "CleanUp."

10. As depicted in FIG. 1B, the tenth and final step of the alpha transform is the cleanup transform, which is described in the section "Cleanup Transform." For each preliminary alpha graph received from an instance of the loop reconstitution transform, exactly one alpha graph is generated and pushed, published, or otherwise made available as input to any downstream consumers of alpha graphs (e.g., subscriber processes, represented by the oval in FIG. 1B). Each such alpha graph represents an independent set of information flows, the identification of which is the object of the present invention.

As noted earlier, the alpha graph outputs may be post-processed (e.g., by downstream "subscribers" collectively represented by the oval in FIG. 1B) to achieve application-specific goals such as automatic test-case generation (approximating all-paths testing), automatic parallelization of software codes (such as for maximizing achievable throughput from multicore or massively parallel processors), and other uses. Refer to the sections "Path Testing" and "Automatic Parallelization" for further discussion of these example applications and real-world uses.

1 Intra-Method Graphs

1.1 Introduction

The algorithm for information flow analysis is based on graph transformation. This section describes the two fundamental graphs that constitute the input and output of the algorithm operating at the intra-method level:

decision graph alpha graph

The input of the algorithm is a decision graph. The decision graph is a hierarchical representation of control flow, annotated with the data elements described below. The decision graph is derived from source code in a semi-structured language, such as Java, or an intermediary representation of method structure. The intermediary representation is typically an annotated control flowgraph, which may be presented pictorially, or encoded as an XML file or DDF file. The latter is a decision data flow language file, and is employed in some of our examples.

The output of the algorithm is an information flowgraph at the intra-method level or simply alpha graph. The descriptor, "alpha," denotes information flow at the intra-method level. If the method contains independent information flows, a single decision graph is transformed into multiple alpha graphs.

1.2 Data Elements

The data elements are the memory access elements and intra-segment data flow elements, which are constructed from the memory access elements.

1.2.1 Memory Access Elements

A memory access element represents a memory read or write or in the case of a predicate, one or more memory reads. The locations in memory being accessed are represented by simple variables. A definition or use has an associated variable. A predicate has an associated vector of uses. The information flow predicate is not, in general, the same as a predicate in a semi-structured language, such as a Java predicate. An information flow predicate occurs in a single segment, so if one use in the predicate is executed, then all uses in the predicate are executed. An information flow predicate contains only uses and, unlike a Java predicate, cannot contain definitions or intra-segment data flow elements.

The memory access elements are listed in the table shown in FIG. 2.

1.2.2 Intra-segment Data Flow Elements

A data flow element is an ordered pair of standard memory access elements. The first memory access element in the pair is the input element and the second is the output element. A data flow that occurs within a single program segment (see below) is called an intra-segment data flow. The intra-segment data flow elements are listed in the table shown in FIG. 3.

Intra-segment data flow elements create two classes of memory access elements: exposed and unexposed. Exposed memory access elements can participate in inter-segment data flows, whereas unexposed memory access elements are "hidden" from data flows outside of the segment containing them.

An exposed definition is a definition that is live upon exit from the segment. For example, in the segment:

x=1
y=x
x=2 the exposed definition of x is contained in the statement "x=2."

An exposed use is a use that can be reached by a definition outside of the segment. For example, in the segment:

z=x
x=1
y=x the exposed use of x is in the statement "z=x." A segment can have only one exposed definition and one exposed use of a specific variable.

As shown in the table in FIG. 3, an intra-segment flow is represented in the DDF language by the token du or the token ud followed by a list of variables. In DDF, a list of variables consists of the variable names, separated by commas and enclosed in parentheses. The du token is always followed by a list of two variables and represents an intra-segment du-pair. The first variable in the list is the variable in the input definition and the second variable in the list is the variable in the output use.

The ud token is followed by a list of two or more variables and represents a ud-join. If the list contains more than two variables, then the ud-join represents a set of two or more ud-pairs which share a common output definition. Each variable in the list except the last, is a variable in an input use. The last variable in the list is the variable in the output definition. A ud token followed by a list of exactly two variables is the degenerate form of a ud-join and represents a single ud-pair. The first variable in the list is the variable in the input use and the second variable is the variable in the output definition.

For example, in the Java fragment:

z=x+y;

there are two intra-segment data flows. The first data flow is from the use of x to the definition of z, and the second data flow is from the use of y to the (same) definition of z. These two data flows (ud-pairs) are represented in DDF by the single ud-join:

ud(x,y,z)

since the two pairs share the common definition of z.

This syntax convention clearly distinguishes the case in which several ud-pairs share a common output definition, as in the above example, from the case in which several ud-pairs have distinct output definitions. An example of the latter case is the Java fragment:

z=x;
z=y;

In this fragment, the first definition of z is anomalous, since it is killed by the second definition of z. Nevertheless, there are two distinct definitions of the variable z, which is represented in DDF by the two ud-joins:

ud(x,z)
ud(y,z)

In general, a source code expression of the general form:

y=f(x1, x2, . . . , xn)

is represented in DDF by the ud-join:

ud(x1, x2, . . . , xn, y)

1.3 Augmented Control Flowgraph

The augmented control flowgraph is introduced, since it is useful for describing basic concepts related to the decision graph.

1.3.1 Nodes

The nodes of the standard annotated control flowgraph are the S-Nodes. Paige, M. R., "On partitioning program graphs," IEEE Trans. Software Eng., Vol. SE-3, November 1977, pp. 386-393.

Information flow analysis uses a new form of annotated control flowgraph called an augmented control flowgraph, which has the additional nodes:

origin of the root edge
origin of decision entry edge
origin of decision exit edge (which is bypassed by at least one outcome)
origin of data element edge
origin of break edge (which is preceded by a data element edge)
origin of loop predicate edge
origin of loop exit edge These nodes are added for proper generation of the decision graph.

1.3.2 Edges

The edges of the standard annotated control flowgraph are segments. Paige, M. R., "On partitioning program graphs," IEEE Trans. Software Eng., Vol. SE-3, November 1977, pp. 386-393. Any control flow path may be expressed as a sequence of segments. In information flow analysis, a segment is an edge of the augmented control flowgraph. The types of edges (or segments) of an augmented control flowgraph consists of those found in conventional annotated control flowgraphs plus several new types:

root edge
decision entry edge
decision exit edge
data element edge
break edge
loop entry edge
loop predicate edge
loop exit edge
initial outcome edge
simple outcome edge (normal or break)

Only certain edges may have associated data elements: a decision entry edge, a data element edge, a loop predicate edge and a simple (normal) outcome edge. When the flowgraph is rendered graphically, the data flow elements appear as annotations.

Each control flow edge has an identifier. The identifier of the edge appears immediately before the left parenthesis in the symbol for any memory access or intra-segment data flow element contained in that edge. In the Figures, the identifier of the edge is a subscript. For example, $d_2(x)$ represents the definition of 'x' which is contained in edge #2, and $?_3(a,b,c)$ denotes the predicate in edge #3 that represents uses of variables 'a', 'b' and 'c'.

A break edge is used to represent a break, return or exception. The break edge transfers control to the exit of a structure containing the break. The structure may be a decision, loop iteration or a complete loop. If the break edge is on a path in an outcome of decision A, then control can be transferred to the exit of A. Similarly, for loops, if the break edge is on a path in loop A, then control can be transferred to the exit of the current iteration or to the complete exit of loop A or to the exit of loop B, where loop A is on a path in loop B.

The DDF syntax for the break statement is:

break <target> where <target> is the label at the beginning of the statement containing the target predicate. If B is the target predicate, then control will be transferred to the exit of decision (or loop) B.

Similarly, the DDF syntax for the continue statement is:

continue <target>

1.4 Decision Data Flow Language

The Decision Data Flow language (DDF) is a Java-like language in which statements represent control flow and data flow elements. Control flow in DDF is represented by four constructs:

the if statement,
the while statement
the break statement
the continue statement DDF is very low level, and serves as a machine language. Higher level structure, such as compound predicates, are translated into DDF prior to analysis. Data flow sources and sinks are represented by memory access and intra-segment data flow elements.

A single control flow segment can be represented in DDF by a list of data elements. The elements are separated by commas. Since a basic block is a program segment, a single DDF statement may correspond to several Java statements.

The Java source code and DDF for the signxy(int x,int y) method are presented in FIG. 4. This example will be used to illustrate the construction of a decision graph. The method takes as its argument two integers, x and y, and sets the sign of the product (sxy) to +1 if the product of x and y is positive and to −1 if the product of x and y is negative.

1.5 Decision Graph

The decision graph is an ordered tree representation of an annotated control flowgraph. Each node in the decision graph is associated with an edge of the control flowgraph.

1.5.1 Nodes

There are three basic types of nodes in the decision graph:
sequence node SNode
end node EndNode
divergence node DNode The EndNode is an abstract type. There are three types of end nodes:
leaf node LNode
break node BNode
convergence node CNode There are two special types of CNode:
loop entry node LoopEntryNode
loop exit node LoopExitNode There is one special type of DNode: loop predicate node WNode.

A class diagram for the decision graph Node is shown in FIG. 5.

Each decision graph Node has
a reference to the decision graph in which it appears
an identifier (which consists of an index number and loop instance vector)
a parent node

1.5.1.1 SNode

The sequence node or SNode represents sequential execution. The edge associated with the sequence node is executed first, then each of its child nodes, proceeding left to right. In addition to decision graph, identifier and parent node, each SNode has:
a vector of child nodes
a vector of interior nodes The SNode may have any number of child nodes. Note that an SNode has no associated data elements. An example sequence node is illustrated in FIG. 6.

1.5.1.2 EndNode

The EndNode (end node) represents a single segment. An EndNode has no children. In addition to decision graph, identifier and parent node, an EndNode has:
an antecedent
interior nodes

1.5.1.2.1 LNode

An LNode (leaf node) is a "normal" EndNode, in the sense that it does not represent a break, a decision exit or loop entry. An LNode has a vector of data elements. An example of an LNode is Node #4 in the decision graph shown in FIG. 8. This LNode has an associated data element, a definition of the variable 'sx'. The LNode has no graphic symbol associated with it.

1.5.1.2.2 BNode

A BNode (break node) is an EndNode that represents a break, continue, return or exception segment. A BNode has a target ID, which is the ID of the predicate node (DNode) of an enclosing decision or loop. A BNode contains no data elements. Since a BNode is an Endnode, it has no child nodes. An example of a BNode is Node #6 in the decision graph shown in FIG. 9. This BNode represents control transfer to its target, DNode #3. The transfer of control is graphically represented by an arrow from the index of the node to the index of its target.

1.5.1.2.3 CNode

A CNode (convergence node) is an EndNode that represents the convergence of data flows. A CNode is used to represent the convergence of data flow in a decision exit. In FIG. 9, CNode #8 represents the convergence of data flow in the normal exit of the decision with DNode #5 as its predicate. A CNode is graphically represented by a '+'.

# 1.5.1.2.3.1 LoopEntryCNode

A LoopEntryCNode is a special type of CNode (and therefore an EndNode) that represents the convergence of data flow in the entry of a loop. The converging data streams emanate from outside the loop and from streams within the loop body that do not exit the loop, such as those formed by continue statements. In FIG. 13, LoopEntryCNode #3 represents the convergence of data flow in the entry of the loop which has WNode #4 as its predicate.

# 1.5.1.2.3.2 LoopExitCNode

A LoopExitCNode is a special type of CNode (and therefore an EndNode) that represents the convergence of data flow in the exit of a loop. The converging data streams emanate from the false outcome of the loop predicate and from break statements that target the loop exit. In FIG. 13, LoopExitCNode #14 represents the convergence of data flow in the exit of the loop which has WNode #4 as its predicate.

1.5.1.3 DNode

The divergence node or DNode represents alternation. The DNode depicts a decision predicate. In addition to decision graph, identifier and parent node, a DNode has:
an antecedent
two child nodes, one for each decision outcome (assuming neither outcome is null)

a vector of breaks a vector of uses, one use for each variable in the predicate

The predicate segment associated with the decision node is executed first. Evaluation of the predicate (true or false) determines which of the two child nodes is executed next. By convention, the first child node represents the false outcome and the second child node represents the true outcome. An example decision node is illustrated in FIG. 10.

It is possible for a DNode to have only one child or no children at all. This type of DNode occurs when one or both outcomes are "null outcomes." A null outcome is an outcome which contains no uses, no (live) definitions and is not a dcco. For example, an interior use partial outcome is not a null outcome, because it contains a use and is a dcco.

This document describes decision graphs (and alpha graphs) based on Boolean logic. A Boolean logic predicate has two possible values: false or true. It is possible to extend these graphs (and the alpha transform) to other logics by using n-ary predicates which can take on n possible values. In the n-ary graphs, a decision has n outcomes, a DNode may have up to n children, and its image, a predicate alpha node, may have up to n sets of children.

1.5.1.3.1 WNode

The WNode (while node) represents repetition. The WNode depicts the predicate of a while loop and is a special type of DNode. In addition to decision graph, identifier and parent node, a WNode has:

a false child which represents termination of the loop a true child which represents the body of the loop a vector of uses (one use for each variable in the loop predicate)

An example while node is illustrated in FIG. 11.

The WNode is always preceded by a LoopEntryCNode which represents the entry of the loop. In FIG. 11, node B is the LoopEntryCNode associated with the loop predicate node C. The predicate is evaluated before each iteration of the loop. If the predicate is true, then the loop body is executed, the loop entry node is executed again and the predicate is evaluated another time. If the predicate is false, then the loop is exited. As in the DNode, the first child node represents the false outcome (termination of the loop) and the second child node represents the true outcome (execution of one or more iterations of the loop).

The WNode always has as its successor, a LoopExitNode which represents the normal exit of the loop. In FIG. 11, node F is the LoopExitNode associated with the loop predicate node C. This node represents the convergence of data flow in the false outcome of loop predicate node C. If there is a break in the loop body which has this WNode as its target, this node represents the convergence of flow when the break merges with the false outcome in the loop exit.

1.5.2 Edges

The edges of the decision graph represent parent-child relationships between nodes.

1.5.3 Normal Form

The alpha graph transform takes as its input a decision graph, which must be in normal form to be processed properly by the algorithm.

The rules for the normal form of a decision are:

the parent of the DNode is an SNode the successor of the DNode is a CNode

If A is a DNode and B is its parent SNode, then the successor of A is that child of B which immediately follows A. The successor represents the decision exit. The decision graph of the signxy(int x,int y) example is shown in FIG. 8. Note that this decision graph is in normal form: the immediate successor of DNode #3 is CNode #6 and the immediate successor of DNode #7 is CNode #10.

The rules for the normal form of a while loop are:

the parent of the WNode is an SNode the predecessor of the WNode is a LoopEntryCNode the successor of the WNode is a LoopExitCNode FIG. 12 displays the annotated control flowgraph which corresponds to the decision graph in FIG. 13. The convergence of data flow in the entry of the loop is represented by edge #3 in the control flowgraph and by LoopEntryCNode #3 in the decision graph. The loop in this example has a break with the loop predicate (WNode #4) as its target. The loop exit is represented by edge #14 in the annotated control flowgraph and by LoopExitCNode #14 in the decision graph.

A data element edge is an edge of the annotated control flowgraph representing the outcome of a decision which contains a data element. For example, in FIG. 12, the true (break) outcome of the decision with predicate ?8(x) contains a data element, so break edge #10 is added as a data element edge to hold the data element, d10(x).

The rules for the normal form of a data element edge are:

the parent of the LNode (which represents the data element edge) is an SNode the parent of the SNode is a DNode In FIG. 13, the data element edge mentioned above is represented by LNode #10. Note that its parent is SNode #9, and the parent of SNode #9 is DNode #8.

1.6 Alpha Graph 1.6.1 the Flow of State

The state at a particular point in a program consists of its execution state (not yet executed, executable and executed, neither executable nor executed) and the values of the program variables. The execution state is the control state, whereas the values of the program variables constitute the data state. As the program is executed, state information is propagated from the entry nodes to the exit nodes of the information flowgraph.

An information flowgraph is an explicit representation of the flow of control state and data state in a program. The alpha graph is an information flowgraph that represents flow at the intra-method level.

The alpha graph can be described in terms of a mathematical model, an algorithmic model or a physical model. The following description emphasizes the physical model, with informal references to the data structures of the algorithmic model, since this approach appeals to physical intuition.

In the physical model, the alpha graph is viewed as a collection of control and data flows. Each data flow (or stream) has an associated variable. For example, the data flow from d2(x) to d10(x) is labeled by the variable 'x'.

1.6.1.1 Control State

Control flow is the flow of control state from one node in the alpha graph to another node in the alpha graph. The control state assigned to nodes or edges of the alpha graph can take on one of three values:

| | |
|---|---|
| CLEAR | not yet executed (initial state) |
| PASS | executable and executed |
| BLOCK | neither executable nor executed |

1.6.1.2 Data State

Data flow is the flow of data state from one node in the alpha graph to another node in the alpha graph. The data state of a predicate alpha node is the set of values bound to the variables in the predicate. The data state of any other type of alpha node is the value bound to the single variable associated with that node.

1.6.2 Computational Model

Prior to execution, the control state of all nodes and edges of the alpha graph is set to CLEAR. Execution begins by setting all entry nodes of the alpha graph to PASS. During a single execution, state information (consisting of control and data) is propagated through the alpha graph in a continuous manner until all nodes are either in the PASS or BLOCK control state. As described in the section on loops, nodes in a cycle that represent multiple instances may be assigned states multiple times during a single execution of the method.

The flow rules for the propagation of state are presented in the tables shown in FIGS. 17 through 22 and FIG. 27. A pseudo-state also appears in these tables. In some alpha nodes, the control input is optional. The pseudo-state, EMPTY, is used to indicate that the optional control input is nonexistent. A blank cell in one of these tables indicates a "don't care" condition, which means that the input can be in any state. In a table with more than one input column, the conditions in all input columns must be true in order for the output condition in the last column to hold.

1.6.3 Nodes

The nodes of the alpha graph represent sources, sinks and repeaters of control and data flows within a method. Each node of the alpha graph is called an alpha node. An alpha node has an ID which corresponds to the identifier of its inverse image in the decision graph.

The term data input will be used to refer to a single data input or a collection of multiple data inputs. A similar convention will be used with regard to the terms: data output and control output. An alpha node has some subset of the following:
  data input
  data output
  control input
  control output The five primary types of alpha nodes are illustrated in the table shown in FIG. 14. The three special types of plus alpha nodes are illustrated in the table shown in FIG. 15.

The fields associated with each type of alpha node are summarized in the table shown in FIG. 16. Each cell in the table indicates the number of elements for the field type in that row associated with the alpha node type in that column. An entry such as "n+" indicates that the type of alpha node may have 'n' or more fields of the specified type. An entry such as "0-1" indicates a range; in this case, zero to one. Since a predicate has two sets of control outputs, an entry is associated with each set (true and false). A blank cell is equivalent to a zero entry.

1.6.3.1 Definition Alpha Node

A definition alpha node is a data source. The data flow is labeled by the associated variable. For example, the definition alpha node d2(x) represents the source of data labeled by variable 'x' located in segment #2 of the corresponding annotated control flowgraph. A definition alpha node that has no data inputs is a data source and converts control state to data state. A definition alpha node that is the output of one or more ud-pairs is a data repeater and has an input for each of the ud-pairs. A definition alpha node may have one or more data outputs. A definition alpha node is the image of a definition which is associated with an LNode in the decision graph.

The flow rules for the definition alpha node are shown in the table shown in FIG. 17.

1.6.3.2 Use Alpha Node

The use alpha node is a data sink for the data flow labeled by its associated variable. For example, the use alpha node u10(x) represents a sink for the data flow labeled by variable 'x' located in segment #10 of the corresponding annotated control flowgraph. Normally, a use alpha node has no data outputs, but if the use alpha node is the input of a ud-pair, then it is a data repeater and will have an output. The use alpha node is the image of a use which is associated with an LNode in the decision graph.

The flow rules for the use alpha node are shown in the table shown in FIG. 18.

1.6.3.3 Predicate Alpha Node

The predicate alpha node represents divergence of control. A predicate alpha node may represent the divergence of control in the predicate of a decision or in the predicate of a loop. The predicate alpha node is a data sink for one or more signals, each identified by an individual associated variable. A predicate alpha node has (composite) data inputs. A predicate alpha node converts data state to control state. The control output of a predicate alpha node is divided into two sets, which correspond to the two possible values of the predicate: false and true. Each control output has an associated variable. The predicate alpha node is the image of a DNode (or WNode, which is a special type of DNode) in the decision graph.

A decision predicate is represented by a DNode in a decision graph and by a predicate alpha node in an alpha graph. The symbol for a decision predicate is the same in both graphs: a '?' inside of a circle as shown in FIG. 14. (The symbol for a decision predicate may alternatively be a 'p' inside of a circle.)

A text reference to a decision predicate may be in one of several different formats:
  variable name (when it is clear from context that the variable name designates a decision predicate)
  variable name+P (for example, "bP")
  '?'+identifier+variable name in parentheses (for example, "?2(x)")
  'p'+identifier (for example, "p2")
  'p'+identifier+one or more variable names in parentheses (for example, "?2(a,b)")

The flow rules for the predicate alpha node are shown in the table shown in FIG. 19.

1.6.3.4 Plus Alpha Node

The plus alpha node represents convergence of control and data. The plus alpha node is a data repeater. The data input of a plus alpha node consists of two or more data streams. The plus alpha node combines these streams to produce a single data output. The plus alpha node is an image of a CNode in the decision graph and has an associated variable.

The flow rules for the plus alpha node are shown in the table shown in FIG. 20.

1.6.3.4.1 Control Plus Alpha Node

The control plus alpha node represents convergence of control only. The control plus alpha node is a control repeater. The control input of a control plus alpha node consists of two or more control streams. The control plus alpha node combines these streams to produce a single control output.

From a theoretical standpoint, the control plus alpha node can be considered as a special type of plus alpha node. In an implementation, the control plus alpha node would not be a subclass of plus alpha node, because its inputs and outputs are control streams instead of data streams. The control plus alpha node has no inverse image in the decision graph.

The flow rules for the control plus alpha node are presented in the table shown in FIG. 21.

1.6.3.4.2 Loop Entry Plus Alpha Node and Loop Exit Plus Alpha Node

Since the loop entry plus alpha node and loop exit plus alpha nodes are loop nodes that have special properties, these two special types of plus alpha node are discussed in the next section.

The loop entry plus alpha node is the image of a LoopEntryCNode in the decision graph. Similarly, the loop exit plus alpha node is the image of a LoopExitCNode in the decision graph.

1.6.3.5 Star Alpha Node

The star alpha node is analogous to a gate. It has a control input which determines if the signal at the data input is transferred to the data output. The star alpha node represents the convergence of data and control. The star alpha node is the image of an empty LNode or empty decision structure (or loop) in the decision graph.

The flow rules for the star alpha node are shown in the table shown in FIG. 22.

1.6.4 Edges

The alpha graph is a directed graph which represents the flow of state information in a method. State information consists of both data and control. State information is propagated throughout the alpha graph by its edges. An edge represents the transfer of state from the origin node of the edge to its destination node.

Each edge of the alpha graph is an information flow element. A class diagram for the information flow elements is shown in FIG. 23.

As shown in this diagram, there are two fundamental types of information flow elements:
   data flow element
   control flow element

1.6.4.1 Data Flow Element

A data flow element represents the transfer of both types of state information: data and control. In this respect, the data flow element could be considered a composite element. The nomenclature "data flow" has been retained to emphasize the primary role of this type of information flow element. A data flow element (or edge) is represented graphically by an arrow with a solid line.

If the destination node of a data edge has a control input, then the state of the control input may override the control state information carried by the data edge (see the tables in FIGS. 17, 21 and 22).

There are two general types of data flow elements:
   intra-segment edge
   inter-segment edge The intra-segment edges correspond to the intra-segment data flow elements listed in the table shown in FIG. 3. All other data flow elements represent flows between segments, which are the inter-segment flows.

The feedforward edge is a special type of inter-segment edge which represents data flow from a loop node to a loop entry node. The latter nodes are discussed under the subheading, "Loops in the Alpha Graph."

1.6.4.2 Control Flow Element

A control edge represents the flow of control state information. All control edges, except the exterior control edge, are represented by arrows with dashed lines which have a "slash," usually positioned near the middle of the line.

There are two main types of control edges:
   polar
   nonpolar

A polar edge represents a decision outcome. Its origin must therefore be a predicate alpha node, and it has an associated polarity (true or false for a binary decision). A nonpolar edge represents portions of several decision outcomes. A nonpolar edge has as its origin, a control-plus alpha node.

There are three types of polar edges:
   exterior
   interior
   interior plus

An exterior edge has as its destination, a star alpha node, and is represented graphically by an arrow with a dashed line (with no slash through it). The exterior edge represents a dcco (def-clear complementary outcome). The outcome represented by the exterior edge must be def-clear for the variable associated with its destination. The origin of the exterior edge must have an alternate outcome that is not def-clear for the same variable.

An interior edge has as its destination, a definition alpha node that is on all paths in the outcome that the interior edge represents.

An interior plus edge represents a portion of a decision outcome which merges with outcomes of (one or more) other decisions. An interior plus edge has as its destination, a control plus alpha node.

1.6.5 Example of an Acyclic Alpha Graph

Since the signxy( ) example has no loops, we shall use it as an example of an acyclic alpha graph. For reference, the Java source code and DDF for signxy( ) appears in FIG. 4. The annotated control flowgraph for this example appears in FIG. 7, and its decision graph appears in FIG. 8. The algorithm converts the decision graph of FIG. 8 to the alpha graph in FIG. 24.

1.6.6 Loops in the Alpha Graph

In a decision graph, a loop node is a LoopEntryCNode, LoopExitCNode, WNode or descendent of a WNode. In an alpha graph, a loop node is an image of a loop node in the decision graph. Most loop nodes are in a cycle and can therefore be executed multiple times. The exceptions are loop nodes which are in a break outcome and the loop exit node, which is the image of the LoopExitCNode.

In our computational model, "execution" of an alpha node consists of assigning a control state (BLOCK or PASS) to that alpha node. Each iteration of a loop is called an instance of the loop and is assigned an instance number 'n'. In the first instance of the loop, 'n' is set to '1'. Prior to each subsequent iteration 'n' is incremented. If the loop is an "inner" loop nested within an "outer" loop, then the loop instance number 'n' is reset to '1' whenever the inner loop is reentered.

In dynamic information flow analysis, there are two general representations for loops: the static alpha graph and dynamic alpha graph. In a static alpha graph, a node or edge represents all instances of that node or edge. A loop node or edge in the static alpha graph may be assigned a state multiple times. Whenever the inner loop in a nested loop is reentered, the state of all nodes in the inner loop is reset to CLEAR.

Advanced applications of dynamic information flow analysis deal with the properties the dynamic alpha graph that are relevant to a specific trace or set of traces. For example, a dynamic information flowgraph can be generated to represent the subset of flows that are possible after a specific instance of a node has been executed.

In a dynamic alpha graph, one or more nodes or edges have associated instance qualifiers. An instance qualifier is an expression which identifies the set of instances represented by the node or edge. The instance qualifier may impose a constraint on the value of the loop instance vector, which is described in the section, "Loop Transform," or on the state of the node or edge. Normally, instance qualifiers are associated with alpha nodes, and the edge instances are implicitly defined in accordance with the instance qualifiers of the nodes.

The instance qualifier is incorporated into the ID of an alpha node or appended to the name of the alpha node as a constraint. An instance qualifier that specifies a unique value for the loop instance vector is incorporated into the ID of the alpha node. The ID of an alpha node is the index number followed by the loop instance vector. Periods are used to separate the index number from the loop instance vector and to separate the individual elements of the loop instance vector. For example, the ID of the '2' (or second) instance of d6(x) is "6.2". The full designation for this node is d6.2(x). If a node is in a nested loop, its loop instance vector will have multiple elements. For example, if the node d6(x) is in loop B which is nested inside loop A, the first instance of d6(x), in loops A and B, is d6.1.1(x). If the instance vector is incompletely specified, and there is no additional instance qualifier, the loop instance vector, by default, refers to the iteration of the minimal enclosing loop. In the previous example, d6.1(x) refers to the first instance of d6(x) in loop B.

If an instance qualifier specifies multiple instances, the instance qualifier is normally appended to the name of the node or edge, using a colon (':') as a separator. For example, d6(x): n>1 is the loop node that represents all instances of d6(x) such that 'n' is greater than '1'. If the instance qualifier imposes a constraint based on state, the state is appended to the name of the node or edge. For example, d9(x): BLOCK is the loop node which represents all instances of d9(x) such that the control state of the instance is BLOCK.

A static alpha graph can be considered to be a dynamic alpha graph in which there are no instance qualifiers. The static alpha graph can also be considered as a compact "pattern" for generating a dynamic alpha graph. Each time a loop node in the static alpha graph is executed, a new loop instance node is generated in the dynamic alpha graph. The ID of the loop instance node has the same index as the loop node in the static alpha graph, and its loop vector contains the instance number of the loop. This process is called "loop expansion" and is further described in the section, "Loop Transform." After being initialized to the CLEAR state, a loop instance node is assigned a state (PASS or BLOCK) exactly once.

FIG. 25 displays the static alpha graph of the "loop with break" example. For reference, the annotated flowgraph of this example appears in FIG. 12, and the decision graph of the example appears in FIG. 13. FIG. 26 depicts the initial part of the dynamic alpha graph generated by the static alpha graph of FIG. 25. The alpha node d7(x) will be used to illustrate this relationship. The first time d7(x) is executed in the static alpha graph, d7.1(x) is created in the dynamic alpha graph. The second time d7(x) is executed in the static alpha graph, d7.2(x) is created in the dynamic alpha graph, and so forth.

1.6.6.1 Loop Predicate

The loop predicate is a predicate alpha node which is the image of the corresponding WNode in the decision graph. For example, the loop predicate ?4(a) in FIG. 25 is the image of WNode #4 of the decision graph in FIG. 13.

1.6.6.2 Loop Entry Node

The loop entry plus alpha node, which is also called the loop entry node, is one special type of plus alpha node. The other special type of plus alpha node is the loop exit node, which is explained below. The loop entry node and the loop exit node are, of course, loop alpha nodes. All other types of alpha nodes can be either a non-loop alpha node or a loop alpha node. The loop entry node is associated with a specific loop predicate. The loop entry node is a data repeater.

A loop entry node has two sets of inputs: the initializer input set and the feedforward input set. The set of inputs for a loop entry node depends upon the instance 'n'. The initializer input set is a single data input which comes from a data source outside of the associated loop. The first instance of a loop entry node has the initializer input set. The feedforward input set consists of one or more data inputs which come from data sources in the previous iteration of the loop. All instances of the loop node after the first, have the feedforward input set.

The annotated control flowgraph for the "loop with break" example is shown in FIG. 12. The corresponding alpha graph appears in FIG. 25. The loop entry node is +3(x). The initializer input comes from d2(x), which is outside of the loop. The feedforward input comes from d7(x) (via *12(x)) which are inside the loop.

The dependence of the input set on 'n' can be clearly seen in FIG. 26. The first instance of the loop entry node, +3.1 (x), has the initializer input. The second instance of the loop entry node, +3.2(x), has the feedforward input.

An ordinary (non-loop) alpha node represents a single instance of the alpha node. In an ordinary plus alpha node, convergence takes place in the single instance of the alpha node. This same kind of convergence takes place in a single instance of a loop entry node if it has the feedforward input set as its input and there is more than one input in the set. For example, this "conventional" kind of convergence would be found in the second instance of a loop entry node that is the target of a continue statement inside of the loop. The new kind of convergence present in a loop entry node is the convergence of inputs associated with different instances of the alpha node. The initializer input set and the feedforward input set converge in the loop entry node, but in different instances. The input of the first instance of the loop entry node is the initializer input set. The input of the second instance of the loop entry node is (an instance of) the feedforward input set. The input of the third instance of the loop entry node is (an instance of) the feedforward input set and so forth. Note that the feedforward input set is an equivalence class.

An instance of the loop entry plus alpha node combines the appropriate set of input streams to produce a single data output.

The flow rules for the loop entry plus alpha node are presented in the table shown in FIG. 27. The format of this table is different from the format of the flow rules for the other types of alpha nodes, since there are two forms for this type of alpha node. Note that all inputs of the loop entry plus alpha node are composite data inputs, which carry both control and data state information.

1.6.6.3 Loop Exit Node

Like the plus alpha node, the loop exit node represents convergence of control and data. The loop exit node exhibits convergence in a single instance of the loop exit node. The loop exit node is a data repeater. The loop exit node is the image of a LoopExitCNode in the decision graph and has an associated variable.

In the static alpha graph, the data input of a loop exit node consists of one or more data streams. The loop exit node is the only type of plus alpha node that may have only one data input (in the static alpha graph). If there is only one data input, when the input is in the PASS state, the data at the input is transferred to the data output. If there are multiple data inputs, the input in the PASS state is transferred to the data output, when all other data inputs are in the BLOCK state. Of course, the single data output may be routed to the data inputs of multiple alpha nodes.

For example, in the static alpha graph shown in FIG. 25, the loop exit node+14(x) has two data inputs. For a single execution (as opposed to iteration) of the loop, the loop exit node is executed once, and the data from only one of the two inputs will be passed through to the output of the loop exit node.

The flow rules for the loop exit node are the same as those for the plus alpha node, as listed in the table shown in FIG. 20. In order to apply these flow rules, the loop exit node must be interpreted as a node in a dynamic alpha graph. The loop exit node in a dynamic alpha graph has two important properties:

for a single execution (as opposed to iteration) of the loop, there is exactly one instance of the loop exit node this single instance of the loop exit node has an infinite number of inputs The term "infinite" is commonly misused in the computer science literature. For our purposes, the term infinite is used to describe a number that is greater than any conceivable number that would be encountered in real machines that possess finite resources in time and space.

These two properties are illustrated by the process of loop expansion. As mentioned earlier, this process converts a static alpha graph to a dynamic alpha graph in which all loop nodes are loop instance nodes. Loop expansion is illustrated in the section, "Loop Transform," and in FIGS. 25 and 26. The alpha graph in FIG. 26 shows the expansion of two iterations of the loop in FIG. 25. Note that there is only one instance of the loop exit node+14(x), and, with two iterations, the loop exit node+14(x) has four data inputs. Complete loop expansion results in an infinite number of data inputs for the loop exit node.

It is important to distinguish the physical execution (iteration) of a loop from the propagation of state in the expanded alpha graph. The expanded alpha graph has an infinite number of loop instances, which correspond to the potentially infinite number of loop iterations. During execution of the loop in the physical domain (for example, in the annotated flowgraph), there will be a corresponding flow of state in the expanded alpha graph. Although only a few physical iterations may be executed before the loop is exited, the flow of state in the expanded alpha graph will be propagated to all loop instances.

FIG. 28 illustrates how the flow rules are applied to a loop exit node. Since the input set is infinite, it is convenient to partition it into several subsets. Each subset has an instance qualifier based on the iteration number 'n'.

The first case depicted is BEFORE TERMINATION; i.e., after the loop has been entered, but before it has been exited. During the first two iterations, the inputs are in the BLOCK state. The BLOCK state is not transferred to the output of the loop exit node, because the remaining inputs (n>2) are in the CLEAR state.

The second case depicted in FIG. 28 is AFTER TERMINATION; i.e., after the loop has been entered and exited. The input to the loop exit node with the loop qualifier 'n=3' represents the third iteration which is in the PASS state. The flow of state in the expanded alpha graph is such that the BLOCK state will be propagated through the subsequent, infinite set of loop instances in the expanded alpha graph, so the inputs coming from these instances, represented by the edge with loop qualifier 'n>3', will all be in the BLOCK state. This allows the data on the 'n=3' input, which is in the PASS state, to be transferred to the output of the loop exit node (along with the PASS state).

The third case depicted in FIG. 28 is BLOCKED: i.e., the flow of state that occurs when the predicate of the loop is in the BLOCK state. The BLOCK state is propagated through the infinite set of loop instances in the expanded alpha graph. As shown in FIG. 28, this causes all inputs of the loop exit node to be in the BLOCK state, so the BLOCK state is transferred to the output of the loop exit node.

2 Signal Flow Algebra 2.1 Introduction

The alpha level information flow transform converts one type of graph, an annotated control flowgraph, into another type of graph, an information flowgraph. Both types of graphs are directed graphs and can be considered as different forms of a signal flowgraph. A signal flowgraph is a pictorial (graph) representation of a system of simultaneous algebraic equations.

The system of equations for information flow are derived from the annotated control flowgraph. Information flow structure is contained implicitly in the annotated control flowgraph. The structure does not become readily apparent, and therefore useful, until it is represented explicitly, as it is in the information flowgraph. The information flowgraph is a direct representation of the system of information flow equations.

In a classical signal flowgraph, a node represents a physical variable (signal) and is a summing device and a repeater. An edge of the signal flowgraph represents transmission; the dependency between pairs of variables.

The annotated control flowgraph can be interpreted as a form of signal flowgraph, by associating with each node, a signal, which is the live definition of a particular variable. The signal is the live definition that is obtained at that node, if execution began at the entry node of the annotated control flowgraph. Signal flow is described with reference to a specific use, called the target use, and the variable is the one that appears in the target use.

The signal flow algebra provides a mathematical basis for the alpha level information flow transform. The alpha level information flow transform can be motivated mathematically by performing the following steps:

select a target use in the annotated control flowgraph derive the signal flow equations from the annotated control flowgraph apply the rules of the signal flow algebra represent the transformed equations as an alpha graph The application of these steps to an example of a simple decision is shown in FIGS. 29 and 30. This example will be used to introduce the principles of signal flowgraph analysis.

2.1.1 Augmented Control Flowgraph

In information flow analysis, a program in the control flow domain is represented by an augmented control flowgraph which is described in the section, "Intra-method Graphs." A simple example of an augmented flowgraph is shown in FIG. 29. As in this Figure, the root segment is often omitted. Some of the segments unique to the augmented control flowgraph are labeled in FIG. 31.

2.2 Path Sets

For the derivation of information flow equations from the augmented control flowgraph, the augmented control flowgraph is organized into structures called path sets. Each path set is a subgraph of the augmented control flowgraph. Higher level path sets, such as decisions and loops, can be successively decomposed into lower level path sets. The lowest level path sets are the individual edges of the augmented control flowgraph.

2.3 Divergence in the Control Flowgraph

The predicate node is the destination of the predicate segment. Divergence of control flow paths is represented by a predicate node. Each path emanating from the predicate node has an associated polarity. The polarity of a path corresponds to the value of the predicate which activates that path. In the case of a binary decision, the polarity of such a path is either 1 or 0. For convenience, the polarity will usually be expressed by the corresponding boolean values: true or false.

Decisions and loops have predicate segments. In a decision, the predicate segment is the same as the entry segment. In a loop, the predicate and entry segments are distinct. The predicate segment is associated with the decision or loop predicate, which contains one or more predicate uses and has an associated boolean expression which determines its state. A lower case letter is typically used to represent the decision, the predicate, or the value of the predicate. The meaning of the lower case letter is established by context. The value of a predicate is 1 if the predicate evaluates to true
0 if the predicate evaluates to false The complement of a predicate value b is designated as not(b) and is defined as b=1 then not(b)=0
b=0 then not(b)=1

A predicate collectively represents its predicate uses. The value of a predicate is a function of its predicate uses. For instance, if the boolean expression associated with predicate b is (x>3 && y>4) in segment #2 then its value can be expressed as $$b=f(u2(x),u2(y))$$

In FIG. 31, predicate associated with segment #3 is labeled 'a'. This predicate contains a use of the variable 'a'. Segment #3 is a predicate segment and its destination is a predicate node.

2.4 Convergence in the Control Flowgraph

An exit node is the origin of an exit segment. Convergence of control flow paths is represented by an exit node. In information flow analysis, exit nodes also represent points at which there would be convergence of paths if all breaks were removed from a path set.

The node in which all paths from a predicate node first intersect (join) is a complete exit node (or simply exit) of a path set. The exit node is the immediate forward dominator of the predicate node.

The normal exit of a path set is the node in which all control flow paths from the predicate node converge if all breaks are removed from the path set. A normal exit that is not also the complete exit of a decision is called a partial exit. A partial exit is on a path from the predicate node to the exit node.

In FIG. 31, the exit node of the path set with a as its predicate is the origin of segment #11, which is the exit segment.

2.5 Method Structure

At the Java method level, a control flowgraph is composed of a root edge followed by a sequence of path sets:

data element edges and
decision and loop structures

For example, the method in FIG. 31 consists of root segment, a data element segment, a decision and a (final) data element segment.

2.6 Decision Structure

A decision structure (or decision) is a set of control flow paths which represents selection. A decision consists of:

decision entry (predicate) segment
outcomes
decision exit segment

The most important characteristic of a decision is that it has one entry and one complete exit.

Decision a in FIG. 31 has:

an entry (predicate) segment (edge #3)
two complete outcomes: the false outcome is the path set {10} and the true outcome is the path set {4-5-7-8-9 and 4-5-6}
an exit segment (edge #11)

The signal flow algebra and the alpha level information flow transform can be extended to apply to decisions consisting of more than two complete outcomes, but in this document, we shall limit our discussion to binary decisions, which have two outcomes: one for each polarity of the predicate.

2.7 Loop Structure

A loop structure (or loop) is a set of control flow paths which represents repetition. A loop consists of:

loop entry segment
predicate segment
outcomes
loop exit segment

An example of a loop from the section, "Intra-method Graphs," is shown in FIG. 32.

Loop a has:

a loop entry segment (edge #3)
a predicate segment (edge #4)
two outcomes: the false outcome is the path set {5} and the true outcome is the path set {6-7-8-12-13 and 6-7-8-9-10-11}
a loop exit segment (edge #14)

The origin of the loop entry segment is called the loop iteration exit, and the origin of the loop exit segment is called the loop exit. Since the true outcome contains a decision, it consists of two paths. The first path {6-7-8-12-13} remains "inside" of the loop and ends at the loop iteration exit. The second path {6-7-8-9-10-11} is a break outcome which ends at the loop exit.

2.8 Outcome Structure

An outcome consists of a set of paths of a specified polarity (true or false) that begins at the predicate node of the reference decision (or loop) and ends at an exit node or a star interior use.

The alternate outcome is the outcome with the opposite polarity. The paths in an outcome do not extend past the complete exit of the reference decision (or loop). A complete outcome ends at the complete exit of the reference decision (or loop). In FIG. 31, the path set {4-5-7-8-9 and 4-5-6} is a complete outcome because it ends at the complete exit of decision a. A partial outcome ends at a partial exit or star interior use.

An interior use is a use (of a specified reference variable) that is on all paths in one outcome (of the reference decision or loop). There are two types of interior uses, based on the location of its antecedent. The antecedent of a use is the data source which reaches the input of the use. If the antecedent is not on a path in the outcome which contains the interior use, then it is a star interior use. Otherwise, the antecedent is a partial exit on a path in the same outcome which contains the interior use, and it is a plus interior use.

An ordinary partial outcome ends at a partial exit that is not the antecedent of a plus interior use. In FIG. 31, the path set {7} is an ordinary partial outcome because it ends at the partial exit of decision b.

There are two types of interior use partial outcomes. A star interior use partial outcome ends at a star interior use. In FIG. 31, the path set {10} is a star interior use partial outcome which begins at the predicate node of decision a and ends at the star interior use u10(x). A plus interior use partial outcome ends at the antecedent of a plus interior use. In FIG. 34, the path set {13} is a plus interior use partial outcome because it ends at the origin of edge #14, which is the antecedent of the plus interior use u15(x). The DDF for the example in this Figure is shown in FIG. 33.

A summary of the basic outcome types is shown as a class diagram in FIG. 35.

The basic types of outcomes may be further classified by adding properties which are listed in the following table. An outcome may be assigned one property from each row of the table. For instance, the property of being either true or false is selected from the first row of the table.

TABLE

| | |
|---|---|
| false | true |
| simple | composite |
| break | normal |
| not def-clear | def-clear |
| not complementary | complementary |

An outcome is simple if it consists of a single edge. An outcome is composite if it consists of multiple edges. A composite outcome begins with an initial outcome segment which is followed by a sequence of decisions, loops and data element segments. In FIG. 31, the false (complete) outcome of decision a is simple, whereas the true outcome is composite.

A break outcome has a break on all paths of the outcome. A break outcome is a set of paths (of a specified polarity) from the predicate node, through the break, to the break target exit. In FIG. 31, the normal exit of b is the origin of edge #8. The path set {7} is a normal outcome.

A normal outcome is a set of paths (of a specified polarity) from the predicate node of the decision to its normal exit. In FIG. 31, the true outcome of b (edge #6) is a break outcome.

An outcome is not def-clear with respect to a specified variable if at least one path in the outcome is not def-clear for that variable. An outcome is def-clear with respect to a specified variable if all paths in the outcome are def-clear for that variable. In FIG. 31, the false outcome of decision b (path set {7-8-9} is not def-clear with respect to the variable 'x'.

An outcome is not complementary (with respect to a specified variable) if the alternate outcome has the same def-clear status. For example, if the true outcome of a decision is not def-clear and the false outcome is also not def-clear, then the true outcome is not complementary.

An outcome is complementary (with respect to a specified variable) if the alternate outcome has complementary def-clear status. In FIG. 29, the outcomes of decision a are complementary with respect to the variable 'x', since the false outcome is def-clear whereas the true outcome is not def-clear.

2.8.1 Dcco and Dciupo

A dcco is a def-clear outcome (with respect to a specified variable) of a decision, whereas there is at least one path in the alternate outcome of the decision which is not def-clear (with respect to the specified variable). The dcco is a fundamental type of path set in the theory of dynamic information flow analysis. In FIG. 29, the false (complete) outcome of decision a is a dcco.

A dciupo is a def-clear interior use partial outcome, and, like the dcco, it is a fundamental type of path set in the theory of dynamic information flow analysis. There are two types of def-clear interior use partial outcomes: the star interior use partial outcome and the def-clear plus interior use partial outcome. In both types, all paths in the dciupo are def-clear (with respect to a specified variable) of a decision, whereas there is at least one path in the alternate outcome of the decision which bypasses the interior use.

The image of a dcco or dciupo is a star alpha node in the alpha graph, and every star alpha node is the image of a dcco or dciupo. This is why these path sets are of such fundamental importance.

The purpose of the somewhat elaborate classification scheme for partial outcomes portrayed in FIG. 35 is to clearly distinguish dciupo's. The significance of the dciupo is illustrated in FIG. 37. The DDF for the example in this Figure is shown in FIG. 36.

FIG. 37 is the same as FIG. 34, except d13(x) has been removed. The path sets {13} and {11} are both def-clear (plus) interior use partial outcomes, and therefore the image of each partial outcome is a star alpha node. The path set {13} does not qualify as a dcco, since the alternate partial outcome {6-7-11-12} is also def-clear. Note that the path set {6-7-11-12} is not a def-clear plus interior use partial outcome: u15(x) is not an interior use with respect to (herein "wrt") this outcome, since it is not on all paths in the corresponding (complete) outcome bTRUE.

2.9 Transmission

Let <theta> be a set of paths that all begin at a single entry node and end at node 'n'. It is not necessary for all paths from the entry node to reach 'n'. The transmission of the set of paths <theta> expresses the relationship between the signal at its entry node and the signal at 'n'.

Recall that the signal is the live definition of a particular variable and is associated with a node of the annotated control flowgraph. The signal at node 'n' in the annotated control flowgraph is given by the equation shown in FIG. 38.

The transmission <tau> <theta> above is obtained by decomposing the paths of <theta> into segments and combining the segment transmissions in accordance with the rules below.

2.9.1 Transmission of a Segment

A segment is the basic building block of a control flow path. There is only one path in a segment. The entry node of the path is the origin node of the segment, and the exit node of the path set is the destination node of the segment.

The transmission of a single segment is represented by <tau>j, where "j" is the segment number associated with that edge. If the segment is a predicate segment, then the symbol immediately following <tau> (which is shown as subscript in the Figures) may alternatively be the symbol for the predicate. For example, <tau>a denotes the transmission of predicate a.

Let 'x' be the variable appearing in the target use. The transmission of a single segment (edge) is shown in FIG. 39.

The latter two rules illustrate how a predicate segment of a has two different transmission values, depending on whether the expression being calculated involves the true or false outcome of the decision.

2.9.2 Transmission of a Sequence

Let A and B be two successive sets of control flow paths, such that the exit node of A is the entry node of B.

The transmission of the composite structure AB is shown in FIG. 40.

2.9.3 Transmission of an Outcome

The transmission of a decision outcome, complete or partial, is the value of the predicate (with the proper polarity) followed by '<dot>' and the transmission of the paths in the outcome.

In the simple decision shown in FIGS. 29 and 30, the transmissions of the two outcomes are shown in FIG. 41.

2.9.4 Transmission of a Decision

The exit node acts as a summing junction. The signal at the decision exit is the sum (+) of the signals associated with its incoming edges. The transmission of a normal or extended decision, is the sum of the transmissions of its two outcomes.

The transmission of the normal decision in FIG. 29 is the sum of the two decision outcomes in FIG. 41. The sum is shown in FIG. 42.

2.9.5 Star Conversion

If the outcome (either complete or partial) is def-clear, then the star conversion transform is applied. This transform converts the <dot> to a '*' in the expression for the transmission of an outcome. The star conversion law is shown in FIG. 43.

'κ' is a qualifier consisting of predicate values, for example, 'a <dot> b'. The star conversion transform derives its name from the property that the '*' operator becomes a star alpha node in the alpha graph. The relationship between star conversion and a dcco can be understood by examining two cases:

decision with predicate 'a' in which both outcomes are def-clear decision with predicate 'b' in which only one outcome is def-clear An example of the first case is obtained by removing d4(x) from the decision in FIG. 29. In this case, the transmission is shown in FIG. 44.

In this example, 1' is the transmission of either def clear outcome.

Using the signal flow algebra, the transmission of the decision in this case can be derived as shown in FIG. 45.

Since neither outcome is a dcco, the transmission of the decision reduces to 1.

In an example of the second case, the transmission is given by the equation in FIG. 46. In the right side of this equation, it is impossible to remove the b<dot>1' term through cancellation. This term represents a dcco.

2.9.6 Transmission of a Loop

A loop is similar to a decision, insofar as it has a predicate with two outcomes (false and true). A single execution of a loop structure consists of the execution of a path which begins at the loop entry segment and ends at the loop exit or passes through an external break and ends at the exit of an enclosing decision or loop. During a single execution of the loop structure, the loop predicate and loop iteration exit may be executed multiple times. The traversal of such a path is called a loop iteration. The path set which contains all paths that begin at the loop predicate and end at the loop iteration exit is called the loop iteration path set. The origin of the loop entry segment is an exit, i.e. the loop iteration exit, because it is a point of convergence.

The transmission of the loop is dependent on 'n', the number of loop iterations and the specific path selected from the path set during each iteration. If there are one or more external breaks in the loop, then the transmission of the loop is also dependent upon the path set from the loop predicate through the external breaks to the exit of the loop (or to the exit of an enclosing decision or loop).

The transmission of 'n' complete paths in the loop iteration path set is shown in FIG. 47. In this Figure, pi is the value of the loop predicate in the i'th iteration and <tau>i is the transmission of the i'th iteration.

If the n'th iteration is reached, then the value of each pi for i<n is 1 and the equation for the transmission is as shown in FIG. 48.

The convergence that takes place in the origin of the loop entry segment (which is the loop iteration exit) is represented in the alpha graph by a loop entry plus alpha node (or simply loop entry node).

There are two conditions for the formation of a loop entry node:

an initializer input from outside of the loop at least one feedforward input from a path in the loop iteration path set In the dynamic alpha graph, an instance of a loop entry node has only one set of inputs. The input set of the first instance is a single initializer input. The input set of subsequent instances consists of one or more feedforward inputs. In the static alpha graph, a loop entry node has both sets of inputs. From hereon, we shall consider the loop entry node in the static alpha graph, A loop entry node is similar to a plus alpha node, insofar as it combines multiple composite inputs to produce a single composite output. In addition, the loop entry node has the state variable 'n', which is the instance number of the node and a built-in decision structure which selects the correct input set (initializer or feedforward) depending on the value of n. The value of this built-in predicate is represented by the variable <lambda> as shown in FIG. 49.

The transmission of the path set which begins at one instance of the loop entry node and ends at an instance of the loop entry is designated <tau>ENTRY. Let <tau>ENTRY.n be the value of <tau>ENTRY at instance n. Then the value of <tau>ENTRY.n is given by the equation in FIG. 50.

The transmission of a loop (without an external break) is given by the equation in FIG. 51.

The derivation using the signal flow algebra in FIG. 52 illustrates the "disappearance" of a loop entry node when one of the conditions necessary for its formation (in this example, the 2nd condition) is not met. The fundamental analogy with the formation of a dcco is evident by comparing this derivation with the disappearance of a dcco in the section star conversion.

2.10 Sample Calculation of a Signal in a Non-Cyclic Control Flowgraph

To demonstrate the operation of the signal flow algebra, we shall calculate the signal in the non-cyclic annotated control flowgraph shown in FIG. 54. The DDF for the example in this Figure is shown in FIG. 53. In this example, u13(x) is the target use. The live definition of the reference variable 'x' that reaches u13(x) is the signal (with respect to 'x') at the origin of segment #13. The example illustrates how the algebra is used to calculate the signal that is "inside" of a decision.

The derivation of the signal flow equations for the non-cyclic example is shown in FIGS. 55a and 55b. In this Figure, the equations appear in the left hand column and the rules of the signal flow algebra associated with the derivation appear in the right hand column. For convenience, the reference variable 'x' is implicit, so all such references are to 'x'. For instance, <alpha>13(x) is abbreviated as <alpha>13, d6(x) is abbreviated as d6 and so forth.

The first equations are derived directly from the annotated flowgraph. The remaining equations are derived using substitutions and the rules of the signal flow algebra, which are listed in the last section of this section. The alpha graph of the non-cyclic example is shown in FIG. 56. The alpha graph provides a pictorial representation of the signal flow equations.

2.11 Sample Calculation of a Signal in a Cyclic Control Flowgraph

To demonstrate the operation of the signal flow algebra when applied to a cyclic control flowgraph, we shall employ results from the subsection, "Transmission of a Loop." The annotated control flowgraph in FIG. 32 is used as an example, since it demonstrates how to apply the signal flow algebra to a cyclic control flowgraph and how to apply the signal flow algebra to an external break (out of the loop). The target uses are u15(x) and u7(x). Since the reference variable in the derivation is always 'x', the variable is left implicit as in the previous example. The signal that reaches u15(x) is <alpha>13.n, where 'n' is the loop instance. Similarly, the signal that reaches u7(x) is <alpha>7.n.

If there is no associated rule in the right hand column of the derivation, then the equation is derived directly from the annotated flowgraph. The derivation of the signal flow equations for the cyclic example is shown in FIGS. 57a through 57c. The alpha graph for the cyclic example is shown in FIG. 58. As in the previous example, the alpha graph provides a pictorial representation of the signal flow equations.

2.12 Signal Flow Algebra

The signal flow algebra represents sequencing constraints. The operator <open_dot> directly represents a sequencing constraint as shown in FIG. 59.

The <dot> operator indirectly represents a sequencing constraint. The informal meaning of the <dot> operator is shown in FIG. 60.

The predicate b must be evaluated before C can be executed.

The general strategy in using the algebra is to convert the expression for transmission into normal form as shown in FIG. 61.

The informal meaning of the four binary operators of the signal flow algebra is summarized in FIG. 62. This Figure also shows the symbols for the <open_dot> and <dot> operators respectively.

The informal BNF for the signal flow algebra expressions is as follows:

```
terminals
    definition
    predicate, not(predicate)
    1'                    (initially) def-clear outcome
    1                     def-clear
    0
nonterminals
    predicate_exp -->     predicate | not(predicate) | 1
    control_exp -->       predicate_exp | predicate_exp <dot>
                          control_exp
    <kappa>_exp -->       control_exp | <kappa>_exp * <kappa>_exp
    <sigma>_exp -->       definition | 1'
    <tau>_exp -->         <tau>_exp + <tau>_exp |
                          <tau>_exp <dot> <tau>_exp |
                          <kappa>_exp <dot> <tau>_exp |
                          <kappa>_exp * <tau>_exp |
                          <sigma>_exp
```

The rules (axioms and theorem) for the signal flow algebra are shown in FIGS. 63a through 63e.

A signal flow algebraic expression is evaluated by substituting values for the variables in the expression. In the non-cyclic example, the derivation for the signal (live definition) at u13(x) is shown in FIG. 64.

3 External Breaks 3.1 Introduction

External breaks play a fundamental role in the operation of the primary transforms. We shall begin by informally presenting the basic concepts necessary for defining an external break. For convenience, the decision is considered as the fundamental path set. The theory may be extended to loops by simply replacing "decision" with "loop." Unless otherwise noted, "path" refers to a non-cyclic path.

Path sets are typically decisions. A decision is denoted by the letter associated with its predicate. For example, "decision c" refers to the decision with predicate "c". The same decision may be denoted by the single letter 'c', when the context makes it clear that 'c' does not refer to (only) the predicate.

3.2 Containment

The definition of external breaks is based on the concept of "containment," which, in turn, is based on the concept of hypothetical paths. A hypothetical path is a path that does not exist in the graph, but could exist as a valid outcome if the existing outcome of a decision is replaced by the hypothetical path. In the unusual case in which there is no outcome of a specified polarity, the hypothetical path is simply added to the graph.

Path set A is contained in path set B if all existing or hypothetical paths in path set A are subpaths of existing or hypothetical paths in path set B. Containment is denoted:

<path set A> <is contained in> <path set B> or simply, "A is contained in B." The term "path set" is intended to be interpreted in its most general sense, meaning any set of paths, including a single edge or even a single node (the trivial path set).

For example:

break b1 <is contained in> decision c means that the break b1 (a special edge of the control flowgraph) is on a path (or could be on a hypothetical path) in decision c. For convenience, in some contexts, this relationship is stated more concisely as "c has break b1" or even "c has b1." Similarly, the relationship:

b1 is an external break wrt decision c is stated more concisely as "c has external break b1."

3.3 Exit of a Decision

The exit of a decision is the node in which all paths from the decision entry first meet. In FIG. 65, consider decision b. The entry of this decision is the destination of edge #5 and the exit of this decision is the destination of edge #6. The two paths from the decision entry (7-8 and 6) diverge at the decision entry and (first) converge at the decision exit.

3.4 Normal Exit of a Decision

The normal exit of a decision is the node "nearest" the entry node of the decision which could serve as the decision exit after the possible replacement of existing outcomes with hypothetical paths.

For example, in FIG. 65, if the true outcome of decision b (edge #6) is replaced by a hypothetical path of true polarity from the entry node of b to the destination of edge #7, the new exit of decision b is the destination of edge #7. This is the normal exit of decision b, since under all possible transformations using hypothetical paths, no other transformation results in an exit nearer the entry node.

The decision predicate is normally denoted by a letter. Since a single letter may denote a decision predicate or a decision, in some contexts, a 'P' is appended to the letter when it specifically refers to a decision predicate. For example, in FIG. 65, the predicate of decision b (edge #5) may be denoted as 'b' or 'bP'.

The normal exit of a decision is denoted by the letter associated with the decision followed by an apostrophe. For example, in FIG. 65, the normal exit of decision b (the destination of edge #7) is denoted as b'.

In the decision graph, the normal exit is represented by the CNode that is the immediate successor of the DNode representing the decision predicate. In FIG. 66, c' (the normal exit of decision c) is the immediate successor of the predicate of decision c.

3.5 Normal Decision

The normal decision with predicate c is the set of paths from the destination of the predicate edge to the normal exit of decision c. A normal decision is denoted by the letter associated with its predicate followed by 'N'. For example, in FIG. 65, the normal decision with predicate b is denoted as bN, which consists of one path: edge #7.

The determination of containment of path sets is facilitated by the structure of the decision graph. If the predicate of one normal decision is the descendent of the predicate of a second normal decision in the decision graph, then the first normal decision is contained in the second. For example, in FIG. 66, since cP is the descendent of aP in the decision graph:

cN <is contained in> aN

Similarly, if a node is the descendent of a decision predicate, then the node is contained in that decision. For example, in FIG. 66, c' is the descendent of aP in the decision graph, then: c' <is contained in> a 3.6 Intuitive Description of a Break In a structured control flowgraph (or structured decision graph), the exit of a decision c is the normal exit of c. In a semi-structured control flowgraph (or semi-structured decision graph), the exit of a decision c may be the normal exit of c or the normal exit of a decision which contains c.

The semi-structured transfer of control which causes the exit of a decision to be different from the normal exit is represented by a special edge called a 'break'. In Java, the break corresponds to a break, return or exception statement. In DDF, the syntax for the break is:
break <target> where 'target' is the label at the beginning of the statement containing the target predicate. In most examples, the target is the letter used to denote the target decision.

Intuitively, a break is an edge which "re-routes" paths so all paths through the break bypass a possible exit of a decision. In FIG. 65, edge #6 is a break since all paths through edge #6 bypass the normal exit of b (i.e., the destination of edge #7).

3.7 Types of Breaks

There are two basic types of breaks: internal and external. The classification of a break is relative to a specified decision called the "reference decision." If the break is on a path from the entry node to the normal exit of the reference decision, the break is an internal break wrt ("with respect to") the reference decision. For example, in FIG. 65, edge #6 is an internal break wrt decision a.

A break is an external break wrt the reference decision if the break is not on a path in the normal reference decision. For example, in FIG. 65, edge #6 is an external break wrt decision b (since the break is not on a path from the destination of edge #5 to the destination of edge #7).

The exit of a decision with no external breaks is the normal exit. The exit of a decision c with at least one external break is not the normal exit, and is, instead, the destination of an external break b1, which is the normal exit of decision b where:

cN <is contained in> bN

Since an external break wrt a decision causes the exit of the decision to extend beyond the normal exit, a decision with at least one external break is called an extended decision. In FIG. 65, decision b, which consists of paths 7-8 and 6, is an extended decision since it contains an external break (edge #6). The exit of an extended decision is called an extended exit.

3.8 Types of External Breaks

There are three decisions associated with an external break:

| c | reference decision |
|---|---|
| aN | medial decision (a normal decision) |
| bN | target decision (a normal decision) |

An external break is defined with respect the "reference decision." The external break bypasses the normal exit of a decision called the "medial decision." The destination of the external break is the normal exit of the "target decision." The medial and reference decision are not necessarily distinct.

An external break wrt reference decision c is contained in c. In particular, the destination of the external break b' (the normal exit of the target decision) is contained in c:

b' <is contained in> c

External breaks are classified in two ways.

The first scheme for classifying external breaks is based on whether the medial and reference decisions are the same or different. If the two decisions are the same, the external break is classified as "elementary," otherwise it is classified as "composite."

The second scheme for classifying external breaks is based on the position of the external break wrt the predicate of the reference decision in the decision graph. In the decision graph, the predicate of a decision is represented by a DNode and a break is represented by a BNode. If the BNode which represents the external break is a descendent of the DNode which represents the reference decision predicate, then the external break is classified as a "descendent external break" (abbreviated as "DEB"). An external break that is not a DEB is classified as a "successor external break" (abbreviated as "SEB"), since it is a successor of the CNode which represents the normal exit of the reference decision.

3.9 Formal Definition of an External Break

The formal definition of an external break is based on 4 core properties shared by all external breaks:

| B1 | There is a path (or could be a path) from the reference decision predicate (cP) to the origin of the external break. |
|---|---|
| B2 | The destination of the external break is the normal exit of the decision (bN). |
| B3 | The medial decision (aN) is contained in the target decision |
| B4 | There is no path p1 such that both the normal exit (a') of the decision and the origin of the external break are on p1. |

3.10 Elementary External Break

An elementary external break possesses properties B1-B4 and the one additional property:

| DEB1 | aN = cN |
|---|---|

This property states that the structure of the medial decision is elementary; i.e., that the medial decision is simply the normal decision c and therefore has no interesting internal structure. FIG. 67 is a schematic diagram which shows the essential structure of the decisions associated with the elementary external break b1. Note that the normal reference decision (cN) is contained in the target decision (bN) and that there is no path from the normal exit (c') of the reference decision to the origin of the elementary external break b1.

In FIG. 68, edge #8 is an elementary external break wrt reference decision b, which can be verified by substituting:

reference decision=b
medial decision=b
target decision=a into B1-B4 and DEB1. In the case of elementary external break b1, all paths through b1 bypass the normal exit of the reference decision. Intuitively, edge #8 is an elementary external break wrt reference decision b, since all paths through edge #8 bypass the normal exit of b (the destination of edge #11).

Note that edge #8 is a descendent external break since it satisfies DEBT.

3.11 Composite External Break

A composite external break possesses properties B1-B4 and the two additional properties:

CEB1 The normal sub-decision of the reference decision (cN) is contained in the medial decision (aN).

CEB2 The normal exit (a') of the medial decision is contained in the reference decision (c).

Under the second classification scheme, an elementary external break is also a descendent external break since it satisfies DEB1. A composite external break is a descendent external break if it satisfies the property:

DEB2 There is no path p2 such that the reference decision predicate (cP), the normal exit (c') of the reference decision and the origin of the external break are on p2.

FIG. 69 is a schematic diagram which shows the essential structure of the decisions associated with the composite external break b2. Note that the normal exit (a') of the medial decision is contained in the reference decision (c), as indicated by the dashed lines extending c, and that there is no path from the normal exit (a') of the medial decision to the origin of the composite external break b2.

In FIG. 70, edge #8 is a composite external break wrt reference decision c, which can be verified by substituting:

reference decision=c
medial decision=b
target decision=a into B1-B4 and CEB1-CEB2. In the case of composite external break b2, decision c possesses an external break b1 (elementary or composite) which has the normal exit of the medial decision as its destination, and all paths through b2 bypass the normal exit of the medial decision. Intuitively, edge #8 is a composite external break wrt reference decision c, since all paths through edge #8 bypass the normal exit of b.

Note that edge#8 is a successor external break since it satisfies CEB-CEB2, but does not satisfy DEB2.

Intuitively, the elementary external break may be viewed as the limiting case when the reference decision approaches (and becomes identical to) the medial decision. When cN equals aN, the definition of the composite external break "collapses" to become the definition of the elementary external break.

3.12 Descendent External Break

Under the second scheme for classifying external breaks there are two types: descendent and successor. A break is a descendent external break if it is an elementary external break (and therefore satisfies DEB1) or if it is a composite external break which satisfies DEB2. A break is a successor external break if it is a composite external break which does not satisfy DEB2.

Intuitively, this classification of external break is based on the decision graph. In the decision graph, a break is represented by a BNode, which has as its label "break <target>." In FIG. 71, "break a" is a BNode which has decision a as its target. This break is an elementary external break since it satisfies B1-B4 and DEB1 where:

reference decision=c
medial decision=c
target decision=a
Since cP is a descendent of aP:
cN <is contained in> aN
which establishes B3.

Since the break in FIG. 71 is an elementary external break, it is also a descendent external break. Intuitively, the BNode labeled "break a" is a descendent external break wrt decision c, since it is a descendent of the reference predicate (cP) in the decision graph.

3.13 Successor External Break

In FIG. 72, "break a" is a BNode that has decision a as its target. This break is a composite external break wrt decision c since it satisfies B1-B4 and CEB1-CEB2 where:

reference decision=c
medial decision=b
target decision=a

Furthermore, it does not satisfy DEB2, so it is a successor external break. B3 and CEB1-CEB2 are easily obtained from the structure of the decision graph. Since bP is a descendent of aP:

bN <is contained in> aN
which establishes B3. Since cP is a descendent of bP:
cN <is contained in> bN
which establishes CEB1. Since break b is a descendent of cP:
b' <is contained in> c
which establishes CEB2.

Intuitively, the BNode labeled "break a" is a successor external break wrt decision c, since it is a successor of the normal exit of the reference decision.

The classification schemes for external breaks are summarized in FIG. 73.

3.14 Searching for External Breaks

There are two operations involving external breaks that are used extensively in the alpha transform:

OPERATION 1: Determine whether a path set (which is typically a decision) has an external break wrt decision n.

OPERATION 2: Find the maximal element in a path set. The maximal element is obtained by examining the targets of all breaks in the path set. The maximal element is that target in the breaks which is nearest the root of the decision graph.

FIG. 74 illustrates concept of a maximal element. In this example, decision c has two breaks. The targets of these external breaks are decision a and decision b. Decision a is the maximal element (wrt decision c) since it is nearest the root.

Both operations are based on a search of the decision graph. The initial subtree of a path set is the subtree which has the predicate of the reference decision as its root. A search of the initial subtree is sufficient for finding only descendent external breaks (wrt the reference decision). To find both types of external break (descendent and successor), it is necessary to search the entire path set. The preferred method for searching a path set is called the "Generalized Strategy," which is described in the section, "Generalized Search of Decision Graph." The Generalized Strategy is the most comprehensive method for searching the decision graph and is capable of performing operation 1, operation 2 and additional operations such as:

OPERATION 3: Determine if a path set is empty. A path set is empty if it does not contain a definition of a specified reference variable.

OPERATION 4: Determine if a path set contains a specified target use.

3.15 Interior Node Strategy

The interior node strategy is an alternative method for searching the decision graph, but it can perform only operation 1 and operation 2.

In information flow analysis, the "on all paths in one outcome" relationship is fundamental. (For brevity, we shall call this relationship simply "on all paths.") In the alpha graph, "on all paths" is represented by an interior edge.

As explained in the "Kappa Transform" section, the "on all paths" relationship in the decision graph is represented in one of two ways:
1. Direct representation (DNode/child or DNode/grandchild)
2. Indirect representation (interior nodes)

An outcome node is the child of a DNode. In the direct representation, an LNode containing a definition that is "on all paths" in the outcome is the outcome node (or the child of the outcome node). In the indirect representation, an LNode containing a definition that is "on all paths" in the outcome is an interior node associated with the outcome node. In the indirect representation, an interior node may also be a DNode or BNode that is "on all paths" in the associated outcome.

An interior node is defined wrt a reference decision and reference variable. A node is an interior node wrt decision c if it has the following properties:
1. The node is on a path from the normal exit of c to its extended exit.
2. The node is on all paths in an outcome of c.
3. The node is an LNode containing a definition of the reference variable or a
   DNode (or a WNode before loop expansion) or a BNode.

The root of a maximal subtree is an outcome node that does not have an external break (wrt a reference decision), whereas its parent DNode does. The interior nodes are inserted into the interior node vectors of the outcome nodes that are roots of maximal subtrees by kappa1 (the first phase of the kappa transform).

There are two types of interior nodes. The first type is an LNode which contains the definition of a (specified) reference variable. The first type is called an interior LNode, and if the definition in the LNode is involved in a data flow, the image of the definition is a definition alpha node which is the destination of a break interior edge. The second type is a DNode or BNode. The second type is called an interior DNode or interior BNode (respectively). There is a special type of interior DNode, a cyclic interior node, which is the predicate of a loop (a WNode before loop expansion or a loop predicate DNode after loop expansion).

The interior node strategy uses only the second type of interior nodes. No interior edge is generated for interior DNodes or interior BNodes.

The interior node strategy searches the initial subtree, interior BNodes and all subtrees referenced recursively by interior DNodes. A decision consists of one or more subtrees. The search begins at the initial subtree.

The search of each subtree is the same. As the search proceeds (for instance, via a preorder traversal), each BNode is examined and checked to determine if it is an external break (wrt the reference decision). If operation 1 is being conducted and an external break (wrt the reference decision) is found, then the operation is complete. If operation 2 is being conducted, and an external break (wrt the reference decision) is found, then the maximal external break is tracked (as described in the section on the Generalized Strategy).

Simultaneously, as the search proceeds, the child of each DNode is examined. If the child has an interior BNode, it is treated in the same way as a BNode in the tree. If the child contains an interior DNode, it is added to a list (such as a Java vector). After the search of the current subtree is finished, the subtrees with roots that are nodes in the list of interior DNodes are searched in a similar manner.

We shall use the strategyExample method to illustrate the interior node strategy. The DDF for this method is:

```
strategyExample {
        d(a), d(b), d(c), d(e);
    A:  if( u(a) )
        {
    B:      if( u(b) )
                d(a);
            else
            {
                if( u(c) )
                {
                    d(a);
                    break B;
                }
                if( u(e) )
                    break A;
                else
                    d(a);
            }
        }
        u(a);
    }
```

The decision graph for the strategyExample method is shown in FIG. 75. The goal of the search is to find the maximal element in c (operation 2). The search begins at the root of the initial subtree (predicate c). A search of subtree c yields one external break (edge #11). The target of this external break is DNode #5 (decision b). Since the current value of the maximal is undefined (null), the maximal element is set to decision b.

In subtree c, the first node that is a child of a DNode is LNode #12. This LNode has an interior DNode (DNode #14), so it is added to the interior DNode list. The only other child of a DNode in subtree c is SNode #9, which has no interior nodes. Therefore, after the search of subtree c has been completed, the interior DNode list consists of one node: DNode #14.

The search continues at DNode #14, and one external break is found (edge #15). The target of this external break is DNode #3 (decision a). Since predicate c is nearer to the root than the current value (decision b), the maximal element is set to decision a. There is no further recursion, since the children of DNodes in this subtree have no interior nodes.

4 Partial Outcome 4.1 Introduction

The concept of a partial outcome is based on the underlying concepts of a partial exit and interior use. We begin with a brief overview from the perspective of how these structures are defined in the control flowgraph.

A partial exit is the normal exit of a decision that has an external break. In this type of decision (an extended decision), the normal exit is distinct from the exit of the decision.

An interior use is a use of the reference variable that is on all paths in the outcome of a reference decision. A star interior use is an interior use which receives its input from a data source outside of the outcome containing the use.

A partial outcome is analogous to a complete outcome. Both types of decision outcomes begin at the predicate node of the decision. Whereas a complete outcome ends at the decision exit, a partial outcome ends at a partial exit or a star interior use.

4.2 Interior Use

An interior use is a use (of a specified reference variable) that is on all paths in one outcome (of a reference decision). There are two types of interior uses:
1. A star interior use has as its antecedent, a data source which is not on any path in the outcome which contains the use.

2. A plus interior use has as its antecedent, a partial exit which is on a path in the outcome which contains the use.

In the example shown in FIG. 76, u4(x) is a star interior use with respect to 'x' and reference decision a because it is on all paths in aTRUE, and its antecedent d2(x), is not on any path in aTRUE.

4.3 Partial Outcome

More formally, a partial outcome is the set of all paths of a specified polarity (true or false) that begin at the predicate node of a decision (called the reference decision) and end at a partial exit or a star interior use. The partial outcome ends at a node that is a predecessor of the exit node (if the reference decision has an exit).

There are two primary types of partial outcomes:
1. An ordinary partial outcome is a partial outcome that ends at a partial exit which is not the antecedent of a plus interior use.
2. An interior use partial outcome is a partial outcome that ends at a star interior
   use or a partial exit which is the antecedent of a plus interior use.

Interior use partial outcomes are further subdivided into two types:
1. A star interior use partial outcome is a partial outcome that ends at a star interior use.
2. A plus interior use partial outcome is a partial outcome that ends at a partial exit which is the antecedent of a plus interior use.

4.4 Ordinary Partial Outcome

The ordinary partial outcome c'FALSE is highlighted in the example shown in FIG. 77. The ordinary partial outcome begins at the predicate node of decision c and ends on node n, which is a partial exit. Node n is a partial exit since node n is the normal exit of decision b and decision b has an external break which bypasses n. The external break is represented by edge #8.

c'FALSE is an ordinary partial outcome because n is not the antecedent of a plus interior use.

4.5 Star Interior Use Partial Outcome

A star interior use partial outcome is the set of all paths from the predicate node of the reference decision to a star interior use.

The example in FIG. 76 illustrates the star interior use partial outcome a'TRUE, which begins at predicate node a and ends at the star interior use u4(x). Since a star interior use partial outcome is def-clear, it is also a def-clear interior use partial outcome (dciupo).

The dciupo is a fundamental type of path set, because, like a dcco, its image is a star alpha node. In fact, every star alpha node is either the image of a dciupo or a dcco.

In the example, the star interior use partial outcome a'TRUE is a dciupo wrt 'x'.

The input of a use is composite, which means it carries both data and control state information. The antecedent of a star interior use does not contain sufficient control state information to serve as the input of the star interior use. Since a use alpha node has no control input, the necessary control state information is supplied by inserting a star alpha node ahead of the interior use. The star alpha node properly represents the partial outcome created by the star interior use, since the partial outcome is a dciupo (as described above) and the star alpha node is the image of a dciupo.

FIG. 78 shows the alpha graph (fragment) that is created by applying deltaBack to star interior use u4(x) in FIG. 76. See "Delta Back," in the section, "Delta Transform."

When deltaBack is called on star interior use u4(x), it produces an image of the use (a use alpha node). Since u4(x) is a star interior use, which has an associated dciupo, deltaBack calls deltaBackDciupo.

deltaBackDciupo creates the image of the dciupo, which is a star alpha node and an exterior edge indicating that this alpha node represents the true outcome of a. deltaBackDciupo makes a recursive call to deltaBack on the antecedent of the use, which produces its image, the definition alpha node representing d2(x) and a data edge from the definition alpha node to the star alpha node.

deltaBackDciupo then returns control to deltaBack which creates a data edge from the star alpha node to the use alpha node.

4.6 Interior Use in Loop Predicate

If a use is contained in a loop predicate, then the set of paths from the predicate node of the decision to the use includes those paths which pass through the loop (one or more times) before ending at the use. These paths must be taken into consideration when determining if the set of paths is a partial outcome.

In the example shown in FIG. 79, the set of paths beginning at the predicate node of a and ending at u6(x) is not a partial outcome, because u6(x) is not an star interior use. u6(x) is not a star interior use because the antecedent of u6(x) is the loop entry node, +5(x) which is in the same path set. +5(x) is generated by the delta transform, because there is a definition, d8(x), in the loop and an initializer input, d2(x). (See the "Principle for the Formation of a Loop Entry Node" in the section, "Delta Transform").

Recall that the antecedent of a data element [edge of the control flowgraph or node of the decision graph] is the source of data flow (wrt a specified variable) that reaches that data element [edge or node]. In the decision graph, the antecedent associated with a node may not be the correct antecedent as defined above. In the decision graph, the antecedent of the DNode (which is the loop predicate containing the use) is always the '1' instance of a LoopEntryCNode. If this were the correct antecedent (in all cases), then a use in a loop predicate cannot be a star interior use, since the '1' instance of the LoopEntryCNode is in the same outcome as the use.

The decision graph antecedent is not the correct antecedent if the LoopEntryCNode is spurious. If there is no corresponding pull-through use for 'variable', then the LoopEntryCNode is spurious and the decision graph antecedent must be corrected. The corrected antecedent of the DNode (which is the loop predicate containing the use) is the antecedent of the spurious LoopEntryCNode.

For the corrected antecedent to be in the same outcome as the use, it must be a descendent of a child of the reference decision predicate. Due to loop expansion, the child of the reference decision predicate is 3 levels up in the decision graph from the loop predicate DNode which contains the use.

EXAMPLE #3

Example #3 shall be used to illustrate a plus interior use partial outcome. The DDF for Example #3 is:

```
example3 {
    d(x); d(a); d(b); d(c);
    A: if(u(a))
    {
        if(u(b))
        {
            if(u(c))
            {
                d(x);
            break A;
```

-continued

```
            }
        }
        else
            d(x);
            u(x);
        }
        else
            d(x);
            u(x);
        }
```

The control flowgraph of Example #3 is shown in FIG. 80.

4.7 Plus Interior Use Partial Outcome

The partial outcome begins at the predicate node of decision c and ends on node n, which is on a path in the false outcome of c. The partial outcome is highlighted in FIG. 81. Note that the plus interior use partial outcome ends at the partial exit n (that is the antecedent of the interior use) and not at the interior use.

Example #3 illustrates a very important property of a partial outcome that ends at a partial exit. It is not necessary that the reference decisions for the partial outcome and the partial exit coincide. In the example, the reference decision for the plus interior use partial outcome is c, whereas the reference decision for the partial exit is b.

A section of the alpha graph of Example #3 is shown in FIG. 82.

The image of a def-clear plus interior use partial outcome is always a star alpha node. In the example, the image of the plus interior use partial outcome c'FALSE is *11(x).

4.8 Partial Exit and Reference Input Node

A node n is a partial exit if:
1. n is the normal exit of a decision J and
2. J has an external break which bypasses n A loop entry CNode is a partial exit if its antecedent is a partial exit.

A reference input node is defined with respect to a partial exit. K is a reference input node with respect to partial exit n if:
1. n is the antecedent of the reference input node and
2. K is on a path from n to the exit of J (where n is the normal exit of J) and
3. J has an external break which bypasses K Examples of reference input nodes with a data input (as opposed to a composite input) are: an empty LNode or a BNode which represents an empty break outcome or an LNode containing a star interior use or a DNode containing a star interior use or a star interior LoopEntry CNode.

4.8.1 Reference Input Node

In the decision graph, u15(x) is contained in LNode #15 which is a reference input node with respect to the partial exit n. To illustrate the concept in the control flowgraph, we shall treat u15(x) in FIG. 81 as the reference input node. u15(x) satisfies all conditions for a reference input node: n is the antecedent of u15(x) and u15(x) is on a path from n to the exit of b and n is the normal exit of b and b has an external break which bypasses u15(x). Since u15(x) has a composite input, deltaBack will be applied to n. See "Delta Back," in the section, "Delta Transform."

4.9 Partial Decision

A partial decision is the set of paths from a predicate node to a partial exit (that is on a path in the decision).

A partial decision is transformed in one of two different ways, depending on whether its output (the partial exit) conveys information to a data input or composite input of a node which is a reference input node with respect to the partial exit.

If the input of the reference input node is a data input, then deltaStarBack is applied to the partial decision. See the section, "Delta Star Transform." Otherwise, the input of the reference input node is a composite input and deltaBack is applied to the partial decision.

A single partial decision is transformed both ways, if there are reference input nodes with respect to its partial exit that have data and composite inputs.

5 Generalized Search of the Decision Graph 5.1 Path Sets

There are certain fundamental structures in the decision graph called path sets which are described in the section, "Star Transform." The three major types of path sets are: (1) decision, (2) decision outcome and (3) loop. Note that these path sets are linear: i.e., the path set begins at a specific entry node and ends at a specific exit node. A trivial path set is a path set which consists of a single LNode. All other path sets have an associated reference decision. The last node of the path set is the exit of the reference decision. The reference predicate associated with a path set is the DNode that is the predicate of the reference decision. The following table shows how the reference predicate is determined.

TABLE

| INITIAL NODE | REFERENCE PREDICATE |
| --- | --- |
| DNode | initial node |
| SNode | parent of initial node |
| BNode | parent of initial node if parent is a DNode; otherwise grandparent of the initial node |
| LNode | none (trivial path set) |
| CNode | none (improper path set) |

The path sets may be subject to further constraints, such as the subset of paths that is contained within a bounding decision or the subset of paths which end at a specified target use.

A common operation performed many times during the alpha transform is to search a path set in the decision graph to determine if it satisfies a specific property. For example, the star transform searches a decision outcome to determine if it is empty. (A decision outcome is empty if there is no definition of a specified "reference" variable on any path in the outcome).

The alpha transform employs a generalized strategy for searching path sets in the decision graph. There are several Java methods in the transform which use this generalized search:
 getMaximalElement (returns the maximal element in the path set)
 isEmpty (returns true if the path set does not contain a definition of the reference variable)
 contains (returns true if the path set contains a specified target use)

In order to elucidate the basic operation of the generalized strategy, we shall examine how the search progresses in a path set with no special constraints.

5.2 Backbone Search

The generalized strategy is based on the subset of nodes in the path set called the backbone. The backbone consists of a subsequence of nodes that are on a path (in the control flowgraph) from the initial node to the last node in the path set. The construction of the backbone is based on the concept of a generalized successor. The generalized successor of the initial node in the path set is the normal exit of the reference decision. The generalized successor of a DNode is its normal exit. Let n1 be any other type of node (a BNode, CNode or LNode that is not the initial node). The generalized successor of n1 is the node which immediately follows n1 on the path from n1. The first node in the backbone is the initial node in the path set. The second node in the backbone is the generalized successor of the first. The second node is therefore the normal exit of the reference predicate. Assuming that the second node is not the last node in the path set, the construction of the backbone proceeds by adding the generalized successor of the second node and so forth until the last node in the path set (a CNode) has been added to the backbone.

5.3 Subtree Search

A subtree search of a node consists of a preorder traversal of all nodes in the decision graph which are descendents of that node. A subtree search of a node which has no descendents, such as an LNode, reduces to a search of that single node. The generalized strategy consists of a subtree search of all nodes in the backbone that are not CNodes, beginning at the initial node and proceeding sequentially until it reaches the last node in the backbone.

5.4 Search Strategy

The backbone of a normal decision consists of two nodes: a DNode (the initial node) and a CNode (the last node in the path set). Since the generalized strategy skips CNodes, the search of a normal decision is just a subtree search of the initial node.

In order to detect when the search is finished, the generalized strategy tracks the break targets of BNodes as the search progresses. These BNodes include BNodes in the backbone and BNodes that are in the subtrees of nodes in the backbone.

The generalized strategy can be decomposed into two search strategies: (1) the backbone search, which corresponds to traversal of the generalized successors in the backbone and (2) subtree searches of nodes in the backbone. Roughly speaking, the backbone search advances to the right, and when it cannot go further to the right, it goes upward in the decision graph until it can advance again to the right.

Now let us examine the generalized strategy in more detail. The backbone search begins at the initial node of the path set. A subtree search of the initial node is performed. The generalized search then switches over to the backbone search. The backbone search advances to the generalized successor of the initial node, which is the normal exit of the reference decision.

Since this node is a CNode, no subtree search is performed. If this CNode is not the last node in the path set, then the backbone search continues by advancing to the generalized successor. The generalized successor of the current node n is the successor of n if (1) the successor exists and (2) the successor is in the path set. The successor of n is the first node immediately to the right of n in the diagram of the decision graph. More formally, the successor of n is the next child of p, the SNode parent of n, that follows n. A subtree search of the successor is performed (if the successor is not a CNode). Whenever possible, the backbone search attempts to advance to the right in the decision graph. If the search is not finished and one of the above conditions is not met, then the backbone search advances upward in the decision tree. The generalized successor is the node which immediately follows n on the path from n. If the grandparent gp of n is a loop predicate, then it is the next node to be executed after n and the backbone search advances to gp. If gp is a decision predicate, then the next node to be executed after n is the successor of gp so the backbone search advances to the successor of gp.

5.5 Tracking of Maximal Element

As the search progresses, it must determine if a node is in the path set. A node n1 is in the path set if (1) there is a path (in the control flowgraph) from the initial node of the path set to that node and (2) the node is not past the exit of the maximal element. If the first test is not satisfied, then the search attempts to move upward in the decision graph. If the second test is not satisfied, then the search is finished.

The concept of maximal element is based on proximity to the root. A node n1 of the decision graph is said to be "greater" than node n2 of the same graph, if n1 is an ancestor of n2 and therefore closer to the root. The maximal element of a path set is the break target in the path set which is closest to the root of the decision graph. The maximal element of a path set is the DNode which has the last node of the path set as its normal exit.

As the generalized strategy advances, it continuously updates the maximal element, which is denoted by 'm'. The generalized strategy tracks the maximal element by examining each BNode that is encountered during the search. The BNode may be a backbone node or a node in a subtree of a backbone node. At the beginning of the search, the maximal element m is set to null. When the search reaches a BNode, it compares the break target of the BNode to the current value of m. If the break target is greater than m, then m is set to the target. (Any non-null value of m is greater than null).

All three methods (getMaximalElement, is Empty and contains) track the maximal element as the search proceeds. This is necessary for detecting when the search is finished. The is Empty method checks each LNode to find out if the node has an associated definition of the reference variable. The contains method checks each DNode and LNode to find out if the node "contains" the specified target use.

5.6 Example of the Generalized Strategy

To illustrate how the generalized strategy searches the decision graph, we shall show how the getMaximalElement method searches the decision graph of a simple Java method, strategyExample. The Java source code and DDF for the example are shown in FIG. 83. The purpose of getMaximalElement is to find the maximal element of a path set. For our discussion, we shall use the path set c, which is the path set in the strategyExample method beginning at predicate c. The annotated control flowgraph of the strategyExample method is shown in FIG. 84.

As a prelude to the algorithmic approach, we first identify the maximal element of path set c through inspection of the control flowgraph. The maximal element of the path set beginning at predicate c is the predicate of the decision which has the exit of decision c as its normal exit. The exit of a decision is the point at which all paths from the decision predicate first meet. From inspection of the control flowgraph in FIG. 84, the point at which all paths from predicate c first meet is the normal exit of decision a, so a is therefore the maximal element of decision c.

The generalized strategy locates the maximal element through a systematic search of the decision graph. The decision graph of strategyExample is shown in FIG. 85. The getMaximalElement method begins by setting m, the maximal element to null. The backbone search begins at the initial node of the path set, which in the example is predicate c (DNode 8 in the decision graph). Since this is the initial backbone node, a subtree search of DNode 8 is performed. While traversing the subtree, the search encounters a break (BNode 11). The break target b is compared to the current value of m. Since any non-null value of m is greater than null, m is set to b.

The backbone search progresses by advancing to the right. The generalized successor of the initial node is CNode 13. Since there is no subtree search of CNodes, the backbone search continues advancing to the right. The generalized successor of CNode 13 is DNode 14. During the subtree search of DNode 14, the break target of BNode 15 is compared to m.

Since the break target a (DNode 3) is greater than b (DNode 5), m is set to a. The backbone search again advances to the right. The generalized successor of DNode 14 is CNode 17.

At this point, the backbone search can no longer advance to the right so it moves upward in the decision graph in order to find the generalized successor of CNode 17. The grandparent gp of CNode 17 is DNode 5. Since DNode 5 is a decision predicate, the generalized successor of CNode 17 is the successor of gp, CNode 18.

Note that if DNode 5 were a loop predicate, then the generalized successor of CNode 17 would be DNode 5. Intuitively, this is the case because the predicate of the loop is tested before the loop is exited (unless the loop is exited by a break out of the loop).

Since CNode 18 has no successor, the backbone search once again moves upward in the decision graph. The grandparent gp of CNode 18 is DNode 3. Since DNode 3 is a decision predicate, the backbone search advances to its successor, CNode 20. Normally, the search would continue to move upward, but it cannot, since CNode 20 has no grandparent. Even if CNode 20 had a grandparent, the search would be finished, because its predecessor, DNode 3, is the maximal element of the path set, making CNode 20 the last node of the path set.

The general flow of the backbone search in the decision graph is shown in FIG. 86. The solid portions of the line cover the nodes that are part of the backbone, whereas the dashed portions of the line cover the predicates (DNode 5 and DNode 3) that are traversed during the backbone search but not part of the backbone itself. Note that the flow of the generalized search is rightward and upward in the decision graph.

6 Sign Examples 6.1 Introduction

A Java method may contain independent computations. The identification of independent computations through static analysis is an important tool for efficient software testing, because such structural information can be used to reduce the number of tests.

The signXY(int x, int y) and signXandY(int x, int y) examples illustrate, in a simple and visual way, the ability of dynamic information flow analysis to detect independence in computational structures.

6.2 signXandY Example

The signXandY(int x, int y) method takes as its arguments two integers, x and y. It sets the sign of x (sx) to +1 if x is positive and to −1 if x is negative. Similarly, the method sets the sign of y (sy) to +1 if y is positive and to −1 if y is negative.

Java source code for signXandY example

```
public static void signXandY(int x, int y)
    {
    int sx = -1;       /* sign of x */
    int sy = -1;       /* sign of y */
    if( x >= 0 )
        sx = 1;
    if( y >= 0 )
        sy = 1;
    System.out.println("sign of x = " + sx + " sign of y = " + sy);
    }
```

DDF for signXandY example

```
signXandY {
    d(x); d(y);
    d(sx); d(sy);
    if( u(x) )
        d(sx);
    if( u(y) )
        d(sy);
    u(sx), u(sy);
    }
```

The alpha transform converts DDF to one or more alpha graphs. See section, "Intra-method Graphs." The symbols for the alpha graph nodes are shown in FIG. 87.

The information flowgraph (alpha graph) of the signXandY example is shown in FIG. 88. The information flowgraph separates into two pieces, corresponding to the two independent computations in this example.

6.3 signXY Example

The signXY(int x, int y) method takes as its argument two integers, x and y, and sets the sign of the product (sxy) to +1 if the product of x and y is positive and sets sxy to −1 if the product of x and y is negative.

Java source code for signXY example

```
public void signXY(int x, int y)
    {
    int sx = -1;       /* sign of x */
    int sxy;           /* sign of xy */
    if( x >= 0 )
        sx = 1;
    if( y >= 0 )
        sxy = sx;
    else
        sxy = -sx;
    System.out.println("sign of xy = " + sxy);
    }
```

DDF for signXY example

```
signXY {
    d(x); d(y);
    d(sx);
    if( u(x) )
        d(sx);
    if( u(y) )
        ud(sx, sxy);
    else
        ud(sx, sxy);
    u(sxy);
    }
```

The information flowgraph (alpha graph) of the signXY example is shown in FIG. 89.

The information flowgraph does not split into separate pieces, as in the previous example, illustrating that the internal computations are not completely independent. The information flowgraph also shows how the output of the decision with predicate ?3(x) supplies information to the decision with predicate ?7(y). This example illustrates that independence is a matter of degree, and even when there is only partial independence, the analysis can supply valuable guidance for testing.

6.4 Signal Flow Equations

The value of a variable at a particular point in a program can be calculated, within the limits of static analysis, by solving a system of simultaneous algebraic equations. The system of equations can be derived from the annotated control flowgraph, by applying the rules of the signal flow algebra. Alternatively, the system of equations can be obtained directly from the information flowgraph through inspection or accessing it as a data structure. To illustrate the two approaches, we shall use the signXandY(int x, int y) example.

6.4.1 Signal Flow Equations from the Information Flowgraph

First, we shall obtain the signal flow equations directly, through inspection of the left-hand information flowgraph in FIG. 88.

There is a signal flow equation for each use in the flowgraph. The first use in the information flowgraph is u3(x) which is in a predicate node. The partition of the information flowgraph relevant to the signal flow for u3(x) is shown in FIG. 90.

(For clarity, we shall allow the partitions in this example to overlap.) The data input of the predicate node is from the data output of the definition node, d2(x). The first signal flow equation is therefore:

$<alpha>3(x)=d2(x)$ where $<alpha>3(x)$ is the signal appearing at the input of u3(x).

The second use in the information flowgraph is u11(sx). The data input of u11(sx) is the signal at the output of the plus node, +6(sx), which has two data inputs. The partition of the information flowgraph relevant to the signal at the first input of the plus node is shown in FIG. 91.

By inspection of FIG. 91, we see that the first term in the expression for a11(sx) is:

$not(x3)* d2(sx)$ where not(x3) is the complement of the value of the predicate containing u3(x).

The partition of the information flowgraph relevant to the signal at the second input of the plus node is shown in FIG. 92.

By inspection of FIG. 92, we see that the second term in the expression for a11(sx) is:

$x3<dot>d4(sx)$ where x3 is the value of the predicate containing u3(x). Note that x3 is a function of the signal at u3(x):

$x3=f(<alpha>3(x))$.

In the information flowgraph, the "on all paths in one outcome" operator '<dot>' is represented by the interior control input of d4(sx).

The plus node "sums" these two inputs, so the second signal flow equation is:

$<alpha>11(sx)=not(x3)*d2(sx)+x3<dot>d4(sx)$

6.5 Signal Flow Equations from the Annotated Control Flowgraph

The annotated control flowgraph of the signXandY(int x, int y) example is shown in FIG. 93.

Since edge #2 is the input of edge #3, the first signal flow equation is:

$<alpha>3(x)=d2(x)$

The signal at u11(sx) is the composition of the signal (with variable 'sx') at the output of edge #2 and the transmissions of the two decision structures:

$<alpha>11\ (sx)=d2(sx)<open\ dot>t3(sx)<open\ dot>t7\ (sx)$

The derivation of the second signal flow equation from this equation appears in FIG. 94. The derivation steps are in the left-hand column, and the corresponding signal flow rules are in the right-hand column.

7 Compound Predicates
7.1 Introduction

In classical path testing, the test strategy consists of generating test cases which exercise each structural path in the control flowgraph of the method under test.

The Java method "is NonNegative" will be used to illustrate the information flow path testing strategy for compound predicates. The Java source code listing for is NonNegative is:

```
public boolean isNonNegative ( int a, int b )
{
    boolean c = false;
    if ( a >= 0 && b > 0 )
        c = true;
    return c;
}
```

This method has a seeded bug. The second condition in the compound predicate, b>0, should be: b>=0.

The control flowgraph of the example is shown in FIG. 95. This method has 2 structural paths: one for each decision outcome.

An unexpanded information flowgraph of the example is shown in FIG. 96. (In the unexpanded flowgraph, the compound predicate is treated as if it has no internal structure.)

The 2 structural paths correspond to 5 complete paths in the unexpanded information flowgraph:

| control flow paths | paths in the unexpanded information flowgraph |
| --- | --- |
| 1 - 2 - 3 - 4 - 6 | d2(a) - ?3(a, b) - d4(c) - +6(c) - u6(c) |
|  | d2(b) - ?3(a, b) - d4(c) - +6(c) - u6(c) |
| 1 - 2 - 3 - 5 - 6 | d2(a) - ?3(a, b) - *5(c) - +6(c) - u6(c) |
|  | d2(b) - ?3(a, b) - *5(c) - +6(c) - u6(c) |
|  | d2(c) - *5(c) - +6(c) - u6(c) |

There are many test cases which could cover the 2 control flow paths. Consider the 2 test cases:

| | |
| --- | --- |
| a = 1 | b = 1 |
| a = −1 | b = 0 |

Although this test set satisfies the all-paths test criteria, it leaves lingering doubt regarding the correctness of the method, since the strategy is not sensitive to possible bugs in the compound predicate. In particular, the seeded bug in the condition, b>0, is not found because the condition can have no effect. This condition is not exercised by the second test case due to short circuit Boolean expression evaluation in Java.

In information flow analysis, a compound predicate is treated as an internal method call made by the compiler. From the compiler's viewpoint, the example code is treated as if the following code were flattened:

```
public boolean isNonNegative ( int a, int b )
{
    boolean c = false;
    boolean pval = andLogic( a >= 0, b > 0 )
    if ( pval )
        c = true;
    return c;
}
private boolean andLogic ( boolean e1, boolean e2 )
{
    boolean v = false;
```

```
if ( e1 )
{
    if ( e2 )
        v = true;
}
return v;
}
```

The alpha graph of the method 'and Logic( )' is shown in FIG. 97, which illustrates the implicit path structure of a compound predicate.

The expanded information flow path structure for is Non-Negative( ) is exhibited in FIG. 98.

This alpha graph is a composite of the alpha graphs for the compiler versions of is NonNegative( ) and Logic( ) above. The implicit flows in the compound predicate ?3(a,b) are surrounded by a dashed border. The segment numbers inside the dashed box apply to the and Logic( ) method, whereas all other segment numbers pertain to the is NonNegative( ) method. The dashed box is not a mu-box. The alpha graph has been simplified by replacing formal parameters with their values. For example, ?3(e1) inside the dashed box is equivalent to a use of the variable 'a', since the formal parameter 'e1' is bound to the value of 'a'.

Each predicate in the expanded alpha graph has only one (data flow) input. Compare this restriction to the predicate in the unexpanded alpha graph of FIG. 96 which has multiple inputs.

There are 6 alpha paths in the expanded alpha graph from d2(a) to u6(c). The original test set covers 2 of the 3 feasible alpha paths. The remaining alpha path:

d2(a)–[?3(e1)–*5(e2)–?5(e2)–*7(v)–+8(v)–+10(v)]

?3(pval)–*5(c)–+6(c)–u7(c)

is traversed by adding one more test:
a=1 b=0
which reveals the bug. Of course, the seeded bug and this latter test were contrived to elucidate the information flow analysis of a compound predicate. There are many other tests which exercise this same alpha path and are not capable of revealing the bug. In general, detection of this type of bug requires a combination of information flow testing (all feasible alpha paths) and domain testing.

Although the test set meets the criteria of all feasible alpha paths, it does not meet all-variants. The variant in which ?2(e1) is false and ?4(e2) is true, is not included in the test set, since it does not represent a path through and Logic( ).

A compound Boolean predicate is represented by a predicate tree. The predicate tree is converted into its implicit path structure by the Compound Predicate Transform.

7.2 Preprocessing Steps

The alpha graph algorithm is preceded by three preprocessors. The net effect of these preprocessors is to convert the system input into a decision graph. The system input may be Java source code or Byte Code for a Java method, or some other semi-structured language for a subroutine or module. The sequence of preprocessors is illustrated in FIG. 99.

The first preprocessor is a source code specific parser which converts the system input into DDF for the method. The second preprocessor is a DDF parser which converts the DDF into a decorated decision graph. A decorated decision graph is an extension of the normal decision graph in which each DNode representing a compound predicate has an associated predicate tree. The predicate tree represents the logical structure of the compound predicate. The final preprocessor expands the compound predicates in the decorated decision graph by applying the Compound Predicate Transform to each DNode in the decorated decision graph that has a predicate tree.

The output is a normal decision graph. In a normal decision graph, each DNode represents a simple predicate. A simple predicate is a predicate which contains neither the binary operator '&&' nor the binary logical operator '||'.

7.3 DDF for Compound Predicate

The DDF for a simple predicate consists of a list of uses enclosed by parentheses. For example, the DDF for the simple predicate in the Java code fragment "if (x>y)" is:

(u(x), u(y))

The DDF for a compound predicate is similar, except the predicate expression contains, in addition to uses or lists of uses, at least one of the binary logical operators ('&&' or '||'). The DDF for a compound predicate may also contain the unary logical operator '!'. These logical operators are the same as their Java counterparts. For example, the DDF for the compound predicate in the Java code fragment "if (!(a==0) && (b>0))" is:

if (!u(a) && u(b))

Note that the "not" operator precedes the use. In general, an operand of a binary logical operator must either be a use, a use preceded by a '!', an expression delimited by parentheses or an expression delimited by parentheses preceded by a '!'.

The informal BNF describing the DDF syntax for a predicate follows:

| | |
|---|---|
| predicate_exp --> | ( use_exp ) | ( binary_exp ) |
| use_exp --> | use | ! use | use_list_exp | ! (use_list_exp) |
| use_list_exp --> | use use_list_exp |
| binary_exp --> | op_exp && op_exp | op_exp || op_exp |
| op_exp --> | use_exp | ( binary _exp ) | ! ( binary_exp ) |

The DDF for the is NonNegative example is:

```
isNonNegative {
    d(a), d(b);
    d(c);
    if ( u(a) && u(b) )
        d(c);
    u(c);
}
```

7.4 Predicate Tree

The nodes in the predicate tree represent simple predicates and the three operators which appear in compound predicates. The operators are listed in the table shown in FIG. 100.

The root of the predicate tree is an operator. Each operator in the predicate tree has one or more children. The number of children of an operator is listed in the table shown in FIG. 100.

The predicate tree corresponding to the predicate:
(!(u(a) && u(b))||! u(c))
is shown in FIG. 101. This predicate tree is associated with DNode #3 (which is not part of the tree).

The DDF parser creates predicate trees as part of the decorated decision graph. The predicate tree in the is NonNegative example appears in the decorated decision graph shown in FIG. 102.

7.5 Compound Predicate Expansion

The predicate trees in the decorated decision graph are expanded by the Compound Predicate Transform. The result of applying this transform to the decorated decision graph in FIG. 102 is shown in FIG. 103.

8 Loop Transform

8.1 Introduction

A simple example of a loop, the "autoiterator," is shown in FIG. 104.

An alpha graph for this example in which each traversal is represented by a unique series of nodes and edges would be very large. In fact, the size is limited only by the finite resources of a real computing machine, since 'x' can be an arbitrarily large negative number. The example illustrates the problem with loops: path proliferation and the resultant state explosion. To be tractable, a method for program analysis must incorporate some means for dealing with path explosion.

One approach for enumerating paths in a control flowgraph is to use control flow analysis; that is, to set a fixed constant k which sets a maximum bound on the number of loop traversals used in classifying paths. This partitions paths into equivalence classes based on the first k traversals of loops. A similar approach could be used for enumerating paths in an information flowgraph. FIG. 105 illustrates how a flowgraph, similar to an information flowgraph, might appear if the loop in example #1 is unrolled subject to the bound k=3.

However, the dynamic information flow analysis approach is different from the control flow analysis approach above. Paths in the information flowgraph are different from paths in the control flowgraph because the information flowgraph operates at a higher level of abstraction than the control flowgraph. The relationship between paths in the two types of graphs is not one-to-one. For example, a single path in a control flowgraph may correspond to the simultaneous execution of multiple paths in an information flowgraph. Conversely, a path in the information flowgraph may correspond to multiple paths in a control flowgraph. The control flow analysis technique may miss important flows, such as data flows, if those flows are completed after the bound 'k' is reached.

Two different types of information flowgraphs are employed to address the problem of counting paths in a program with loops. In a static information flowgraph, a single information flow element, such as a node or edge in a loop, represents multiple execution instances of the element. For example, in the static alpha graph for the example in FIG. 104, the use u6(x) is represented by a single loop node. The loop node represents all execution instances of the node. The first traversal of the loop exercises the first instance of u6(x). The next traversal exercises the second instance of u6(x) and so forth. This representation collapses the number of states in the graph, yet preserves important flow relationships. In a dynamic information flowgraph, greater precision is achieved by associating constraints (instance qualifiers) with certain nodes and edges. For example, in a dynamic information flowgraph, a loop node may be a loop instance node, which represents a specific instance of that loop node.

For clarity of exposition, this document describes how the loop transform is applied to the simple loop in Example 1. The basic principles are easily generalized to loops in dynamic alpha graphs and nested loops. Static and dynamic information flowgraphs are further described in the section, "Intramethod Graphs."

8.2 Loop Nodes

To simplify the exposition, our treatment of loops is informal.

Two special types of plus alpha nodes are found only in loops: loop entry nodes and loop exit nodes. Alpha nodes involved in loops retain their usual attributes (definition, use, star, plus), but gain additional attributes as a result of their presence in a loop.

A loop partitions the nodes of the alpha graph into two classes: nodes inside the loop and nodes outside the loop. A node is inside the loop if it can be executed more than once within the context of the loop (if it is in a cycle) or if the node is the destination of an edge which has a loop node as its origin; otherwise, the node is outside the loop. A node inside a specified loop is called a loop node.

The most important loop node is the loop predicate. A loop is identified by its loop predicate. The fundamental loop construct in dynamic information flow analysis is the while loop. Other looping constructs, such as do_while loops, are modelled using while loops. In the case of a while loop, the loop predicate is the boolean condition that appears in the while statement.

In the course of the loop transform algorithm, the ID's of loop nodes are modified so they can be recognized as nodes in loop being transformed. Also, temporary loop nodes are created which are used and eventually discarded. Both types of loop nodes are called loop instance nodes or simply instance nodes.

In the single level loop expansion used in the first step of the loop transform, the two types of instance nodes are identified by appending a '1' or a '0' to the loopInstance vector, which is part of the node ID. The '1' or '0' is called the loop instance. The '1' instance of a loop node is permanent, whereas the '0' instance is temporary. In the case of multilevel expansions, as mentioned in the section on loop expansion, there can be higher loop instances, such as a '2' instance node or '3' instance node, which are also permanent loop nodes.

In our example, the loop is not nested, so the loopInstance vector consists of a single integer which is '1' if the loop instance node is permanent or a '0' if the loop instance node is temporary. The node ID is the index followed by the loopInstance vector, using a period as a separator. For example, the node identifier for the permanent instance of the loop node u6(x) is u6.1(x), and the node identifier for the temporary instance is u6.0(x).

In the general case, a loop may be nested inside other loops. Such a node will have a loop instance with respect to each loop in which it participates. In the loopInstance vector, the loop instances are arranged in order of loop containment. For example, suppose loop C is nested in loop B, loop B is nested in loop A, and loop A is not nested in any loop. The order of loop containment is [A, B, C]. The loopInstance vector [1, 1, 0] indicates that the loop instance in loop A is '1'; the loop instance in loop B is '1' and the loop instance in loop C is '0'. The node identifier for loop node u6(x) having the above loopInstance vector is u6.1.1.0(x). The loopInstance vector of a node which is not a loop node is empty. In a nested loop, the instance should be qualified by specifying the reference loop. By default, if the reference loop is left unspecified, the instance given is with respect to the innermost loop.

Loop instance nodes which are derived from the same node in the alpha graph and differ only by the last entry in the loopInstance vectors are called analogous nodes.

8.3 Fundamental Flows Associated with a Loop

With respect to a particular loop, there are four fundamental flows:
- data flow into the loop
- information flow inside the loop within a single iteration
- data flow from one iteration to the next
- data flow out of the loop The data flows are depicted in FIG. 106.

The four basic types of loop edges correspond to the four fundamental flows:
- loop entry edge
- loop information flow edge loop feedforward edge
loop exit edge A loop entry edge represents data flow into the loop. In a loop entry edge, the origin is outside of the loop and the destination is inside of the loop. The destination of a loop entry edge is a plus alpha node called a loop entry node. A loop entry edge is executed only once within the context of the loop.

A loop information flow edge represents information flow inside the loop within a single iteration. In a loop information flow edge, the origin and destination are contained in the loop. There is a path from the destination to the next instance of the origin. The loopInstance vectors of the origin and destination of a loop information flow edge are identical. A loop information flow edge may be executed more than once within the context of a loop.

A loop feedforward edge or simply, feedforward edge, represents data flow from one iteration to the next. The loopInstance vectors of the origin and destination of a feedforward edge have different last elements. A feedforward edge supplies the feedforward input to a loop entry node. Like the loop information flow edge, a feedforward edge may be executed more than once within the context of a loop.

A loop exit edge represents data flow out of the loop. The destination of a loop exit edge is a plus alpha node. If the loop is exited in the normal way; when the boolean value of the condition in the loop predicate is false, then the destination of the loop exit edge is the normal exit of the loop, which is called the loop exit node. The loop exit node is part of the loop; it is a loop node. A loop may also exit via a break that transfers control to the normal exit of the loop (the loop exit node) or to the loop exit node of an enclosing loop or to the normal exit of an enclosing decision. Like a loop entry edge, a loop exit edge is executed only once within the context of the loop.

FIG. 107, which shows the alpha graph of the autoiterator, is labeled so the four types of loop edges are readily apparent.

Data flow into and out of the loop is controlled by the loop predicate and any predicates in the loop that have break outcomes. The loop entry node has special state flow properties as described in the section, "Intra-method Graphs." The loop entry node has two sets of inputs: a initializer input and feedforward inputs. The first instance of the loop has only the initializer set as its input. This property allows data to enter the loop, even though the feedforward inputs are in the CLEAR state. Any subsequent instance of the loop entry node has the feedforward set as its input. This property allows data to propagate from instance 'n' to instance 'n+1' as illustrated by the feedforward arrow in FIG. 106.

The loop exit node has an infinite number of inputs, as described in the section, "Intra-method Graphs." This property prevents data from being propagated out of the loop until the loop terminates.

8.4 Loop Transform Algorithm
8.4.1 Overview

The input to the loop transform is a decision graph. The decision graph of a Java method without loops has three basic types of nodes: DNodes, SNodes and EndNodes. There is a special type of DNode, the WNode, which represents the loop predicate prior to the loop transform. The node labeled 'C' in FIG. 108 is a WNode. The predecessor of a WNode is a CNode, which is called the loop entry CNode. The node labeled 'B' in FIG. 108 is a loop entry CNode. The immediate successor of a WNode is a CNode, which is called the loop exit CNode. The node labeled 'F' in FIG. 108 is a loop exit CNode.

The first child of the WNode represents the false outcome, which maps to one or more loop exit control edges in the alpha graph. The second child of the WNode represents the true outcome, which corresponds to one or more iterations of the loop. The predicate is evaluated prior to the execution of each pass through the loop. If the predicate evaluates to true, then the true outcome is executed. If the predicate evaluates to false, the loop is exited. The decision graph is obtained from the Java source code or from an intermediary representation such as DDF, as shown in FIG. 109.

The output of the loop transform is an alpha graph. Loops are represented by cycles in the alpha graph, possible break outcome(s) and loop exit nodes. For the autoiterator example, the net effect is to take the decision graph in FIG. 109 and transform it into the alpha graph in FIG. 118.

The loop transform algorithm consists of three main steps:
STEP 1 expansion of loops in the decision graph
STEP 2 transformation of the decision graph into an alpha graph
STEP 3 reconstitution of loops in the alpha graph The first step transforms the loop into two decisions: an outer and inner decision. During this process the loop nodes are transformed into permanent loop instance nodes and other loop instance nodes, both temporary and permanent, are added to the decision graph.

The second step transforms the resulting decision graph into an alpha graph using the conventional alpha graph transform.

The third step redirects the incoming edges of temporary loop instance nodes to the permanent loop instance nodes and removes the temporary loop instance nodes.

8.4.2 Step 1 of Loop Transform
8.4.2.1 Overview

To motivate our model of loop expansion, let us begin by examining a simpler model. In this model, there is no expansion of the loop, and step 1 would consist of just replacing the loop predicate WNode with a DNode. This effectively converts the loop into an ordinary decision. This model is sufficient for analyzing zero or one iterations of the loop, but it is incomplete. In particular, it misses one of the three fundamental flows shown in FIG. 106, the feedforward flow. The single level model of loop expansion used in the loop transform addresses this deficiency. The precision of loop analysis can be further increased to any desired degree by increasing the level of expansion, as suggested in FIG. 105.

A schematic control flow diagram of loop expansion model used in the algorithm is illustrated in FIG. 10. The outer decision has the predicate if(true). The exit of the outer decision becomes the normal exit of the loop.

The expansion consists of temporary and permanent loop instance nodes. A temporary loop instance node is identified by inserting a '0' as the last element in its loopInstance vector. A permanent loop instance node is identified by inserting a '1' as the last element in its loopInstance vector. All outcomes which exit the loop, including the false outcome of the loop predicate, are converted to breaks which transfer control to the exit of the outer decision (or the exit of another enclosing loop or decision).

The next three sections explain how the loop expansion algorithm, schematized in FIG. 110, captures each one of the three fundamental data flows associated with loops as illustrated in FIG. 106.

8.4.2.2 Loop Entry Data Flow

Loop entry edges represent data that comes from outside the loop. Data flow into the loop must pass into the true outcome of the outer decision, since the boolean value of its predicate is always true. FIG. 110 illustrates how data entering the loop passes through the 'T' instance of the loop entry CNode. The loop entry CNode represents convergence of data from outside the loop with data flow from inside the loop. This type of convergence is depicted in FIG. 104 by the two incoming edges which converge on the origin of edge #3. Convergence which occurs in different instances of a loop node is further explained in the section, "Intra-method Graphs."

If, upon entry to the loop, the loop predicate as represented by the predicate of the inner decision, is true, then the data from outside the loop passes through the loop entry CNode and reaches (exposed) uses in the loop body. If the first instance of the loop predicate is false, then the data from outside the loop, after passing through the loop entry CNode, exits the loop as explained below.

If, upon entry to the loop, the loop predicate is true, the first instance of the loop body is executed. If the next evaluation of the loop predicate is true, the second instance of the loop body is executed. Single level loop expansion is sufficient for modelling data flow from an arbitrary instance n to instance n+1 of the loop, since making n arbitrary does not introduce any flows not already found in the single level model.

8.4.2.3 Feedforward Data Flow

Feedforward data flow is data that flows from one instance of the loop to the next. FIG. 110 illustrates how this fundamental loop related flow is generated during loop expansion. After the '1' instance of the loop body, a '0' instance of the loop entry node is followed by pull-through uses of those variables which are defined in the loop. During the second step of the transform, the pull-through uses create incoming data edges for the '0' instance of the loop entry node. During the third step of the transform, these data edges are redirected to the '1' instance of the loop entry node and become the feedforward edges of the loop.

8.4.2.4 Loop Exit Data Flow

Data flows out of the loop via a loop exit edge. The normal exit of the loop is the exit of the outer decision in the loop expansion. The normal exit of the loop corresponds to the loop exit node. As mentioned in the section on the loop exit edge, data may also be conveyed out of the loop by a break to the normal exit of an enclosing loop or decision.

It is important to distinguish a loop iteration exit node from a loop exit node. The loop iteration exit node is executed upon the completion of each iteration of the loop. The loop exit node is executed upon completion of all iterations of the loop. In FIG. 104, the loop iteration exit node is the image of edge #3. In the same Figure, the loop exit node is the image of edge #7. In FIG. 110, the loop iteration exit node is represented by the box containing the '0' instance of the loop entry node. In the same Figure, the loop exit node is the image of the origin of the edge labeled "loop exit."

8.4.2.5 Algorithm for STEP 1

We have presented the general concept of loop expansion in terms of its effect in the control domain. FIG. 104 shows the input control flowgraph of the autoiterator example, and FIG. 110 shows a general schematic of the output control flowgraph. Since the algorithm transforms a decision graph, we shift our attention to the decision graph domain. The algorithm is presented using the autoiterator example. The net effect can be seen by comparing FIG. 109, which shows the input decision graph, with FIG. 114, which shows the output decision graph.

The algorithm for the loop expansion transforms the decision graph into the general "nested decision" structure portrayed in FIG. 110. The loop expansion algorithm is divided into four steps:

- extract the cyclic subgraph of the loop from the input decision graph
- transform the cyclic subgraph into the outer decision of the expanded loop
- transform the subgraphs from the previous step into the inner decision of the expanded loop
- adjust the ID of the loop exit node The cyclic subgraph of the loop consists of the loop entry node and the subtree having the loop predicate as its root. The cyclic subgraph of the example is shown in FIG. 111.

FIG. 111 illustrates transformation of the cyclic subgraph into the outer decision of the expanded loop.

The pseudocode for this step is:

```
root = the SNode parent of the WNode
n3 = the loop entry node = the immediate predecessor of the WNode
detach n3 from the root; save n3
create n0, a new LNode with a new index; the loop instance vector of n0 is a
    clone of the loop instance vector of the WNode, with a '0' appended at
    the end; create a new definition of the dummy variable 'true' and add
    it to n0
attach n0 to the root, in the position originally occupied by n3
detach the WNode from the root; save the WNode
create n1, a new DNode with the same index as the WNode;   the loop instance
    vector of n1 is a clone of the loop instance vector of n0; create a new
    use of 'true' and add it to n1
attach n1 to the root, in the position originally occupied by the WNode
create n2, a new SNode as the true child of n1 with a new index; the loop
    instance vector of n2 is a clone of the loop instance vector of n0
```

FIG. 112 illustrates transformation of the subgraphs from the previous step into the first part of the inner decision of the expanded loop. To emphasize the analogy with FIG. 111, n2 is the only node shown in the subgraph having SNode 1 as its root.

The pseudocode for this step is:

```
attach n3 as the first child of n2, which was created in the previous step
save the ID of the false child of the WNode; delete the false child
n6 = the true child of the WNode
```

```
        detach n6 from the WNode; save n6
        save the ID, use vector, atomicPredicateNumber and subPredicateNumber of
the
    WNode; delete the WNode
        create a new DNode n4 which has the same ID, use vector,
            atomicPredicateNumber  and  subPredicateNumber  as  the  original
WNode
        attach n4 as the second child of n2
        create n5, a new BNode with the same ID as the false child of the WNode;
the
            target of n5 is DNode n1
        attach n5 as the false child of n4
        attach n6 as the true child of n4
        append '1' to the loop instance vector of n3 and all nodes in subtree n4
```

FIG. 113 illustrates the completion of the inner decision of the expanded loop.

The pseudocode for this step is:

```
            create the loop iteration exit, n7, a new loop entry CNode with the same
index       as n3; the loop instance vector of n7 is a clone of the loop instance
                vector of n0
            attach n7 as the third child of n2
            create n8, a new LNode with a new index; the loop instance vector of n8 is
a
                clone of the loop instance vector of n0
            for( each variable such that: there is a definition of the variable in
                subtree n6 AND the definition is on a physical path from n4 to n7 AND
                the path from the definition to n7 is non-cylic )
                    create a new use of the variable and add the use to n8
            attach n8 as the fourth child of n2
```

In the final step of the loop expansion transform, the ID of the loop exit (n9) and the endNumber of n7 are adjusted in accordance with the pseudocode:

```
n9 = the loop exit node = the immediate successor of n1; append '1' to the
    loop instance vector of n9
endNumber of n7 = endNumber of n9
```

FIG. 114 illustrates the output of the loop expansion transform when applied to the autoiterator example. The overall algorithm performs a preorder traversal of the decision graph, beginning at the root, and applying the loop expansion transform to each WNode. After the expansion of a WNode, the algorithm continues by calling itself on n6.

8.4.3 STEP 2 of Loop Transform

The next step is to apply the alpha graph transform to the expanded decision graph. The result for the autoiterator example is shown in FIG. 115.

8.4.4 STEP 3 of Loop Transform 8.4.4.1 Overview

The third and final step of the loop transform reconstitutes loop structure and removes the temporary scaffolding created during loop expansion. The loop reconstitution algorithm is divided into four steps:

removal of pull-through uses and create feedforward edges
  redirection of control inputs of loop predicates from '0' instance to the
    '1' instance
  removal of all temporary nodes
  removal of last entry ('1') from loopInstance vector of loop nodes [optional]

This step assumes that the alpha graph is properly formed: that there are no definitions inside predicates and that there are no data flow anomalies (for example, a use that is not reached by any definition). The loop reconstitution transformed is applied to each alpha graph. In a nested loop, the loop reconstitution transform should be first applied to the innermost loop and then be successively applied to the next outer loop until all loops in the nested loop have been transformed.

8.4.4.2 Algorithm for STEP 3

The simplified pseudocode for the loop reconstitution algorithm is:

```
for( each alpha node a2 in the alpha graph )
    {
        if( a2 is the '0' instance of a loop node in the reference loop )
        {
            if( a2 is the '0' instance of a loop entry node [i.e. a loop
                iteration exit node])
                {
                    delete the pull-through uses [uses which are the
                        destinations of out edges of a2]
                    for ( each input edge of a2 )
                    {
                        a3 = origin of input edge
                        remove input edge
                        if (the '1' instance of the loop entry node
                            exists )
                                create a new feedforward edge from
                                    a3
                                    '1' instance of the loop entry node
                    }
                }
```

```
        }
    if( a2 is not a control plus alpha node )
        delete a2 [and its associated edges]
    }
for( each alpha node a3 in the alpha graph )
    {
    if( the size of a3's loop instance vector > 0 )
        remove all elements from a3's loop instance vector
    }
```

FIGS. 115, 116 and 118 illustrate the operation of the loop reconstitution when applied to the autoiterator example. The input is shown in FIG. 115 and the output in FIG. 118.

The application of the first step, the removal of the pull-through use(s) and the creation of feedforward edge(s), is illustrated in FIG. 116.

In our example, the second step, the deletion of temporary nodes, removes the artifacts of the outer loop: d9.0(true) and u4.0(true). Note that control plus alpha nodes are not removed during this step, since a control plus alpha node associated with the '0' instance of a loop predicate is converted to a '1' instance in the second step. The last step removes the last entry ('1') from loopInstance vector of loop nodes. The result of applying these two steps to the original autoiterator example is illustrated in FIG. 117.

The last step is optional, since for certain types of analysis, such as determining depth of loop nesting, it may be desirable to retain the information contained in the loopInstance vectors.

The cleanup transform follows the loop transform. The cleanup transform removes redundant control edges and phantom nodes. The autoiterator contains a redundant control edge, the edge from ?4.1(x) to d6.1(x) in FIG. 117. This edge is removed. There are no phantom nodes in the example.

The final alpha graph of the autoiterator example, after the cleanup transform, is shown in FIG. 118.

9 Partition Transform 9.1 Introduction

The input of the partition transform is a single decision graph produced by the loop expansion transform. The partition transform converts the single decision graph into a set of one-use decision graphs. Each one-use decision graph is associated with a unique target use in the input decision graph. The partition transform clones the input decision graph and removes all the nodes which are successors of the target use to produce each one-use decision graph.

In the decision graph, a successor appears "to the right of" or "below" the target use. If the use is in a predicate (i.e., in a DNode), then the children of the DNode are removed.

The partition transform preserves:
the target use and ancestors of the target use
CNodes associated with the remaining decisions
LoopEntryCNodes and LoopExitCNodes associated with the remaining loops
LNodes which contain pull-through uses There are two types of one-use decision graphs:
1. normal and
2. initial PseudoDUPair The target use of a PseudoDUPair one-use decision graph is in a PseudoDUPair, whereas the target use of a normal one-use decision graph is not. The type of a one-use decision graph may be determined by examining the data elements in the target use node. If this node has only two data elements, a definition and a PseudoDUPair which contains the definition, then the one-use decision graph is a PseudoDUPair one-use decision graph. The partition transform consists of two steps:

1. the generation of the normal one-use decision graphs and
2. the generation of the PseudoDUPair one-use decision graphs This order is necessary, since the second step creates DefinitionAlphaNodes for the definitions in the initial PseudoDUPairs which are not necessarily visible to other uses.

9.2 EXAMPLE #4

Example #4 will be used to illustrate the operation of the partition transform in the production of a single, normal one-use decision graph. The DDF for Example #4 is:

```
example4 {
    d(x), d(a), d(b);
    if( u(a) )
    {
        if( u(b) )
    d(x);
        }
    u(x);
    }
```

The control flowgraph of Example #4 is shown in FIG. 119. The decision graph of Example #4 is shown in FIG. 120.

The decision graph in FIG. 121 illustrates the one-use decision graph produced by the partition transform when the input is the decision graph of Example #4 and the target use is u5(b). Note that the children of the DNode containing u5(b) have been removed.

10 Star Transform 10.1 Properties of Path Sets

The operation of the alpha transform is based on path sets. A path set is a set of paths in the control flowgraph or decision graph that has a single entry node. Each path set has:
(1) an initial node (which is the entry node)
(2) a reference decision
(3) a reference variable There is one exception to the above rule: the trivial path set, which consists of a single LNode, has no reference decision.

The three major types of path sets are:
(1) decision
(2) decision outcome
(3) loop Further information about path sets can be found in the section "Generalized Search of the Decision Graph."

The operation of the star transform is based on two special types of path sets:
(1) maximal reducible path sets
(2) isolated path sets Informally, a maximal reducible path set is the largest path set such that all paths begin at the initial node, end at the exit of the reference decision and contains no definition of the specified reference variable.

A path set is classified in accordance with its properties. We begin by defining some of the fundamental properties of reducible path sets.

A path set is linear if all paths in the path set begin at a specified entry node and end at a specified exit node. There may be paths from entry nodes different from the specified entry node that reach exit nodes in the path set or paths from predicate nodes in the path set that reach exit nodes different from the specified exit node, but such paths are not in the path set.

A path set is standard if it is linear and the entry node is the predicate node of a decision or loop and the exit node is the partial or complete exit of the same decision or loop. A further constraint may be imposed on the path set to restrict it to those paths from the entry node to the exit node that have a specified polarity (true or false). Examples of standard paths sets are (partial or complete) outcomes, decisions and loops. A path set is partial if it is standard and the exit of the path set is a partial exit. Similarly, a path set is complete if it is standard and the exit of the path set is a complete exit.

A path set is live if the path set is linear and if there exists a def-clear path (wrt a specified reference variable) from the entry node of the path set to the exit node of the path set.

A path set is cohesive if the path set is linear and if all paths which begin at the entry node and pass through a predicate node in the path set are also contained in the path set. A standard path set which has no internal predicate node consists of simple paths and is cohesive. Note that there may be paths from other entry nodes (different from the specified entry node) which reach exit nodes in the cohesive path set. Of course, such paths are not in the cohesive path set.

A path set is empty if all paths in the path set are def-clear wrt a specified reference variable and the path set does not contain the target use.

A path set is an isolated path set if there exists no path from the root of the decision graph to the initial node of the path set. An isolated path set represents structurally unreachable code.

10.1.1 Maximal Reducible Path Set

In order for a path set to be reducible, we must examine the properties of the path set itself, which is called the primary path set, and the properties of an associated path set called the secondary path set. The secondary path set consists of all paths that begin at the exit node of the primary path set and reach the target use (or, in the delta star transform, the entry node of the reference data input path set). Note that the secondary path set is a linear path set.

A path set is reducible if the primary path set is empty and complete, and the secondary path set is live. Alternatively, a path set is reducible if the primary path set is empty, partial and cohesive, and the secondary path set is empty and cohesive. If a reducible path set is an outcome in which all paths reach one or more loop exits, then the path set ends at the first loop exit. (This restriction is necessary to preserve the inputs of loop exit alpha nodes).

A path set is maximal if it is not contained in any larger path set that is of the same type (in the case of the star transform, a reducible path set). A path set is a maximal reducible path set if it is a reducible path set that is maximal.

10.2 Introduction

The input of the star transform is a one-use decision graph produced by the partition transform. The star transform modifies the one-use decision graph by eliminating nodes which have no effect on information flow to the target use.

There are two types of path sets which have no effect on information flow:
- isolated path sets.
- maximal reducible path sets For correct operation, the alpha transform requires that its input, the decision graph, contains no unreachable code. Therefore, the star transform begins by removing all isolated path sets, since such path sets are unreachable. If an isolated path set is present in the decision graph, the star transform will remove the isolated path set. The star transform calls itself recursively until all isolated path sets have been removed.

The star transform then proceeds to the next step, which is to remove each maximal reducible path set. If the maximal reducible path set is a decision outcome, then it replaces the path set with a simple path (i.e., an empty LNode or BNode).

The empty outcomes remaining after the star transform are mapped to star alpha nodes: hence the name of the transform.

10.3 Example of Reducible Path Set

The control flowgraph in FIG. 122 contains the complete decision a which is a simple example of a reducible path set.

The decision is empty because it contains no definition of the reference variable 'x'. The decision is complete because the entry node (the destination of edge #3) is the predicate node of the decision and the exit node (the origin of edge #6) is the complete exit of the decision. The secondary path set is live because there is a def-clear path (wrt 'x') from the origin of edge #6 to the target use u7(x).

Since the decision is empty and complete, and the secondary path set is live, the decision is a reducible path set.

10.3.1 Example of Maximal Reducible Path Set

Decision a in FIG. 122 is also an example of a maximal reducible path set. The decision is maximal because it is not contained in a larger reducible path set. The path set is therefore a maximal reducible path set (wrt 'x').

Decision a has no influence on the information flow (wrt 'x') from its entry to its exit. Since no definition of 'x' can be injected into the data stream that passes through the decision, the definition of 'x' which reaches the exit (the origin of edge #6) and u7(x) is not influenced by the path taken in decision a. Similarly, the path taken in decision a has no effect on the final control state of the exit and u7(x).

EXAMPLE #5

The DDF for Example #5 is:

```
example5 {
    d(x), d(a), d(b);
    if( u(a) )
    {
        if( u(b) )
            d(a);
    }
    else
        d(x);
    u(x); u(a);
}
```

The control flowgraph of Example #5 is shown in FIG. 123. In this graph, the true outcome of decision a is another example of a maximal reducible path set.

The true outcome of a is empty since it is def-clear (wrt 'x'). The true outcome of a is complete because its entry node is the predicate node of a decision and its exit (the origin of edge #10) is a complete exit. Since the primary path set is empty and complete and the secondary path set is live, the true outcome of a is reducible. The true outcome of a is maximal since it is not contained in a larger reducible path set (wrt 'x').

The star transform preserves:
(1) the target use
(2) ancestors of the target use
(3) CNodes (including LoopEntryCNodes and LoopExitCNodes) associated with non-empty decisions and loops
(4) LNodes with pull-through uses and
(5) the false outcome of non-empty loops The latter restriction is necessary to preserve loop exit alpha nodes.

The decision graph of Example #5 is shown in FIG. 124. In this graph, the true outcome of decision a is found to be empty (wrt 'x') by searching the subtree with the true child of a (SNode #4) as its root. This path set is complete because the subtree contains no external breaks. It is maximal because subtree a is not empty.

NOTE: If subtree a had one or more external breaks, then it would not be sufficient to search (only) the subtree with the true child of a as its root, since the subtree would be neither complete nor maximal. See the section, "External Breaks".

If a decision is maximal and reducible, then the star transform removes the entire decision. In this example, decision b was maximal reducible and has been removed. This is demonstrated in FIG. 125, which shows the result after the star transform has been applied to the decision graph in FIG. 124.

If only one outcome of a decision is maximal reducible, the subtree corresponding to the outcome is replaced by an empty LNode. In this example, the true outcome of decision a was maximal reducible and has been replaced by the empty LNode #4. The empty LNode represents a dcco (def-clear complementary outcome) and later serves as the basis for the creation of a star alpha node by the delta transform. A dcco is an outcome that is def-clear (wrt a specified variable), whereas its alternate outcome is not.

10.4 Isolated CNode

When the star transform is applied to an empty outcome that is a maximal reducible path set which extends beyond the normal exit (of the decision having the entry node of the outcome as its predicate), the star transform replaces the empty outcome with a BNode which has the exit node of the outcome as its target.

In the augmented control flowgraph shown in FIG. 126, the outcome cFALSE is highlighted. This outcome is empty and complete. Since the secondary path set [from the origin of edge #16 to the target use, u7(x)] is live, the outcome is maximal reducible and is replaced by a BNode which has the origin of edge #16 as its target.

The result of replacing cFALSE with a BNode in the one-use decision graph corresponds to replacing cFALSE with a break. The corresponding control flowgraph is shown in FIG. 127.

In the example, both outcomes of decision c are breaks, so there is no path from the entry node of the graph (the origin of edge #2) to the exit node of decision c. The exit edge which has the exit node of decision c as its origin is highlighted in the control flowgraph shown in FIG. 127. This edge corresponds to CNode #12 in the one-use decision graph. When an exit node has no in-edges, the corresponding CNode in the decision graph is called an isolated CNode. CNode #12 is an example of an isolated CNode. An isolated CNode is unreachable and therefore has no antecedent.

10.5 Isolated Path Set

An isolated CNode may be present in a method prior to analysis or it may be produced by the star transform. Irrespective of its origin, an isolated CNode may also produce subpaths in the flowgraph which are unreachable. An isolated subpath begins at the successor of the isolated CNode and ends at the predecessor of the first CNode (along the path) that is reachable from the entry point of the method. Note that the isolated subpath does not include the isolated CNode. The set of isolated subpaths created by an isolated CNode is called an isolated path set.

In the augmented control flowgraph shown in FIG. 128, the outcome cFALSE is highlighted. This outcome is maximal reducible and is replaced by a BNode which has the origin of edge #17 as its target.

10.5.1 Example of Isolated Path Set

When the star transform replaces cFALSE with a BNode in the one-use decision graph, it produces isolated CNode #12. The isolated CNode produces an isolated subpath which is highlighted in control flowgraph shown in FIG. 129. The isolated subpath corresponds to BNode #13. In the decision graph, nodes in the isolated subpath consist of the generalized successors of the isolated CNode. The star transform eliminates these unreachable nodes.

The isolated CNode is not included as part of the isolated subpath and therefore not removed by the star transform, because it is part of decision c which is not isolated.

11 Kappa Transform

11.1 Introduction

The overall control transform (kappa transform) consists of two phases: kappa1 and kappa2.

The first phase, kappa1
traverses the decision graph and
applies kappaCombine which loads the interior nodes
The second phase, kappa2(variable)
traverses the modified decision graph and
produces interior edges, interior plus edges, plus interior edges and all alpha
nodes associated with these edges, including control plus alpha nodes The interior edges are generated from DNode/child/grandchild edges in the decision graph. Interior edges, interior plus edges, plus interior edges and control plus alpha nodes are generated from interior nodes (using generateBreakInteriorEdges).

11.2 Central Concept of an Interior Edge

An interior (control) edge means that the destination is on all paths in the associated outcome of the decision.

The control flowgraph for Example #11 is shown in FIG. 130. In this example, the image of d4(x) is on all paths (i.e., the only path) in the true outcome of decision a. Therefore, there will be an interior edge from the image of a to the image of d4(x) in the alpha graph.

FIG. 131 illustrates how the interior edge is derived from the DNode/child edge in the decision graph of Example #11.

11.3 Outcome Node

The child of a DNode is called an outcome node. In the previous example, the interior edge was derived from the DNode and the outcome node. The interior edge has the same polarity as the outcome node.

The DDF for Example #12 is:

```
example12 {
    d(x); d(a); d(b);
    if( u(a) )
    {
        d(x);
        if( u(b) )
            d(x);
    }
    u(x);
}
```

FIG. 132 illustrates how an interior edge can be derived from the
DNode/grandchild relationship in the decision graph of Example #12.

11.4 DNode/Grandchildren Edges

If the outcome node is an SNode, then several of its children may be on all paths in that outcome. In this case, an interior edge is generated for each child that:

is an LNode which contains a definition of the variable in the target use and
is not preceded by a DNode that has an external break The reason for the latter restriction is that those child nodes after the DNode child with the external break will not be on all paths in the outcome (of the grandparent). This restriction is illustrated in FIG. 133. If c has an external break (wrt c), then interior edges will be generated for b and c, but not for e.

11.5 Concept of Break Interior Edge

There is a new type of interior edge that cannot be derived from the parent/child/grandchild relationship. This type is called a break interior edge, because it is caused by an external break.

Normally, if a definition is a successor of a tree, the definition will block ("kill") all the data flows from the tree. This property is demonstrated by Example #13.

The DDF for Example #13 is:

```
example13 {
    d(x); d(a); d(b);
    if( u(a) )
    {
        if( u(b) )
            d(x);
        // The definition on the next line is d9(x)
        d(x);
    }
    u(x);
}
```

The decision graph of Example #13 is shown in FIG. 134.

In this example, the definition d9(x) blocks all data flows from the tree b. As a result, the data flow from SNode 4 is reduced to d9(x) as shown in the partial alpha graph of FIG. 134.

On the other hand, if b contains an external break (wrt b), then the break produces a path that bypasses d9(x), and b is no longer "dead." Example #14 is derived from Example #13 by replacing the true outcome of decision b with an external break (wrt b).

The DDF for Example #14 is:

```
example14 {
    d(x); d(a); d(b);
    A: if( u(a) )
    {
        if( u(b) )
            break A;
        // The definition on the next line is d9(x)
        d(x);
    }
    u(x);
}
```

The decision graph of Example #14 is shown in FIG. 135.

The external break causes d9(x) to be on all paths from the LNode of b that does not contain the break to the exit of the extended decision (which is the same as the exit of a).

Since d9(x) is on all paths in the false outcome of b, there will be a break interior edge from b false to d9(x) as shown in the partial alpha graph of FIG. 135.

The introduction of this new type of interior edge has some interesting consequences, as will be demonstrated using Example #15.

```
example15 {
    d(x), d(a), d(b), d(c);
    A: if( u(a) )
    {
        if( u(b) )
        {
            if( u(c) )
                break A;
        }
        d(x);
    }
    else
```

```
        d(x);
        u(x);
    }
```

The control flowgraph of Example #15 is shown in FIG. 68.

Note that two decisions in Example #15, b extended and c extended, share a common exit. This structure is characteristic of extended decisions as discussed earlier.

The new phenomenon that we would like to emphasize in this example is that the definition d13(x) is on all paths of two outcomes. The implication of this is that certain alpha nodes can now have more than one interior control input.

11.6 The Control Plus Alpha Node

The control plus alpha node makes it possible to extend dynamic information flow analysis to semi-structured programs.

Just as the (data) plus alpha node represents the (alternate) convergence of data flow, the control plus alpha node represents the alternate convergence of control flow.

In the alpha graph of Example #15, shown in FIG. 136, the two control inputs to d13(x) converge on a single control plus alpha node. The inputs to the control plus alpha node are called interior plus edges and are polarized. The output is called a plus interior edge and is not polarized.

11.7 Interior Nodes

The break interior edges are encoded in the decision graph by associating interior nodes with the appropriate outcome nodes. Certain interior nodes represent the destinations of break interior edges. In the decision graph of Example #15, shown in FIG. 137, the interior node representing d13(x) is placed in the false outcome of DNodes b and c.

A break interior edge is generated from an interior node only if the interior node is an LNode.

We shall now explain how the interior nodes are generated.

11.7.1 Kappa Combine kappa1, the first phase of the kappa transform, sequences the application of kappaCombine, which generates the interior nodes. kappaCombine propagates control from right to left and has two operands:

A <dot> B

Subtree A must have a DNode as its root and contain an external break relative to the root DNode. Node B must be a DNode or BNode or LNode with a definition of the variable in the target use. If these conditions are met, kappaCombine places a reference to the right operand (node B) into the interior node vector of each EndNode or SNode which is the root of a maxSubtree in A. The operation of kappaCombine is shown schematically in FIG. 138.

11.7.2 Maximal Subtree

Now we shall address the question of why kappaCombine places the interior nodes into the roots of maximal subtrees.

A subtree with root N is a maximal subtree with respect to predicate c if subtree N does not have an external break with respect to c, but its parent does.

Let <pi> be the parent of outcome node <lambda>, where <lambda> contains an interior node. This is shown schematically in FIG. 139.

In FIG. 138, the left operand is tree A and the right operand is node B.

For <lambda> to be an outcome node in A that contains interior node B, node B must be on all paths in <lambda>.

This first observation implies that:
the tree with root <lambda> has no
external break with respect to A This condition is shown schematically in FIG. 140.

For B to be on even one path in <lambda>, the exit of <pi> must be a successor of B. This requirement is evident from the control flowgraph in FIG. 141.

This second observation implies that:
the tree with root <pi> must have an
external break with respect to A This condition is shown schematically in FIG. 140.

11.8 Kappa1 kappa1 sequences the application of kappaCombine.

In processing the children of an SNode, when a child is encountered that is a DNode with an external break, kappa1 will not call the kappa transform on the remaining children.

The reason is the same as in generateInteriorEdges which is called by kappa2. A child of the SNode that occurs after the DNode with an external break, will not be on all paths in the outcome of the parent (of the SNode). This restriction is illustrated in FIG. 133.

If c has an external break (wrt c), then kappaCombine will be applied to the combination b and c, but not to the combination c and e.

11.9 Kappa2 kappa2 produces interior edges, interior plus edges, plus interior edges and the alpha nodes associated with these edges (including control plus alpha nodes) using
generateInteriorEdges and
generateBreakInteriorEdges The former generates interior edges from the parent/child/grandchild relationships, whereas the latter generates interior edges, interior plus edges, plus interior edges and control plus alpha nodes from the interior nodes.

If a PredicateAlphaNode or DefinitionAlphaNode has an interior edge input and a break interior edge input is added, addInteriorEdge will generate a control plus alpha node as shown schematically in FIG. 142.

12 Delta Transform

12.1 Introduction

The basic concept underlying the data transform (also called the delta transform) is that data flows are constructed by tracing the flow of data backwards (backtracking) from the target use. Backtracking along a particular path stops when a definition is encountered, since the definition blocks all data flow that precedes it (along that path).

Example #6 shall be used to illustrate backtracking. The DDF for Example #6 is:

```
example6 {
    d(x), d(a);
    if( u(a) )
        d(x);
    u(x);
}
```

The control flowgraph of Example #6 is shown in FIG. 130.

In Example #6, backtracking data flow from u7(x) along the true outcome of a leads to d4(x), which blocks the data flow from d2(x).

This technique therefore handles "killing" definitions and the non-local behavior of data flow in semi-structured programs (i.e., programs with breaks).

The delta transform consists of two phases:
deltaForward and
deltaback

12.2 Delta Forward

The first phase, deltaForward traverses the decision graph
applies deltaSetAntecedent which loads the
antecedents, and
fills the break vectors of DNodes An antecedent is the source of data flows reaching the node with which it is associated. The antecedent is defined wrt a specific variable. Only EndNodes and DNodes have antecedents. A Node has only a single antecedent. The break vector of a DNode contains each BNode which has that DNode as its target.

With respect to variable 'x' in Example #6 above, the antecedent of u7(x) is segment #6. The antecedent of segment #6 is a. The true outcome of a, d4(x), has no antecedent, since the definition blocks all sources of data flow to that segment. The antecedent of segment #5 is d2(x), since this definition is the source of data which reaches the false outcome.

12.2.1 Delta Forward
Subtree hasData deltaForward loads the antecedents of EndNodes and DNodes by propagating data forward in the decision graph, from each subtree that "has data." A subtree has data, if the method hasData returns true when applied to the root of the subtree. hasData has two parameters: a reference decision and reference variable.

hasData returns true if each EndNode in the subtree that is on a physical path from the predicate of the reference decision to the normal exit of the reference decistion: has a definition of the reference variable or has an antecedent or is an isolated CNode or is the successor of an isolated CNode.

If there is no path from the predicate of the reference decision to its normal exit, then hasData returns false.

12.2.2 Delta Forward
Data Flow deltaForward propagates data from left to right in the decision graph. It has two operands:
A <dot> B The left operand (A) must have data (i.e., hasData applied to A returns true). A copy of the root of A is placed as an antecedent in each EndNode of B that:
is either empty (i.e., does not have a definition of the variable in the target use) or that has a use of the variable and
has the property that any node in the path from this EndNode back to B that
has an SNode parent, is the first child of the SNode parent.

The propagation of data from A to B is shown in FIG. 143. An example decision graph showing the antecedents is shown in FIG. 144. If a node has an antecedent, the index of the antecedent appears in italics below the identifier of the node.

12.3 Delta Back

The delta transform establishes a mapping from nodes in the decision graph to nodes in the alpha graph. A node in the decision graph maps to an alpha node called its "image" in the alpha graph.

deltaBack is the second phase of the delta transform. deltaBack traverses the decision graph and produces images of nodes in the decision graph (that are involved in data flows) and the associated edges in the alpha graph:
alpha nodes (except control plus alpha nodes and the images of unexposed definitions and uses)
data edges (that are not intra-segment) and
exterior control edges The intra-segment transform, kappa2 and deltaBack produce alpha nodes. The intra-segment transform generates the images of unexposed definitions and uses, and the intra-segment data flows associated with these unexposed memory access elements. kappa2 produces all control plus alpha nodes, duplicates of some alpha nodes produced by deltaBack and extraneous nodes called "vestigial alpha nodes." The vestigial alpha nodes do not participate in data flows and are later removed by the kappaCleanUp transform.

12.3.1 Delta Back

Forms of Delta Back

There are several forms of deltaBack:

deltaBack (the primary form)

deltaBackUse deltaStarBack deltaStarBackDcco deltaBackDcco deltaBackDciupo

The method name "deltaBack" will be used in the generic sense, to refer to any one of the above forms. deltaBack is recursive. When deltaBack calls itself, it selects the proper form.

deltaBack is initiated by calling deltaBackUse on a node in the decision graph which contains a target use. deltaBack uses the antecedents and break vectors created by deltaForward to trace the flow of data in the reverse direction of flow. In general, deltaBack is called on the antecedent of a decision graph node.

12.3.2 Delta Back

Backtracking

As deltaBack performs this "backtracking" of the data flow, it generates the alpha nodes involved in the flow, and the associated data flow and exterior control flow edges in the alpha graph.

In general, each time deltaBack is called on a decision graph node, it creates the image of that node, an alpha node, if the image does not yet exist in the alpha graph. It then returns a vector containing the image of the decision graph node. The exceptions return: an empty vector or a vector of "source nodes" or the vector returned by calling deltaBack on its antecedent or a vector containing the image of the dciupo associated with the node.

In general, the data flow edges of the alpha graph are generated by using the image of the current decision graph node as the destination of each data flow edge and the images returned by the recursive call to deltaBack as the origins of the data flow edges.

When deltaBackDcco or deltaStarBackDcco or deltaBackDciupo is called, it creates an image of the dcco or dciupo, if the image does not yet exist, and the exterior control edge input of its image (a star alpha node).

12.3.3 Delta Back on a BNode

12.3.3.1 Delta Back on a BNode that is a Dcco

A BNode is a dcco if it represents an empty outcome: an outcome that does not contain a definition of the reference variable. deltaBack obtains its image, a star alpha node, by the call:

a2=deltaBackDcco (variable)

which creates the image of the dcco if it does not yet exist. The image, a2, is inserted into the vector returned by deltaBack. The image (a star alpha node) is shown in FIG. 145.

In the decision graph, a break outcome is empty if the parent of the BNode is a DNode or if the parent of the BNode is an SNode and the preceding definition or decision was removed by the star transform.

12.3.3.2 Delta Back on a BNode that is not a Dcco

If this BNode does not represent an empty outcome, then deltaBack makes a recursive call to deltaBack on its antecedent:

```
n1 = antecedent of this BNode
av = n1.deltaBack (variable)
```

The image of the antecedent (which is the first alpha node in vector av) is inserted into the vector returned by deltaBack on this BNode.

Since this type of BNode has no image (of its own), it is an exception to the general rule that deltaBack returns a vector containing the image of the decision graph node.

12.3.4 Delta Back on a CNode

12.3.4.1 Delta Back on a Normal CNode

A CNode that is not a special type of CNode (an isolated CNode or loop entry CNode or loop exit CNode) is called a normal CNode.

If the image of a normal CNode does not yet exist, deltaBack on the CNode creates its image and each incoming data flow edge (if the edge does not yet exist). deltaBack returns a vector containing the image of the CNode.

The image of a normal CNode is a plus alpha node, shown as 'A' in FIG. 170. The origins of the incoming data flow edges of 'A' are returned in the vector av, which is obtained from the recursive call:

```
n1 = antecedent of this CNode
av = n1.deltaBack (variable)
``` av usually contains more than one alpha node. An example of an exception is a decision with a break outcome (which bypasses the normal CNode).

12.3.4.2 Delta Back on an Isolated CNode

An isolated CNode corresponds to an exit node (in the augmented control flowgraph) which has no in-edges. Since it has no in-edges, the isolated CNode cannot be on a path from the entry to the exit of the method and is therefore unreachable. Since an isolated CNode is unreachable, it has no antecedent.

If the antecedent of a CNode is null, then it is an isolated CNode:

```
n1 = antecedent of this CNode
if ( n1 == null )
    return < empty vector >
```

Since an isolated CNode does not participate in any data flow, it has no image, so deltaBack returns an empty vector. This type of CNode is an exception to the general rule that deltaBack returns a vector containing the image of the decision graph node.

12.3.4.3 Delta Back on Loop Entry Nodes

The action of deltaBack on a LoopEntryCNode depends on its type: normal, spurious or star interior. The difference between a normal and spurious LoopEntryCNode is based on the following important principle.

Principle for the Formation of a Loop Entry Node

Two conditions are necessary for the formation of a loop entry node in the alpha graph:

(1) There must be an initializer input, i.e., a data flow from a node preceding
    the loop that reaches the loop entry node.
(2) There must be at least one feedforward input, i.e., a data flow from a node in the loop iteration path set that reaches the loop iteration exit. (In
    the alpha graph, the loop iteration exit is the same as the loop entry node.)

The loop iteration path set consists of paths from the loop predicate to the loop iteration exit (which is the image of the 'O' instance of the LoopEntryCNode). In the alpha graph, data flow from an instance of the loop passes through the loop entry node before it reenters the loop or exits from the loop.

12.3.4.3.1 Delta Back on a Spurious LoopEntryCNode

A spurious LoopEntryCNode is a LoopEntryCNode which has no image (loop entry plus alpha node) in the alpha graph, because it does not meet the conditions for the formation of a loop entry node.

In the decision graph, a LoopEntryCNode is spurious if either:
- the '1' instance of the LoopEntryCNode has no antecedent (which indicates condition (1) above is not satisfied) or
- there is no pull-through use of the reference variable following the '0' instance
  - of the LoopEntryCNode (which indicates that condition (2) above is not satisfied)

In the example shown in FIG. 146, the LoopEntryCNode corresponding to edge #3 is spurious because there is no data flow which reaches edge #3 from the exterior of the loop and therefore condition (1) for the formation of a loop entry node is not satisfied.

In this example, there is a definition of variable 'y' on a path from the loop predicate (edge #4) to the loop iteration exit (edge #3) so the loop expansion transform generates a pull-through use of 'y'. This pull-through use is spurious since the LoopEntryCNode does not satisfy condition (1) above.

If the pull-through use of a variable is spurious, then the associated LoopEntryCNodes for that variable are spurious. The converse is not generally true; a spurious LoopEntryCNode may have no associated spurious pull-through use. The spurious pull-through use is described in the section, "Delta Back Use on a spurious pull-through use."

If a LoopEntryCNode is a spurious LoopEntryCNode, then deltaBack does not generate an image of the LoopEntryCNode.

When applied to the '0' instance of a spurious LoopEntryCNode, deltaBack does nothing and returns an empty vector.

When applied to the '1' instance of a spurious LoopEntryCNode, deltaBack acts as if it were called on the antecedent of the spurious LoopEntryCNode.

12.3.4.3.2 Delta Back on a Star Interior LoopEntryCNode

The image of a star interior LoopEntryCNode is a loop entry plus alpha node which has an associated star alpha node.

A star interior LoopEntryCNode is a LoopEntryCNode that is not spurious, is on all paths in an outcome of a decision (where the decision is not an artifact of loop expansion), and has an antecedent which is not in the same outcome as the LoopEntryCNode.

The initializer input of a star interior loop entry plus alpha node is similar to the input of an interior use. The inputs of a plus alpha node are composite inputs. Like a star interior use, the initializer input of a star interior loop entry plus alpha node receives its execution condition from an associated star alpha node a1, which is obtained from the call:

a1=deltaBackDciupo (variable)

A data flow edge is created from a1 to the image of the star interior LoopEntryCNode.

12.3.4.3.3 Delta Back on a Normal LoopEntryCNode

The image of a normal LoopEntryCNode is a loop entry plus alpha node.

A normal LoopEntryCNode is a LoopEntryCNode that is neither a spurious nor a star interior LoopEntryCNode. A normal LoopEntryCNode is handled in the same way as a normal CNode (except its image is a loop entry plus alpha node instead of a plus alpha node).

The recursive call to deltaBack returns only one alpha node in av, since the image of a loop entry CNode (after loop expansion but before loop reconstitution) has only one incoming edge: the edge which connects to the initializer input to the plus alpha node, which is its image.

12.3.4.4 Delta Back on a LoopExitCNode

The image of a loop exit CNode is a loop exit plus alpha node.

deltaback on a loop exit CNode is otherwise the same as deltaBack on a normal CNode.

If this is the loop exit CNode of a loop which has no breaks out of the loop, then its image will have only one incoming edge.

12.3.5 Delta Back on a DNode deltaBack on a DNode creates its image, if its image does not yet exist. If it is a loop DNode, its image is LoopPredicateAlphaNode A; otherwise its image is PredicateAlphaNode A. If the image of the DNode is created, then the images of all uses in the DNode are added to its image.

The DNode is an exception to the general rule that deltaBack returns a vector containing the image of the decision graph node. Instead, deltaBack on a DNode returns a vector of "source nodes". Let B be the plus alpha node which is the normal exit of the decision with this DNode as its predicate. The source nodes are the origins of the incoming data flow edges which have B as their destination. The source nodes are obtained by calling deltaBack on the children of the DNode (in accordance with the rules that follow) and on each BNode that has this DNode as its target. This process is depicted schematically in FIG. 147.

If the child is an SNode, then deltaBack is called on its last child, since the last child is the source of the data flow that reaches the normal exit of the decision. If the child (or the last child of an SNode child) is a BNode, then deltaBack is not called on that child. The call is unnecessary. If the BNode represents an external break, the data flow from the child bypasses the normal exit of the decision. If the BNode does not represent an external break, then deltaBack will be called on the BNode when deltaBack is called on each BNode that has this DNode as its target.

12.3.6 Delta Back on an LNode

12.3.6.1 Delta Back on an LNode that is a Dcco

An LNode is a dcco if it does not contain a definition or use of the reference variable. deltaBack obtains its image, a star alpha node, by the call:

a2=deltaBackDcco (variable)

which creates the image of the dcco if it does not yet exist. The image, a2, is inserted into the vector returned by deltaBack. The image (a star alpha node) is shown in FIG. 145.

Note that this operation is the same as deltaBack on a BNode that is a dcco.

12.3.6.2 Delta Back on an LNode that is not a Dcco

If this LNode contains a definition of the reference variable, then deltaBack creates its image, a definition alpha node (if the image does not yet exist). Recursion on deltaBack ceases, since this type of LNode has no antecedent. The image of this LNode is inserted into the vector returned by deltaBack. The image (a definition alpha node) is shown in FIG. 148.

If the LNode contains a pull-through use, then deltaBack acts as if it were called on its antecedent:

```
n1 = antecedent of this LNode
return n1.deltaBack(variable)
```

12.4 Delta Back Use deltaBack is initiated by calling deltaBackUse on a target use in an LNode or DNode. In the example shown in FIG. 130, the target use is u7(x), which is contained in the node n=LNode #7. deltaBack is initiated by the call:

n.deltaBackUse("x")

When deltaBack reaches the inverse image of an entry point of the alpha graph, in this case d2(x), backtracking terminates.

deltaBackUse creates an image of the target use and the incoming data flow edge of the target use. deltaBackUse is an exception to the general rule that deltaBack returns a vector containing the image of the decision graph node. Instead, deltaBackUse returns an empty vector, since there is no further recursion on deltaBack.

12.4.1 Delta Back use on a Normal Use

The operation of deltaBackUse on an LNode varies in accordance with the type of use. There are four special types of uses: star interior, anomalous, pull-through and initial PseudoDUPair. A use that is not one of these special types is called a normal use.

deltaBackUse begins by checking if the LNode has been removed by the star transform. If it has, then deltaBackUse returns.

deltaBackUse on a normal use in an LNode creates the image of the use and makes the call:

```
n1 = antecedent of this LNode
av = n1.deltaBack (variable)
``` av will contain the single alpha node a1. deltaBackUse creates a data flow edge from a1 to the image of the use. The basic action of deltaBackUse on a normal use in an LNode is shown in FIG. 149.

12.4.2 Delta Back Use on a Star Interior Use

The first special type of use is a star interior use. The antecedent of a star interior use is not in the partial outcome ending at the star interior use, therefore the partial outcome is def-clear. This outcome, which is a def-clear interior use partial outcome (dciupo), begins at the predicate of the minimal enclosing decision (or loop) and ends at the interior use.

deltaBackUse on a star interior use in an LNode creates the image of the use and makes the call:

a2=deltaBackDciupo (variable)

which creates the image of the dciupo, the star alpha node a2. deltaBackUse creates a data flow edge from a2 to the image of the use. The basic action of deltaBackUse on a star interior use in an LNode is shown in FIG. 150.

12.4.3 Delta Back Use on an Anomalous Use

The second special type of use is an anomalous use. An anomalous use is a use that is not reached by a definition. An anomalous use is a classic form of data flow error and is reported as an error in the program being analyzed.

If the LNode containing a use has no antecedent, then the use is anomalous and deltaBackUse reports the error to the program analyzer.

12.4.4 Delta Back Use

Overview of Pull-Through Uses

The third special type of use is a pull-through use. Pull-through uses are added to the decision graph by the loop expansion transform. The purpose of pull-through uses is to induce deltaBackUse to produce feedforward edges and loop entry nodes in the alpha graph.

12.4.4.1 Generation of Pull-Through Uses

Prior to the loop expansion transform, the decision graph represents only one instance of a loop. In order to induce deltaBackUse to produce feedforward edges, two special types of nodes are added to the decision graph by the loop expansion transform: '0' instances of loop entry nodes and LNodes containing pull-through uses.

The images of these nodes are temporary and are later removed by the loop reconstitution transform. The pull-through use derives its name from its action, which is to pull data through the '0' instance of the loop entry node.

Recall conditions 1 and 2 for the formation of loop entry nodes. The loop expansion transform determines if the 2nd condition is met by searching the loop iteration path set for a definition of the reference variable. If such a definition exists, then the 2nd condition is satisfied. On the other hand, the loop expansion transform is incapable of performing the data flow analysis necessary for determining if the 1st condition is satisfied. This data flow analysis cannot be performed until the delta transform.

12.4.4.2 Detection of Spurious Pull-Through Uses

The loop transform therefore produces a pull-through use if the 2nd condition is satisfied. As a consequence, some of the pull-through uses generated by the loop expansion transform do not satisfy the 1st condition. Such pull-through uses are called spurious pull-through uses and must be recognized by the delta transform (in the form of deltaBackUse). A pull-through use that meets both the 1st and 2nd conditions is called a normal pull-through use.

deltaBackUse distinguishes normal and spurious pull-through uses by examining whether or not the 1st condition is satisfied. If the '1' instance of the loop entry node associated with the pull-through use has an antecedent, then the loop entry node has an initializer input and the pull-through use is normal. If it has no antecedent, then there is no initializer data flow and the pull-through use is spurious.

12.4.4.3 Preservation of Pull-Through Uses

The star transform directly follows the loop expansion transform and directly precedes the delta transform. The star transform removes empty compete path sets, such as complete decisions, loops or outcomes.

The star transform preserves certain nodes in the decision graph, such as ancestors of the target use, the node containing the target use and CNodes associated with non-empty decisions or loops.

The star transform also preserves pull-through uses, so the LNodes which contain the pull-through uses are passed through intact to the delta transform.

12.4.4.4 Delta Back Use on a Pull-Through Use

The behavior of deltaBackUse is dependent on the type of pull-through use. There are two types of pull-through uses:

normal and spurious

The action of deltaBackUse when applied to each type is based on the principle for the formation of a loop entry node.

Formally, "data flow" should be qualified as being with respect to a specified reference variable. For example, if the reference variable were 'x', data flow is from a definition of 'x' to a use of 'x'. For convenience, we shall frequently omit the qualifier in our presentation.

12.4.4.5 Delta Back Use on a Normal Pull-Through Use

A normal pull-through use represents the destination of data that is flowing out of one instance of the loop. The real destination could be in the next instance of the loop or some point outside of the loop.

deltaBackUse on a normal pull-through use operates in exactly the same way as deltaBackUse on a normal use.

In the example shown in FIG. 151, the data flow from d6(x) flows out of one instance of the loop to the next, therefore the pull-through use of 'x' generated by the loop expansion transform is a normal pull-through use.

12.4.4.6 Delta Back Use on a Spurious Pull-Through Use

For a spurious pull-through use, there exists no corresponding real data flow out of the single loop instance. A spurious pull-through use occurs when there is a definition in the loop which reaches only a use or uses that are within the same instance of the loop as the definition.

deltaBackUse on a spurious pull-through use acts as if it does not exist. The suppression of backtracking has the effect of suppressing the creation of the corresponding loop entry node and feedforward edge.

In the example shown in FIG. 146, d6(y) reaches only one use, u6(y), which is in the same loop instance as d6(y). Since there is no data flow outside of the loop instance for 'y', the pull-through use of 'y' generated by the loop expansion transform is a spurious pull-through use.

12.4.5 Delta Back Use on an Initial Pseudodupair Use

The fourth special type of use is an initial PseudoDUPair use. An initial PseudoDUPair use is the target use of a oneUseDecisionGraph that is not exposed because it is in a PseudoDUPair. The initial PseudoDUPair oneUseDecisionGraph is discussed in the section, "Partition Transform."

deltaBackUse on an initial PseudoDUPair use creates the image of the PseudoDUPair (including the edge from the definition alpha node to the use alpha node).

12.4.6 Delta Back Use on Use in a DNode deltaBackUse on a use in a DNode operates in a manner similar to deltaBackUse when applied to a use in an LNode.

deltaBackUse begins by checking if the DNode has been removed by the star transform. If it has, then deltaBackUse returns.

The presence of the use in a DNode causes deltaBackUse to perform two additional operations:
- create the image of this DNode if the image does not exist (a LoopPredicateAlphaNode if this is a loop DNode; otherwise a PredicateAlphaNode)
  - the variable in the use is added to the 'variables' vector of the predicate alpha
    - node If the antecedent of the DNode is a spurious LoopEntryCNode, then the antecedent is corrected by setting it to be the antecedent of the LoopEntryCNode.

Otherwise deltaBackUse proceeds as if the use were in an LNode, according to the type of use (anomalous, star interior or normal).

If the DNode containing the use is a loop predicate, special tests are needed to discern if the use is a star interior or normal use. These tests are described under the heading, "Interior Use in Loop Predicate," in the section, "Partial Outcome."

12.5 Delta Back Dcco and Dciupo

There are two fundamental types of path sets which map to a star alpha node: the dcco (def-clear complementary outcome) and dciupo (def-clear interior use partial outcome).

When deltaBack is called on a node that is a dcco (i.e, an empty LNode or BNode that represents an empty outcome), it calls deltaBackDcco.

When deltaBack is called on a node that is has an associated dciupo (i.e., a star interior LoopEntryCNode), it calls deltaBackDciupo. When deltaBackUse is called on a node that is has an associated dciupo (i.e., a star interior use in a DNode or LNode), it calls deltaBackDciupo.

The operation of deltaBackDciupo is not separately described, since it is the same as deltaBackDcco. The following description applies to deltaBackDciupo by replacing deltaBackDcco with deltaBackDciupo and "dcco" with "dciupo."

If the image of the dcco already exists, the call to deltaBackDcco returns.

Otherwise, deltaBackDcco:
- creates a2, the image of this dcco (a star alpha node) as shown in FIG. 145.
- calls deltaBack on n1, its antecedent, unless n1 is a partial exit, in which case deltaBackDcco calls deltaStarBack on n1. a1 is the first element in the vector returned by deltaBack (or by deltaStarBack).
- creates a data edge from a1 to a2. The predicate of the decision which has this dcco as an outcome is the reference predicate.
- creates an exterior edge of the appropriate polarity from the image of the reference predicate to a2

If deltaBackDcco is called on a LoopEntryCNode or a DNode which is a loop predicate, then the reference predicate will be 4 levels up in the decision tree due to loop expansion.

12.6 Delta Transform Example

The operation of the delta transform when applied to Example #6 is illustrated in FIGS. 152 through 157. For reference, the control flowgraph of Example #6 is shown in FIG. 130.

The delta transform is applied to two oneUseDecisionGraphs. In the first oneUseDecisionGraph, the target node is DNode 3 (the decision predicate) and the target use is the use of 'a' in DNode 3. The first step of the delta transform, delta forward, loads the antecedent LNode 2 in DNode 3. The second step of the delta transform, delta back, creates the nodes and data flow involving variable 'a'. The trace beginning with the call to delta back use and the resulting alpha graph (which is called a "delta graph") is shown in FIG. 153.

In the second oneUseDecisionGraph, the target node is LNode 7 and the target use is the use of 'x' in LNode 7. delta forward loads the antecedents in the decision graph as shown in FIG. 152. If a node has an antecedent, the index of the antecedent appears in italics below the identifier of the node. Next, delta back creates the nodes and data flows involving variable 'x' and the corresponding delta graph. The trace beginning with the call to delta back use is shown in the sequence of diagrams in FIGS. 154 through 157.

The alpha graph obtained by merging the two delta graphs is shown in FIG. 158. One call for each (exposed) use in the decision graph produces all alpha nodes (except control plus alpha nodes and the images of unexposed definitions and uses), all data edges (that are not intra-segment) and all exterior control edges of the alpha graph. This is due to the recursive nature of deltaBack.

Only one type of edge (excluding intra-segment data edges) is missing from the alpha graph: the interior control edge. These are produced by the control transform (also called the kappa transform).

13 Delta Star Transform

13.1 Introduction

Example #9 is presented to review the basic operation of the star transform. The DDF for Example #9 is:

```
example9 {
    d(x), d(a), d(b), d(e);
    if(u(a))
    {
        if(u(b))
            d(a);
        if(u(e))
            d(x);
    }
    else
```

```
        d(x);
        u(x); u(a);
    }
```

The control flowgraph of Example #9 is shown in FIG. 159.

In this example, predicate b has no effect on the live definition of 'x' that reaches the false outcome of decision e: edge #11, which will be mapped to a star alpha node. All paths through decision b are def-clear wrt the variable 'x', so it is an empty path set. Since decision b is also maximal reducible, the path set will be removed by the star transform from the one-use decision graph for u15(x).

13.1.1 A Limitation of the Star Transform

Example #10 is presented to illustrate a fundamental limitation of the star transform. The DDF for Example #10 is:

```
example10 {
    d(x), d(a), d(b), d(c), d(e);
    A: if(u(a))
    {
        if(u(b))
        {
            if(u(c))
            {
                d(x);
                break A;
            }
        }
        if(u(e))
            d(x);
    }
    else
        d(x);
    u(x);
}
```

The control flowgraph of Example #10 is shown in FIG. 160.

Example #10 is similar to Example #9, except a break external wrt b has been introduced. As in Example #9, predicate b has no effect on the live definition of 'x' that reaches the false outcome of decision e (which is represented by edge #17).

In this example, the star transform will not remove partial decision b from the one-use decision graph for the target use u21(x) because the star transform removes only maximal reducible path sets. The partial decision b is not reducible because the primary path set (from b to the origin of edge #14) is not cohesive. It is not cohesive because there is a path from the entry of b which passes through internal predicate c and bypasses the partial exit of b.

13.1.2 Partial Outcome

In Example #10, edge #17 receives data directly from the origin of edge #14, which is the partial exit of decision b. A partial outcome is empty if all paths in the partial outcome are def-clear (wrt a specified variable).

The partial outcome b'true is highlighted in the control flowgraph shown in FIG. 161. Since both partial outcomes (b'true and b'false) are empty wrt 'x', the partial decision b' consisting of these outcomes is also empty wrt 'x'.

13.1.3 Delta Star Back as a Special Form of Delta Back

A partial decision consists of partial outcomes of both polarities extending from a common predicate node to a common partial exit.

Backtracking in the delta transform is performed by the second phase of the delta transform, deltaBack. When deltaBack is called on a dcco, it switches over to deltaBackDcco, a special form of deltaBack. If the antecedent of the dcco is a partial decision, deltaBackDcco switches over to deltaStarBack, which is another special form of deltaBack. deltaStarBack operates in a manner similar to deltaBack, except that it acts as if empty partial decisions have been removed and as if empty partial outcomes are replaced by empty LNodes and BNodes.

In Example #10, b' is a partial decision, since edge #14 is a partial exit. If a partial decision is empty, then deltaStarBack will backtrack past the empty partial decision, which has the effect of acting as if the empty partial decision does not exist. This is analogous to the star transform, which physically removes an empty complete decision (if the secondary path set is live).

13.1.4 Maximal Data Reducible Path Set

The path sets that are (virtually) removed or replaced by the delta star transform are called maximal data reducible path sets. This operation is similar to the star transform, which physically removes or replaces maximal reducible path sets. The properties of path sets referenced below are defined in the section, "Star Transform." Note that in the delta star transform, the entry node of the secondary path set is the exit node of the primary path set, and the exit node of the secondary path set is the entry node of the reference data input path set.

A path set is data reducible if the primary path set is empty and partial, and the secondary path set is empty. A data reducible path set is maximal if it is not contained in any larger data reducible path set.

13.2 Applicability deltaStarBack is applied to a Node K if it will be mapped to an alpha node that
has a data (as opposed to a composite) input and its antecedent is a CNode which represents a partial exit.

Any Node that is mapped to a star alpha node is a possible candidate for Node K, since a star alpha node has a data input. For example, an empty LNode maps to a star alpha node. If the antecedent of the empty LNode is a CNode that is a partial exit, then deltaStarBack is applied to the LNode. A CNode represents a partial exit wrt the Node K if its antecedent is the predicate of a decision which has at least one external break which "bypasses" the Node K.

The reason why deltaStarBack is not applied to a partial decision that is the source of information for a reference input node with a composite input, is that the transform does not preserve all the control information necessary for composite inputs. When deltaStarBack is performed, control information from external breaks that were originally in the composite outcomes is lost.

13.2.1 Concept

The diagram in FIG. 162 represents the conditions for the applicability of deltaStarBack in terms of control flow.

In this diagram, K represents an alpha node with a data (not composite) input. Since J has an external break, there is a path from J which bypasses K. The exit of the upper box is therefore a partial exit.

The arrows leading from the partial exit to K indicate that the antecedent of K is the partial exit of decision J, which qualifies K as a reference input node with respect to the partial exit.

K is called the reference input node and J is called the reference decision for the application of deltaStarBack.

13.3 Analysis of Reference Decision

As compared to deltaBack, deltaStarBack has the added capability of detecting and processing partial outcomes and partial decisions. This process is described with reference to the control flow diagram in FIG. 163.

Assuming that the applicability conditions for deltaStarBack are met, then when deltaBack is applied to K, it will call deltaStarBack (instead of deltaBack) on the partial exit of J.

At this point, deltaStarBack adds an extra processing step. It examines J as if the external breaks (wrt J) do not exist.

If the partial decision J is empty, then deltaStarBack will act as if the partial decision J does not exist.

13.3.1 Analysis of Empty Reference Decision

As shown in the diagram in FIG. 164, deltaStarBack backtracks past the empty partial decision J by calling itself on the "simulated" antecedent of J, which is the antecedent of the first node in the decision graph of J that has an antecedent.

Note that the effect on backtracking is the same as if the empty partial decision J does not exist.

13.3.2 Backtracking Empty Partial Outcome

If the partial decision J is not empty, then deltaStarBack proceeds in the same manner as deltaBack on the root node of J, which is a DNode. This process is described with reference to the control flow diagram in FIG. 165.

At this point deltaStarBack adds another extra processing step. If a partial outcome in the reference decision is empty, deltaStarBack substitutes a "simulated" empty LNode for the empty outcome. deltaStarBack on the simulated empty LNode creates a star alpha node, just as it would if called on a "real" empty LNode.

If the partial outcome is not empty, then deltaStarBack calls itself on the outcome node if it is an LNode, or the last child of the outcome node, if it is an SNode.

13.4 Continuation deltaStarBack continues to call itself on antecedents until it either runs out of antecedents or there are no more partial decisions to process. In the latter case, it reverts to deltaBack.

The reference input node and reference decision are passed as arguments to deltaStarBack. As it proceeds, deltaStarBack continues to call itself with the same arguments until it reaches a:
  predecessor partial decision—a partial decision that is "outside" the current reference decision or
  nested partial decision—a partial decision that is "inside" the current reference decision When deltaStarBack enters a predecessor partial decision, the reference decision passed to deltaStarBack is changed to the predecessor partial decision. When deltaStarBack enters a nested partial decision, the reference decision passed to deltaStarBack is changed to the nested partial decision and the reference input node passed to deltaStarBack is changed to the node having the exit of the nested partial decision as its antecedent.

13.4.1 Predecessor Partial Decision

When backtracking inside the current reference decision J, if deltaStarBack is called on an antecedent that is the exit of a predecessor partial decision J″, then deltaStarBack will call itself on J″ with the reference decision set to J″. This process is described with reference to the control flow diagram in FIG. 166.

The current reference input node K is used to determine if the decision J″ is a partial decision. To qualify as a partial decision wrt K, J″ must possess an external break that bypasses K.

The current reference decision J is used to determine if the partial decision J″ is a predecessor partial decision. To qualify as a predecessor partial decision wrt J, J″ cannot be a descendent of J in the decision graph.

13.4.2 Nested Partial Decision

When backtracking inside the current reference decision J, if deltaStarBack encounters a nested partial decision, it will call itself with the new reference input node K′ and the new reference decision J′. This process is described with reference to the control flow diagram in FIG. 167.

The new reference input node K′ is used to determine if decision J′, is a partial decision. To qualify as a partial decision wrt K′, J′ must possess an external break that bypasses K′.

The current reference decision J is used to determine if the partial decision J′ is a nested partial decision. To qualify as a nested partial decision wrt J, J′ must be a descendent of J in the decision graph.

13.5 Completion

When deltaStarBack is called on an antecedent that is not "inside" the current reference decision J (i.e., not a descendent of J in the decision graph) and that antecedent is not the exit of a partial decision, deltaStarBack calls deltaBack. This process is described with reference to the control flow diagram in FIG. 168.

13.6 Delta Star Back on a BNode

13.6.1 Delta Star Back on a BNode That is a dcco deltaStarBack is called on a BNode that forms a break partial outcome. The partial outcome begins at the BNode if its parent is a DNode; otherwise the partial outcome begins at its parent, which is an SNode. The partial outcome ends at the normal exit of the BNode's target or at the normal exit of the bounding decision if the normal exit of the bounding decision precedes the normal exit of the BNode's target. n1 is the antecedent of this BNode. If the break partial outcome is empty and the associated partial decision is not empty, then the partial outcome is a dcco and its image, a star alpha node is created by the call:

deltaStarBackDcco (n1, n3, n4, variable)

deltaStarBack returns a vector containing the star alpha node.

13.6.2 Delta Star Back on a BNode that is not a Dcco

If the break partial outcome formed by this BNode is not a dcco, then deltaStarBack makes a recursive call to deltaStarBack on its antecedent:

av=n1.deltaStarBack (n3, n4, variable)

deltaStarBack returns the image of the antecedent (which is the first alpha node in vector av).

13.7 Delta Star Back on a CNode

13.7.1 Delta Star Back on an Isolated CNode

If deltaStarBack is called on an isolated CNode, it has no effect since the isolated CNode represents an unreachable exit. (For a more complete description of the isolated CNode, see the sections on the Star Transform and Delta Transform.)

If the antecedent of a CNode is null, then it is an isolated CNode:

```
n1 = antecedent of this CNode
if ( n1 == null )
    return < empty vector >
```

Since an isolated CNode does not participate in any data flow, it has no image, so deltaStarBack returns an empty vector.

13.7.2 Delta Star Back on a Normal CNode

The action of deltaStarBack when called on a normal CNode (i.e., a CNode that is not an isolated CNode or LoopEntryCNode or LoopExitCNode) depends on the type of CNode:
  partial exit of new reference decision
  partial or complete exit of a decision that is inside the current reference decision
  partial exit of a nested partial decision
  partial exit of a decision that is outside the current reference decision

13.7.3 Delta Star Back on CNode
Partial Exit of New Reference Decision deltaback switches over to deltaStarBack when deltaBack-Dcco is called on a node n (an empty LNode or BNode) and the antecedent of n is a CNode, nc, which is a partial exit (wrt n).

deltaBackDcco calls deltaStarBack on the CNode with the reference input node set to n and the reference decision set to 'null':

nc.deltaStarBack(n, null, variable)

When deltaStarBack is called with the reference decision set to 'null', it will set the new reference decision n4 to n1, the antecedent of nc.

Since nc is a partial exit wrt n, the new reference decision n4 contains n.

13.7.4 Delta Star Back on CNode
Partial Exit of New Reference Decision which is Empty If the partial decision n1 is empty (within the normal bounding decision n4 and wrt the reference variable), then deltaStarBack acts as if the empty partial decision does not exist by calling deltaStarBack on n2, which is the first node (via preorder traversal) in the partial decision n1 that has an antecedent:

av=n2.deltaStarBack (n3, n4, variable)

where n3 is the reference data input node and n4 is the reference decision. deltaStarBack returns the vector av.

deltaStarBack returns the vector obtained by the recursive call to deltaStarBack on n2 as depicted in FIG. 169.

13.7.5 Delta Star Back on CNode
Partial Exit of New Reference Decision which is not Empty If the partial decision n1 is not empty (within the normal bounding decision n4 and wrt the reference variable), then deltaStarBack continues recursively by calling itself on n1:

av=n1.deltaStarBack (n3, n4, variable)

If the image of the CNode, does not yet exist, deltaStarBack creates its image, a plus alpha node, as shown as 'A' in FIG. 170. The origins of the incoming data flow edges of 'A' are returned in the vector av from the recursive call. If an incoming data flow edge of 'A' does not yet exist, deltaStarBack creates it.

deltaStarBack returns a vector containing the image A of the CNode.

13.7.6 Delta Star Back on CNode
Decision Inside of Reference Decision

If the CNode is the partial or complete exit of a decision inside of the reference decision (and is not the partial exit of a nested partial decision as described below), then deltaStarBack operates in the same way as deltaStarBack on a CNode that is the partial exit of a new reference decision except that there is an input reference decision n4 which remains unchanged.

13.7.7 Delta Star Back on CNode
Nested Partial Decision deltaStarBack switches over to deltaStarBack with a new reference input node and a new reference decision (i.e., a nested partial decision) when deltaStarBackDcco is called on a node n0 (an empty LNode or BNode) and the antecedent of n0 is a CNode which is a partial exit.

deltaStarBackDcco calls deltaStarBack on the CNode with the new reference input node set to n0 and the reference decision set to 'null':

n1.deltaStarBack (n0, null, variable)

As described previously, calling deltaStarBack with the reference decision set to "null" causes deltaStarBack to create a new reference decision. Since the new reference decision is "inside" of the original reference decision (in deltaStarBackDcco), it is called a nested partial decision. The predicate of the nested partial decision is the antecedent of n1 in the above call.

13.7.8 Delta Star Back on CNode
Predecessor Partial Decision deltaStarBack switches over to deltaStarBack with a new reference decision n4 when deltaStarBack is called on a CNode and n1, the antecedent of the CNode, is not contained in the current reference decision n4 and the CNode is a partial exit (wrt the reference input node n3).

In this case, deltaStarBack sets the reference decision to n1, and deltaStarBack operates in the same way as deltaStarBack on a CNode that is the partial exit of a new reference decision.

Let n0 be the reference decision passed to this invocation of deltaStarBack. Since the new reference decision n1 is "outside" of the original reference decision and is a predecessor of n0, the new reference decision n1 is called a predecessor partial decision.

13.7.9 Delta Star Back on CNode
Decision Outside Reference Decision deltaStarBack switches over to deltaBack when deltaStarBack is called on a CNode and n1, the antecedent of the CNode, is not contained in the current reference decision n4 and the CNode is not a partial exit (wrt the reference input node n3). deltaStarBack reverts to deltaBack by making the call:

av=n1.deltaBack (variable)

If the image of the CNode, does not yet exist, deltaStarBack creates its image, a plus alpha node, as shown as 'A' in FIG. 170. The origins of the incoming data flow edges of 'A' are returned in the vector av from the recursive call. If an incoming data flow edge of 'A' does not yet exist, deltaStarBack creates it.

deltaStarBack returns a vector containing the image A of the CNode.

13.7.10 Delta Star Back on a Loop Entry CNode

The image of a LoopEntryCNode is a loop entry plus alpha node.

deltaStarBack on a LoopEntryCNode reverts to deltaStarBack since the input of a loop entry plus alpha node is composite. deltaStarBack makes the call:

$$av = deltaBack\ (\ variable\ )$$

and returns av.

13.7.11 Delta Star Back on a Loop Exit CNode

The image of a loop exit CNode is a loop exit plus alpha node.

deltaStarBack on a loop exit CNode is otherwise the same as deltaStarBack on a CNode.

13.8 Delta Star Back on a DNode deltaStarBack on a DNode creates its image if the image does not yet exist. The image of a loop DNode is loop predicate alpha node A; otherwise the image of a DNode is predicate alpha node A.

If a child n2 of the DNode is not an external break (wrt the DNode), then deltaStarBack determines if the partial outcome beginning at n2 is empty (within the normal bounding decision n4).

If the partial outcome n2 is empty, deltaStarBack begins by determining mOutcome, which is the lesser of the maximal element in n2 and the normal bounding decision. Intuitively, mOutcome is the "size" of the partial outcome. If mOutcome does not exceed the DNode parent of n2, then n1 is used as a "simulated" empty LNode to represent the partial outcome, where n1 is the antecedent of the first node in n2 that has an antecedent. deltaStarBack calls deltaStarBackDcco on n2 which produces a star alpha node as the image of the empty partial outcome. If the partial outcome is empty and mOutcome exceeds the DNode parent of n2, then n2 is replaced by an internal BNode which has mOutcome as its target.

If the partial outcome n2 is not empty, then deltaStarBack adjusts n2 if necessary (by setting n2 to be its last child if n2 is an SNode) and makes a recursive call to deltaStarBack on n2. deltaStarBack also makes a recursive call to deltaStarBack on each BNode that has this DNode as its target.

Like deltaBack, deltaStarBack returns a vector containing source nodes as depicted schematically in FIG. 171. Let B represent the image of the normal exit of the decision having this DNode as its predicate. A source node is the origin of a data flow edge which has B as its destination.

13.9 Delta Star Back on an LNode 13.9.1 Delta Star Back on an LNode that is a Dcco If an LNode does not have a definition (or use) of the reference variable, it is treated as a dcco by deltaStarBack. n1 is the antecedent of this LNode. deltaStarBack obtains the image of this (empty) LNode, a star alpha node, by the call:

a2=deltaStarBackDcco (n1, n3, n4, variable)

which creates the image of the dcco if it does not yet exist. The image, a2, is inserted into the vector returned by deltaStarBack.

13.9.2 Delta Star Back on an LNode that is not a Dcco

If this LNode contains a definition of the reference variable, then deltaStarBack creates its image, a definition alpha node (if the image does not yet exist). Recursion on deltaStarBack ceases, since this type of LNode has no antecedent. The image of this LNode is inserted into the vector returned by deltaStarBack.

13.10 Delta Star Back Dcco on a Node that is a Dcco deltaStarBackDcco is called by deltaStarBack on a node that is a dcco. If the image of the dcco already exists, the call to deltaStarBackDcco returns.

If this node qualifies as the input reference node for a nested partial decision, then deltaStarBackDcco calls deltaStarBack on n1 with n3 set to this node and n4 (the input parameter for the reference decision) set to "null." This will cause deltaStarBack to create a new reference decision (see nested partial decision).

Otherwise, deltaStarBackDcco makes a recusive call to deltaStarBack on n1 with the other parameters unchanged.

a1 is the first element in the vector returned by the recursive call to deltaStarBack.

deltaStarBackDcco creates a2, the image of this dcco (a star alpha node), and a new data edge from a1 to a2.

This node is a partial outcome of the decision which has pa as the image of its predicate. If pa does not yet exist, deltaStarBackDcco creates it.

deltaStarBackDcco then creates an exterior edge of the appropriate polarity from pa to a2.

deltaStarBack returns a vector containing the star alpha node, a2.

13.11 Delta Star Transform Example

Example #10 shall be used to illustrate the basic operation of deltaStarBack. A portion of the decision graph for Example #10 is shown in FIG. 172. If a node has an antecedent, the index of the antecedent appears in italics below the identifier of the node.

Let us examine what happens when deltaBack is called on LNode #17 in the decision graph.

When deltaBack reaches LNode #17, it detects that LNode #17 meets the applicability conditions for deltaStarBack:

LNode #17 is empty and therefore will be mapped to an alpha node with a data input and its antecedent, CNode #14, is a partial exit wrt LNode #17, since its antecedent, DNode #5, is the predicate of a decision that has an external break (BNode #10)

which bypasses LNode #17.

Therefore, deltaBack calls deltaStarBack on LNode #17.

When deltaBack calls deltaStarBack from LNode #17, deltaBack sets the current reference input node to LNode #17. deltaStarBack is called on CNode #14. Since there is no current reference decision, deltaStarBack sets the current reference decision to the partial decision b', since it is the antecedent of this CNode.

Next, deltaStarBack searches b' for definitions of the variable in the target use. The decision graph in FIG. 173 shows how b' appears to deltaStarBack (since it searches only the partial decision, ignoring external break outcomes).

Since b' is an empty partial decision, deltaStarBack calls itself on the "simulated" antecedent of b'. The first descendent of b' which has an antecedent is LNode #13. Its antecedent, LNode #2, is the "simulated" antecedent of b'.

The net effect is illustrated by the decision graph in FIG. 174. deltaStarBack on LNode #17 operates as if the empty partial decision b' does not exist.

Since LNode #2 has no antecedent, deltaStarBack creates and returns its image, d2(x). This returns control to deltaStarBack on CNode #14, which returns control to deltaStarBack on LNode #17. deltaStarBack creates its image, *17(x), and a data edge from the image returned by deltaStarBack to the image of this node. The delta graph generated by this operation is shown in FIG. 175.

The trace for delta back on LNode #17 is shown in FIG. 176.

14 Kappa Cleanup Transform 14.1 Vestigial Alpha Nodes

The kappa transform can produce extraneous alpha nodes called "vestigial" alpha nodes. The kappa clean-up transform removes vestigial alpha nodes from the alpha graph generated by the kappa transform.

A vestigial alpha node is a definition alpha node which is not involved in a data flow or a predicate alpha node which has no out edges after the vestigial definition alpha nodes have been removed by this transform.

For example, the definition d4(x) in the control flowgraph shown in FIG. 177 does not reach the use d4(x) nor any other use. Since d4(x) is not part of a inter-segment data flow nor intra-segment data flow, the image of d4(x) produced by the kappa transform will be a vestigial alpha node.

14.2 Kappa and Delta Graphs

The output of the kappa transform is an alpha graph called the kappa graph. Likewise, the output of the delta transform is an alpha graph called the delta graph. For each kappa graph, there is an associated delta graph, since the input of both transforms is the same decision graph. This correspondence is shown in FIG. 178.

Vestigial alpha nodes are identified by comparing the kappa graph with its associated delta graph. The delta graph contains only those alpha nodes which participate in a data flow. Any alpha node in the kappa graph which does not also appear in the associated delta graph is vestigial.

14.3 Removal of Vestigial Alpha Nodes

The kappa clean-up transform removes vestigial alpha nodes and their associated edges.

The kappa graph in FIG. 179 contains d4(x) which does not appear in the corresponding delta graph. d4(x) is therefore a vestigial alpha node. The kappa clean-up transform will remove d4(x) and its associated internal control edge.

15 Cleanup Transform

15.1 Redundant Control Edge

The cleanup transform is the final step in the production of the alpha graph(s). The cleanup transform consists of two steps:

- the removal of redundant control edges
- the removal of phantom nodes

A redundant control edge exists when two alpha nodes are connected by an alpha path and have control inputs from the same polarity of a common predicate alpha node. Since control information is implicitly carried by the alpha path, the control input of the alpha node further along the path is redundant. Since an InteriorPlusEdge connected to a PlusInteriorNode through a control plus alpha node functions like a single interior edge, this combination must also be considered when searching for redundant control edges. In the diagram shown in FIG. 180, either alpha-e1 or alpha-e2 could be such a combination. alpha-e2 is preserved if its destination is a star alpha node.

15.2 Phantom Node

The second step of the cleanup transform is the removal of phantom nodes. A phantom node is a plus alpha node that has a single input, but is not a loop exit node. In the example shown in FIG. 181, there is a data flow from node A to node B through phantom node +10(x). After the cleanup transform has removed the phantom node, the data flow is rerouted so it flows directly from A to B.

16 Path Testing

16.1 Introduction

One of the foundational problems in the theory and practice of software testing has been to find a structural test strategy that is both effective and efficient. A fundamental tenet in the theory of software testing is that the ideal (structural) test strategy for a high level of effectiveness is all-paths. The fundamental limitation of the all-paths test strategy is that it is a theoretical ideal and not attainable due to the astronomical number of control-flow paths in the units (for example, Java methods) commonly found in industry. There has been much research over the past decades in an attempt to discover a structural test strategy that approximates the theoretical effectiveness of the all-paths test strategy, yet is sufficiently efficient to use in practice.

In this section, we present a small Java method and two efficient strategies based on information flow analysis for the structural testing of this method (in ascending order of effectiveness): all epsilon paths and all alpha paths. Test strategies based on all epsilon paths or all alpha paths are efficient approximations to the all-paths strategy.

For convenience, the instance variables safety and power have been converted to the arguments s and p respectively. The signal flow algebra for this example is supplied to demonstrate that the fundamental property of the alpha graph: the information flowgraph is a graph representation of the signal flow equations.

16.2 Preprocessors

The alpha transform is preceded by three preprocessors. The Java source code listing for the example MorePower method is:

```
public void MorePower( int s, int p ) {
    if ( s == 0 && p != 0 )
    {
        p = p + 1;
        if ( p > 3 )
        p = 3;
    }
    System.out.println ( "s = " + s + " p = " + p );
}
```

The first preprocessor converts the Java source code to the internal language, DDF. The DDF may be viewed as a textual representation of the annotated control flowgraph, which is shown in FIG. 182. The DDF for MorePower is:

```
MorePower {
    d(s), d(p);
    if( u(s) && u(p) )
    {
        ud(p, p);
        if( u(p) )
            d(p);
    }
    u(s), u(p);
}
```

The second preprocessor converts the DDF to the decorated decision graph, which is shown in FIG. 183.

The third preprocessor is the compound predicate transform, which performs predicate expansion as shown in FIG. 184. The complete decision graph after the compound predicate transform is shown in FIG. 185. The effect of predicate expansion can be viewed in the control domain by comparing FIG. 182 to FIG. 186. FIG. 186 corresponds to the decision graph in FIG. 185. FIG. 182 shows the control flowgraph prior to predicate expansion, whereas FIG. 186 shows the control flowgraph after predicate expansion. The control flowgraphs are not produced explicitly, but are provided to aid in understanding the operation of the predicate expansion.

16.3 Alpha Transform

The alpha transform converts the decision graph shown in FIG. 185 to the alpha graph shown in FIG. 187. The signal flow equations can be independently derived from the control flowgraph shown in FIG. 186. The complete derivation of the signal flow equations is shown in FIGS. 188a through 188f. A comparison of equations for the signals at the uses in the control flowgraph with the alpha graph demonstrates the fundamental property of the alpha graph: the information flowgraph is a graph representation of the signal flow equations.

16.4 Physical Paths

Paths in the control flowgraph are called physical paths. A physical path corresponds to the conventional notion of a path in a program. A complete physical path extends from an entry node to an exit node of the control flowgraph. The complete physical paths in a non-cyclic control flowgraph can be obtained by listing all structurally feasible combinations of predicate states. Predicate combinations that are not structurally feasible can be determined through static analysis and eliminated from consideration. For example, if the control state of u3:1(s) is false, then the control state of u3:3(p) has no effect, because u3:3(p) is not executed. The complete physical paths for the MorePower example are listed in this manner in the table shown in FIG. 189. Structural infeasibility is represented by a '-' in the table, which indicates a "don't care" condition.

16.5 Information Flow Paths

Complete paths in the alpha graph (alpha level information flowgraph) are called alpha paths. An alpha path extends from an entry node to an exit node of an alpha graph. A method is represented by a single control flowgraph. If the method contains independent information flows, it will be represented by multiple alpha graphs. Whereas the control flowgraph of a method has a single entry node, an alpha graph may have multiple entry nodes. A method has a single control flowgraph, but may have several alpha graphs. Since an information flowgraph is a parallel representation of a program, the execution of a single physical path may correspond to the execution of multiple information flow paths.

16.6 Elementary Paths

Each alpha path is composed of building blocks called elementary paths or epsilon paths. An elementary path is defined in terms of endnodes and alpha join nodes. An endnode is an entry or exit node of the alpha graph. An alpha join node is a star alpha node or
  predicate node with multiple data inputs or
  definition de that is shared by multiple ud-pairs An alpha join node represents concurrent convergence, which means that its incoming paths could be executed concurrently. An elementary path begins and ends at either an endnode of the alpha graph or an alpha join node, with no endnodes or alpha join nodes in between the terminal nodes.

The epsilon paths are derived from the alpha tree. The general rule for constructing the alpha tree is that the children of a given node in the alpha tree are its parents in the alpha graph. The algorithm for construction of the alpha tree begins with an exit node of the alpha graph, which becomes the root of the alpha tree. The algorithm is applied recursively until all endnodes of the alpha tree are entry nodes of the alpha graph. The alpha tree for the exit node u12(p) of MorePower is shown in FIGS. 190*a* and 190*b*.

Note that the designation of alpha nodes in this figure and the subsequent figures and tables are abbreviated. For example, the node *10(p) is abbreviated as *10, since the latter designation uniquely identifies the alpha node.

In FIGS. 190*a* and 190*b*, the terminal nodes of epsilon paths are enclosed by circles. The epsilon paths are generated by beginning at the root of the alpha tree (an endnode) and, through a preorder traversal, finding the first descendent of the root which is an endnode or alpha join node. In this case, the first such descendent is *10. The first epsilon path is the sequence of nodes, beginning at *10 and progressing back toward the root:

<epsilon>1: *10+11 *u*12

The algorithm proceeds by finding the next descendent of the root which is an endnode or alpha join node: *8. The second epsilon path is the sequence of nodes, beginning at *8 and progressing back toward the root:

<epsilon>2: *8+9+11 *u*12

When all epsilon paths ending at the root have been found, the algorithm proceeds in a similar manner, by finding all epsilon paths which terminate at the first node of <epsilon>1, the first node of <epsilon>2 and so forth. The epsilon paths for the MorePower example are listed in the table shown in FIG. 191.

16.7 Complete Alpha Paths

The elementary path structure of the alpha paths is derived from the epsilon tree. The pseudocode for the algorithm which generates the epsilon tree is:

```
etree ( <epsilon>-path p )
{
    Vector vc;        /* vector of <epsilon>-paths */
    for each <epsilon>-path in the alpha tree that ends on the first alpha
``` of p
    {
        if ( <epsilon>-path is not contained in vc )
            add <epsilon>-path to vc
        add <epsilon>-path as new child of p
    }
    call etree on each child of p
}

The algorithm begins by constructing a dummy path, <epsilon>0, which consists of a single alpha node: the root node of the alpha tree. This path will later be discarded. The algorithm is initiated by calling etree on <epsilon>0:

etree ({u12})

There are three epsilon paths which end at u12: <epsilon>1, <epsilon>2 and <epsilon>3. These epsilon paths are added to vc and are added as children of <epsilon>0. The algorithm then calls etree on each of these epsilon paths and proceeds recursively. The resulting epsilon tree is shown in FIG. 192.

Note that the algorithm for the construction of the epsilon paths could be combined with the algorithm for construction of the epsilon tree. The two are separated in this presentation for clarity.

The complete alpha paths can be derived from a preorder traversal of the alpha tree or epsilon tree. In either case, the alpha paths are obtained by finding a descendent of the root which is an endnode. An alpha path consists of the sequence of nodes on the path in the tree from the endnode to the root.

For example, a preorder traversal of the epsilon tree in FIG. 192, produces <epsilon>4 as the first endnode descendent of the root, <epsilon>0. The first alpha path is the sequence of nodes on the path in this tree from <epsilon>4 back to <epsilon>0:

<alpha>1: <epsilon>4<epsilon>1

Note that the root, <epsilon>0, is not included in the alpha path, since it is a dummy path. Continuing with the traversal produces the complete alpha paths listed in the table shown in FIGS. 193*a* and 193*b*.

16.8 Path Coverage

Before discussing coverage, it is important to note that, of the nine physical paths in this particular example, only four are feasible:

FEASIBLE PATHS: 1 4 8 9

To keep our treatment general, we shall assume that all physical paths are feasible.

To cover all edges of the alpha graph, three physical paths are sufficient, for example:

EDGE COVER: 1 5 9

The correlation between the execution of physical paths and elementary paths is presented in the table shown in FIG. 194. The rows in this table that consist of a single 'x' are of special importance. The presence of such a row means that there is only one physical path which correlates with the elementary path represented by that row.

These physical paths:

NECESSARY ELEMENTARY PATHS: 1 4 7 must be contained in any elementary path cover. A possible elementary path cover is:

ELEMENTARY PATH COVER: 1 2 4 5 7 9

Note that this cover consists of six (physical) paths. In fact, any elementary path cover must consist of at least six paths.

A complete alpha path cover must consist of all physical paths. This requirement is evident from the table shown in FIG. 195, which shows that there are some alpha paths which can be executed by only one physical path, and that there is at least one such alpha path for each physical path. Note that the table in FIG. 195 is illustrative and not comprehensive, in the sense that there are other alpha paths which are executed by only one physical path.

17 Automatic Parallelization

The same theoretical foundation for software testing can be applied to automatic parallelization of programs because both fields share the same fundamental problem: finding the independent parts of a program. See FIG. 196.

An automatic parallelization tool breaks apart a program into smaller pieces that can be scheduled to run on separate processors. For example, in FIG. 198, the pieces (code fragments) are represented by the blocks A, B, C and D. The graph on the right is normally some form of dependence graph. Each edge (arrow) in the graph represents an ordering relationship known as a "sequencing constraint." Opportunities for parallel execution can be discovered by examining paths in the graph. There is no path in the graph from B to C, so B and C can be executed in parallel.

Program analysis is used to identify sequencing constraints. There are two types of sequencing constraints: necessary and unnecessary. Parallelization of a program is equivalent to the removal of the unnecessary sequencing constraints. To ensure correctness, an automatic parallelization tool must accurately identify and preserve the necessary sequencing constraints.

An automatic parallelization tool is based on some form of program analysis. The effectiveness of a tool for parallelization depends on the precision of the underlying form of program analysis in distinguishing necessary from unnecessary sequencing constraints. Higher precision leads to fewer unnecessary sequencing constraints and greater parallelization.

The two basic types of (static) program analysis are: data flow and control flow analysis. Existing program analyzers are typically based on a dependence graph. In a dependence graph, each edge represents a sequencing constraint which is either a data dependence or control dependence, but not both. For example, in the pseudo-code:

```
input x
y = x + 1
``` there is a data dependence between the first statement which stores a value in 'x' and the second statement which reads the value of 'x'. This is a necessary sequencing constraint, since the first statement must be executed before the second statement for correct program behavior. This sequencing constraint would appear as a data dependence edge in a dependence graph.

In an information flowgraph, a single edge may represent a data flow or a control flow or a composite flow (a sequencing constraint which consists of both control and data), as described in the section, "Intra-method graphs. The use of a single edge to represent composite flow is one distinguishing characteristic of information flow analysis which leads to greater precision than program analysis based on a dependence graph.

The pseudocode for a simple example and the corresponding dependence graph is shown in FIG. 199. Each node in the dependence graph is a program statement. In this graph, each data dependence is represented by an edge labeled by a <delta>, and each control dependence is represented by an edge labeled by a 't'.

A conceptual diagram depicting how information flow analysis can applied to automatic parallization is shown in FIG. 197. First, a preprocessor converts the source code to the intermediary language DDF. In the example, this preprocessor converts the pseudocode to DDF as shown in FIG. 200. Next, the DDF is converted to a decision graph which is processed by the alpha transform to produce one or more information flowgraphs. Finally, a postprocessor converts the information flowgraphs into independent pieces of source code. The operation of the preprocessor and postprocessor will vary, depending on the source language and system.

The application of information flow analysis to the example results in two separate information flowgraphs as shown in FIG. 201. These two information flowgraphs are mapped back to two independent tasks as shown in FIG. 202. These two tasks can be run in parallel on two separate processors.

In the dependence graph shown in FIG. 199, the three edges (S5 to S7, S6 to S7 and S6 to S9) represent unnecessary sequencing constraints. The presence of any one of these edges is sufficient to limit parallelization. These three edges have no counterpart in the information flowgraphs shown in FIG. 201. The increased precision of information flow analysis is clearly demonstrated by the absence of the unnecessary sequencing constraints.

The increased precision inherent in information flow analysis leads to increased ability to reveal opportunities for parallelization. Whereas dependence analysis, the dominant form of contemporary program analysis, results in a single graph (FIG. 199), information flow analysis results in two independent graphs and two independent tasks (FIG. 202).

Incorporation by Reference of Pseudocode

This application refers to pseudocode contained in an ASCII-compliant text file named "SCRT-1-006-PSEUDOCODE.TXT" having a size of 74.0 KB (75,813 bytes), and created on 12 Feb. 2009. This text file is being filed electronically concurrently herewith and is incorporated herein by reference in its entirety.

While the preferred embodiments of the invention have been illustrated and described, as noted above, many changes can be made without departing from the spirit and scope of the invention. Accordingly, the scope of the invention is not limited by the disclosure of the preferred embodiments. Instead, the invention should be determined entirely by reference to the claims that follow.

The embodiments of the invention in which an exclusive property or privilege is claimed are defined as follows:

1. A computer implemented method for analyzing computer programs based on a mathematical model of within the subroutine-level code of such programs, said method comprising:
  a reduction process which transforms a representation of signal flows from an unreduced form to a reduced form, thereby removing unnecessary sequencing constraints;
  said reduction process further comprising obtaining the unreduced form from said code, said unreduced form comprising a representation of control flow structure with associated data elements in said code, said data elements further comprising: definition, use, predicate (vector of uses), intra-segment du-pair (definition-use pair), and intra-segment ud-pair (use-definition pair), performing a reduction process having the effect of removing unnecessary sequencing constraints (unnecessary flows), yielding said reduced form, said reduced form further comprising a representation which is convertible back to a parallelized form of the original subroutine-level code;

said unreduced form comprises a system of unreduced signal flow equations which, in conjunction with a signal flow algebra, describe the transmission of signals or state within said code, said signals further comprising control state and data state, with said signal flow algebra further comprising four operators for sequence, control, convergence and alternation and having algebraic rules that are non-commutative and non-associative; and wherein said reduction process comprises the repeated application of the rules of said signal flow algebra, thereby transforming said unreduced signal flow equations into a reduced form comprising a system of reduced signal flow equations, said process having the effect of removing unnecessary sequencing constraints.

2. The computer implemented method of claim 1, wherein the unreduced form comprises a decision graph, which is an ordered tree representation of a system of unreduced signal flow equations which, in conjunction with said signal flow algebra, describe the transmission of signals or state within said code; and wherein said reduction process comprises a fully automatable system of non-iterative graph transformations which natively support conventional structured constructs in said code, as well as the semi-structured constructs break, return, continue, and exceptions, and wherein said reduction process yields a reduced form further comprising one or more information flowgraphs at the subroutine level, each of which is a direct representation of the system of reduced signal flow equations as a graph having the same mathematical basis as the signal flow equations.

3. The computer implemented method of claim 2, wherein said information flowgraphs, which are direct representations of the systems of reduced signal flow equations as graphs having the same mathematical basis as the signal flow equations, and which are also inherently parallel representations of program flow, are utilized in a postprocessing step, said step converting said information flowgraphs into a desired output form further comprising independent or quasi-independent subsets of the original code of said program, such that said independent subsets may be utilized independently of each other as parallel codes or threads to implement automatic parallelization, or for use in efficient and parallelizable automated software testing approximating all-paths testing.

* * * * *